United States Patent [19]

Thaden et al.

[11] Patent Number: 4,654,804

[45] Date of Patent: Mar. 31, 1987

[54] VIDEO SYSTEM WITH XY ADDRESSING CAPABILITIES

[75] Inventors: Robert C. Thaden, Houston; Jerry Van Aken; Jeffrey C. Bond, both of Sugar Land, all of Tex.; Rudy Albachten, Centerville, Ohio

[73] Assignee: Texas Instruments Incorporated, Dallas, Tex.

[21] Appl. No.: 633,389

[22] Filed: Jul. 23, 1984

[51] Int. Cl.[4] .......................... G06F 15/66; G06F 3/14

[52] U.S. Cl. .................................... 364/520; 340/798; 364/200; 364/521

[58] Field of Search ............... 364/518, 519, 520, 521, 364/200 MS File, 900 MS File; 340/701, 703, 798, 799

[56] References Cited

U.S. PATENT DOCUMENTS

| | | | |
|---|---|---|---|
| 3,789,367 | 1/1974 | Dumstorff et al. | 364/900 |
| 4,069,511 | 1/1978 | Lelke | 364/200 |
| 4,237,543 | 12/1980 | Nishio et al. | 364/900 |
| 4,286,320 | 8/1981 | Ott | 364/200 |
| 4,495,594 | 1/1985 | Eggebrecht et al. | 364/521 X |
| 4,511,965 | 4/1985 | Rajaram | 364/200 |
| 4,546,450 | 10/1985 | Kanuma | 364/900 |
| 4,546,451 | 10/1985 | Bruce | 364/900 |

*Primary Examiner*—Felix D. Gruber
*Assistant Examiner*—H. R. Herndon
*Attorney, Agent, or Firm*—Robert D. Marshall, Jr.; Richard K. Robinson; Rodney M. Anderson

[57] ABSTRACT

A video system has a processor processing of data to be displayed on a CRT monitor. A memory which is the embodiment shown is a multiport dynamic random accessed memory, stores the data therein according to X and Y coordinates. A video controller controls the transfer of data between the processor and the memory; the controller also, has included therein an X and Y address logic for providing the X and Y coordinates to the memory.

29 Claims, 109 Drawing Figures

TO FIG. 22f

FROM FIG. 40B

TO FIG. 40D

FROM FIG. 40C

TO FIG. 40E

VIDEO SYSTEM WITH XY ADDRESSING CAPABILITIES

BACKGROUND OF INVENTION

This invention relates to electronic computer systems and the like, and more particularly relates to improved methods and apparatus for achieving a video display having high resolution.

Related U.S. patent applications are: application Ser. No. 633,385 entitled "Video System Controller with a Row Address Override Circuit" by Jeffrey C. Bond and Robert C. Thaden, application Ser. No. 633,384 entitled "Single Chip DRAM Controller and CRT Controller" by Robert C. Thaden and Jeffrey C. Bond, application Ser. No. 633,386 entitled "Video Memory Controller" by Robert C. Thaden, Jeffrey C. Bond, James C. Moravec, Karl M. Guttag, Raymond Pinkham and Mark Novak, application Ser. No. 633,367 entitled "State Machine Standard Cell" by Robert C. Thaden and Mark W. Watts, application Ser. No. 633,383 entitled "Video System with Single Memory Space for Instructions, Program Data and Display Data" by Karl M. Guttag, Raymond Pinkham and Mark Novak, application Ser. No. 633,388 entitled, "Single Chip Video System with Separate Clocks for Memory Controller and CRT Controller" by Robert C. Thaden and Jeffrey C. Bond and application Ser. No. 633,387 entitled "Video Memory Controller Support Storage of Data From an External Source" by Jeffrey C. Bond and Robert C. Thaden.

It is conventional to present the output from a computer as an image on the screen of a cathode ray tube or the like. The screen is actually composed of a collection of dots or "pixels", and the image is therefore produced by selecting and illuminating those pixels necessary to form the desired image. If the image sought to be presented is merely a simplistic pattern of numbers or other symbols, this may be achieved with a relatively limited number of pixels. However, if a more complex image (with a greater resolution) is desired, then a screen must be chosen which has a substantially greater number of pixels.

It should be understood that each pixel used to form the image is illuminated by a separate output data signal from the processing section of the computer, and that an increase in resolution requires a screen having a greater number of pixels. More particularly, since each video data signal must also be stored before being transferred to the video screen, an increase in image resolution also requires that the data storage section have a corresponding increase in the number of memory cells for receiving and holding all of these data signals.

If a different screen having an increased number of pixels is employed for the purpose of enhancing the resolution of the image displayed on the screen, this will not by itself cause a disproportionate increase in the overall cost of the system. However, the size or capacity of the memory component or circuit is a significant factor in the cost of the system, and an increase in the resolution of the image being presented effectively decreases the time interval available to effect a complete transfer of all of the data signals between the storage and the video section.

There have been many attempts and proposals for overcoming or mitigating these disadvantages. In particular, a larger storage unit may be selected to accommodate the increased number of input signals, but as hereinbefore explained, such a unit is inherently expensive, and its use in home computer systems will disproportionately increase the costs of such computer systems. The technology is available to provide specially designed memory units capable of fast access for higher data velocity, but such units are even more expensive than slower access memory units.

Alternatively, an increase in data storage capacity may be achieved by simply adding additional memory units. However, this not only increases the overall cost of the system, since each memory unit is a separate storage component this tends to increase the length of the time required to transfer video data to the pixels.

It has been proposed to mitigate part of the problem which arises when the data storage is composed of a plurality of separate random-access memory units or "chips", by interconnecting them in parallel with a shift register, whereby all of the units may be unloaded and their contents transferred to the shift register at the same time. The data in the shift register is then sequentially clocked to the pixels at the proper video data rate. Although this technique has been extremely beneficial in reducing the data transfer cycle to that corresponding to a single memory chip, it does not attack the problem of increased cost. Moreover, since the storage circuit is composed of memory units of standard design, there will inherently be more cells in the storage unit than there are pixels on the video screen, and whenever the storage is unloaded into the video section, it is necessary to unload more cells than are actually required to produce the image.

The control circuits for the prior art systems required three different controllers, one for handling system memory, one for handling of text information and one for handling of graphic information. These systems often resulted in bottlenecks at the video memory.

The text subsystem is only required if the performance of the bit-mapped controller subsystem is insufficient to handle text in a reasonable period of time. Today in a number of products, the text and graphics are combined into one subsystem. These systems, however, have the drawback that they must have physically separate data buses between the least part of the system memory and the display memory. In one example—part of the main system memory is in a shared memory space with the display data, there is a separate isolated data bus that connects to a high speed ROM that is used to contain important (for performance) routines.

Due to the fact that most display devices must be constantly refreshed with display data, there is a need for a relatively constant "background" task that continually transfers the contents of the display memory to the display device. This "background" with normal RAMs can monopolize the data bus into and out of the RAMs for as much as 85% (percent). With the multiport video RAM type device (such as Texas Instrument Inc's TMS4161 for example), the amount of data bus requirement needed for the display refresh task can be dropped down to less than 3%. On the other hand, the aforementioned bottleneck created when other types of RAMs are used.

In systems using conventional memories for holding the display data it is imperative that the significant portion of the processor's main system memory not be on the same physical data bus as the display data bus, or else the system performance would be substantially reduced. For example if the processor were connected on a bus where 80% of the bus cycles were allocated to display refresh, the overall system performance could be degraded by as much as 5 times (due to only getting 20% or 1/5th of the accesses).

The solutions to date, using conventional memories for the display data, have been to isolate at least a significant portion (if not all) the CPU's main system memory data bus from the display memory data bus. This isolation lets the processor run significantly faster on the isolated system memory bus that it can out of the display memory bus. In some cases, such as systems using a NEC7220 manufactured by Nippon Electric Corporation, the isolation of the display memory is such that the processor has only very limited access to the display memories.

SUMMARY OF THE INVENTION

A video system has a processor for processing of data to be displayed on a CRT monitor. A memory which in the embodiment shown is a multiport dynamic random accessed memory, stores the data therein according to X and Y coordinates. A video controller controls the transfer of data between the processor and memory; the controller also, has included therein an X and Y address logic for providing the X and Y coordinates to the memory.

The address logic includes a first register that the X and Y coordinates are stored in. A second register is used to store the offset between the X and Y registers.

These and other advantages and features of the present invention may be ascertained from a reading of the specifications and the figures in which:

The video memory and CRT controller or video system controller (VSC) controls two essential features.

1. Normal Dynamic Ram control—This may include all or part of the following—DRAM refresh address generation, RAS and CAS strobes, write enable generation, row and column address multiplexing, and other features found in standard dynamic ram controllers. A CPU or other Host processor is given direct or indirect access to the Dynamic RAM.

2. The special control generation necessary to effect the transfer of the to and/or from the memory array and the shift register inside the special VRAMs.

Further significant features that may be included are:

2A. The control hardware necessary to cause the transfer to or from the memory array and the shift register inside the memory array to happen automatically. This hardware may be in the form of programmable or fixed counters that once initialized will cause the transfers to be made automatically in a relationship that is related to the vertical and horizontal scanning of a display device such as a CRT.

3. Including a timing function (either programmable or fixed timing) that produces control signal outputs necessary for the control of a display device like (but not limited to) a CRT.

4. Since there may be multiple operations needing to access the bus such as the host processor access, DRAM refresh, and shift register transfers, it is generally preferred that arbitration logic that controls which of conflicting requests gets the bus, and then sees that the appropriate address is applied to the addresses of the memories is included. This may involve including internal or external address multiplexing.

4A. In the case where host processor conflict with DRAM refresh or other acceses it may be desirable to indicate that the cycle of the host needs to be extended by the means of a "not-ready" like signal.

5. Signals from a host processor may directly/asynchronously effect the address, RAS, CAS DRAM timing or the timing could be controlled synchronously to the controller after the request signals from the host have been synchronized. Or there could be a mixture of synchronous and asynchronous control where normally the host directly controls the DRAM control signal except in cases where there is an access conflict where the controller detects this conflict and substitutes its own control signals and indicates a longer request cycle.

6. In addition to controlling special VRAM, the video controller may also control standard dynamic RAM's.

These and other features/advantages may be apparent from a reading of the specification in conjunction with the figures in which:

DETAILED DESCRIPTION OF SPECIFIC EMBODIMENT

Figure 1:
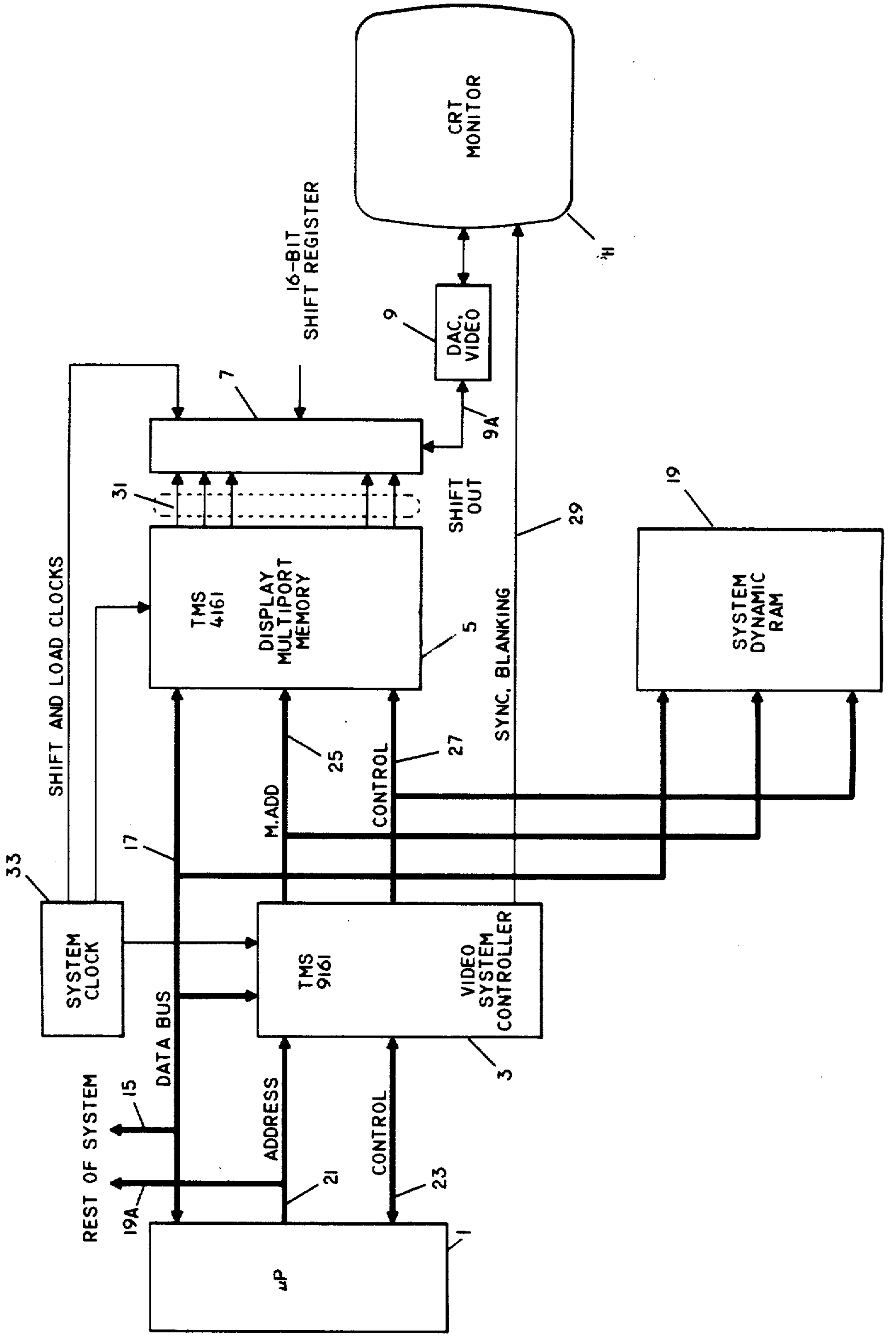
FIG. 1 is a block diagram incorporating a video controller according to the inventions.

In FIG. 1, to which reference should now be made, there is a block diagram of an embodiment of the video system controller according to the invention. The blocks that are shown in FIG. 1 include a microprocessor 1, a video system controller 3, a display memory 5 shch as that disclosed in U.S. patent application Ser. No. 567,040 assigned to assignee of the present invention and incorporated herein by reference. The Output of the display memory 5 is connected to a shift register 7 which shifts data to an optional digital to analog converter 9 for application to an appropriate monitor or television display 11 or other output or input device via bidirectional data bus 9A. Additionally, a system dynamic RAM 19 is provided for the storage of data and/or instructions for processing by a microprocessor 1. The microprocessor 1 contains data inputs from terminal bus 15 and applies the data to a bi-directional bus 17 which connects the microprocessor 1 to the video system controller 3, the display memory 5 and the system dynamic RAM 19. Additionally, the microprocessor provides address information to the video system controller 3 and to a second terminal bus 19*a* which in conjunction with terminal bus 15 are connected to a port device such as a keyboard, as well as other peripheral devices which may be utilized by the system. The microprocessor 1 provides address information to the video system controller 3 via an address bus 21. The handling of the interface between the microprocessor 1 and video system controller 3 is provided by the bidirectional bus 23 over which the control signals are transferred between the microprocessor 1 and the video system controller 3. The output of the video system controller 3 is applied in the form of address information and control signals to the display memory 5 and system dynamic RAM 19 via address bus 25. The control of the transfer of data to and from the display memory 5 and the system dynamic RAM 19 is provided from the video system controller 3 via the control bus 27. Additionally, a sync and blanking signal is provided to the CRT monitor 11 via sync line 29. The microprocessor 1 executes the program instructions that are provided to it either by the data bus 17 or stored within its own internal memories. In response to these program instructions, control signals and data in the form of commands are passed to the video system controller 3. The video system controller 3 performs four basic functions. These functions are (1) it allow the microprocessor 1 virtually uncontested access to the system dynamic RAM 19 and the display memory 5; (2) automatically generates the refresh cycles needed to maintain the data stored within the system dynamic RAM 19 and the display memory 5; (3) performs the diplay update cycles needed to periodically load new video data into the display memory 5 and in particular into the shift registers contained within the display memory 5; (4) generates the video sync signals and blank signals necessary to control the video monitor.

The display memory 5 includes a bit map RAM unit or chip having sufficient cells to accomodate any screen display intended for the CRT monitor 11 and further includes a serial shift register that has a plurality of taps at locations corresponding to different preselected columns of cells in the display memory 5. Additionally, provisions are included for selecting taps to unload only a portion of the shift register containing the bits of interest, whereby unused portions of the shift may be effectively excluded and the time for transferring of data of interest to the CRT monitor 11 is reduced. The optional high speed shift register 7 is interfaced to the internal shift register ports of the display memories 5 via conductors 31, and shifts the data to an optional digital to analog video signal converter 9 or other output devices and input devices. The CRT monitor 11 displays the information that is provided to it from the microprocessor 1 via the data bus 17 under the control of the video system controller 3 which handles the transfer of data from the display memory 5 to the CRT monitor via the optional shift register 7 and the digital to analog converter 9. Timing for the system is provided by the system clock 33 which provides the shift and load clocks to the system, and in particular to the video system controller 3, the display memory 5 and the shift register 7.

Figure 2:
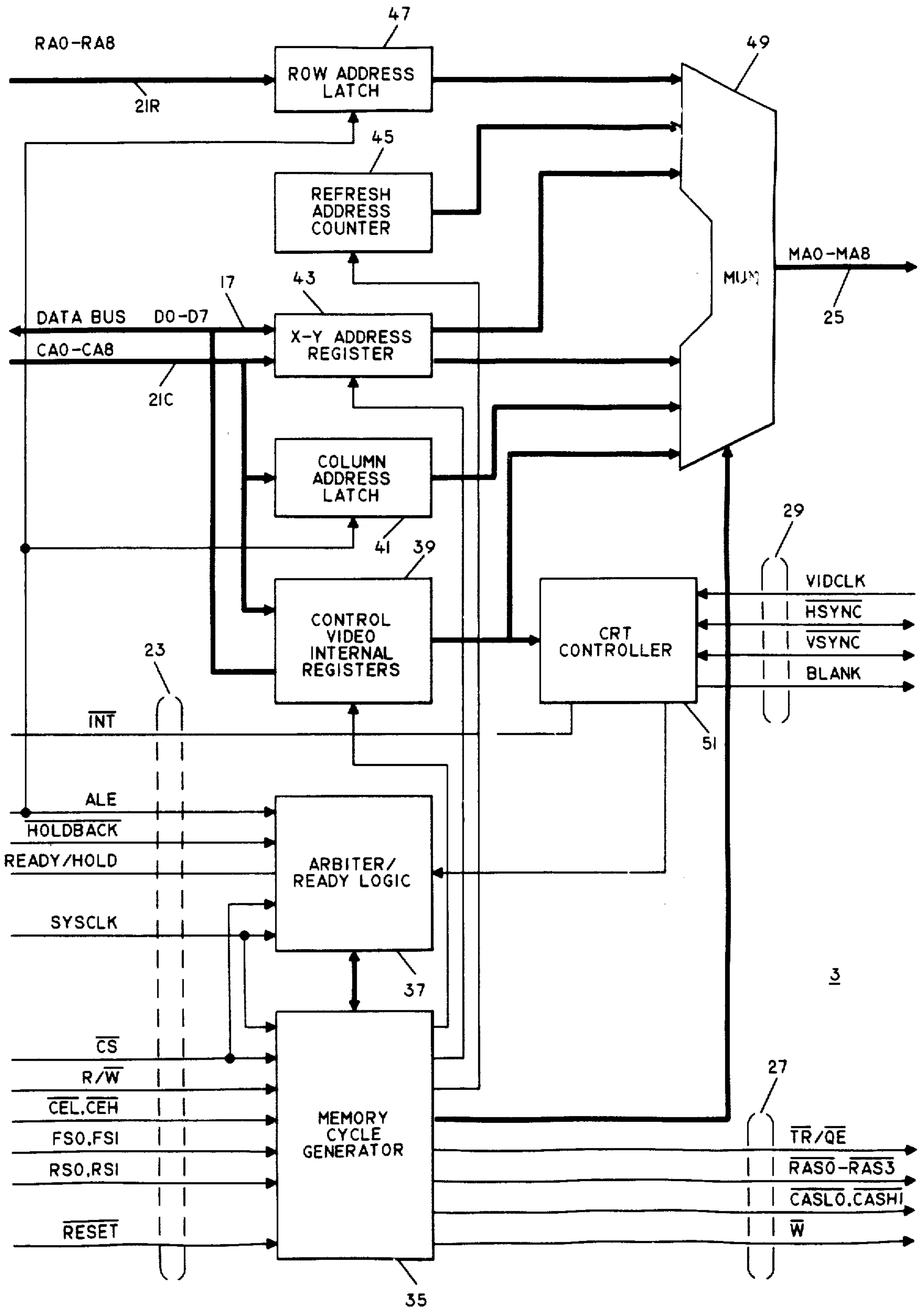
FIG. 2 is a functional block diagram of the video controller of FIG. 1.

FIG. 2 to which reference should now be made is a functional block diagram of the video system controller 3 of FIG. 1 in which a multiplexer 49 accepts addresses from the microprocessor 1 via address bus 21 as well as from a refresh address counter 45 which is used to refresh the memory cells of the display memory 5, from an X-Y address register 43 and the shift register address from the control and video internal register 39. The addresses are converted to a 9 bit row and column address required for the display memory 5 and/or the system DRAM 19. The address that is provided by the microprocessor 1 is divided into two groups, RA0–RA8 are the row address bits which are applied to a row address latch 47 via data bus 21R and the CA0–CA8 address bits which are the column address bits which apply to the column address latch 41 via data bus 21C. Of course the mnemonic CA stands for the column address bits. An arbitor-ready logic 37 determines the source of the addresses that is applied by a multiplexer 49 and data bus 25 to the display memory 5 as well as providing a ready/hold signal to the microprocessor 1 as a portion of the control signals carried via data bus 23. The control signals used to control the multiplexer 49 and the subsequent multiplexing of the row column addresses as they are outputted on the data bus 25 in the form of MA0–MA8 which stands for memory address is generated by a memory cycle controller 35. The row and column address inputs from the microprocessor 1 are stored in a row address latch 47 and a column address latch 41 respectively by the falling edge of the control signal "ALE" prior to being multiplexed to the display memory 5.

Both the X-Y registers 43 and the control and video register 39 are programmable registers which are directly accessible by the microprocessor 1.

Data bus 17 in the embodiment of FIG. 2 is only 8 bits wide, each register of the X-Y address register 43 and the control and video register 39 is 16 bits wide. Consequently, the microprocessor 1 accesses the high and low bits of the registers in separate cycles. The bit value inputted on column address bit line that is a part of address bus 21C determines whether the high or low byte of the register is addressed. An acess of an internal register is enabled by setting the appropriate function code select which is designated by the function select lines FS0–FS2 at the start of the cycle. Selection of one of the registers, which in the embodiment of FIG. 2 total up to 18, is determined by the 5 bit code input on data lines CA6 through CA2 which are a portion of address bus 21C during the access by the microprocessor 1. The value input on CA1 selects the high or low bytes of the register. The state of the read and write line, R/W-input which must be valid prior to and during the time the column address enable low byte, CEL, which is a control line that is present on data bus 23 goes low, which determines whether the register access is a read or a write. The control and video registers include video timing registers, display update registers, and control registers. The video timing registers are programmed to generate the horizontal and vertical sync and blanking signals needed to control the CRT monitor 11 of FIG. 1. The values loaded into these registers are customized to fit the particular display resolution and timing requirements of the CRT monitor 11. Both interlaced and non-interlaced scan modes are available. The video system controller can be programmed to lock up to externally generated sync signal, an application in which the graphic image generated within the display memory 5 is to be superimposed upon an external video signal.

The display update registers are required because the video system controller 3 generates the display update cycles necessary to periodically refresh the video display. The display update registers maintain the row and tap point address output to the display memory 5 during each display update cycle. The display update cycle is a special type of display memory 5 access which transfers 256 bits of data between the memory cell array and the shift register within each display memory 5 in the memory system. In graphics application, the display update cycle takes place during horizontal blanking to load the shift register with a new load of data from the memory cell array.

During the subsequent active horizontal scans, the contents of the shift registers within the display memory 5 are clocked from the serial out pads and displayed on the CRT monitor 11. The video system controller 3 can be programmed to transfer data in the opposite direction, i.e., from the shift register to the memory cell array, all of which are contained within the display memory 5. This mode of operation is convenient for capturing video images that are generated externally and then clocked into the shift register through the serial input during the preceding active horizontal scan.

The display control registers contain a starting display address corresponding to the location within the display memory 5 that is displayed at the upper left of the screen. The amount by which the display address is incremented between display update cycles is also programmable. These programmable features include (1) specifying the number of scan lines between successive display update cycles; (2) specifying the direction (read or write) of data transfer; (3) specifying the horizontal sync, Hsync, and vertical sync, Vsync, lines to be either inputs or outputs; and the selection of either interlaced or non-interlaced video. These features are controlled by means of the values loaded into the control registers and the video timing registers. In the embodiment represented by the block diagram of FIG. 2, there are two control registers which control the specification of a number of programmable features, including the various modes of operation supported by the video system controller 3 that have already been mentioned. Each active register can be both read or written too by the microprocessor 1. Also included in this block of registers are the status register which can be read but not written to.

A status register contains three active bits. One of these bits indicates when a particular horizontal scan on the screen has been displayed. The other two status bits indicate error conditions. One bit indicates when a pending request for a DRAM refresh cycle has been locked out for too long, and the other bit indicates when a pending request for a display update cycle has been blocked for too long. When enabled, these status conditions cause interrupt requests to be sent to the microprocessor 1.

The X-Y address register 43 maintains the X-Y addresses that represent the concatination of the X and Y coordinates of a location on the graphics screen that is being displayed by the display monitor 5. The video system controller 3 can be configured to provide an internal 20 bit X-Y address in place of the address provided by the microprocessor 1. This feature is useful in extending the address reach of certain processors. Even when the microprocessor 1 has sufficient address reach to directly access any pixel on the screen, the hardware updating of the X-Y address between accesses is likely to be more efficient than the same functions performed in the microprocessor 1's software. The X-Y portion of the address can be independently incremented, decremented, or cleared, under control of the inputs CA4-CA1 supplied by the microprocessor 1 during each X-Y address register 43 access. The incrementing takes place following completion of the access in preparation for the transfer of the next X-Y address to the X-Y address register 43. The video system controller's X-Y addressing feature permits internal algorithms such as line drawings or custom character drawing routines to access a series of adjacent pixels on the screen at hardware assisted speeds.

An arbitor 37 is responsible for generating requests for memory and register access cycles. When more than one request is outstanding, the arbitor is responsible for deciding which request is to be generated next based upon the relative priorities of the completed requests. Since the display update and the DRAM refresh cycles are generated internally by the video system controller 3 typically utilize fewer than 2% of the available memory cycles, the arbitor is likely to grant a request from the microprocessor 1 for a memory register access immediately. However, when a display memory 5 refresh request has been outstanding for sometime, its priority is increased to insure that the refresh cycle occurs before memory data is lost. The arbitor holds the microprocessor 1 in check by means of the RDY/HOLD-signal.

A memory cycle generator 35 is responsible for performing the memory cycles assigned to it by the arbiter/ready logic 37. The memory cycle generator controls the multiplexer 49 and generates the timing for control signals and addresses during a memory cycle. The memory cycle generator 35 can perform microprocessor-direct memory access, X-Y addressing, display update, refresh of the display memory 5 and the system dynamic random access memory (DRAM) 19, shift register read and shift register write cycle.

The video system controller 3 can perform refresh cycles to the display memory 5 and system DRAM 19 at regular intervals. The refresh address counter 45 generates a 9 bit row address output during a refresh cycle. The refresh address counter 45 determines the number of refresh cycles per horizontal scan line. Timing for this transfer is illustrated in FIG. 38.

A refresh address register within the refresh address counter 45 is inaccessible to the microprocessor 1, maintains the current row address and is incremented following each memory refresh cycle. The enabling of refresh cycles and the frequency of refresh cycles are determined by three control register bits within the control register 39C of FIG. **3*b***.

The CRT controller 51 contains a 4 bit scan line counter which is used to count the number of active horizontal scan lines output to the CRT monitor 11 between successive display update cycles. Any number of scan lines from 1 to 16 can be specified. For example, in a system in which each display update cycle transfers enough data to do the video shift register within the display memory 5 for two complete scan lines, a display update cycle is required only at the beginning of every other scan line.

Figure 38:
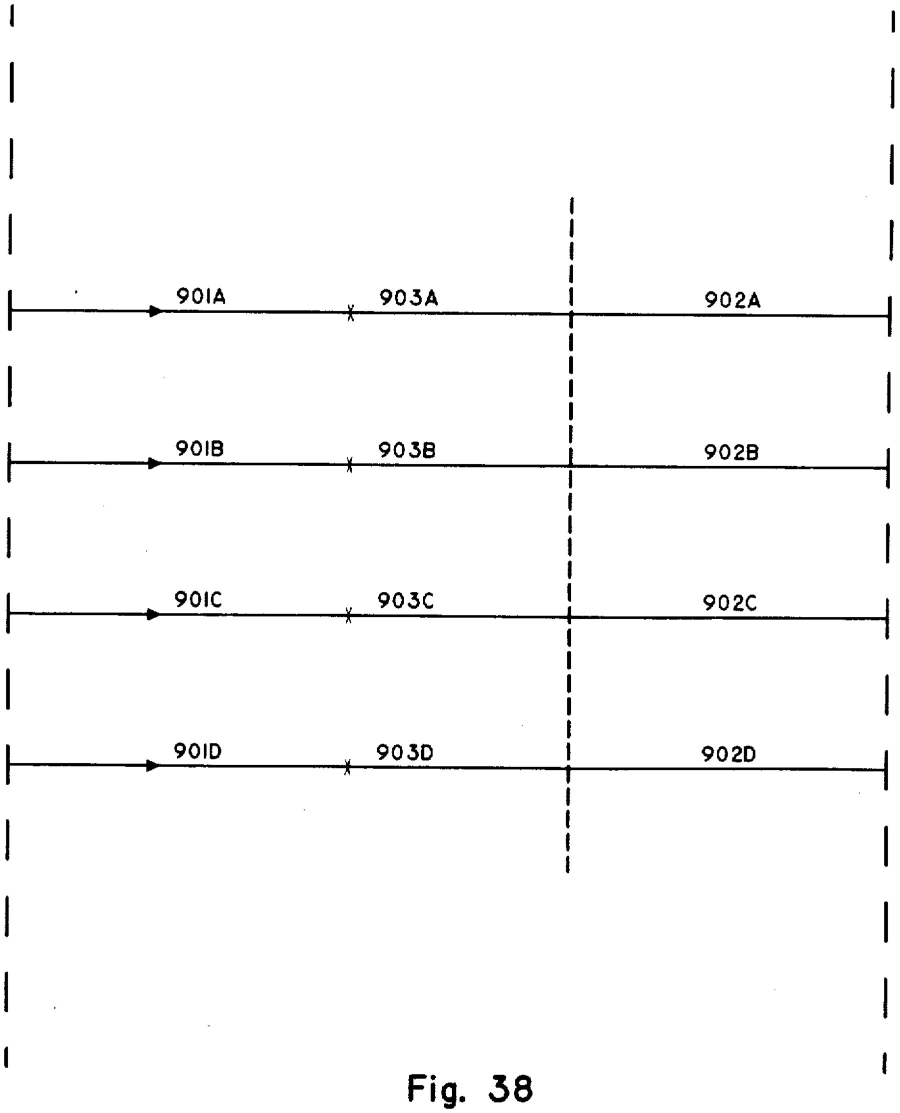
FIG. 38 is a diagram of the data transfer cycle.
Figure 39A:
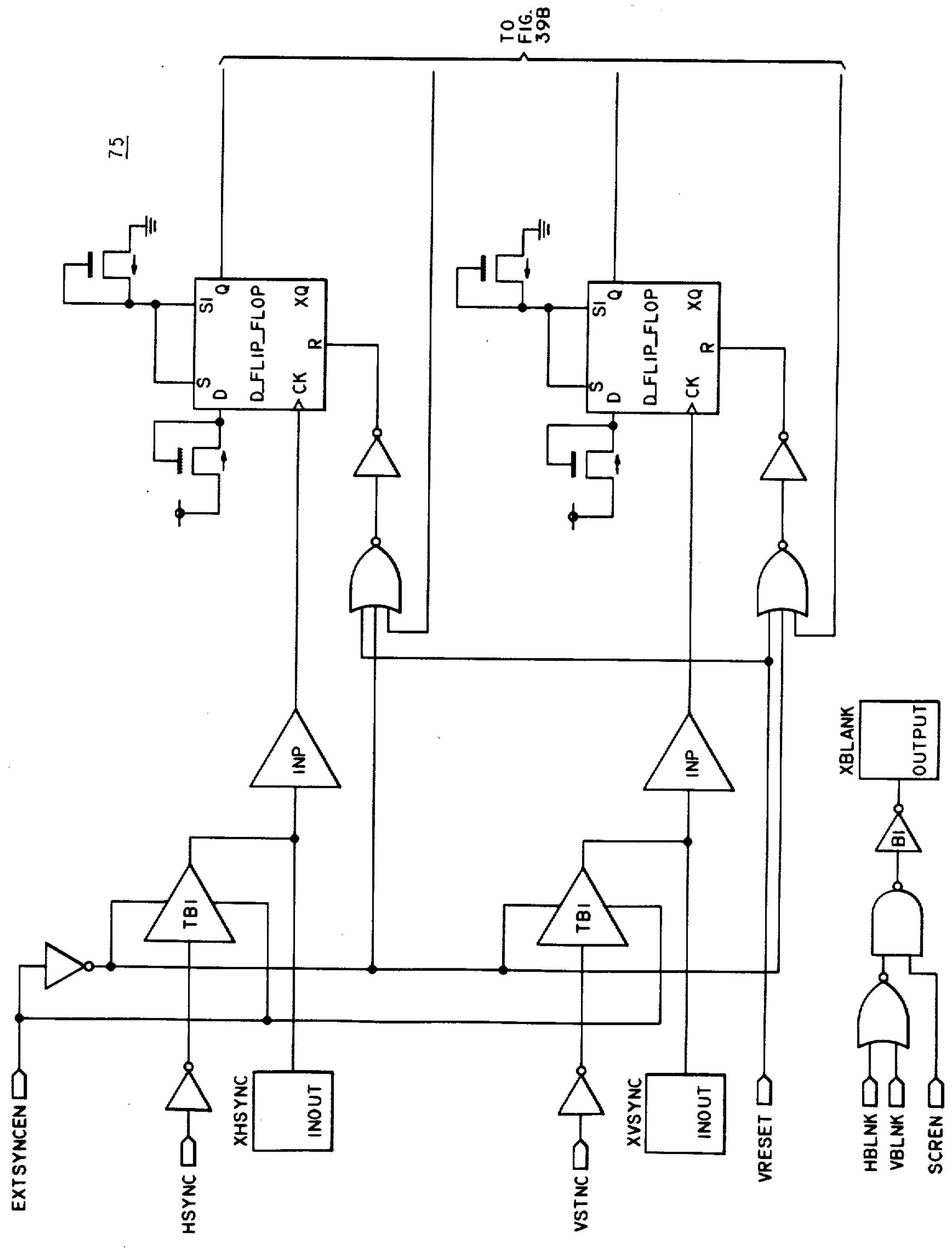
FIGS. 39*a* and 39*b* are schematic diagrams of the video pins of FIG. 5.
Figure 39B:
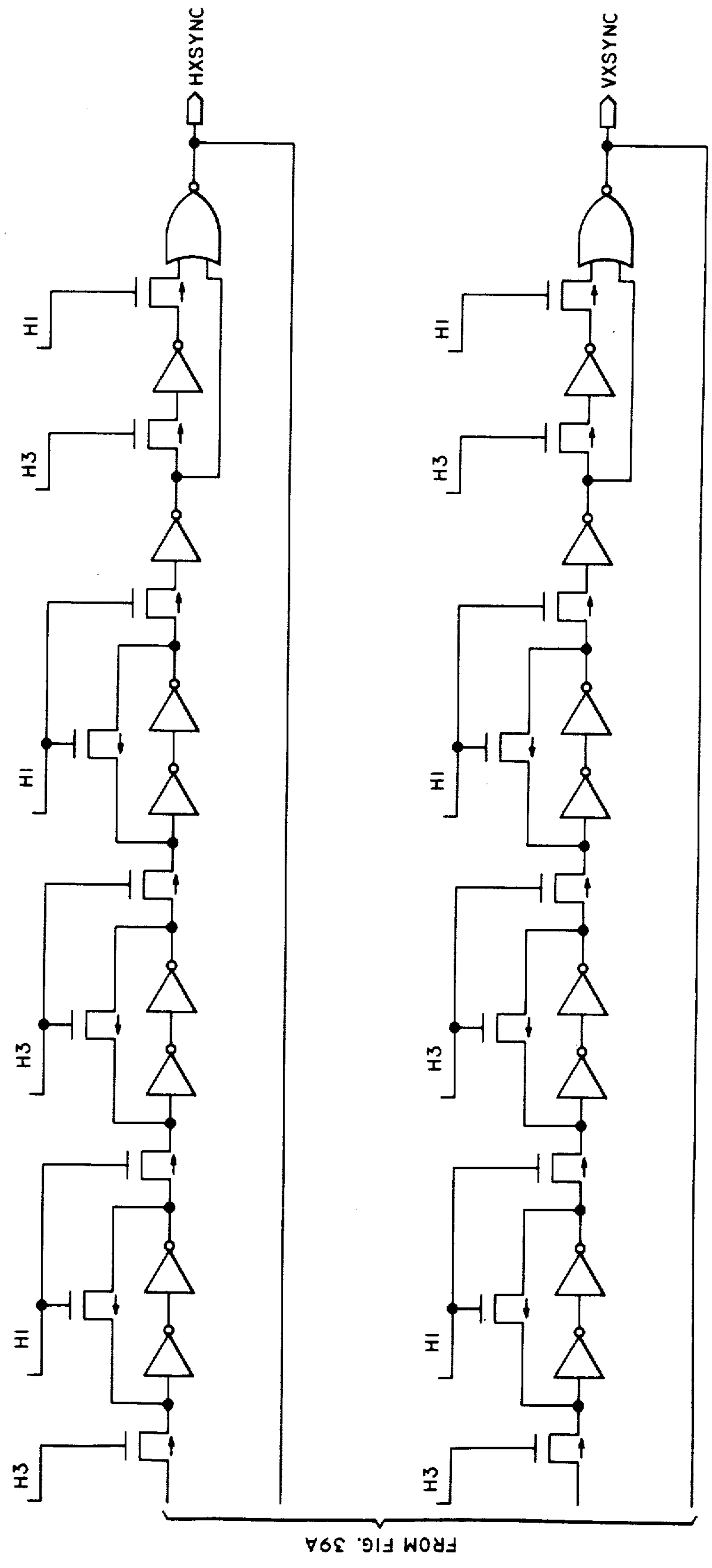
Figure 40A:
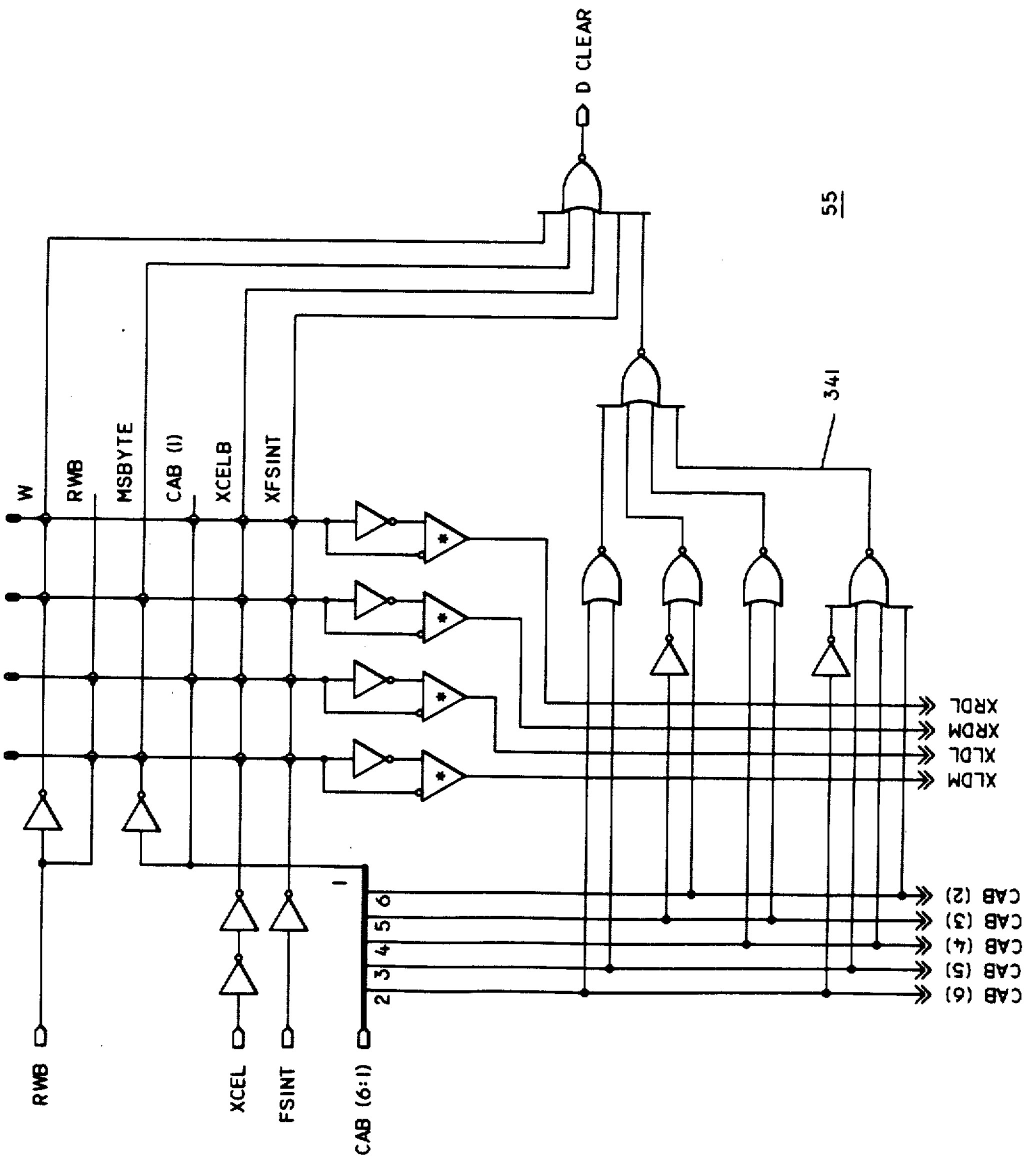
FIGS. 40*a* through 40*f* are schematic diagrams of the CA decode logic of FIG. 3*a*.
Figure 40B:
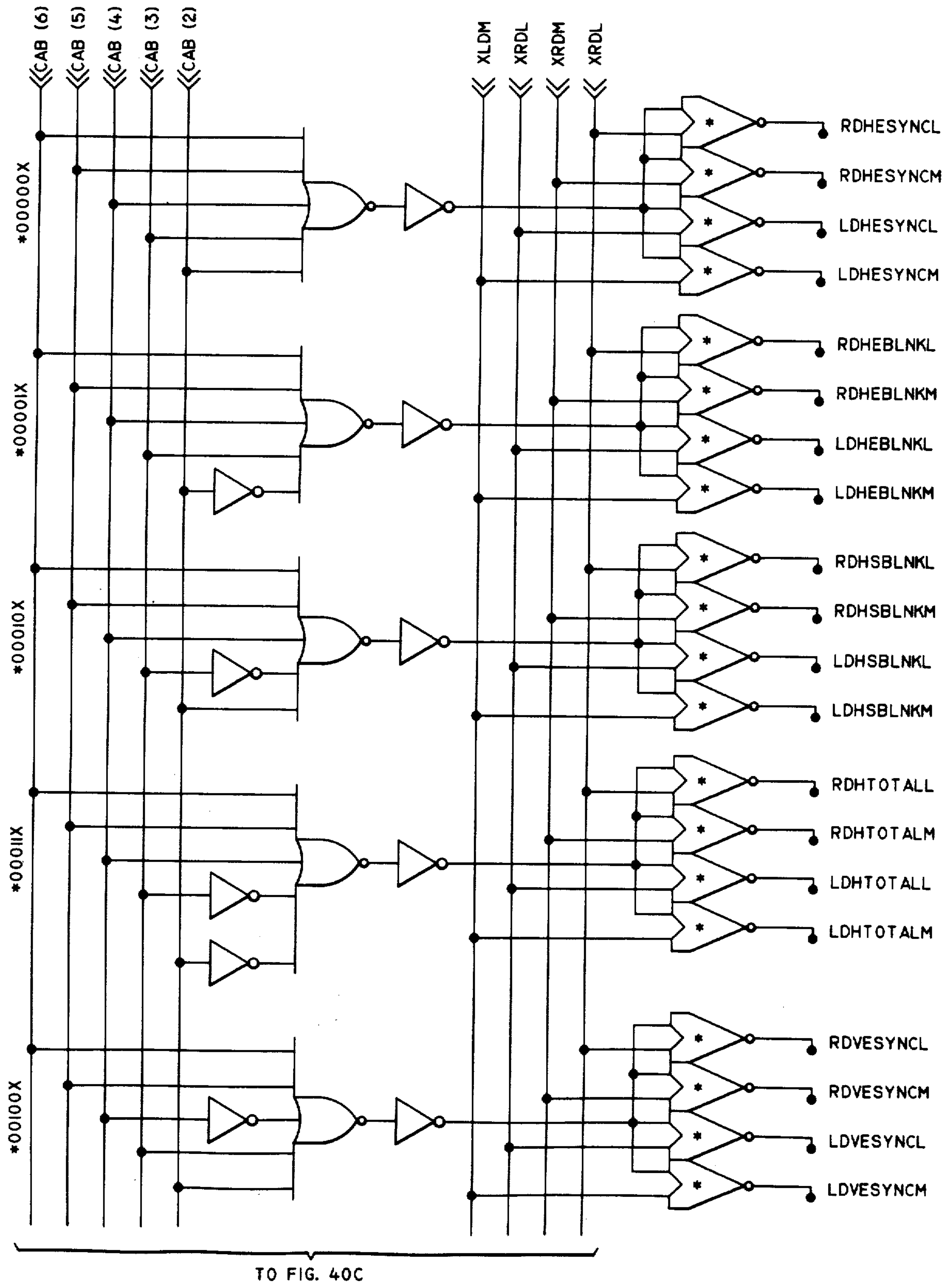
Figure 40C:
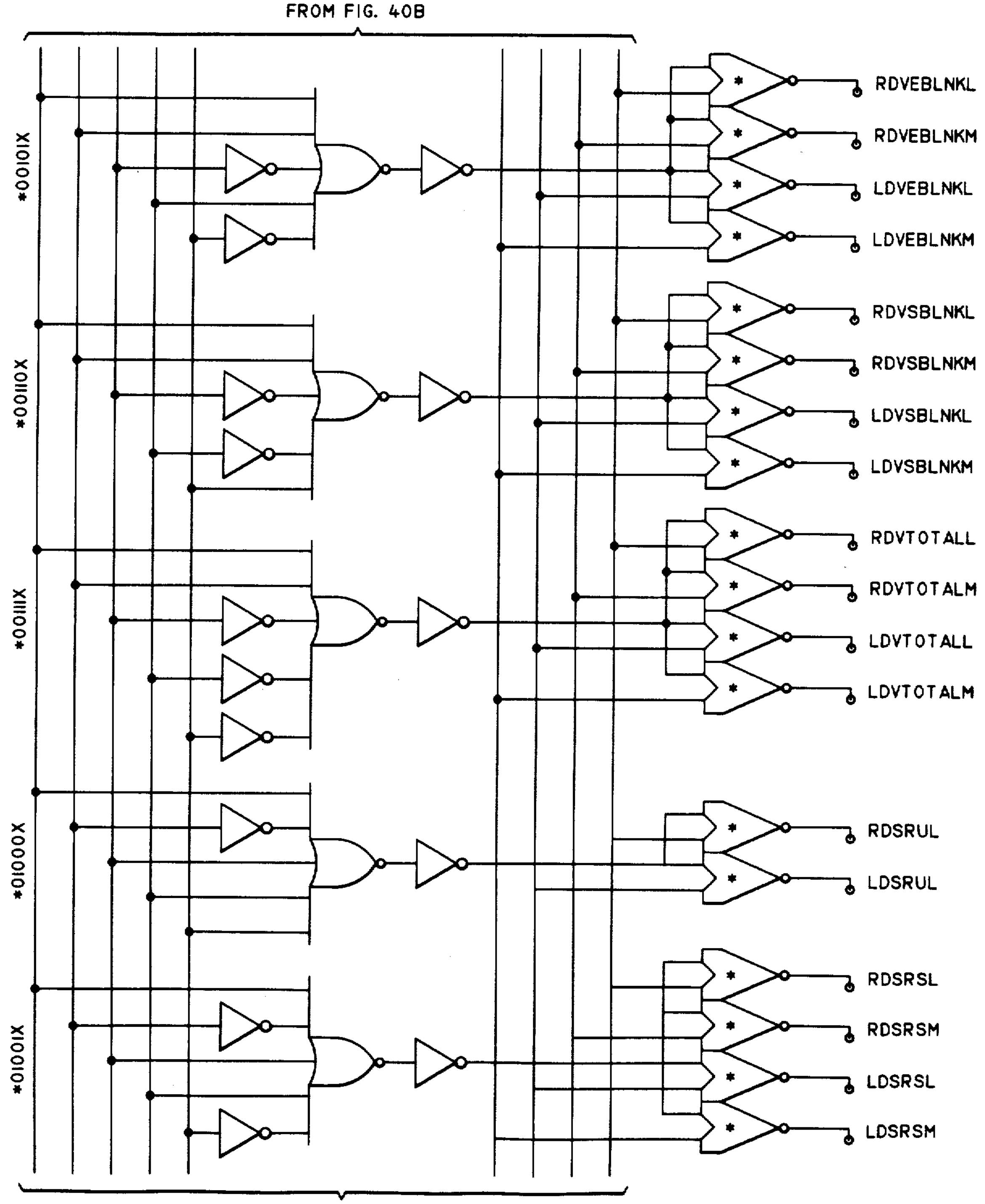
Figure 40D:
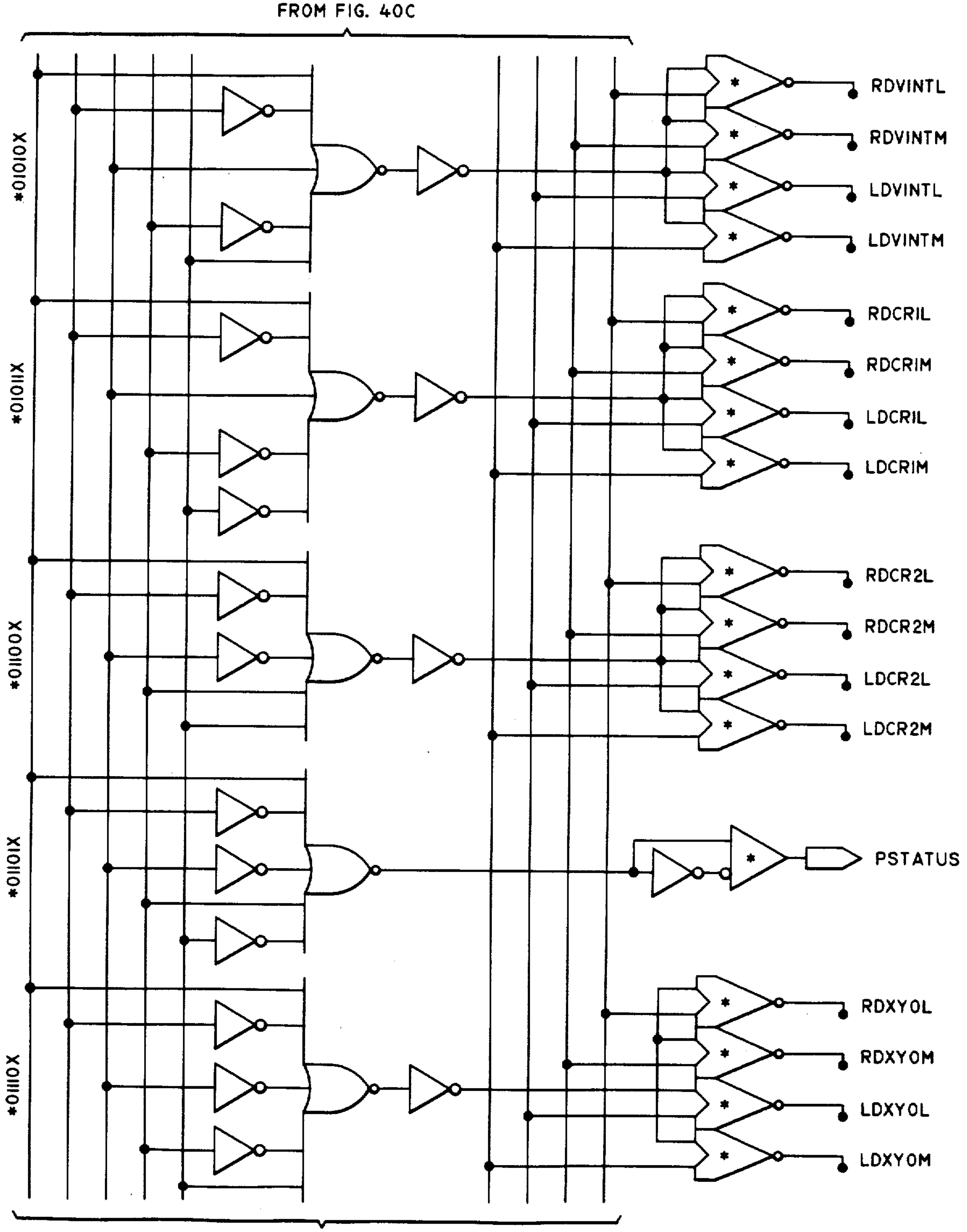
Figure 40E:
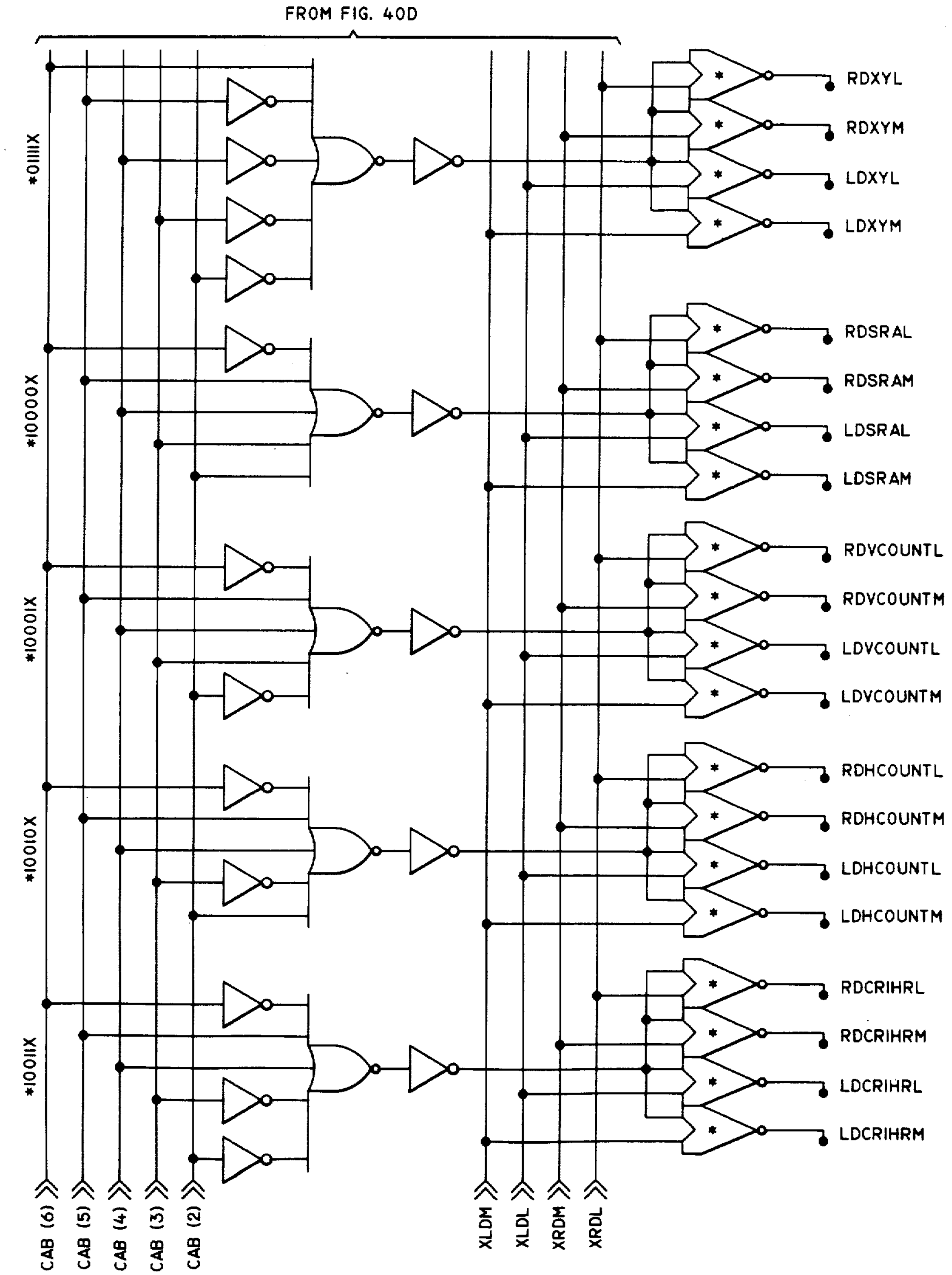
Figure 40F:
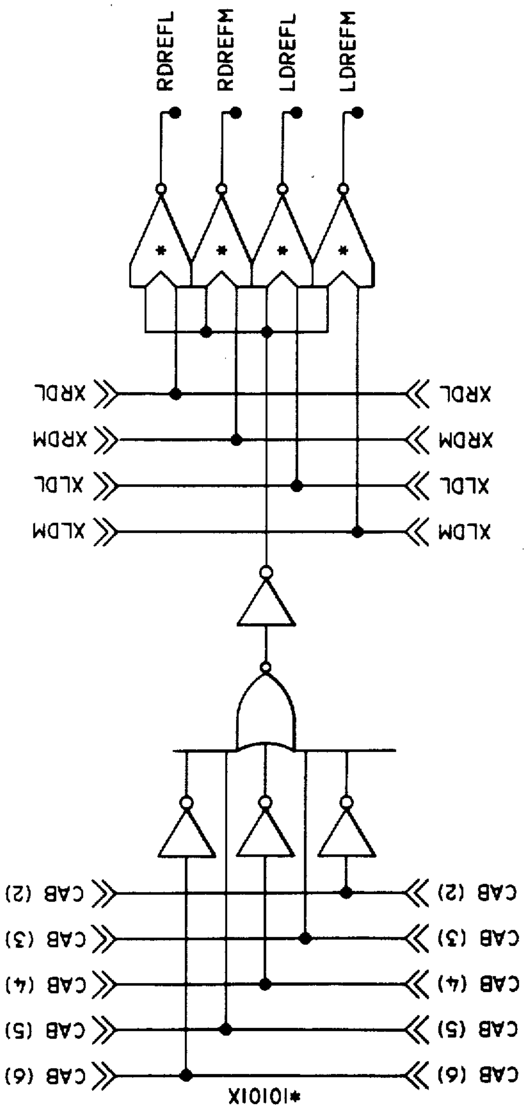

FIG. 38 depicts four successive scan lines on the CRT monitor 11 and will be used to reference the locations at which various video system controller 3 activities ocur. Line segments 901A through 901D represent the active portion of each horizontal scan line. Intervals 902A through 902D represent the blanked portion of each horizontal scan line. The microprocessor 1 may request a memory access at any time and the video system controller 3 will grant the access and perform the memory cycle based on arbitration logic within the video system controller 3. Two types of cycles are produced by the video system controller 3 at particular times during the raster. During the interval labeled 902A, 902B, 902C, 902D, the video system controller 3 performs a display update cycle also known as a shift register reload cycle. This causes a shift register transfer to take place within the display multiport memory 5, which is data to be displayed on the next scan line. The beginning of intervals 901A–D represents thse end of the horizontal blanking interval. At this point the video system controller 3 begins performing refresh cycles to all memories of the system. Up until point 903A–D on each scan line, microprocessor 1 requested memory access cycles are granted with priority over internally requested refresh cycles. Half way through the active scan line, denoted by 903A–D, refresh cycles are given priority over microprocessor requested cycles. Display update cycles are always given priority over microprocessor requested cycles.

FIGS. 3 through **3*g* to which reference should now be made are a wiring diagram of circuit blocks used to implement the functional blocks of FIG. 2** on a single metal oxide silicon chip with field effort transistors.

System 53 (FIGS. **3*f* and 3*g*) contains the memory cycle generator 35, registers 39A which are a portion of the control and video internal registers 39 of FIG. 2, the multiplexer 49, the refresh counter 45, and the arbiter/-ready logic 37. Video block 57 (FIG. 3*e*) completes the functions of the CRT controller 51 as well as the video internal registers 39*c*. The X-Y logic block 43 (FIG. 3*d*) corresponds to the X-Y registers 43 of FIG. 2. The FS decode logic 63 (FIG. 3*a*) contains not only the row and column address latches 41 and 47, but also the function select decode logic which decodes the function select input signals FS (2-0). The CA-decode logic 55 which is a portion of the control and video internal registers 39 of FIG. 2, contains the decode circuits associatesd with the column address latch 41. The remainder of the control registers are contained within the control reg block 39C of FIG. 3*b* and input pins 59 and data status 61 contain input logic for receipt of data from the microprocessor 1 of FIG. 1 and to provide the status to the microprocessor 1 of FIG. 1 as well as providing the control signals necessary to implement the bidirectional transfer of data between the microprocessor 1 and the display memory 5 and system DRAM 19**.

Table 1 provides a definition for the pneumonics used in FIG. 3 to describe the different signals that are illustrated on the figure.

TABLE 1

I/O CONNECTIONS FOR THE VIDEO SYSTEM CONTROLLER 3

| SIGNAL NAME | DIRECTION | DESCRIPTION |
|---|---|---|
| RA8–RA0 | In | Row Address 8 to 0 (9 input lines) These 9 address inputs are multiplexed to memory address lines MA8–MA0 during row address time when a microprocessor 1 initiated memory access cycle is executed. While ALE is high and the display memory 5 is available for a microprocessor 1 initiated cycle, the MA8–MA0 outputs follow the RA8–RA0 inputs, which are latched by the high-to=low transition of ALE. RA0 is the LSB, least significant bit. |
| CA8–CA0 | In | Column Address 8 to 0 (9 input lines) These 9 address inputs are multiplexed to memory address lines MA8–MA0 during column address time when a microprocessor 1 initiated memory access cycle is performed. When the microprocessor 1 accesses one of the 18 registers internal to the Video System Controller 3, a register is selected by the code input on CA6–CA2, and the upper or lower byte of the register is selected by the value input on CA1. During an X-Y address cycle, the value input on CA4–CA1 determines the manner in which the X-Y address stored within the X-Y register is incremented or decremented following completion of the cycle. These |

TABLE 1-continued

I/O CONNECTIONS FOR THE VIDEO SYSTEM CONTROLLER 3

| SIGNAL NAME | DIRECTION | DESCRIPTION |
|---|---|---|
| | | inputs are latched by the falling edge of ALE. CA0 is the LSB. |
| RS1, RS0 | In | RAS Select 1 and 0<br>During microprocessor 1 direct cycles and shift-register-transfer cycles, these two lines determine which of the four row address strobes, RAS3- to RAS0-, is driven active-low. RS1-RS0 are latched by the falling edge of ALE. If extended-row address select mode is enable, these inputs are ignored |
| CEH- | In | Column Address Enable High Byte<br>This signal enables the activation of CASHI- during an initiated memory cycle by the microprocessor 1. |
| CEL- | In | Column Address Enable Low Byte<br>This signal enables the activation of CALSO- during a microprocessor 1 initiated memory access cycle. CEL- is also used to strobe data into the internal registers during register write cycles and to enable register data onto D7-D0 during register read cycles. |
| ALE | In | Address Latch Enable<br>The high-to-low transition of ALE latches the CS-, RAS0-RAS8, CAS0-CAS8, RS1-RS0, and FS2-FS0 inputs, and is interpreted by the Video Display Controller 5 as a command from the host processor to initiate the cycle specified by the values latched at these inputs. ALE is required to be synchronous to SYSCLK, and must meet setup and hold times specified with regard to each low-to-high SYSCLK transition. |
| R/W- | In | Read, Not Write<br>During a memory cycle initiated by the microprocessor 1, R/W- indicates the direction of the data transfer (high for read, low for write), and determines the state of the W- signal output from the Video System Controller 3 to the memory. By appropriately controlling the state of the R/W- input, the microprocessor 1 initiated memory cycle can be a read, write, early write, or read-modify-write cycle. Similarly, during an access of an internal register by the microprocessor, R/W- indicates whether the data is transferred to or from the register. At the beginning of the register access cycle, R/W- is required to be valid prior to the high-to-low transition on the CEL- input. |
| INT- | Out | Interrupt Request<br>The interrupt request output is driven active-low to indicate that an interrupt condition previously enabled by the microprocessor 1 has occurred. INT- will remain active until the microprocessor 1 initiates a read of the Status Register. The Video System Controller 3 can be programmed to generate an interrupt at the start of a particular scan line in each vertical field, and also when a refresh or display-update error has occurred. |
| D7-D0 | I/O | Data Bus Lines 7 to 0<br>The microprocessor 1 accesses the registers internal to the Video System Controller 3 through this 8-bit bidirectional data bus. D0 is the LSB. Each of the 18 16-bit registers within the VSC that are accessible one byte at a time via D7-D0. The microprocessor 1 must be accessed one byte at a time via D7-D0. The microprocessor 1 accessed the memory through a separate data path external to the Video System Controller 3, whose width is determined by the width of the microprocessor 1's data bus. |
| RDY/HOLD- | Out | Ready or Hold<br>The operation and timing of the RDY/HOLD- output are configured by means of several control bits contained in Control Register 39, and also by the state of the HOLDACK- input at the end of reset. With the Video System Controller 3 configured in ready or wait mode, the RDY/HOLD- line remains in high impedance until the microprocessor 1 requests a memory cycle. In hold/hold acknowledge mode, the RDY/HOLD- line is always driven. |
| HOLDACK- | In | Hold Acknowledge<br>When the Video System Controller 3 is configured in hold/hold acknowledge mode, the HOLDACK- input is driven active-low by the microprocessor 1 to acknowledge a hold requests from the Video System Controller 3. While in this mode, the Video System Controller 3 can perform an internally-requested cycle (display update or refresh) only upon receipt of a hold acknowledgment from the |

TABLE 1-continued

I/O CONNECTIONS FOR THE VIDEO SYSTEM CONTROLLER 3

| SIGNAL NAME | DIRECTION | DESCRIPTION |
|---|---|---|
| | | microprocessor 1. A second use of the HOLDACK- line is to configure active level of the VSC's RDY/HOLD-line at system power-up. The level input on the HOLDACK- line just prior to the end of reset determines whether the RDY/HOLD- output is initially configured as active-high or active-low. If HOLDACK- is high at the end of reset, then while the VSC remains configured in ready or wait mode, the RDY/HOLD- output is active-low, meaning a low level means "ready" and a high level means "not ready". The meaning of the high and low levels of RDY/HOLD- are reversed if HOLDACK- is low at the end of reset. When the VSC is configured in hold/hold acknowledge mode, however, the meaning of the levels output on the RDY/HOLD- line are fixed independent of the level on HOLDACK- at the end of reset. |
| CS- | In | Chip Select<br>This input operates as a master chip select. Before any microprocessor 1-initiated access involving the Video System Controller 3 can begin, CS- must be active-low. This includes both accesses of Video System Controller 3 internal registers and accesses of the memory system controlled by the Video System Controller 3. |
| FS2-FS0 | In | Function Selects 2 to 0<br>The three-bit function-select code input on FS2-FS0 indicates the type of cycle requested by the microprocessor 1. All cycles initiated by the microprocessor 1 begin on the high-to-low transition of ALE. |
| SYSCLK | In | System Clock<br>SYSCLK is the system input clock, which is used to generate the timing of signals output to the memory, and the timing of the INT- and RDY/HOLD- signals output to the microprocessor 1. Additionally, all microprocessor 1 interface signals input to the Video System Controller 3 must be synchronous to SYSCLK. |
| RESET- | In | Reset<br>The RESET- input is driven active-low to place the Video System Controller 3 in a known initial state. While RESET- is low, the internal registers are forced to their default values, and all display memory 5 control outputs are forced to their inactive levels. RESET- should be driven low when power is first applied, and remain low for at least 1 msec. After RESET- is brought inactive-high, the microprocessor 1 accesses neither the Video System Controller 3 nor the memory it controls for another 1 msec. This time is required to allow the Video System Controller 3 to perform at least 8 RAS-only refresh cycles, thus bringing the display memory 5 it's current initial state. After the required time has elapsed, the registers internal to the Video System Controller 3 should be loaded with the values appropriate to the application. |
| MA8-MA0 | Out | Memory Address 8 to 0<br>The 9 memory address outputs are multiplexed address lines designed to interface directly to display memory 5, as well as to conventional DRAMs. The Video System Controller 3 multiplexes 9 bits of row address and 9 bits of column address over these lines. When the display memory 5 is 256K DRAMs that require 9 bits of row and column address interface to all 9 memory address outputs, while 64K DRAMs requiring only 9 bits of row and column address are connected to MA7-MA0. MA0 is the LSB. |
| RAS3- TO RAS0 | Out | Row Address Strobe 3 to 0<br>These active-low outputs- are designed to directly drive the RAS- inputs on both conventional memory 13 and the display memory 5. During a microprocessor 1 direct read or write cycle, or a microprocessor shift register transfser cycle, the default mode of operation is that the four row-address-strobe outputs, RAS3- to RAS0-, are controlled by the RS1 and RS0 inputs. The two-bit code input on RS1-RS0 determines which of the four RAS outputs is driven active-low during the cycle. Alternately, the Video System Controller 3 can be configured to use two control register bits in place of the RS1-RS0 to determine which of the four RAS outputs is active during a microprocessor 1-direct cycle. During a DRAM-refresh cycle all four RAS- outputs are always driven active-low. During a display-update cycle, the default mode of |

TABLE 1-continued

I/O CONNECTIONS FOR THE VIDEO SYSTEM CONTROLLER 3

| SIGNAL NAME | DIRECTION | DESCRIPTION |
|---|---|---|
| | | operation is that all four RAS- outputs are driven active-low. Alternately, the Video System Controller 3 can be configured to drive only one of the four RAS outputs low during a display-update cycle. |
| CASHI- | Out | Column Address Strobe, High Byte<br>This active-low output is designed to directly drive the CAS- inputs on on both conventional memory 13 and the display memory 5. During memory cycles initiated by the microprocessor 1, CASHI- becomes active only after the CEH- input is driven active-low. In 16-bit systems, CASHI- is typically used to enable a read or write to the high byte (8 MSBs) of the memory data bus. CASHI- is driven active-low during the internally-requested display-update cycles, and remains inactive-high during DRAM-refresh cycles. |
| CASLO- | Out | Column Address Strobe, Low Byte<br>The operation of CASLO- is similar to the operation of CASHI-, as described above, except that CASLO- is enabled by an active=low level on CEL- rather than CEH-. In 16-bit systems, CALSO- typically is used to enable the low byte (8 LSBs) of the memory data bus. CASLO- is driven active-low during internally-requested display-update cycles, and remains inactive-high during DRAM-refresh cycles. |
| W- | Out | Write Control<br>This signal is intended to drive the W- inputs on both conventional DRAMs and TMS4161 multiport DRAMs. W- is driven active-low during write cycles requested by the host processor. During internally-initiated display-update cycles, W- is driven active-low -if a write is indicated by control bit B6 in Control Register 39C. |
| TR-/QE- | Out | Shift Register Transfer and Output Enable<br>The TR-/QE- output can directly drive the TR-/QE- inputs on the display memory 5. The signals used to enable shift-register cycles, and those used to enable the display memory 5 output buffers during read cycles are multiplexed over this single pin. |
| BLANK- | Out | Video Blanking<br>The BLANK- output is used to control the blanking input on a CRT monitor 11. BLANK- is driven active-low during both horizontal blanking and vertical blanking intervals. This output is TTL-compatible. The entire screen is blanked immediately following reset, and the active portions of the screen are unblanked only after control bit B13 in Control Register 39C is set. |
| HSYNC- | I/O | Horizontal Sync<br>Except when external sync mode is enabled, HSYNC- operates as an output, generating the horizontal sync pulses used to control a CRT monitor 11. HSYNC- is driven active-low during horizontal sync intervals, the timing of which is determined by the values programmed into the Video System Controller 3's horizontal timing registers. In external sync mode, HSYNC- is an input rather than an output, and a high-to-low transition on HSYNC- forces the Horizontal Counter Register to zero. This bidirectional pin is TTL-compatible. |
| VSYNC- | I/O | Vertical Sync<br>Except when external sync mode is enabled, VSYNC- operates as output, generating the vertical sync pulses used to control a CRT monitor. VSYNC- is driven active-low during vertical sync internals, the timing of which is determined by the values programmed into the Video System Controller 3's vertical timing registers. In external sync mode, VSYNC- is an input rather than an output, and a high-to-low transition on VSYNC- forces the Vertical Counter Register to zero. This bidirectional pin is TTL-compatible. |
| VIDCLK | In | Video Clock<br>The video input clock drives the portion of the logic within the Video System Controller 3 chip that is responsible for generating the timing for the sync and blankings signals. VIDCLK also drives the logic responsible for generating internal requests for display-update and DRAM-refresh cycles. Typically, VIDCLK is harmonically related to the dot (or pixel) clock used to stream video data from the external shift registers in the memory system to the CRT monitor. This |

TABLE 1-continued

| I/O CONNECTIONS FOR THE VIDEO SYSTEM CONTROLLER 3 | | |
|---|---|---|
| SIGNAL NAME | DIRECTION | DESCRIPTION |
| | | input is TTL-compatible. |

In FIGS. 4*a* through 4*f* the system 53 includes the logic to implement memory cycle generator 35. This is divided into several logic components which include the row address select RAS, decode logic 65 which decodes a row address select operation; memory pins 69 which control the loading of data through the memory that is provided by a cycle generator 67; memory 67 generates the memory cycle transfers to handle the transfer of data between the microprocessor 1 and the display memory 5 or the system DRAM 19; and control 71 generates the internal control signals that are used by the video system controller 3. Additionally, the arbiter ready logic 37 is contained in the system block diagram as is the refresh address counter 45 which is a portion of the system block diagram 53.

Figure 3A:
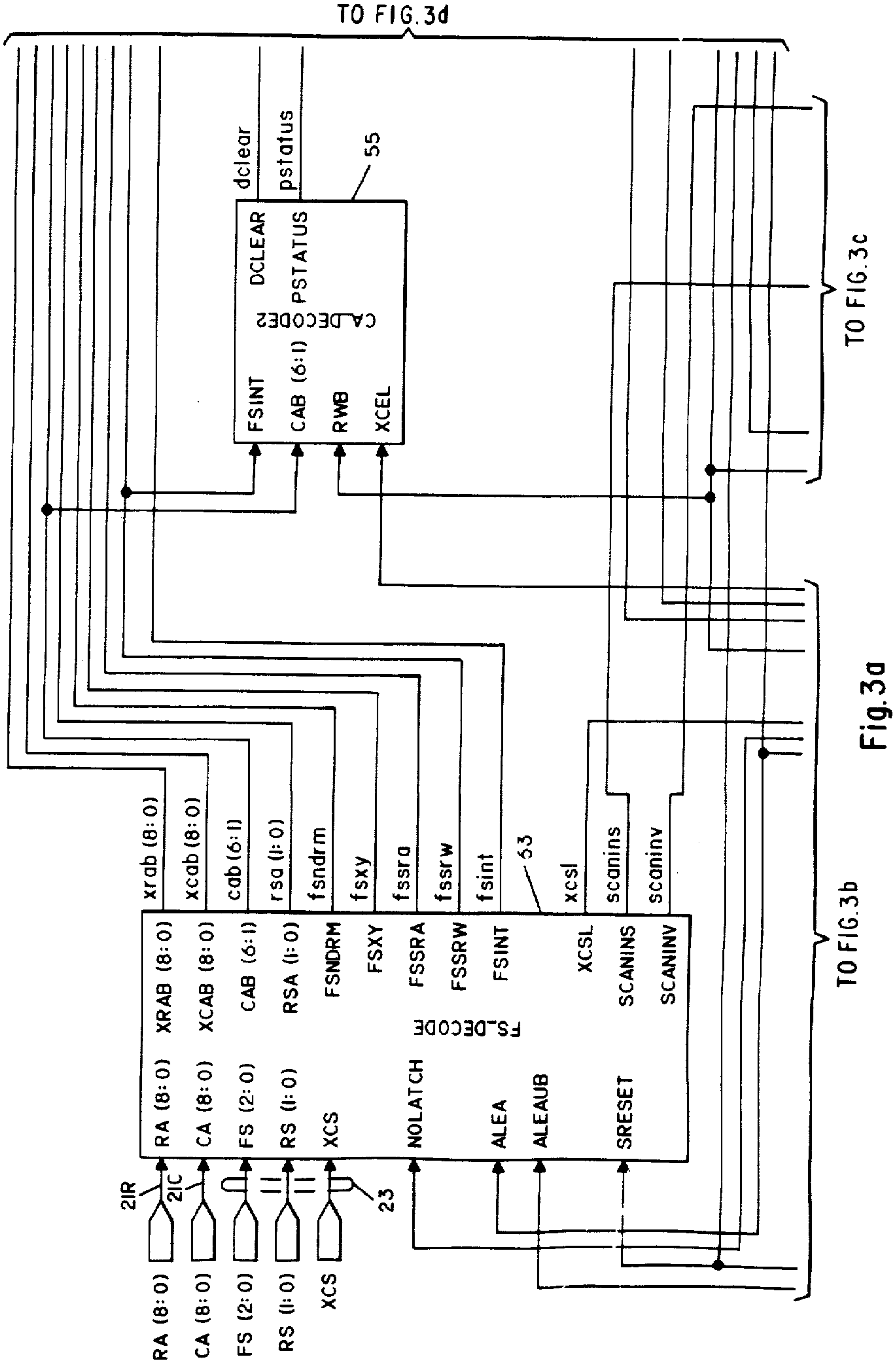
FIGS. 3*a* through 3*g* are wiring diagrams of circuit blocks used to implement the functions of FIG. 2.
Figure 3B:
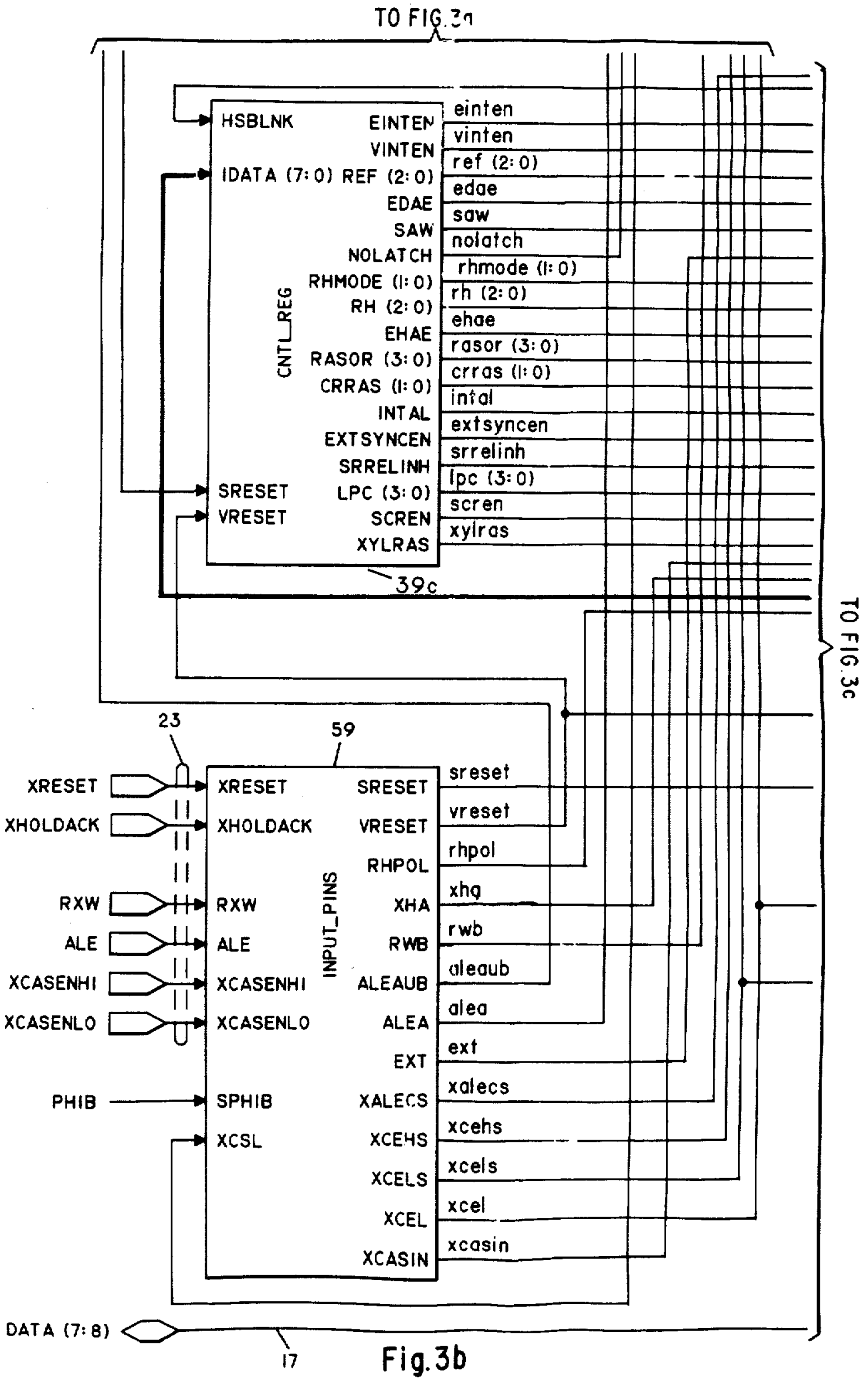
Figure 3C:
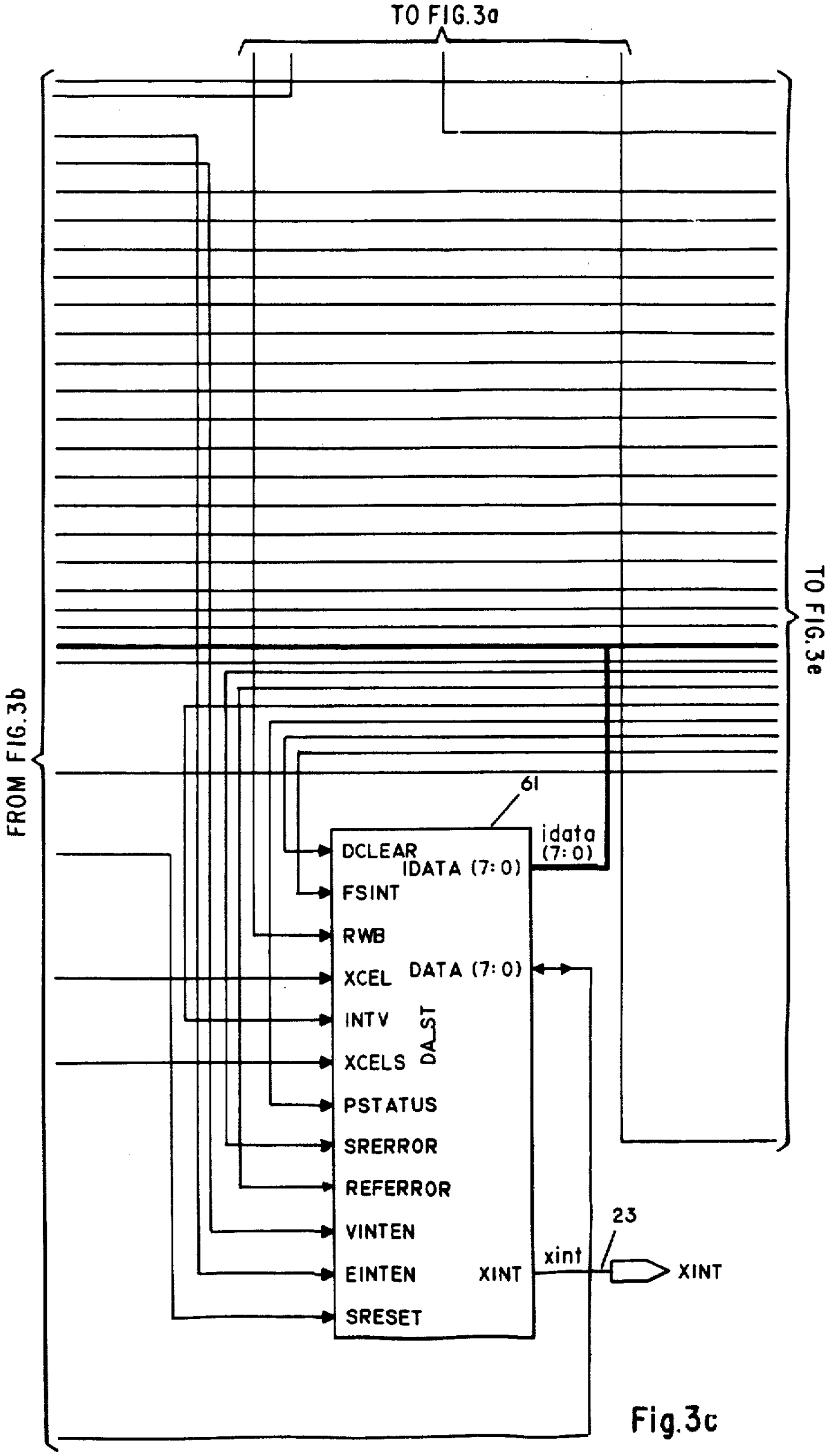
Figure 3D:
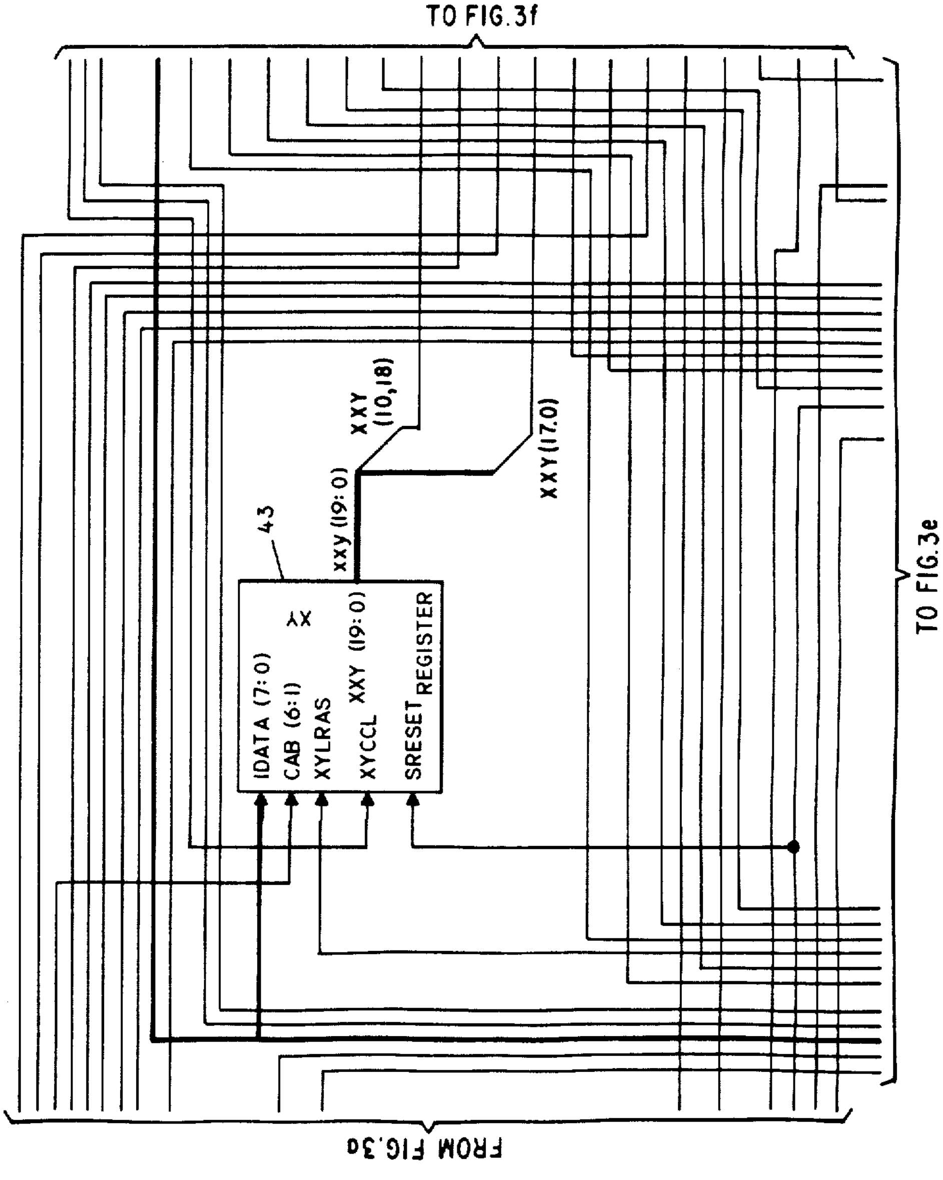
Figure 3E:
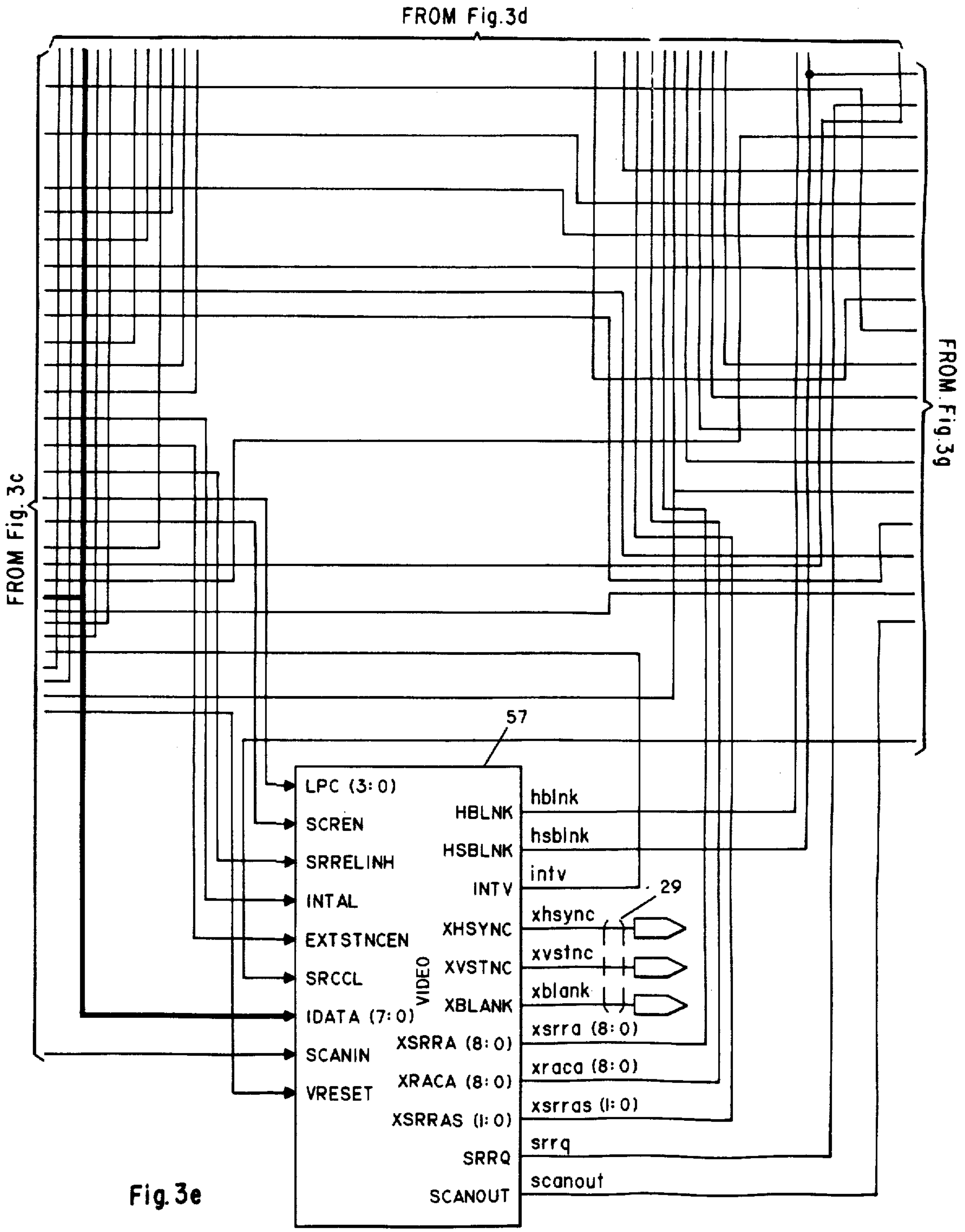
Figure 3F:
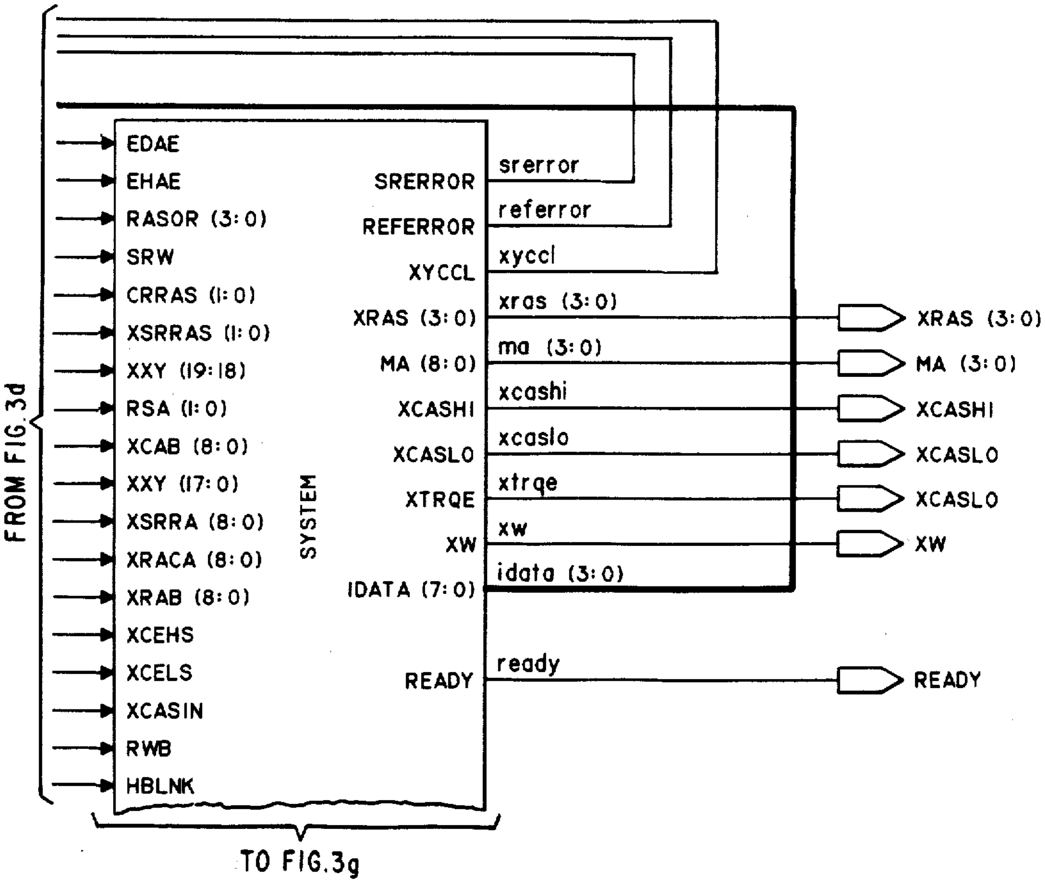
Figure 3G:
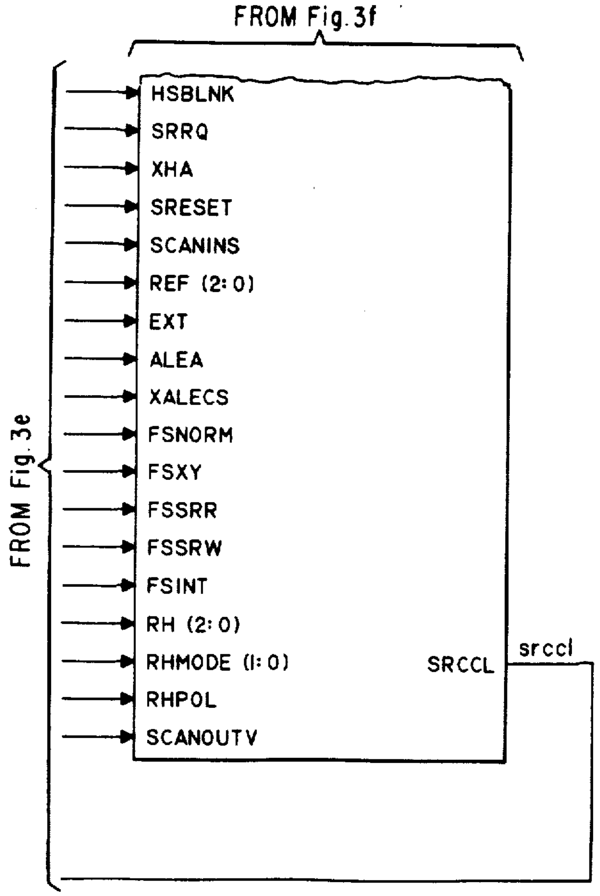
Figure 5:
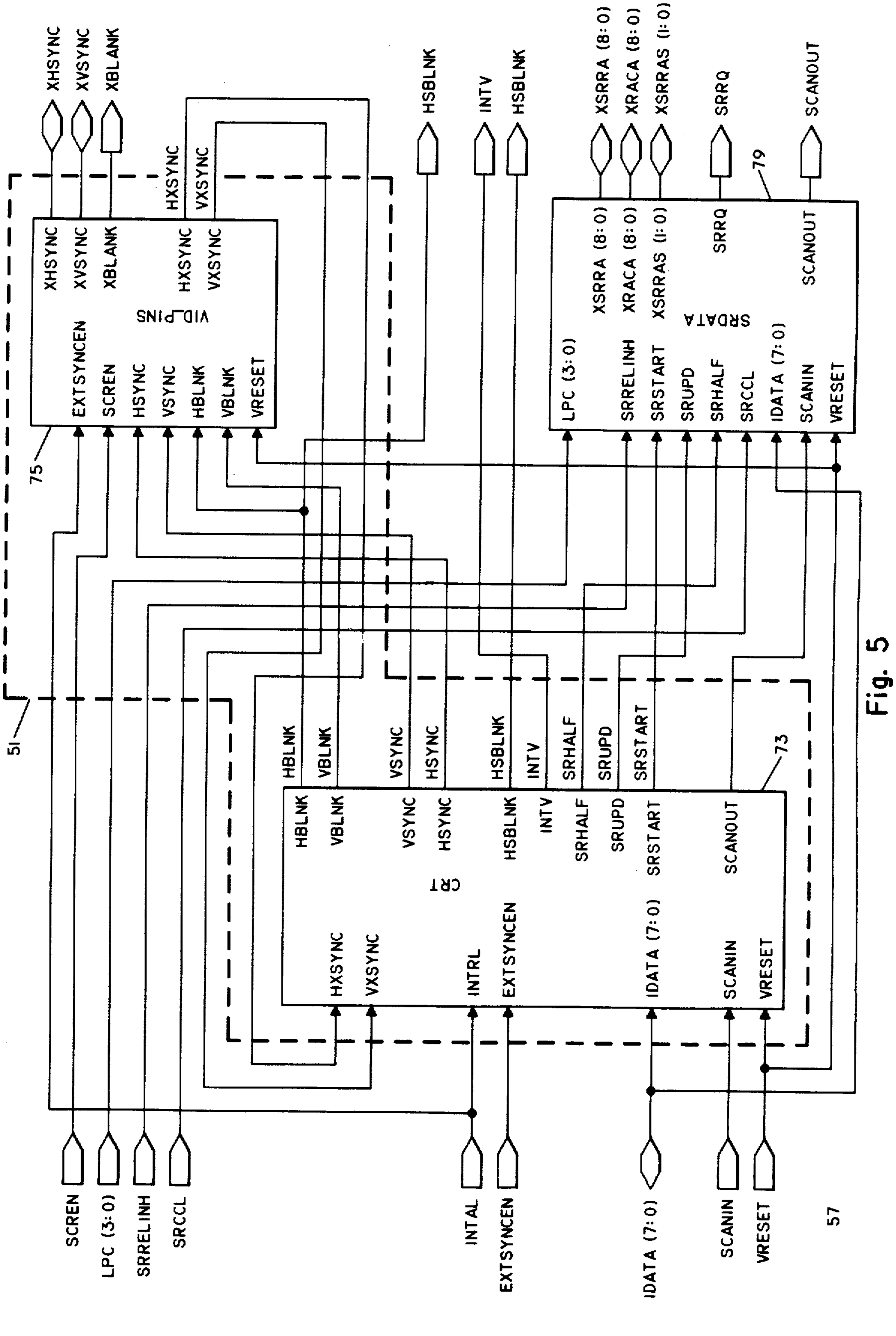
FIG. 5 is a block diagram of the video block of FIG. 3.

FIG. 5 is a connecting diagram of the video block 57 of FIG. 3*e* and includes the CRT controller 51 which contains the CRT logic 73 which generates the CRT signal such as blank and sync, both horizontal and vertical and applies these signals to the video pins 75 which converts this signals to signals which are voltage and current levels acceptable by the CRT monitor 11. As was previously discussed, the display memory 5, in the preferred embodiment, has built in shift registers in which the microprocessor 1 may write to directly. The control of data transfer to the shift register is provided by the SR logic 79 which is a portion of the video block 57.

Figure 6:
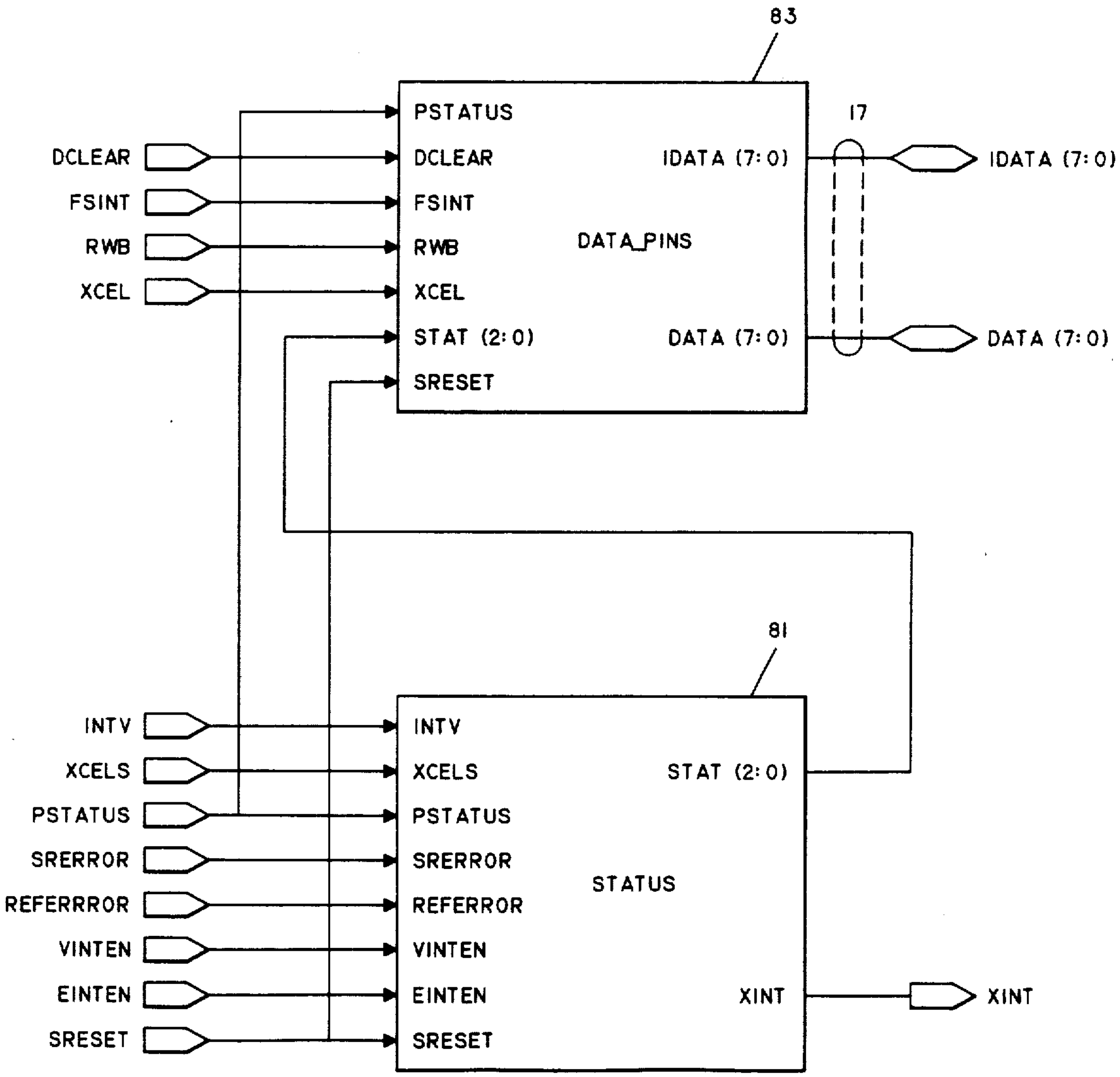
FIG. 6 is a block diagram of the DA-ST block of FIG. 3.

FIG. 6 is a connection diagram of the DA-ST block 61 of FIG. 3*c*. It includes data pins for receiving the data and converting it to logic level acceptable by the video system controller 3. Additionally, as part of the interface to the microprocessor 1, the display memory 5, and the system memory 19 status is provided by a status block 81 of FIG. 6.

Figure 7A:
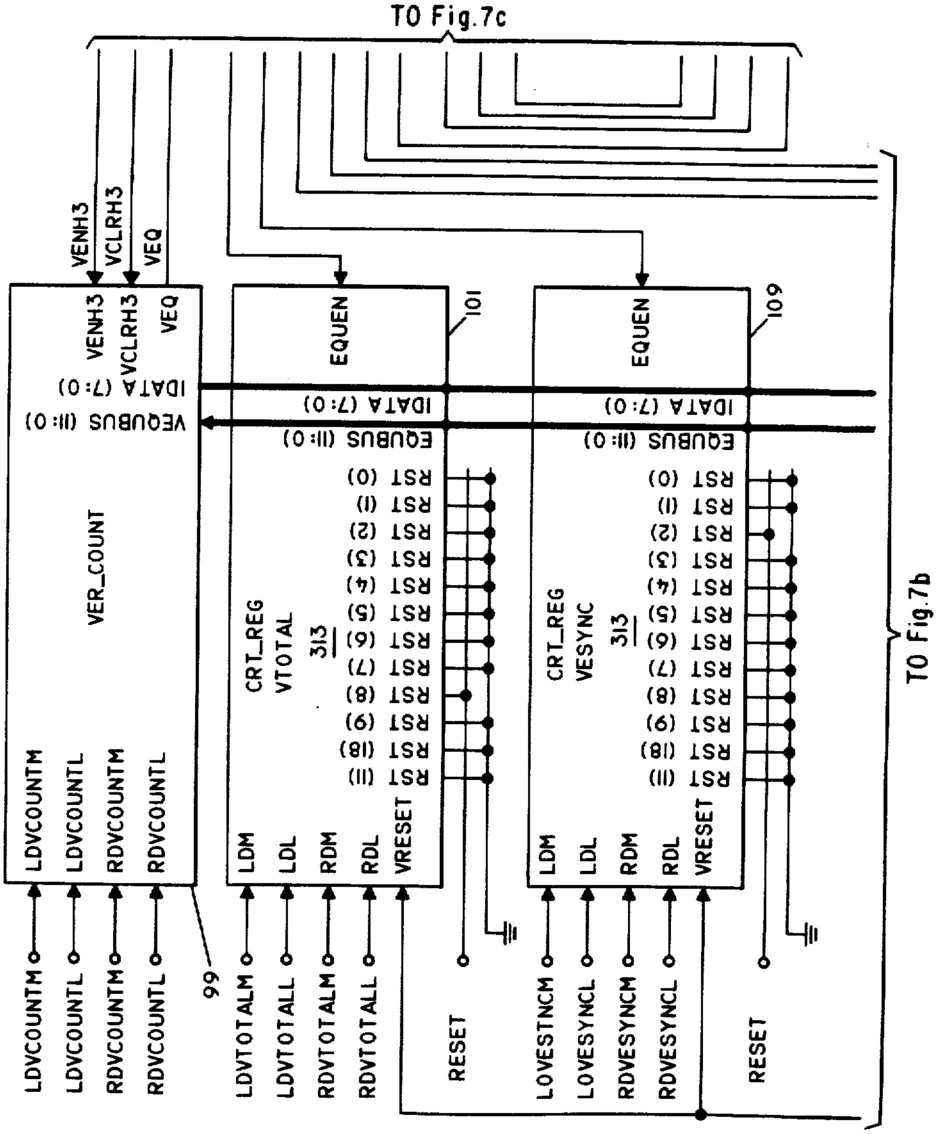
FIGS. 7*a* through 7*g* are block diagrams of the CRT block of FIG. 3.
Figure 7B:
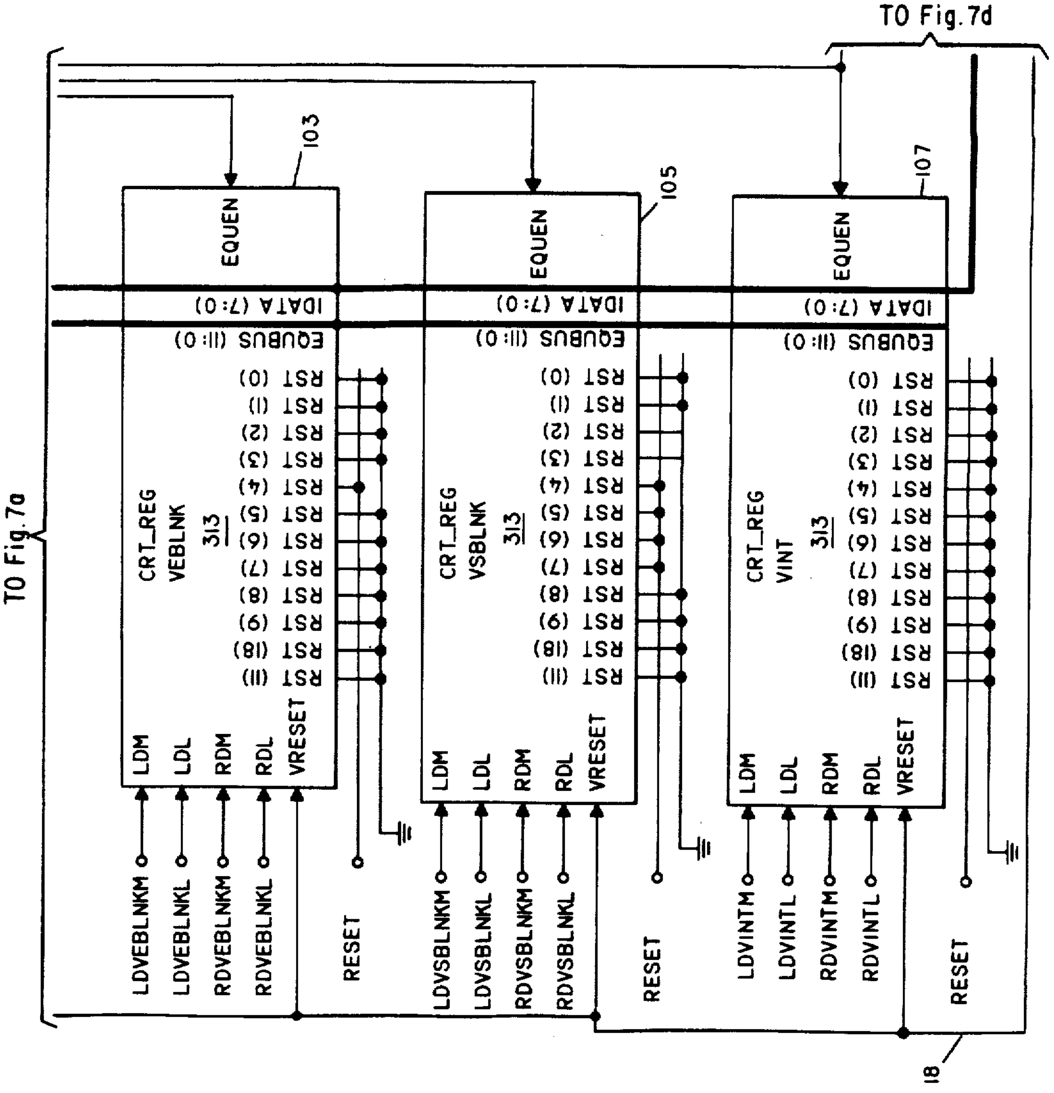

FIGS. 7*a* through 7*g*, to which reference should now be made, shows a connection diagram of the CRT block 73 of FIG. 5. The CRT block includes the vertical control logic 97 (FIG. 7*c*), the horizontal control logic 95 (FIG. 7*e*), a horizontal counter 93 (FIG. 7*f*) and a vertical counter 99 (FIG. 7*a*). Additionally, there are 9 programmable registers which can be both written to and read from by the microprocessor 1 through an 8 bit data pad 18 that is provided by the DA-ST block 61 to the video block 57. Each register in the embodiment shown in FIG. 7 is 12 bits wide. The microprocessor 1 accesses the programmable registers within the CRT block 73 as well as other areas of the video system controller 3 by means by special read and write cycles. A register access cycle is selected by setting the functions select inputs FS2–FS0 to one of two 3 bit codes, either 000 or 010. Being there are 18 programmable registers in the video system controller 3 and only 9 in the CRT block 73 the information described here is applicable to all 18 programmable registers. One of 18 registers is selected by a 5 bit register address input in the column address input CA6–CA2. Binary codes 00000 thru 10001 are valid register addresses. Codes 10010 through 11111 are reserved. The high or low byte of the register is selected by the value input on CA1. If CA1 is zero, the low byte is selected; otherwise, the high byte is selected. In FIGS. 7*a* to 7*g*, the logic represented by the CRT block 73 generates the horizontal sync, vertical sync, and blanking outputs needed to control CRT monitor 11. These signals are outputed on the HSYNC-VSYNC-BLANK linear. The video system controller may be programmed to provide sync and blanking signals appropriate to the particular CRT monitor 11 and screen resolution selected for the desired application. In addition, the video system controller 3 can be programmed to interrupt the microprocessor 1 at the end of any horizontal scan line by driving an interrupt, INT- to its active low level by the control of the INTV signal that is present on line 23. These signals are programmed by the parameters loaded into the nine registers of the CRT block 73 by the microprocessor 1. These registers include the horizontal end sync register 89 (FIG. 7), HESYNC; the horizontal end blank 87, HEBLNK; horizontal start blank 85 (FIG. 7*g*), HSBLNK; horizontal total 91 (FIG. 7*f*), HTOTAL; vertical end sync 109 (FIG. 7*a*), VESYNC; vertical end blank 103 (FIG. 7*h*), VEBLNK; vertical start blank 105 (FIG. 7*b*), VSBLNK; vertical total 101 (FIG. 7*a*), VTOTAL; and vertical interrupt 107 (FIG. 7*b*), VINT. The two additional registers, the horizontal counter 93 (FIG. 7*f*) and the vertical counter 99, are used in generating the video timing signals.

The horizontal counter 93 is a counter whose contents are compared with the horizontal end sync register 89, the horizontal end blank register 87, the horizontal start blank register 85 and the horizontal total register 91 to determine the limits of the horizontal sync and blanking intervals. Similarly, the vertical counter 99 is a counter whose contents are compared with the vertical end sync register 109, the vertical end blank register 103, the vertical start blank register 105, and the vertical total register 101 to determine the limits of the vertical sync and blank in intervals. The contents of the vertical interrupt register 107 are compared with the vertical counter 99 to determine when a particular scan line is being outputed to the CRT monitor 11. The microprocessor 1 can be interrupted when this condition is detected.

Figure 4A:
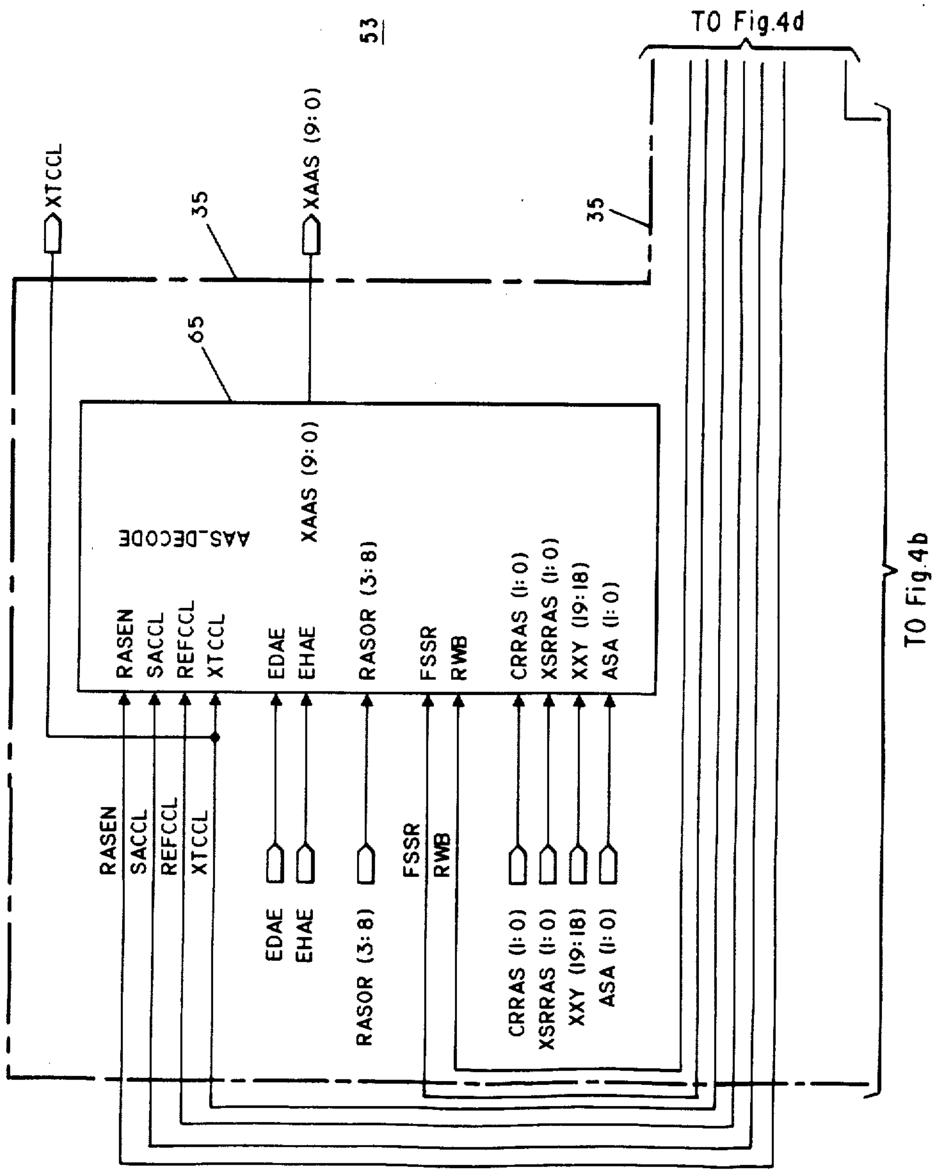
FIGS. 4*a* through 4*f* are block diagrams of the system block of FIG. 3.
Figure 4B:
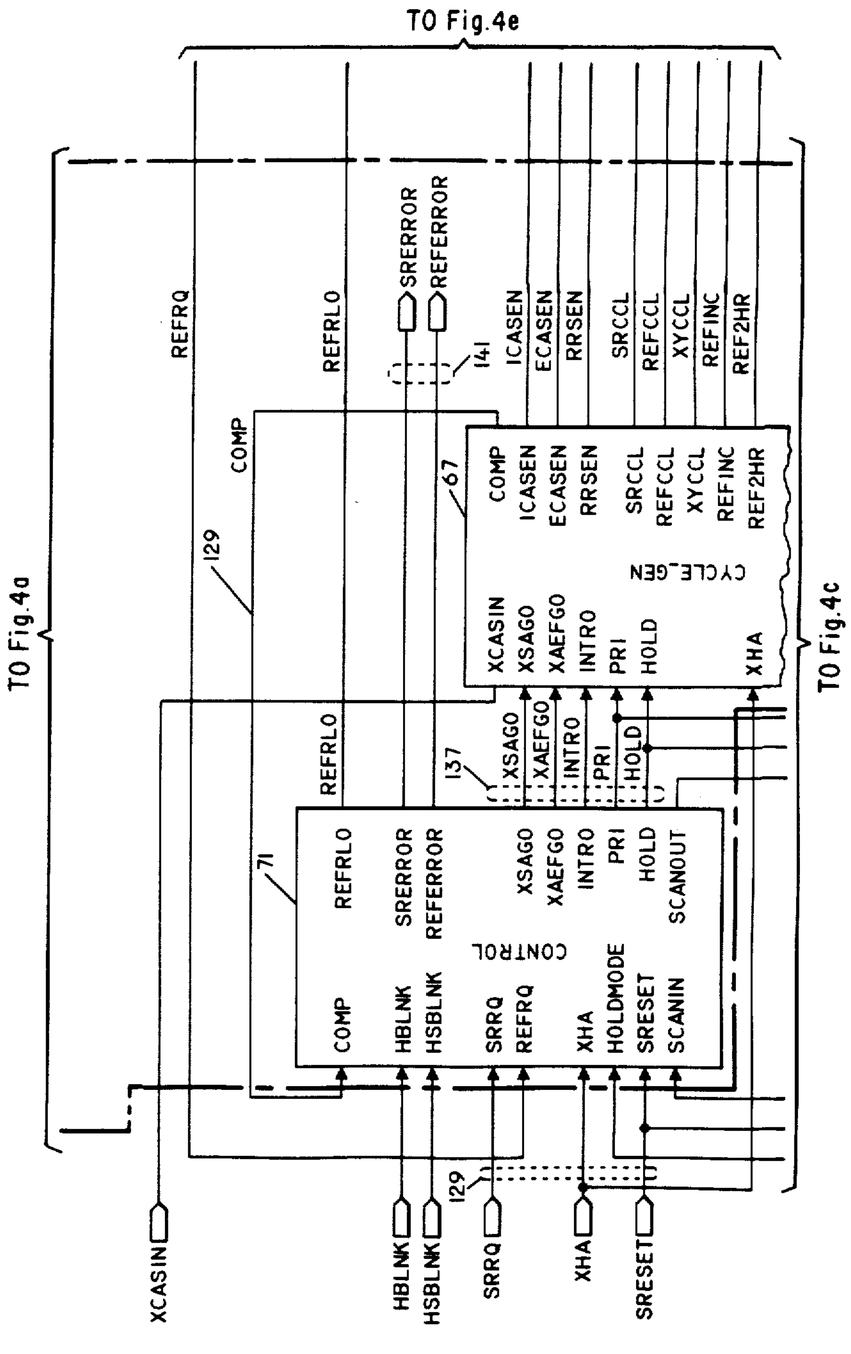
Figure 4C:
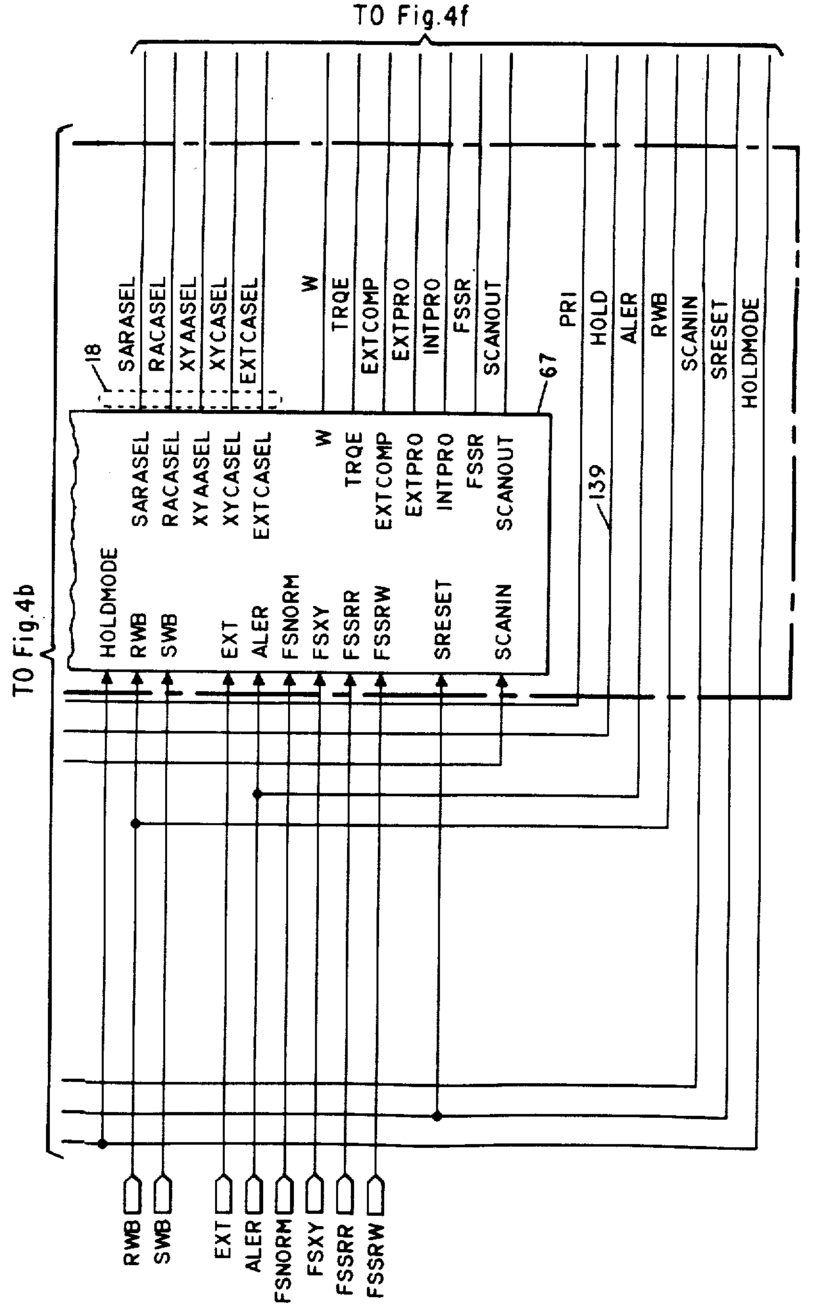
Figure 4D:
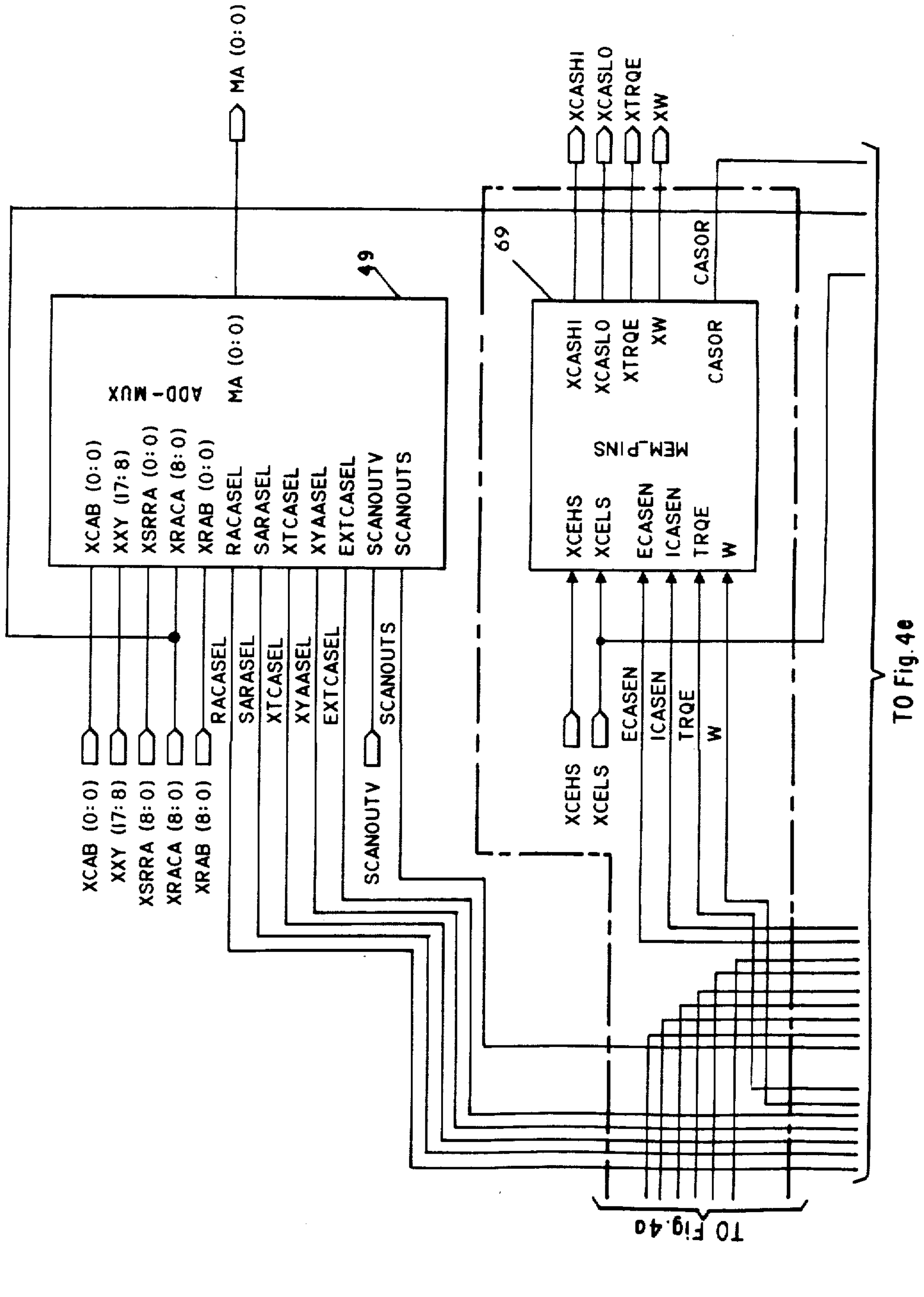
Figure 4E:
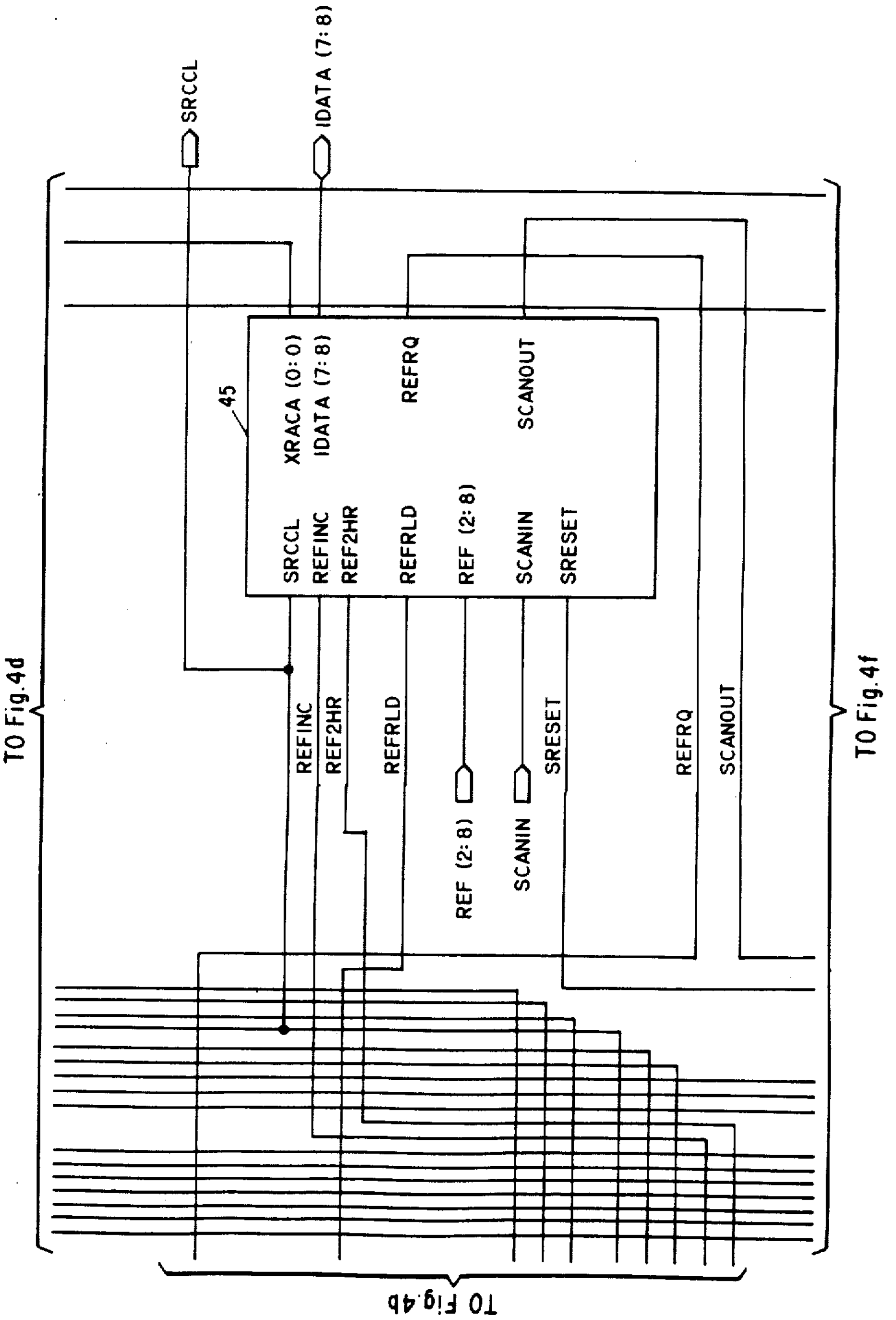
Figure 4F:
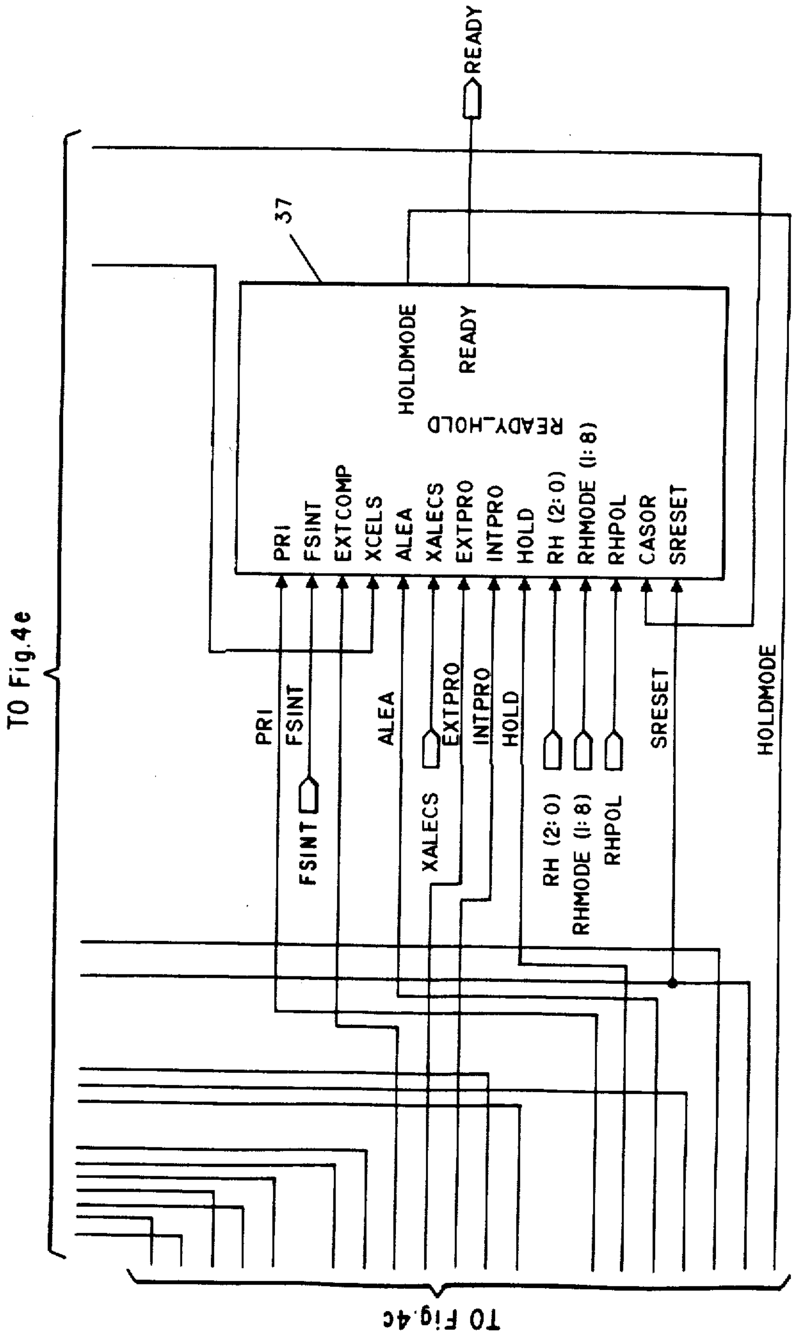

In performing a role as a controller for the display memory 5, system DRAM 19, the display update controller, and CRT monitor 11 timing controller, video system controller 3 must perform several types of access cycles. Some of these types of cycles are initiated by the microprocessor 1, while others are initiated automatically by the video system controller 3. The memory cycle generator 35 performs most of the access cycles. And in particular, the cycle generator 67 which is shown in FIGS. 4*b* and 4*c* and performs the following cycles:

Direct cycles which are initiated by the microprocessor 1;

X-Y register 43 indirect cycle which is also initiated by the microprocessor 1;

display memory 5 and system DRAM 19 refresh cycles are initiated automatically by the video system controller 3;

display update cycle initiated automatically by the video system controller;

and shift register transfer cycles which includes the shift register write and shift register read for transferring data to and from the shift register within the display memory 5.

The control circuit 71 handles the request for all internal cycles including the CRT monitor display update cycles, and the memory 5 and 19 refresh cycles. The horizontal blank signal tells the control logic 71 the location of the raster on the CRT for request of a display update or refresh. This request is transferred to the cycle generator 67 for implementing the display update cycle or the refresh update cycle.

Figure 8A:
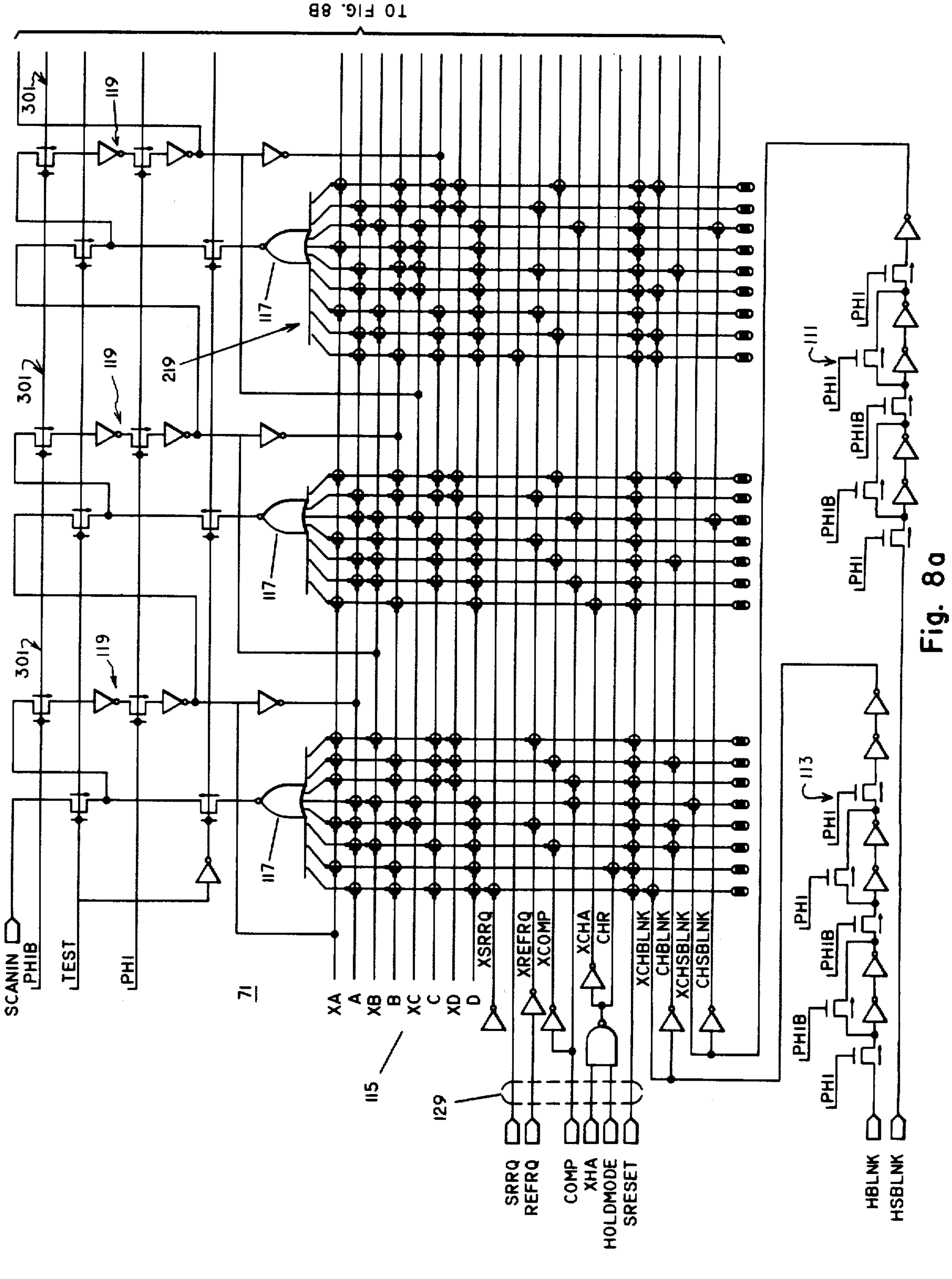
FIGS. 8*a* through 8*b* are schematic diagrams of the control block of FIG. 4.
Figure 8B:
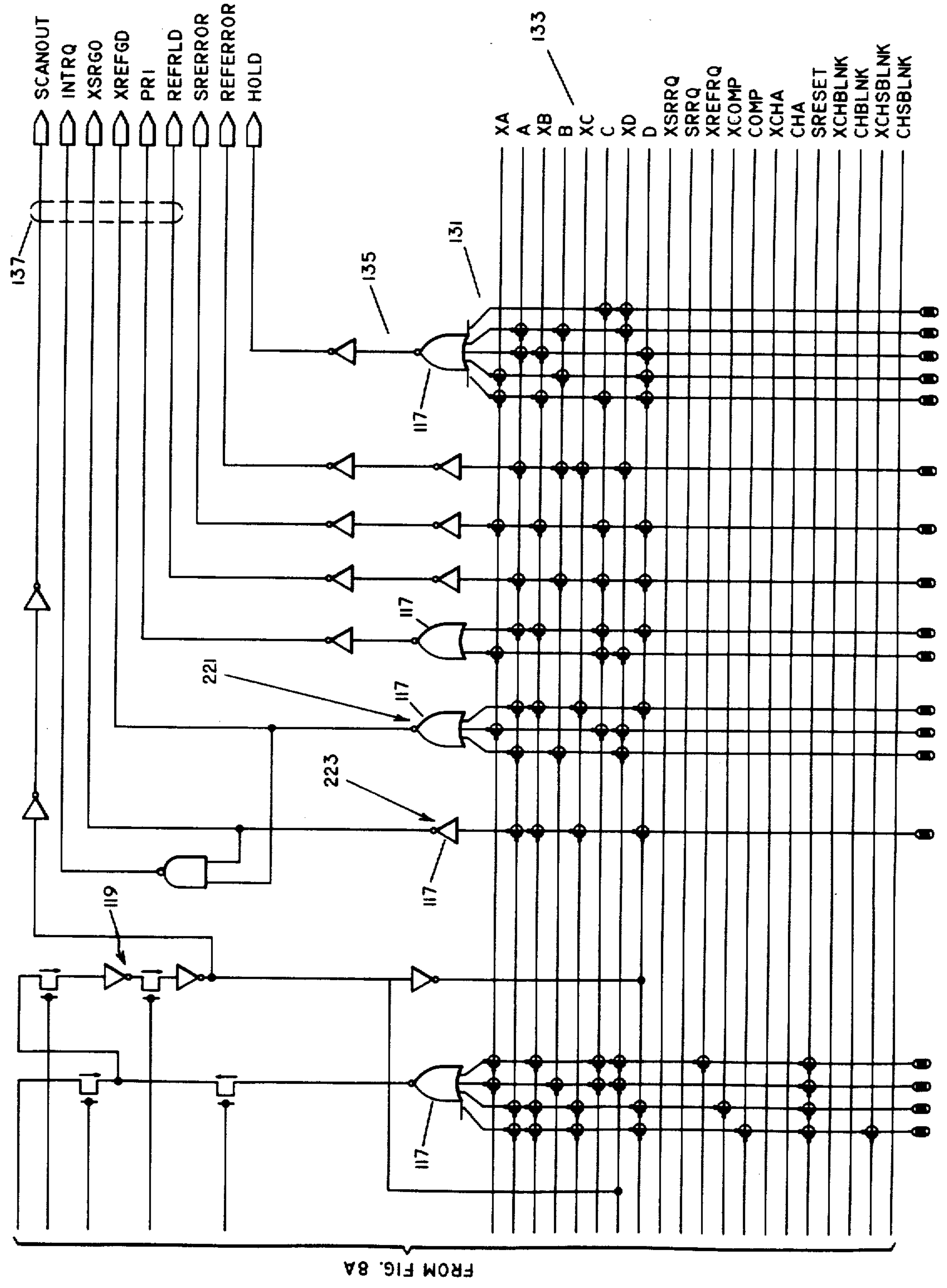

FIGS. 8*a* through 8*b* are schematic diagrams of the control block 71 and includes two synchronizer circuits 111 and 113. Synchronizer circuit 111 synchronizes the horizontal blanking signal with the internal clock that is used to control the logic within the system block 53. The CRT monitor 11 uses a separate clock system than the system 53 and consequently the horizontal blank signal and the horizontal stop blank signal that are applied to the system 53 from the video block 57 use a different clock which needs to be synchronized with the internal clock that is used to operate the control 71. Additionally the control 71 includes a Mealy-model state machine that is comprised of a plurality of programmable logic arrays 115 and an OR-gate 117 and a latch circuit 119. Each output of each stage in the embodiment of FIGS. 8*a* to 8*b* has four stages applied to the column lines A, B, C, and D. The compliments thereof are applied to XA, XB, XC and XD column lines. Additional controls are provided to the programmable logic arrays 115 in the row lines at data lines 129. Additionally, the Mealy state machine includes a PLA 133 and the decode logic 135 at point 131. The output of the control circuit is applied to the cycle generator 67 via data bus 137 to the ready hold logic via data line 139 and to the data status block 61 via data bus 141. A unique feature of the control logic is the state machine is laid out on "N" channel metal oxide silicon field efect transistor logic circuits utilizing a standard cell that is multiple repeated and programmed by placement of a transistor 143 which determines the operation of the state machine that is used to implement the control block 71.

Logic gates 117 are configured with a plurality of input leads 217. These leads may be tied to a large number of outputs from the programmable logic array 115 that is illustrated at 219 or connected to a minimal number of inputs to the NOR gate 117 as illustrated at 221 or just a single line with all the inputs of the NOR gate tied together as is illustrated at location 223 to provide for the implementation of a standard cell NOR gate.

Figure 9A:
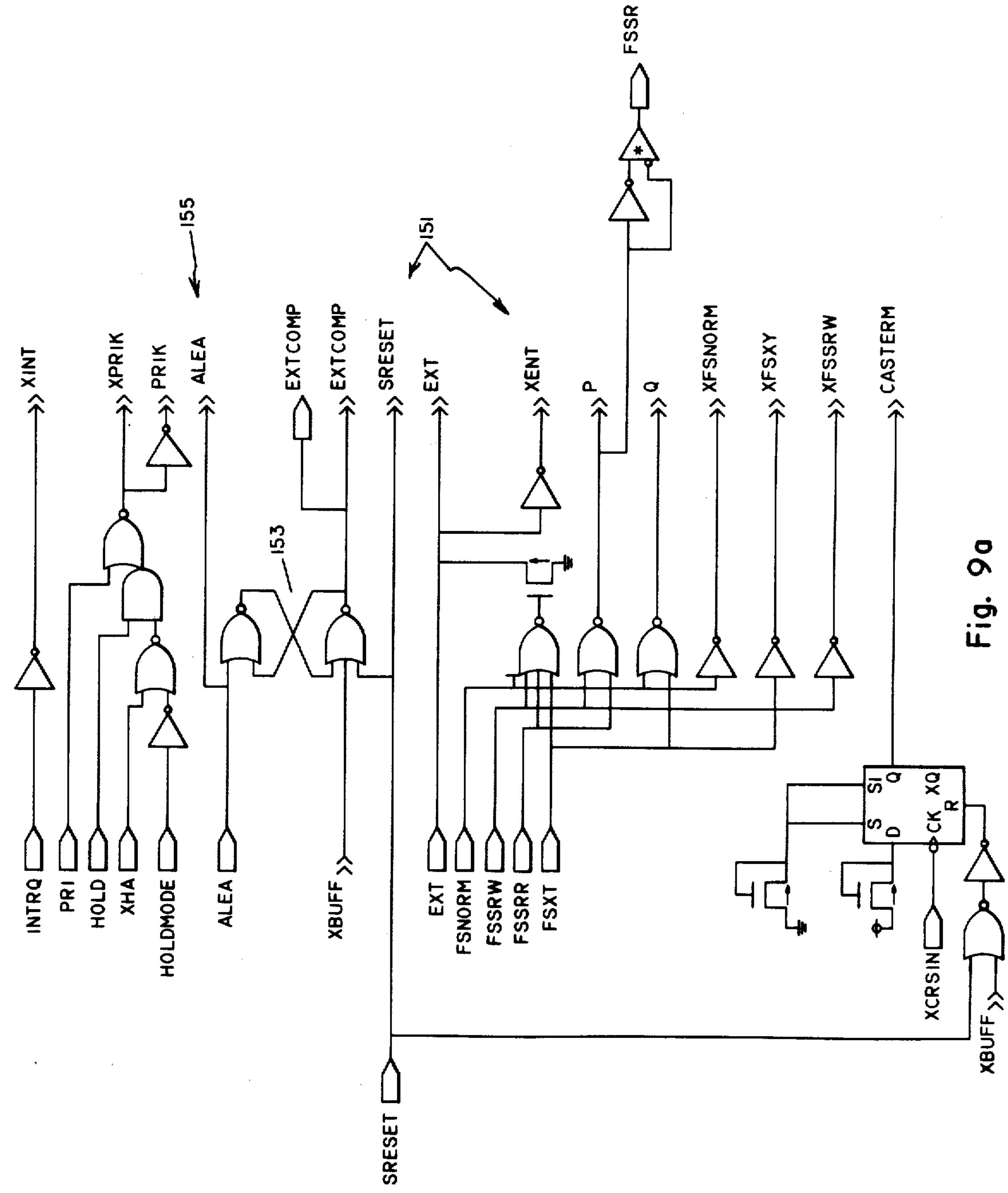
FIGS. 9*a* through 9*e* are schematic diagrams of the cycle generator of FIG. 4.
Figure 9B:
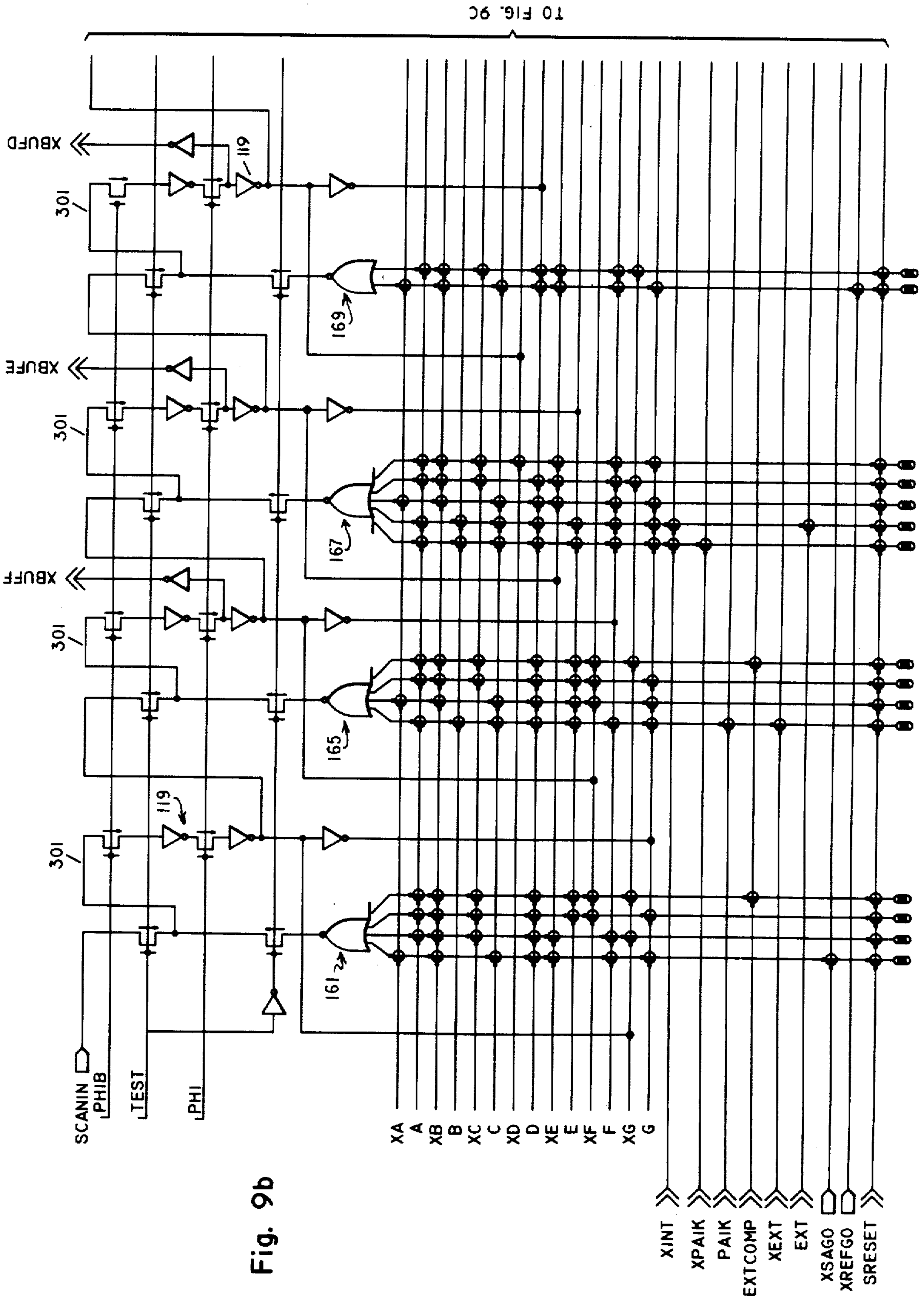
Figure 9C:
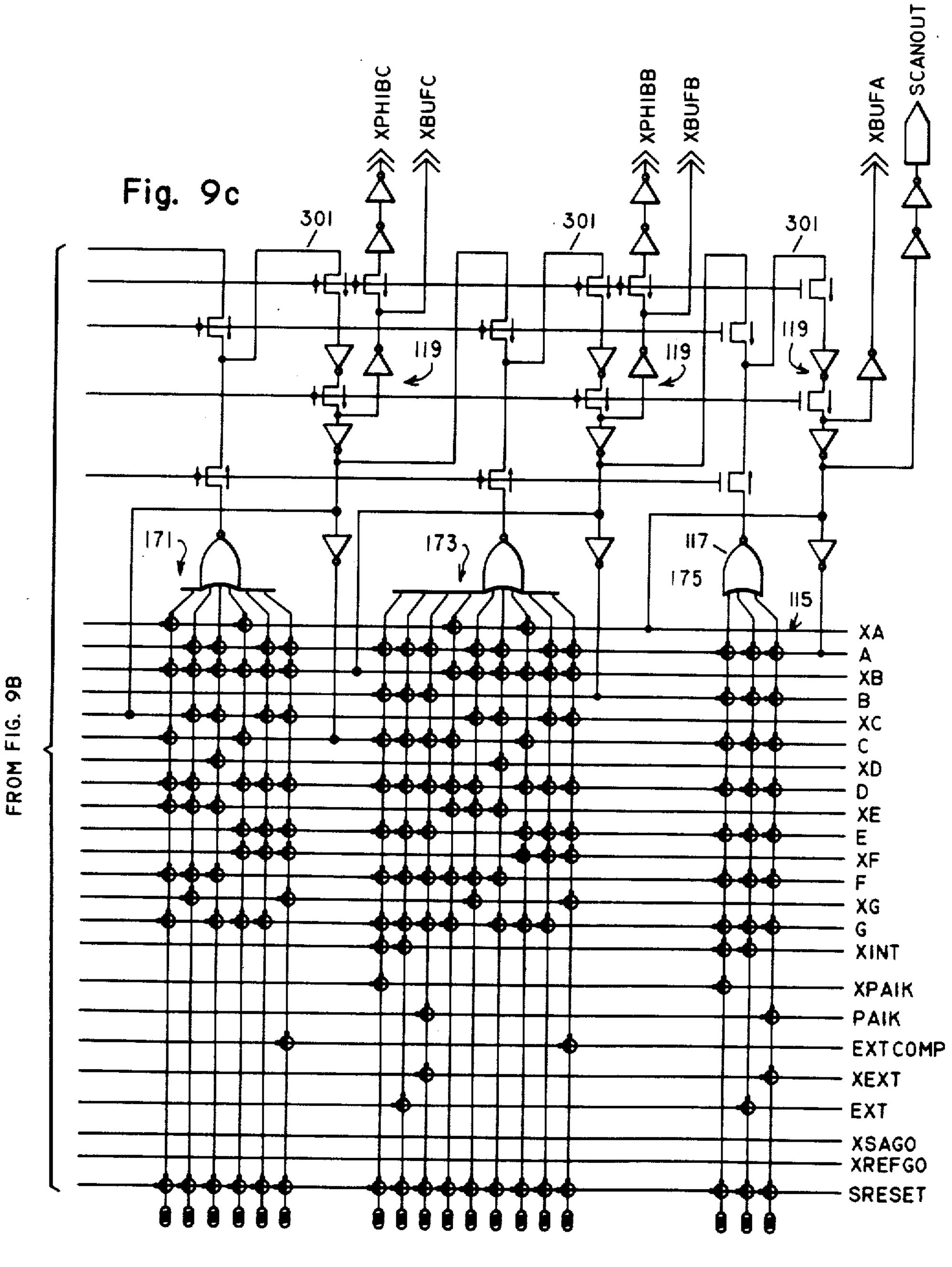
Figure 9D:
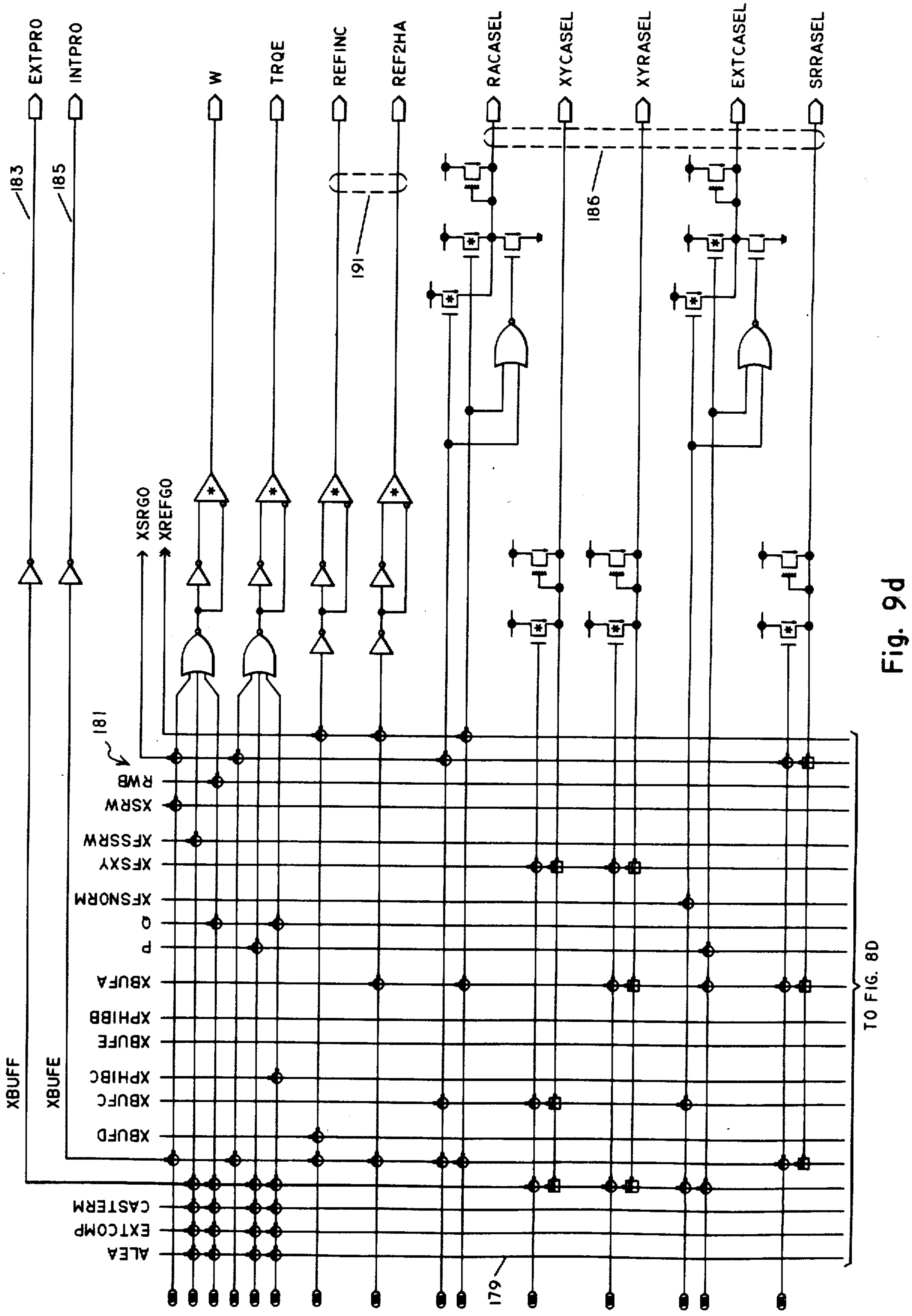
Figure 9D:
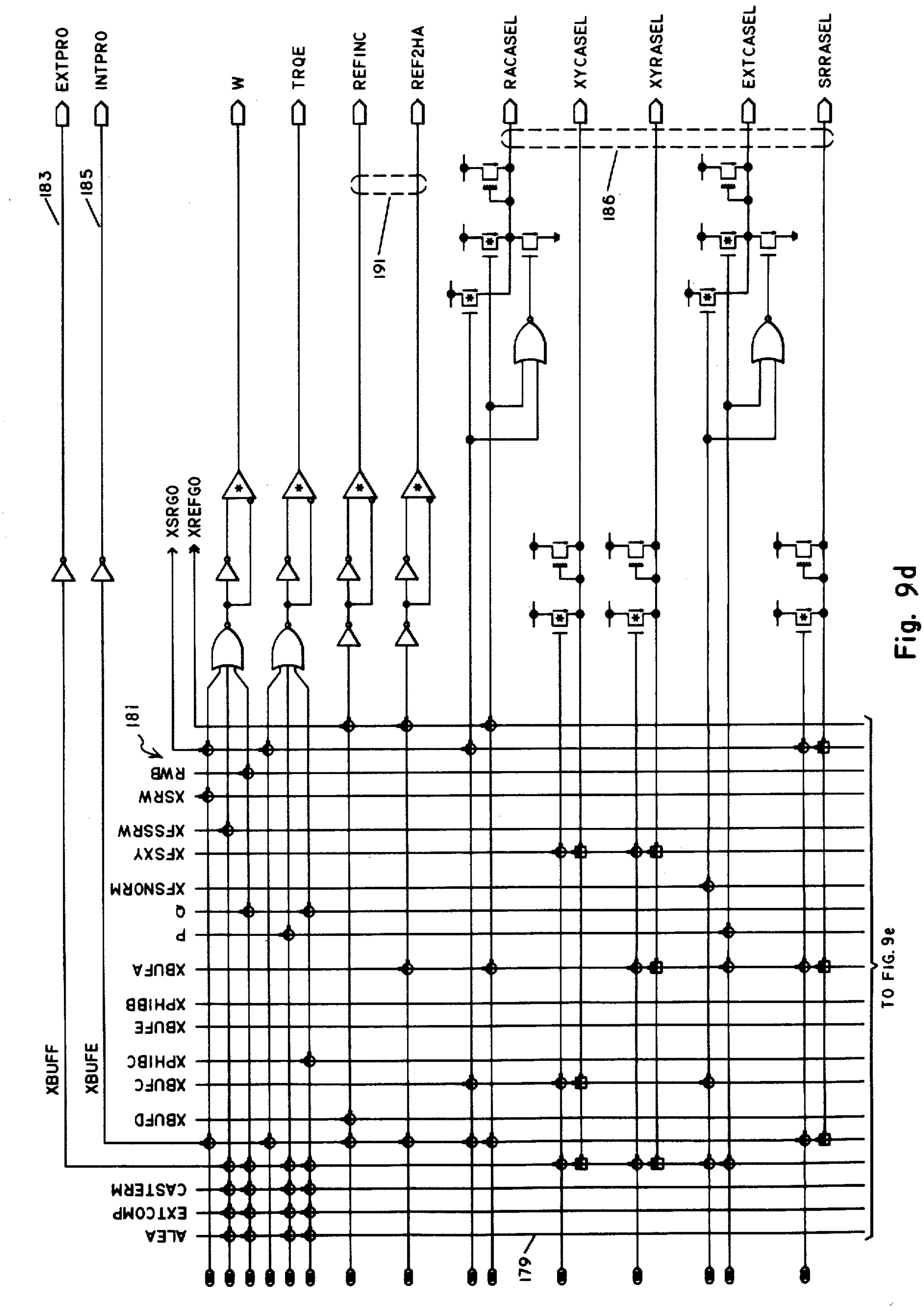
Figure 9E:
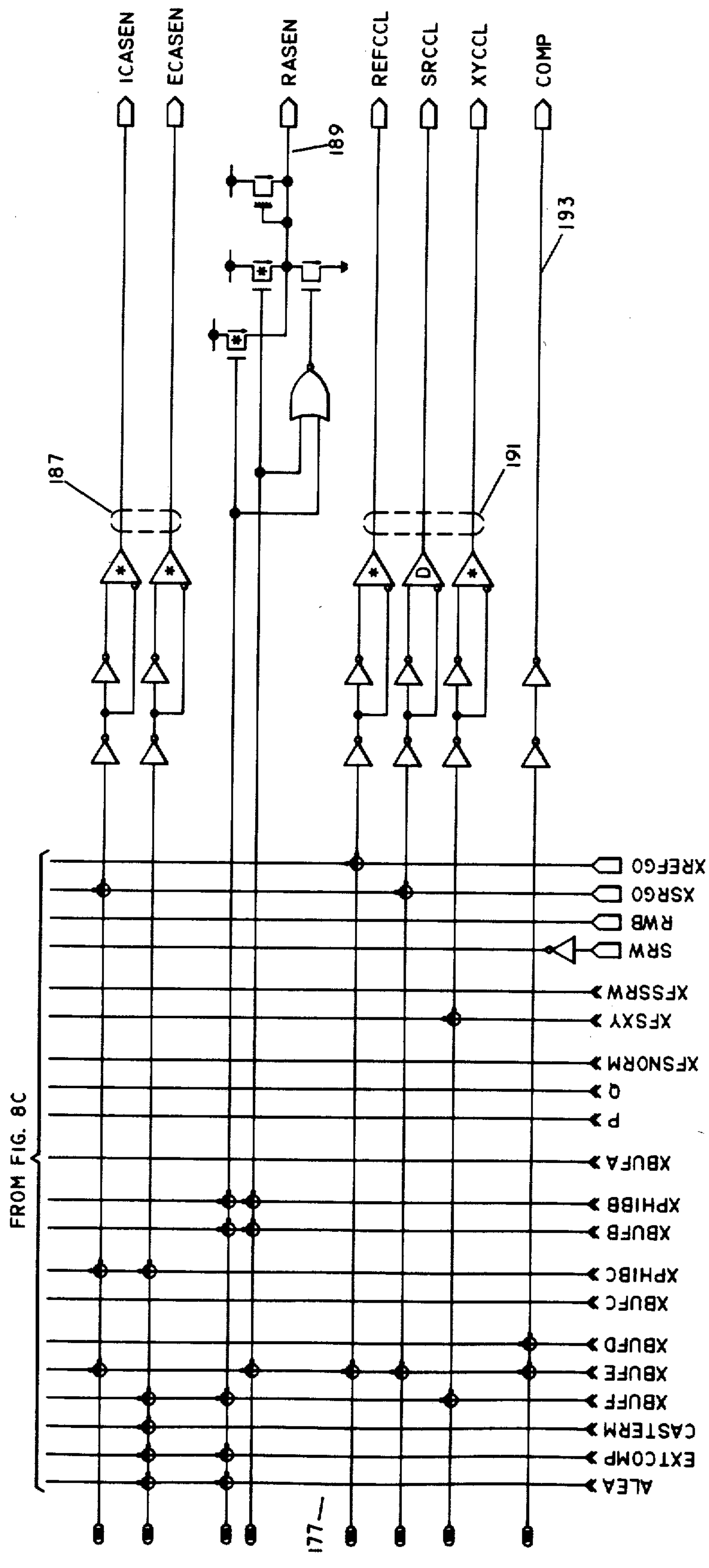
Figure 9E:
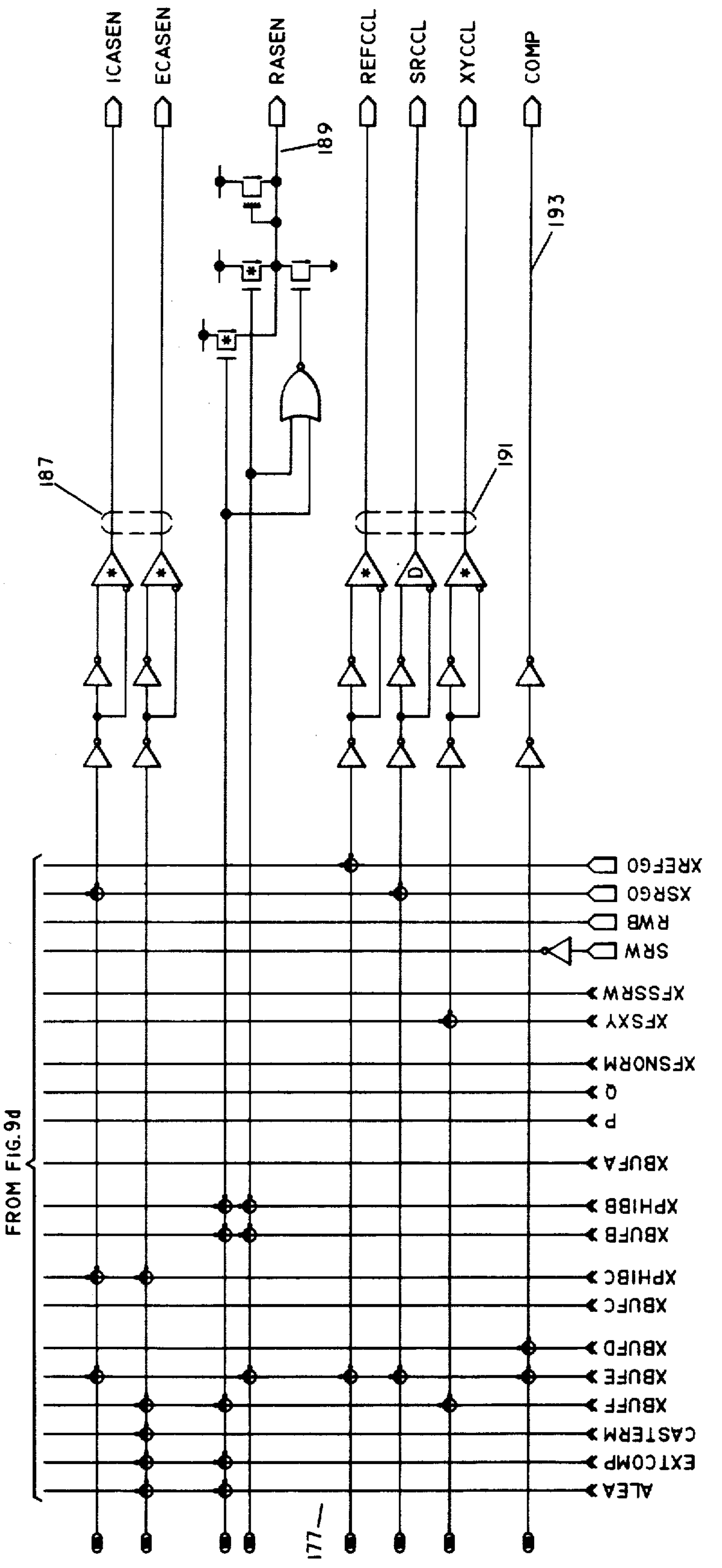

The arbiter and ready hold logic 37 is based upon its operation by the cycle generator 67 in which logic circuits 151 of FIG. 9*a* determine the priority of the operation whether it's internal or external to the video system controller 3. EXT and compliment, XEXT signals which are based on the ALE signal represent a request from the microprocessor 1 for a memory access cycle. ALE is latched on to the cycle generator by the latch 135. Additionally, circuit 155 provides buffering for the internal cycle request XINT. The cycle generator 67 includes a Moore-model state machine composed of a first stage 161 (FIGS. 9*b* and 9*c*), a second stage 165, a third stage 167, a fourth stage 169, a fifth stage 171, a sixth stage 173, and a seventh stage 175. Each stage includes a PLA 115, an OR gate 117, an a latch circuit 119 with the output of each stage applied to the row lines A through G and the compliment applied to the XA through XG lines. Referring to FIGS. 9*d* and 9*e*, the outputs are further decoded by logic 177 that includes a PLA 179 and decode logic 181. The logic 177 provides an indication of data bus 183 for an external cycle and 185 an internal cycle is in progress. The W conductor indicates a write operation where the TRQE provides the enable to the shift register and the output enable of memories 5 and 19. REFINC provides the increment refresh to the refresh logic 45 and REF2HR provides for transfer from the refresh counter to the refresh hold register contained within the refresh logic of the refresh block 45 of FIG. 4*e*. Data lines or outputs 186 are the controls for the address selects of the multiplexer 49 and provide for SRRASEL which is a select of the display update row address. The RACASEL is the row address, column address select lines used for display update and refresh cycles. XYRASEL is the XY row address select lines. The XYCASEL is the XY column address select and the EXTCASEL is the external column address select lines. If none of these are active, then the row address (RA) 21*d* is sellected. Lines 187 provide for the internal column address enable, ICASEN, and the external column address enable, ECASEN. Row address enable RASEN is provided on the data line 189. Data lines 191 select the source to the RAS decode logic 65 which includes the XY cycle, XYCCL, the shift register cycle SRCCL, and the refresh cycle REFCCL. Additionally, line 193 is the completion line indicating that an internal cycle operation is complete and the XYGO signal is the adjust enable to the XY register 43 and is present on data line 195.

Figure 10A:
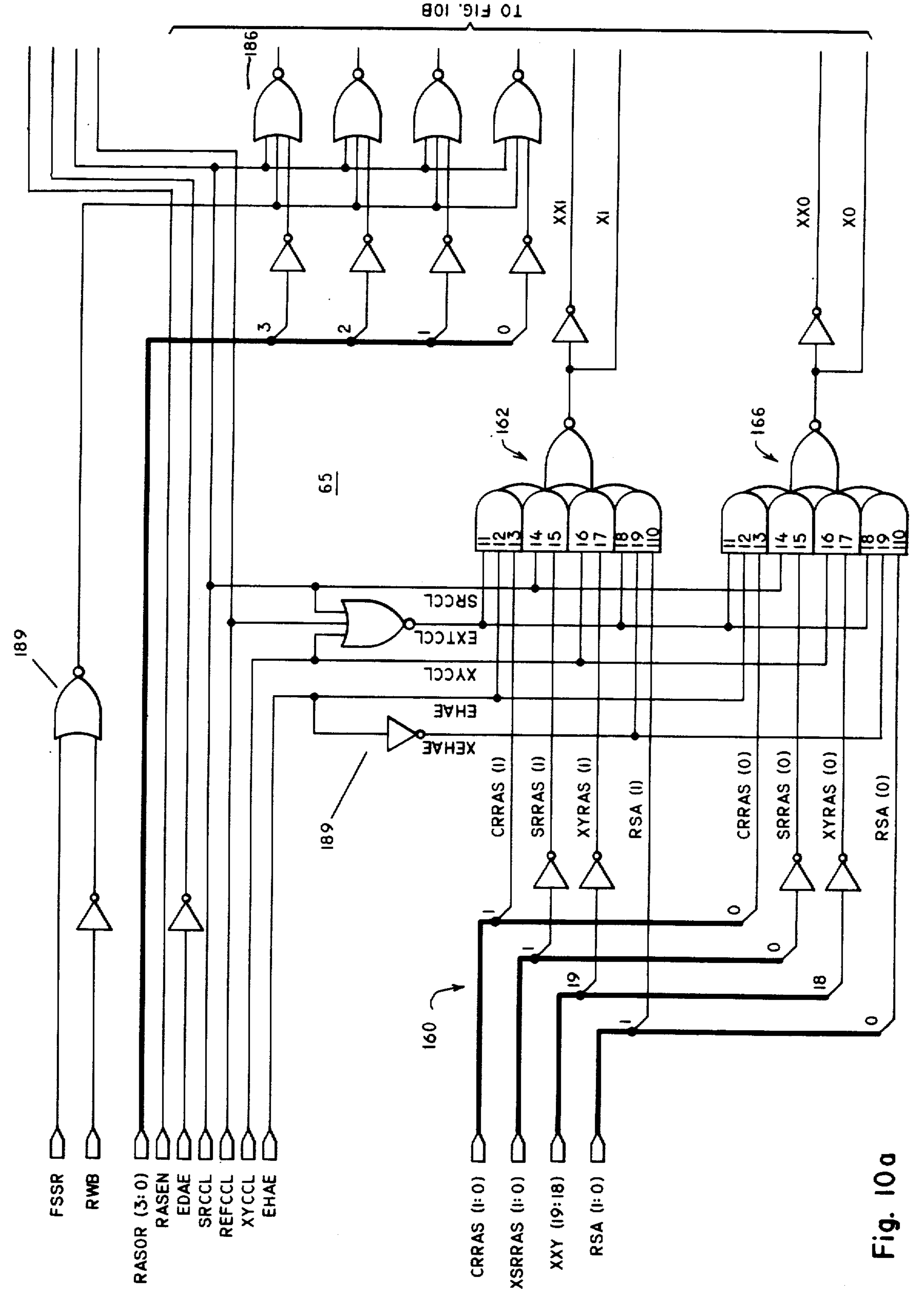
FIGS. 10*a* and 10*b* are schematic diagrams of RAS decode block of FIG. 4.
Figure 10B:
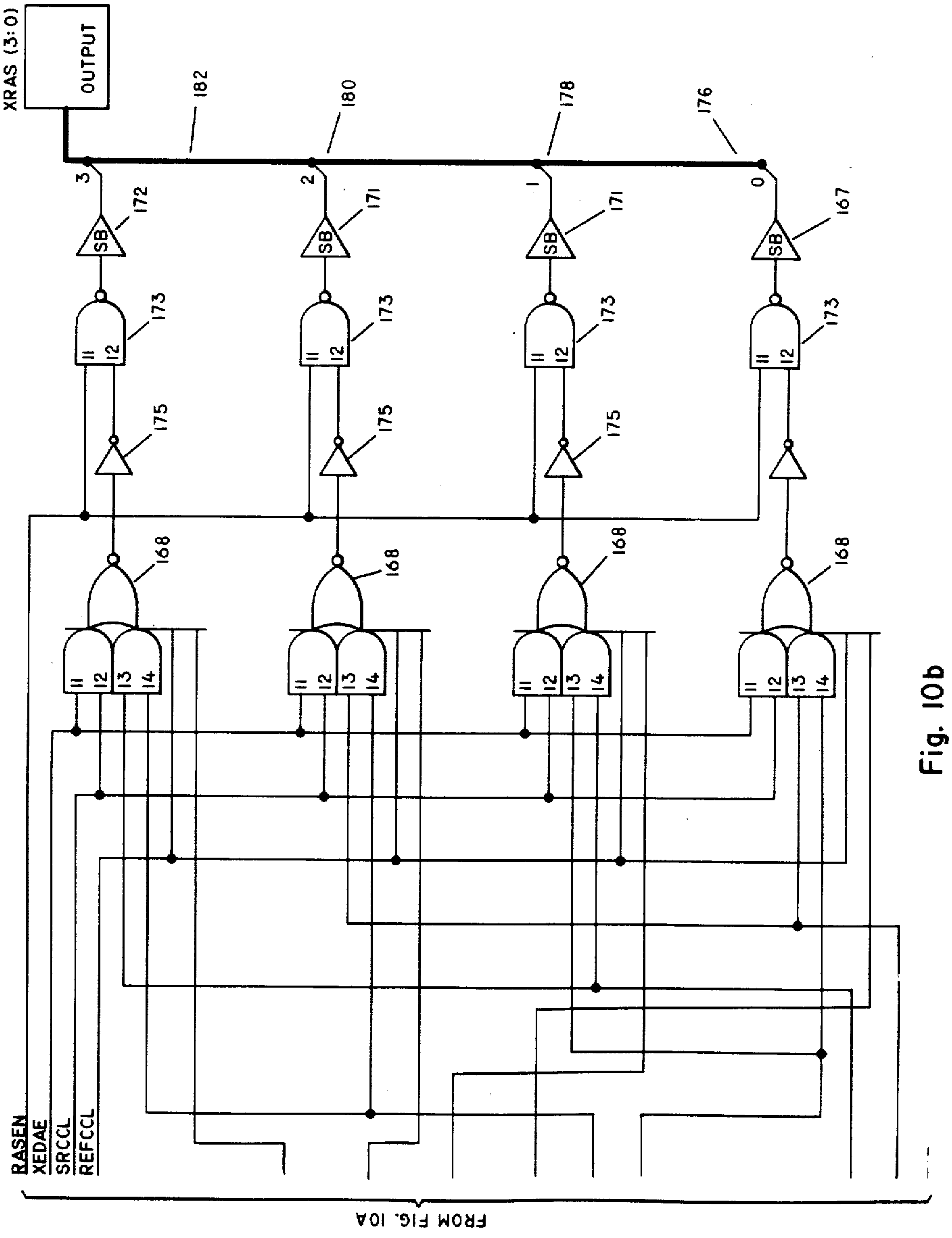

In FIG. 10 to which reference should now be made, there is shown a block diagram of the row address select decode circuit that is represented by the block 65 entitled "RAS decode". The row address select override circuit provides a mode of operation that allows writing data to memory N times faster than without this mode. N is the number of memory planes within the system, for example the display memory 5 of FIG. 2 in one embodiment is configured to have four memory planes. For the video system controller 3, four row address select planes are supported in the embodiment of FIG. 10. One embodiment is to designate each of the four planes that are illustrated on FIG. 10*b* at areas 176, 178, 181, and 182. Writing to one plane generates an image in one primary color. Writing the same data to two planes generates a mixed color. Using load address select override feature allows writing to both planes at the same time. To do this, the RAS override bits in the control register contained within the block 39C of FIG. 3*b* are loaded with the binary value of the color. When writing to one plane of memory using this feature, the other planes are also selected. The row address select override feature also applies to shift register transfers. These shift registers, of course, are located within the display memory 5. This feature allows for clearing the screen of the CRT monitor 11 four times faster because all four row address select planes may be transferred in a single cycle. Prior to this invention, data was written to one bank of memories or plane in a single memory cycle. To draw an object requires writing to each code or plane individually.

The row address override logic is controlled by four bits which are programmed and stored in the control register 39C (FIG. 3*b*) by the microprocessor 1 that select which row address select output bit will be forced active during the memory access cycle. These four bits are RASOR(3-0). These four bits are gated with function decode and the R/W-signals to prevent memory read conflicts. The row address override feature is enabled only for the following types of memory cycles; microprocessor 1 random access write cycle, microprocessor 1 requested shift register to memory transfer, and microprocessor 1 requested memory to shift register transfer. The four gated bits are then OR'd with the row select zero and the row select one bits to form the select for the row address select output. On FIG. 10 the row address select enable is bit is brought to the row selct decode logic from the cycle generator 67 and is represented by RASEN. This bit enables the four bits from the control registers which were previously enumerated by the OR logic 164 onto the XRAS(3-0) outputs. Additionally, NOR gates 162 and 166 decode the function that is being implemented being it is the row address select from the function select decode circuit that is represented by RSA, the XXY from the X-Y register 43 which indicates where the data is being written into memory, a shift register, SSRRAS from the video block 57 and the extended control register row address select bits provided from the control register 39C and represented by signal CRRAS. These signals are multiplexed by logic 160 and with NR gate 162 and 166 in conjunction with the appropriate cycle that is being implemented being its shift register cycle represented by the signal SRCCL, a refresh cycle represented by the signal REFCCL, and an XY cycle represented by the signal XYCCL. These signals are of course from the cycle generator 67 of FIGS. 4*b* and 4*c* and are combined by logic gates 168, along with the signal EHAE which is brought over from the control register block 39C. The decode block 63 (FIG. 3*a*) provides the function select shift register signal represented by the mnemonic FSSR and the RWB signal in which the four row select output bits are gated by the logic gates 186. The function select and the read/W-signals are combined by the NOR gate 188.

Figure 11A:
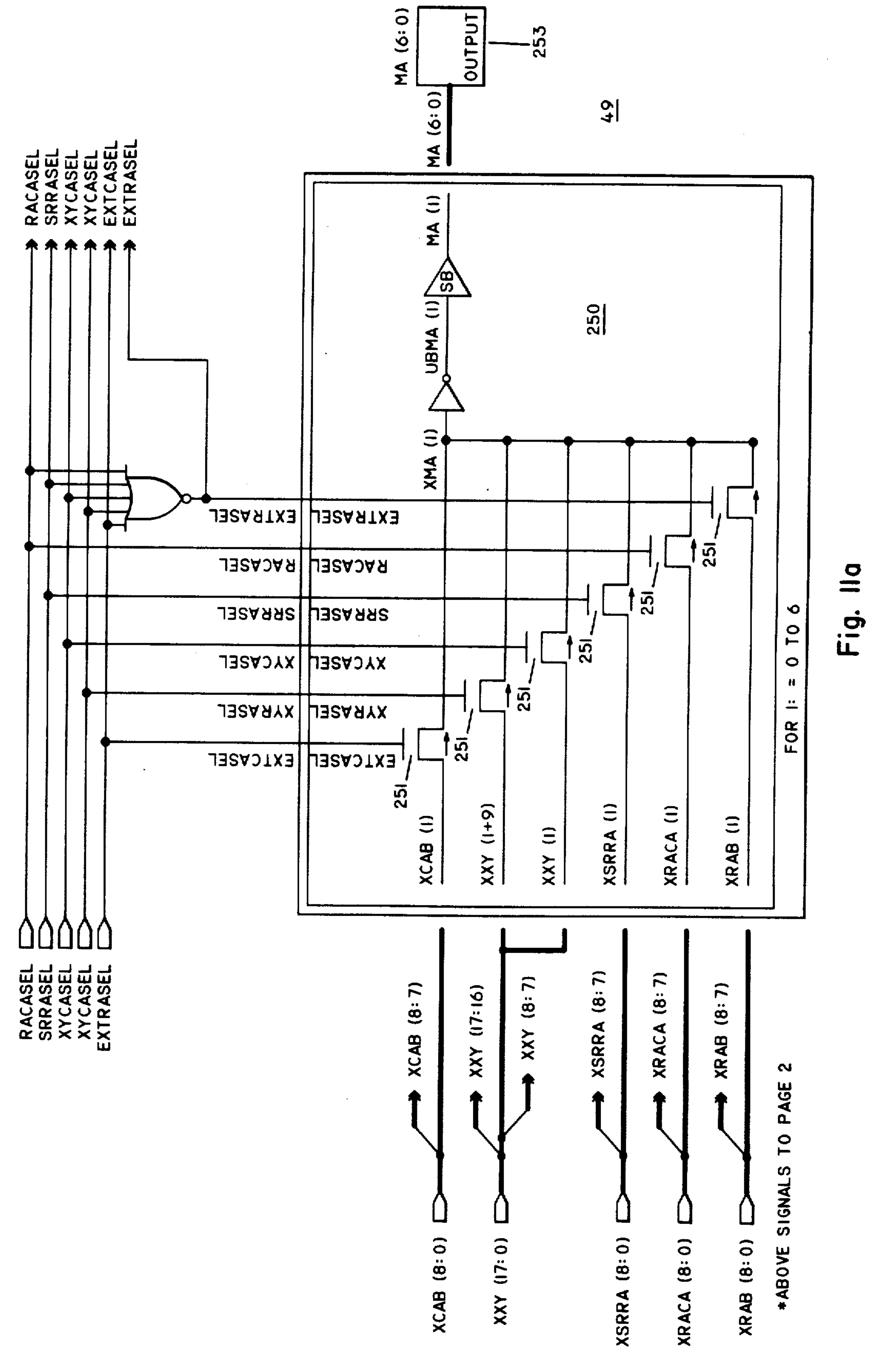
FIGS. 11*a* and 11*b* are schematic diagrams of the multiplexer of FIG. 2.
Figure 11B:
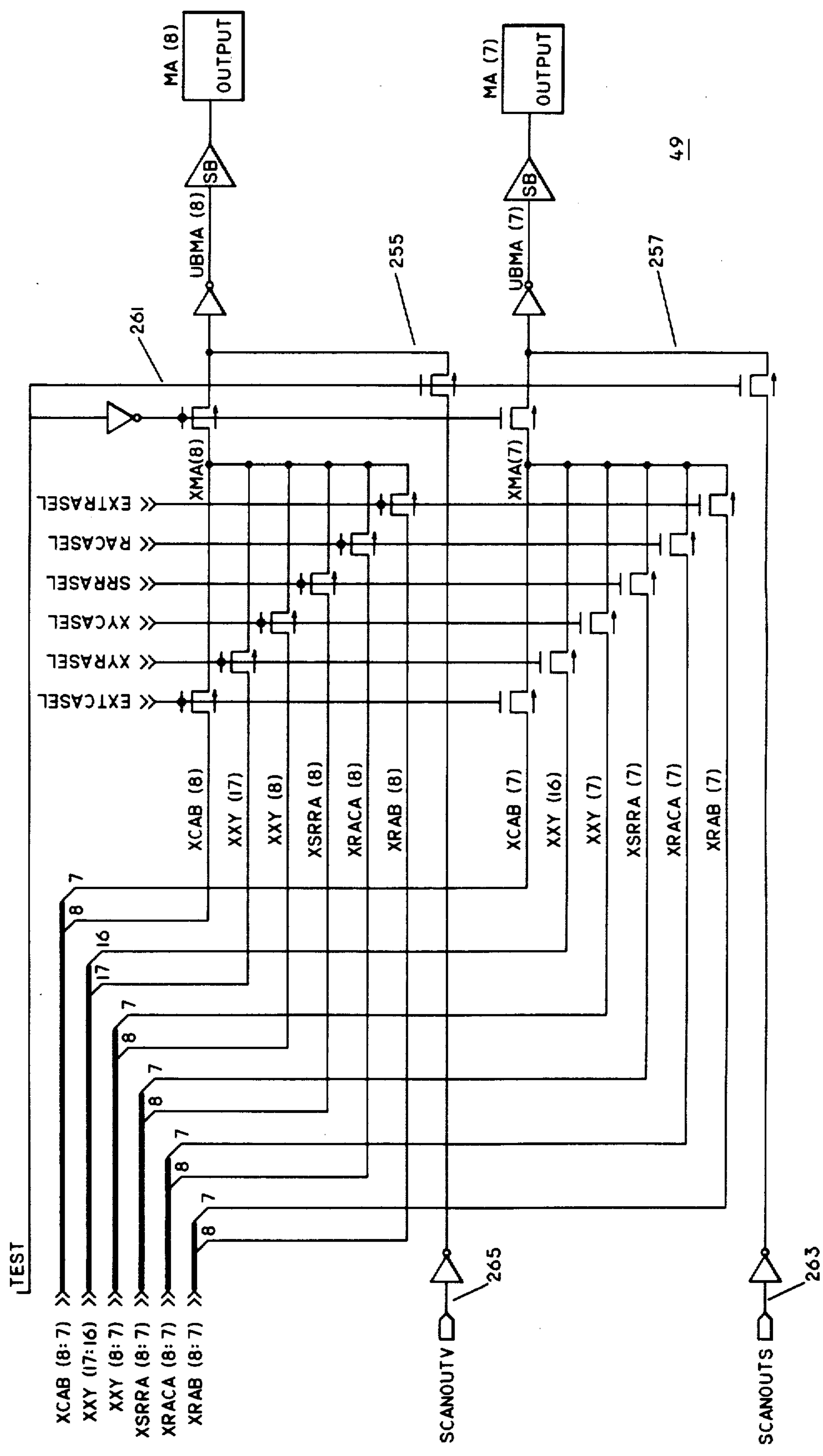

FIGS. 11A and 11B are schematic diagrams of the multiplexer 49, which outputs the memory address to memories 5 and 19. As was discussed in conjunction with FIG. 2, the multiplexer 49 selects either the output from the row address latch 47, the refresh address counter 45, the XY address register 43 or the column address latch 61. These inputs are brought into the multiplexer 49 as signals XCAB, which is the input from the column address latch 41 and XRAB, which is the input from the row address latch 47, both of which are a part of the FS decode block 63 of FIG. 3*a*, the XXY signal which is the input from the XY register 43 of FIG. 3*d*, the XSRRA which is the shift register row address that is a part of the video block 57 (FIG. 3*e*), and the XRACA which is the output of the refresh block 45 (FIG. 4*e*) and the video block 57. The multiplexer in the embodiment shown includes 7 stages 250 in which the aforementioned signals are selected via pass transistors 251 and applied to the output terminals 253. The cycle generator 67 (FIGS. 4*b* and 4*c*) provides the select for each of the functions. EXTCASEL provides the column select, XYRASEL provides the XY row select function, XYCASEL is the column select of the XY register 43, SRRASEL is the shift register row address output select enable, the RACASEL is the refresh row address and shift register column address select enable. The OR combination of all of these functions provides a signal that is denoted EXTRASEL which connects the RA address bus 21*d* to the output of the multiplexer 49 at the output terminal 25. The output terminal is a 9 bit terminal and the remaining two bits are illustrated in FIG. 11D by circuits 255 and 257. Additionally, test logic is provided for testing of the video system controller 3 at area 261 and is enabled by the SCANOUTS signal that is brought into the multiplexer 49 at point 263 from the cycle generator 67 and the scan out video scanout signal which is the output of the video block 57 that is applied to the multiplexer at 265. These two signals are the circuit of a scan path that serially connects all otherwise in accessible storage nodes within the video system controller 3, and is used during test of the device.

Figure 12:
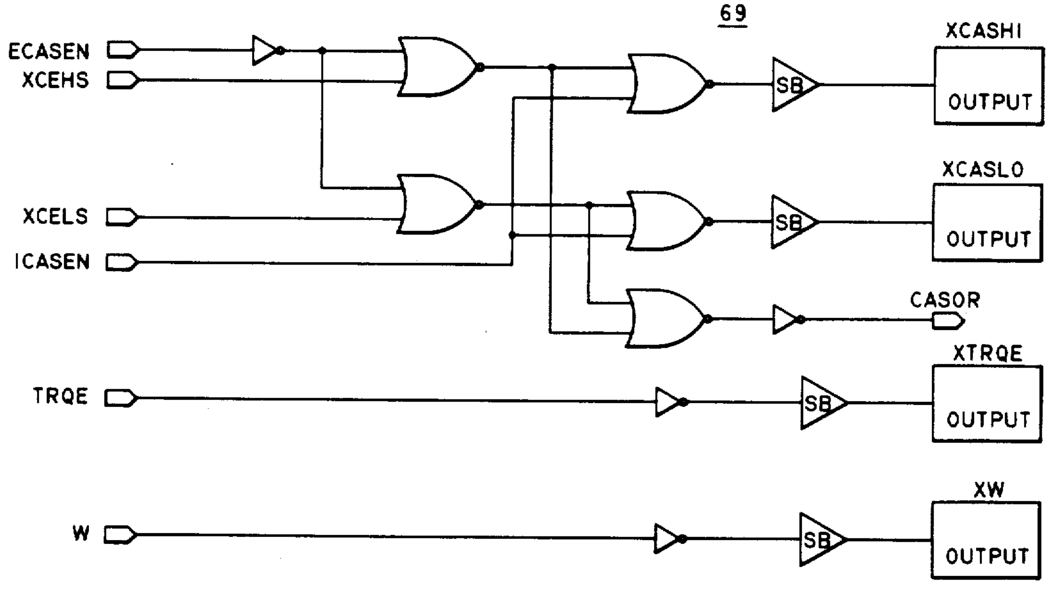
FIG. 12 is a schematic diagram of memory pins block of FIG. 4.

The memory pins 69 as shown in FIG. 12 provide the control signals for writing into the display memory 5, the output of which are the write command, XW, the TRQE command and the two column address strobes XCASHI and XCASLO. The column address enable high and low signals that are provided from the input pins 59 are gates by ICASEN and ECASEN, both of which are generated by cycle generator 67, onto outputs XCASHI and XCASLO.

Figure 13A:
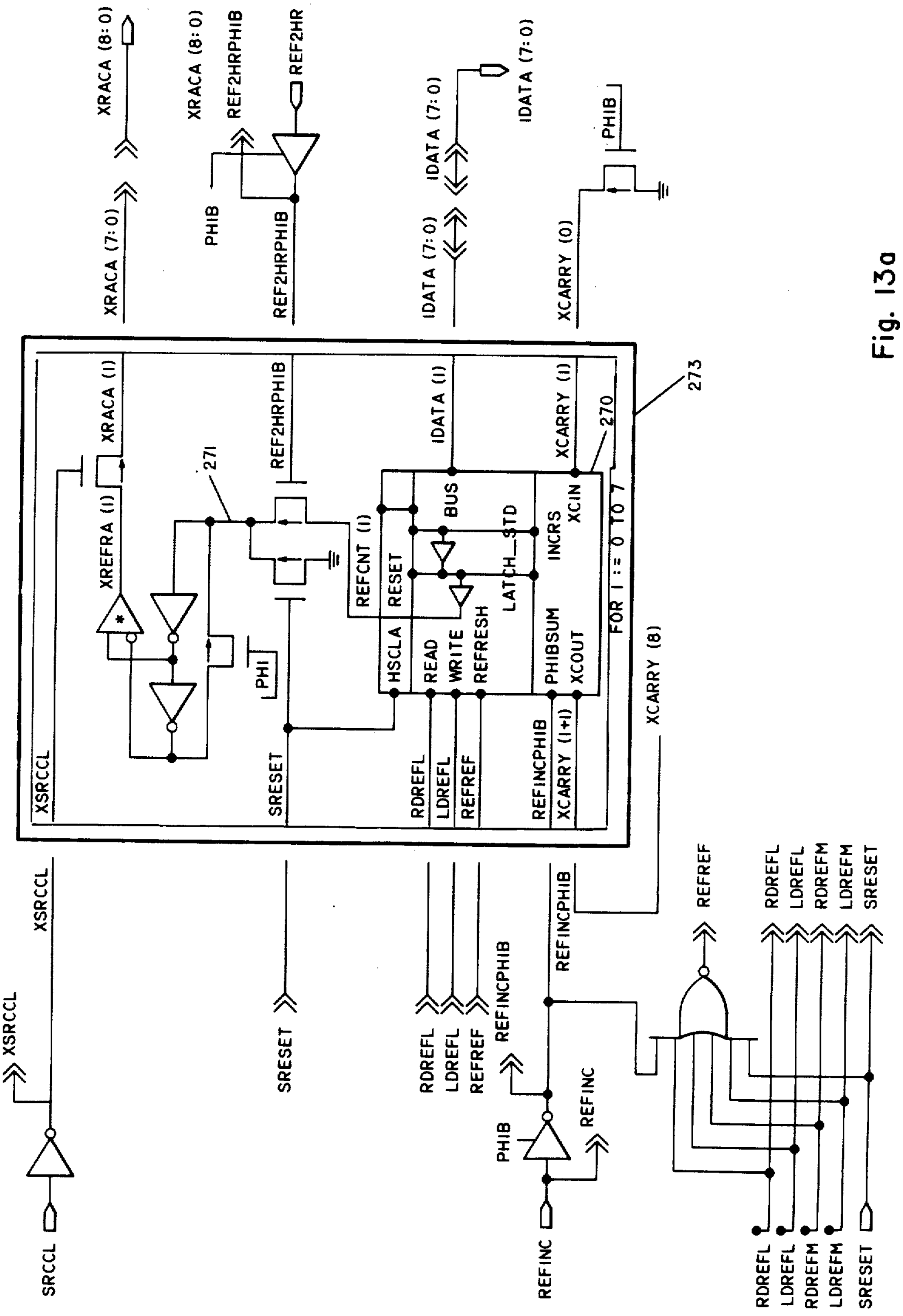
FIGS. 13*a* through 13*d* are schematic diagrams of the refresh block of FIG. 4.
Figure 13B:
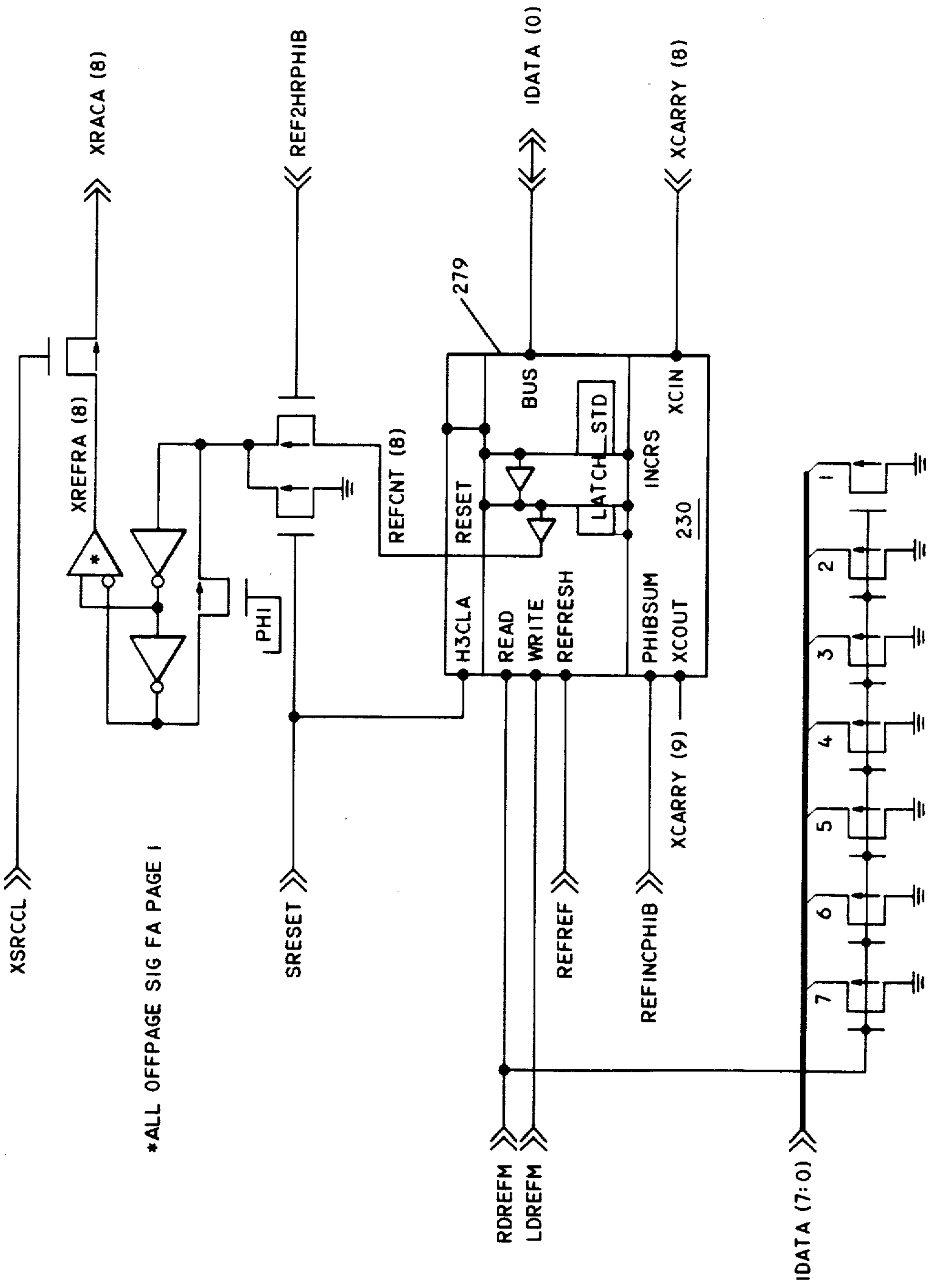
Figure 13C:
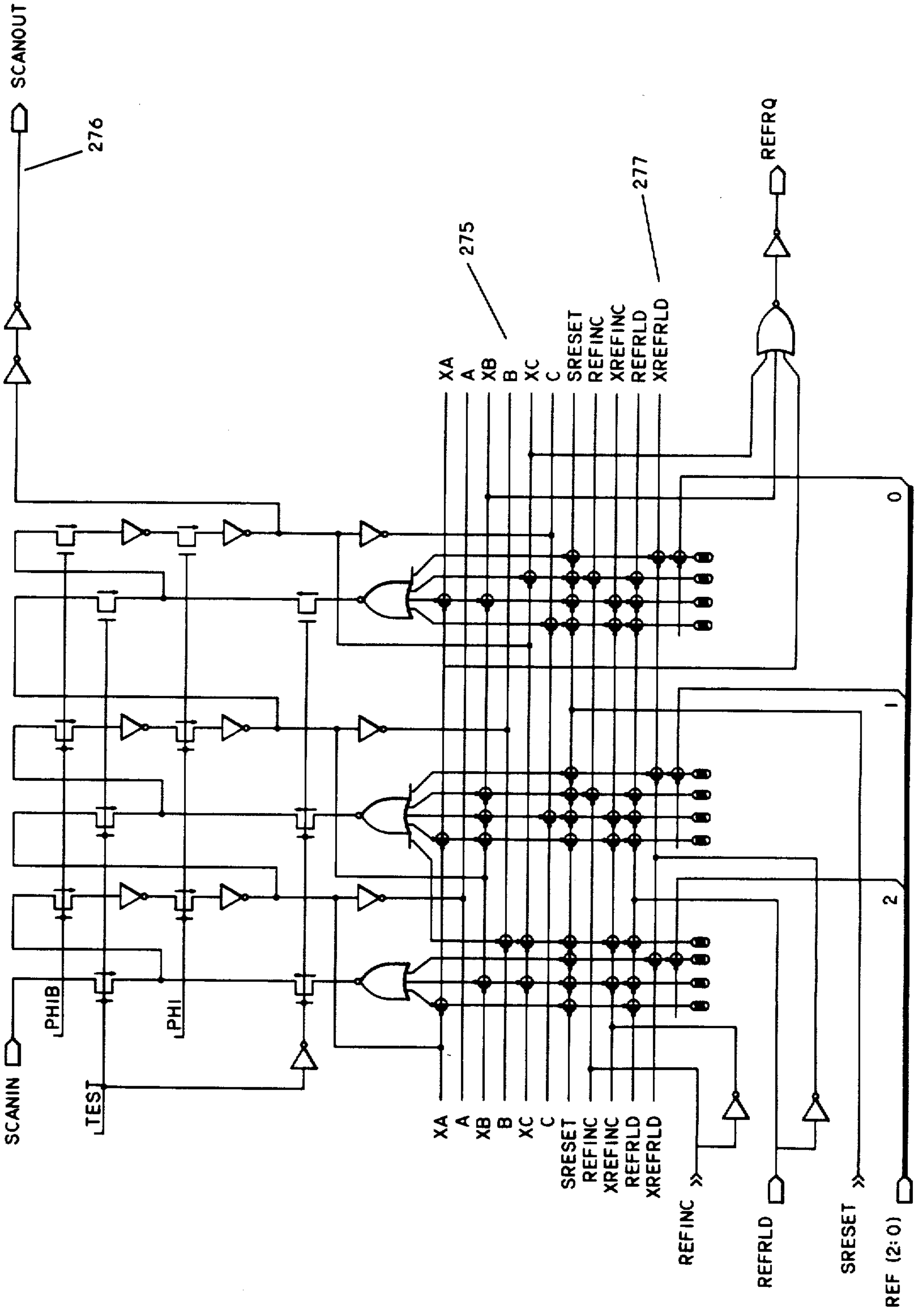
Figure 13D:
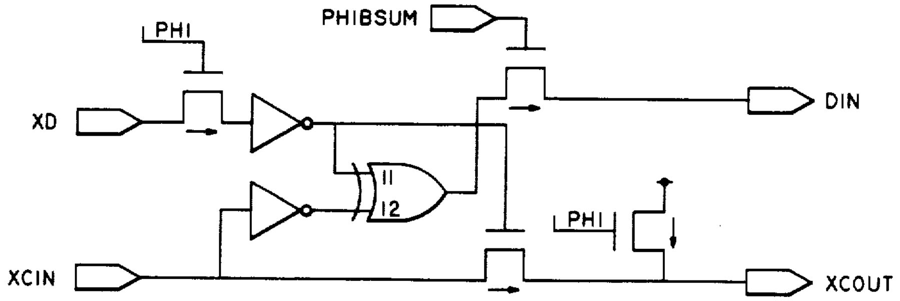
Figure 14A:
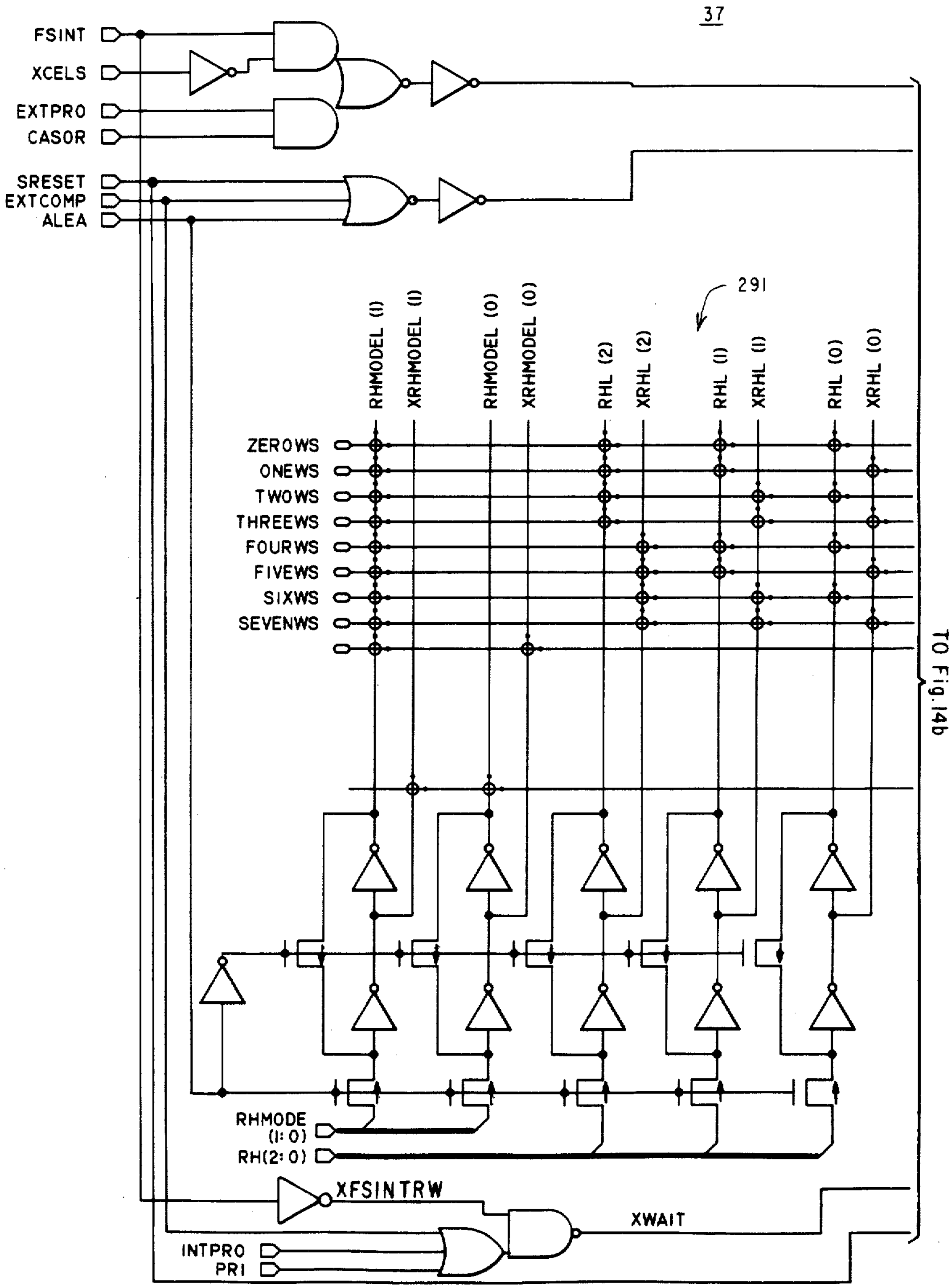
FIGS. 14*a* through 14*d* are schematic diagrams of ready hold block of FIG. 4.
Figure 14B:
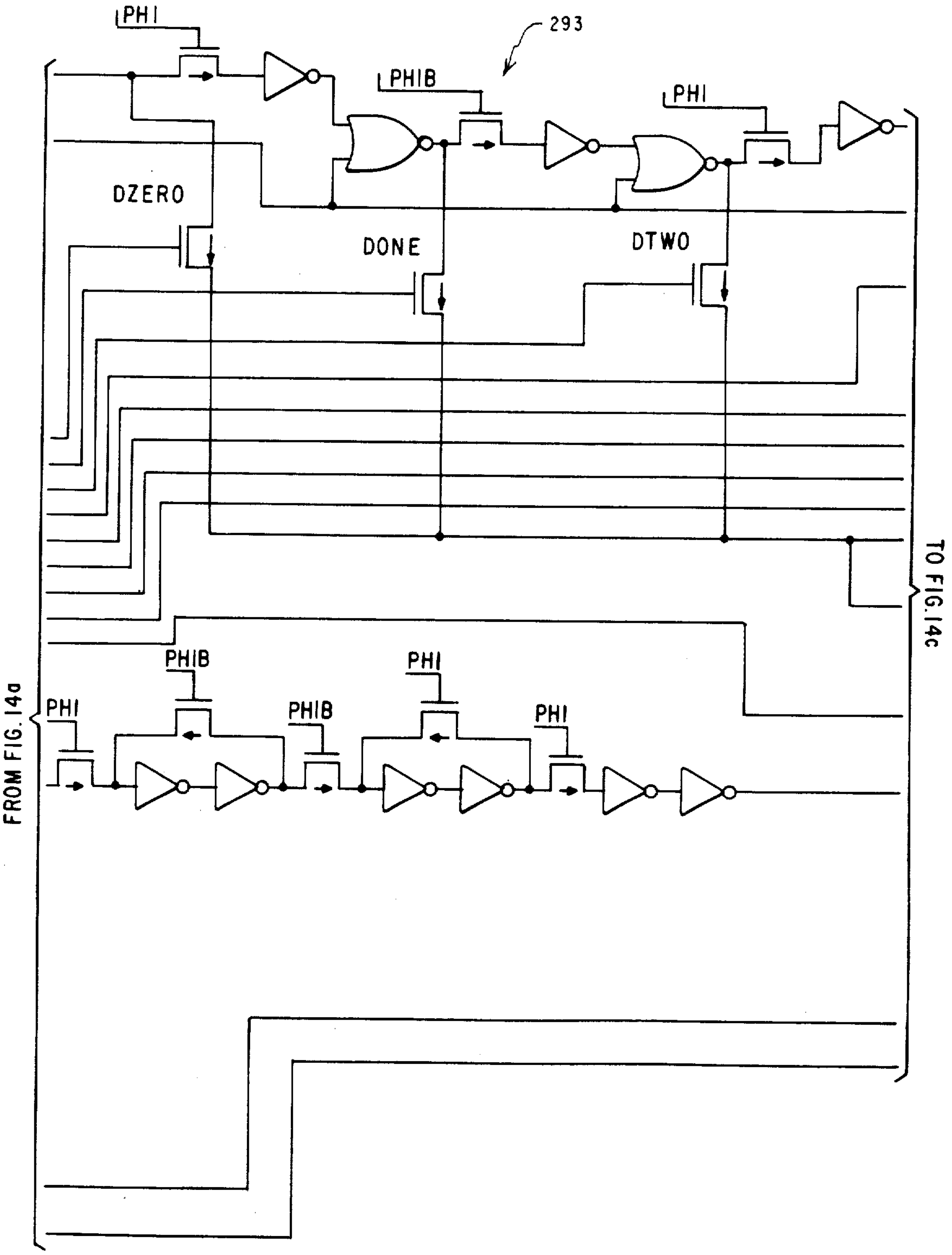
Figure 14C:
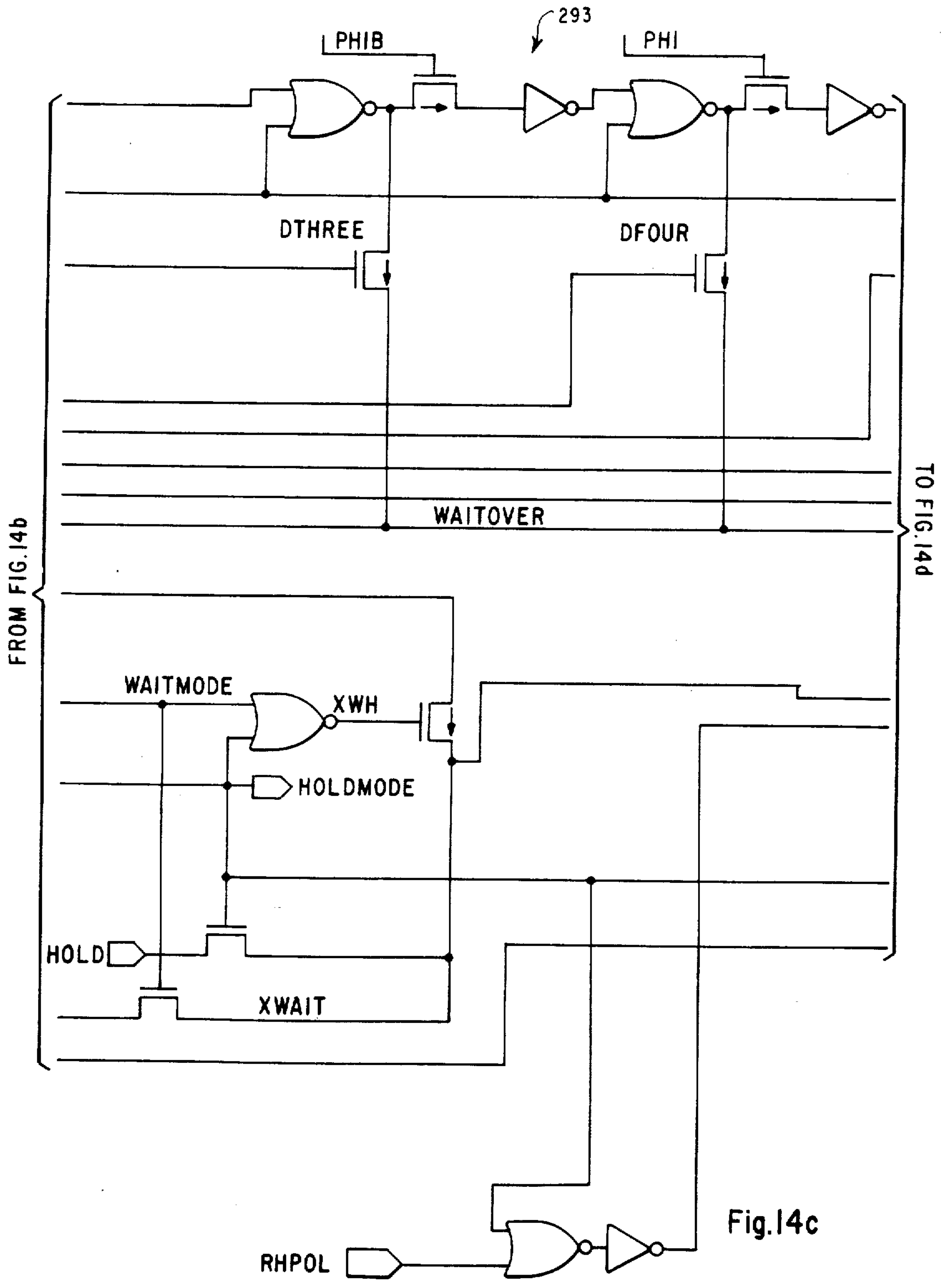
Figure 14D:
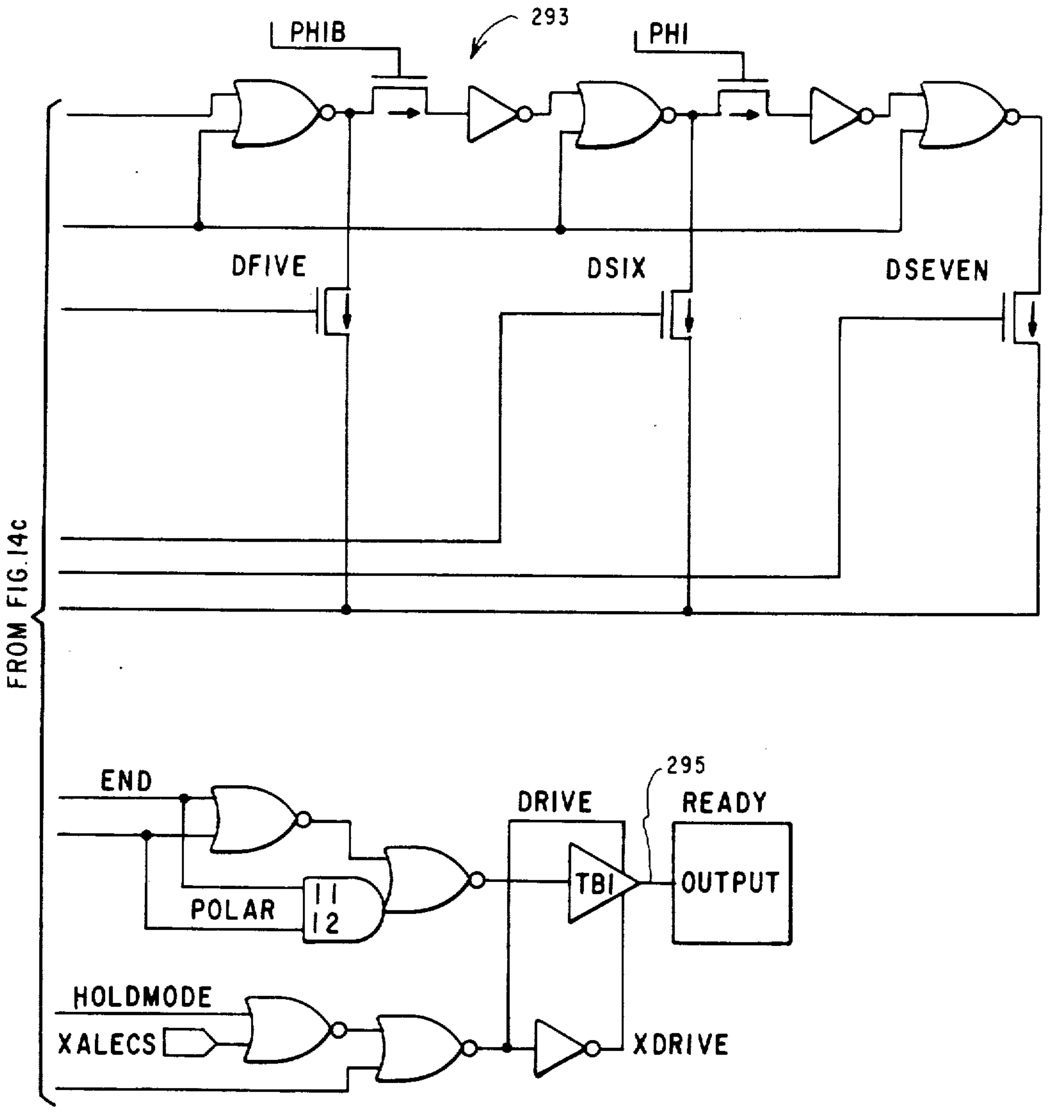

The video system controller 3 is configured to perform refresh cycles for the display memory 5 at regular intervals. The refresh counters (FIG. 13), contained within the refresh address counter 45 (FIG. 4*e*) generate a 9 bit row addresses output during the refresh cycles. A refresh burst counter not accessible to the micoprocessor 1, determines the number of refresh cycles per horizontal scan line. A refresh address register, also inaccessible to the micoprocessor 1, maintains the current row address and is incremented following each refresh cycle. The enabling of the refresh cycles and the frequencies of the refresh cycles are determined by three control register bits within the video system controller 3. Eight of the nine bit row addresses are provided by the circuit 273 of FIG. 13A which includes a refresh counter block 270 and a holding register 271. Upon command from the cycle generator 35 via the SRCCL signal, the counter 270 is enabled to the multiplexer 49 via the bus XRACA which connects the refresh address counter 45 to the multiplexer 49. FIG. 13B provides the remaining counter state 279 associated with counter 270. A Mealy-model state machine illustrated in FIG. 13C at 275, which, as mentioned earlier, is not accessible to the host computer, determines the number of refresh cycles per horizontal scan line that are performed. Its output REFRQ is issued to control logic 71 indicating that additional refresh cycles need to be performed during the current scan line. The refresh address register 270 maintains the current row address and is incremented following each refresh cycle for the display memory 5 and system memory 19. The cycle generator 67 performs the arbitration for determining the priorities of the memory cycles that are to be produced.

Ready hold logic 37 (FIGS. 14*a* through 14*d*) provides the ready/hold signal which informs the microprocessor of the current status of the cycle generator 67. Several modes of operation are available, programmed by control register bits RHMODE(1-0) and RH(2-0). These modes are ready, wait and hold modes. In ready mode, the microprocessor 1 programs a particular number of wait states that are desired during a microprocessor initiated cycle by loading RH(2-0). When the cycle requested by the microprocessor 1 begins, circuits 293 provide a timing sequence, which when complete, informs the host that the cycle is complete by activating ready/hold output. If an internal cycle is in progress, or a previously requested microprocessor requested cycle is still underway when the microprocessor 1 requests another cycle, then the previous cycle must complete. Wait mode does not include programmable wait states, but simply informs the microprocessor that his cycle has started by activating the ready/hold output. When ready hold logic is programmed to be in the hold mode, the video system controller 3 must issue a request for the microprocessor 1 to "hold" because it is time for the video system controller 3 to perform a refresh cycle or a shift register reload cycle. The microprocessor acknowledges the request for hold by providing a logic zero level on the xholdback input. When programmed to be in either the ready or wait mode, the ready/hold output active logic level is programmable by the state of the xholdback input during reset. This completes the dicussion of the system block 53 of FIGS. 3*f* and 3*g* and the circuits thereto as is illustrated in FIGS. 4 and 8 through 14.

Figure 15A:
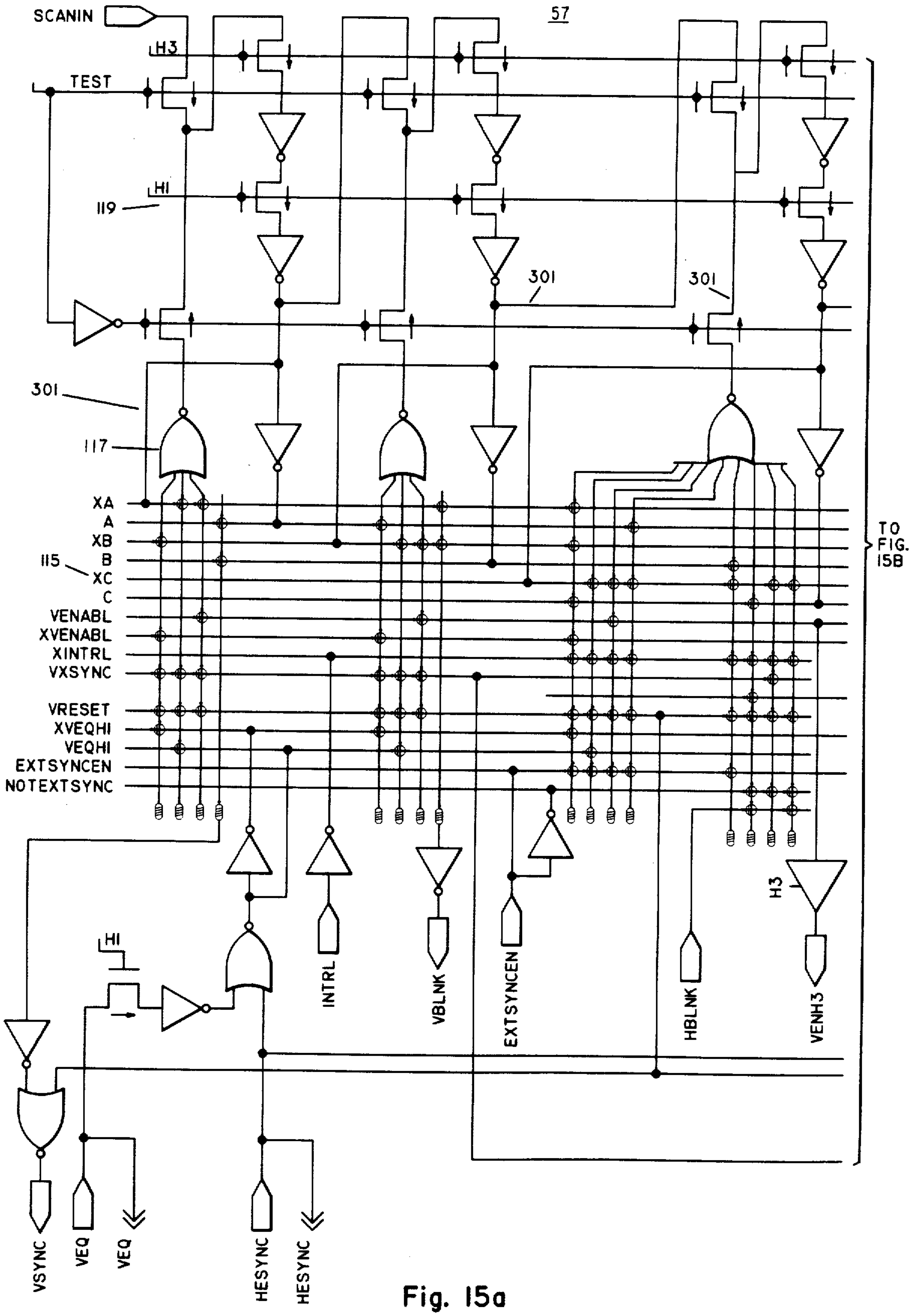
FIGS. 15*a* through 15*c* are schematic diagrams of the vertical control block of FIG. 7.
Figure 15B:
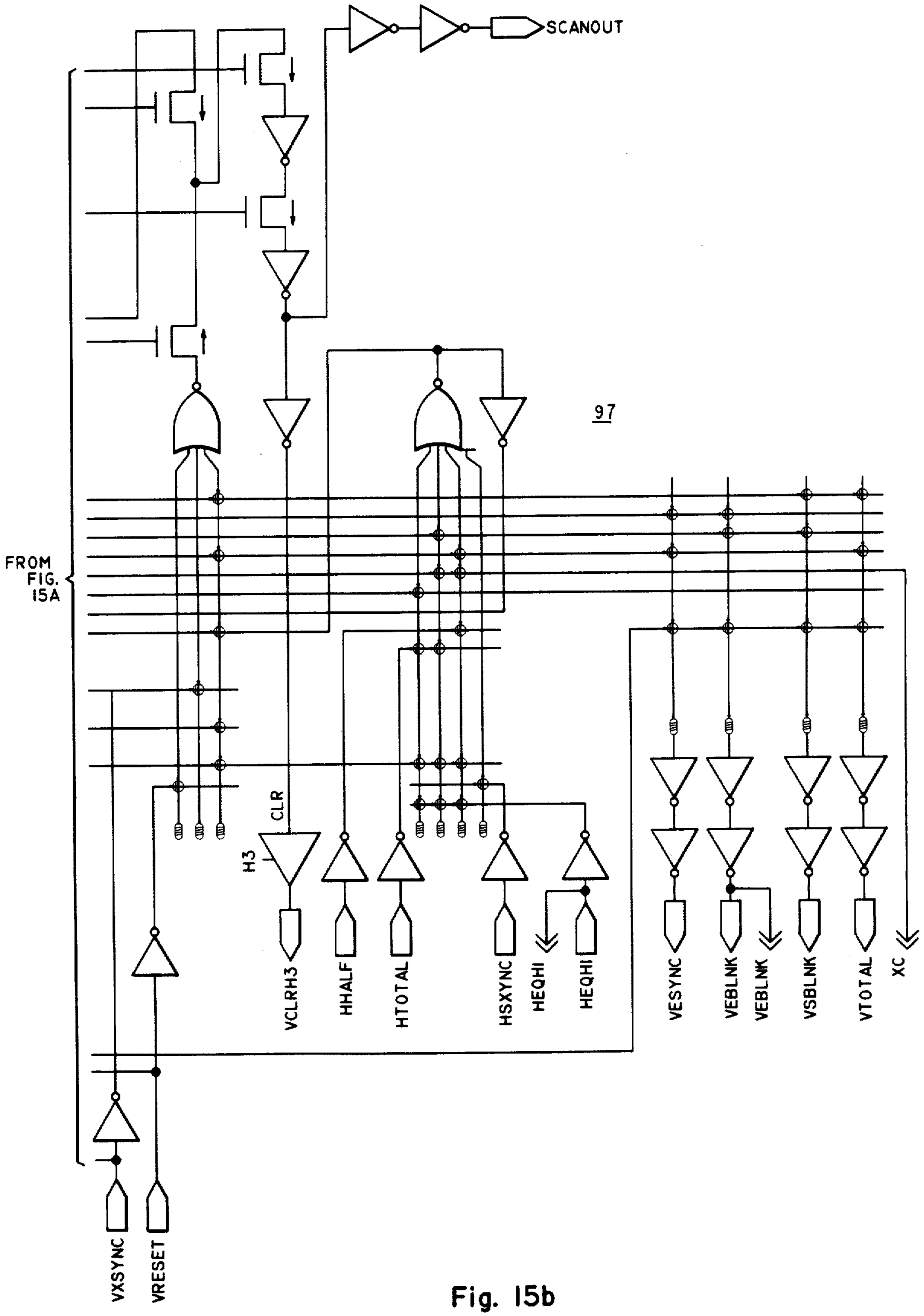
Figure 15C:
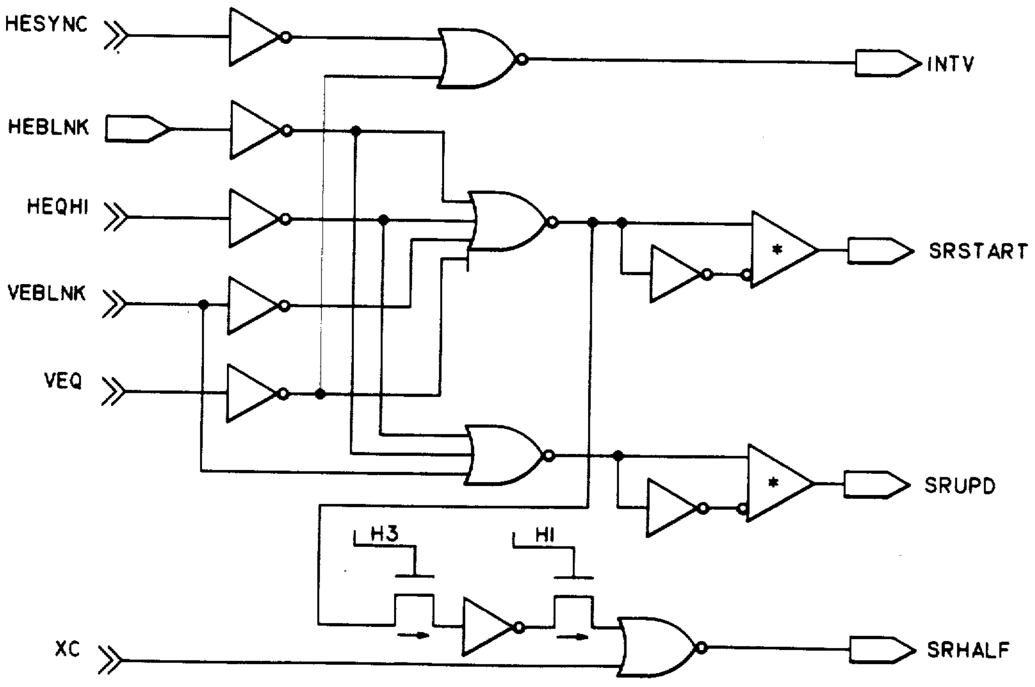

The video block 57 (FIG. 15) is used to generate the horizontal sync HSYNC-, vertical sync VSYNC-, and blank signals used to drive the CRT monitor 11 in a bit map graphic system. These signals are synchronous to the video input clock, VIDCLK. The signals output at the HSYNC-, the VSYNC and the VLANK-pins are programmed through 8 microprocessor 1 accessible video timing registers. The vertical control logic 97 as illustrated includes a plurality of state machine cells 301 that are a PLA 115, a logic gate 117 and a latch 119. The state machine standard cells 301 are connected in a counter figure configuration as is illustrated in FIGS. 15*a* and 15*b* and provide a sequence of gating signals that select which vertical counter. When the counter reaches the value in the selected timing register, the vertical control state machine cycles to the next timing register. The vertical counter register 99 (FIG. 7*a*) counts the horizontal lines in the video displays and serves as the timing base for determining the limits of the vertical sync and blanking intervals. The contents of the vertical counters are compared with the values in the vertical timing registers to mark off the vertical sync and blanking intervals. The count is incremented by one at the beginning of each horizontal sync interval with one exception.

Figure 7C:
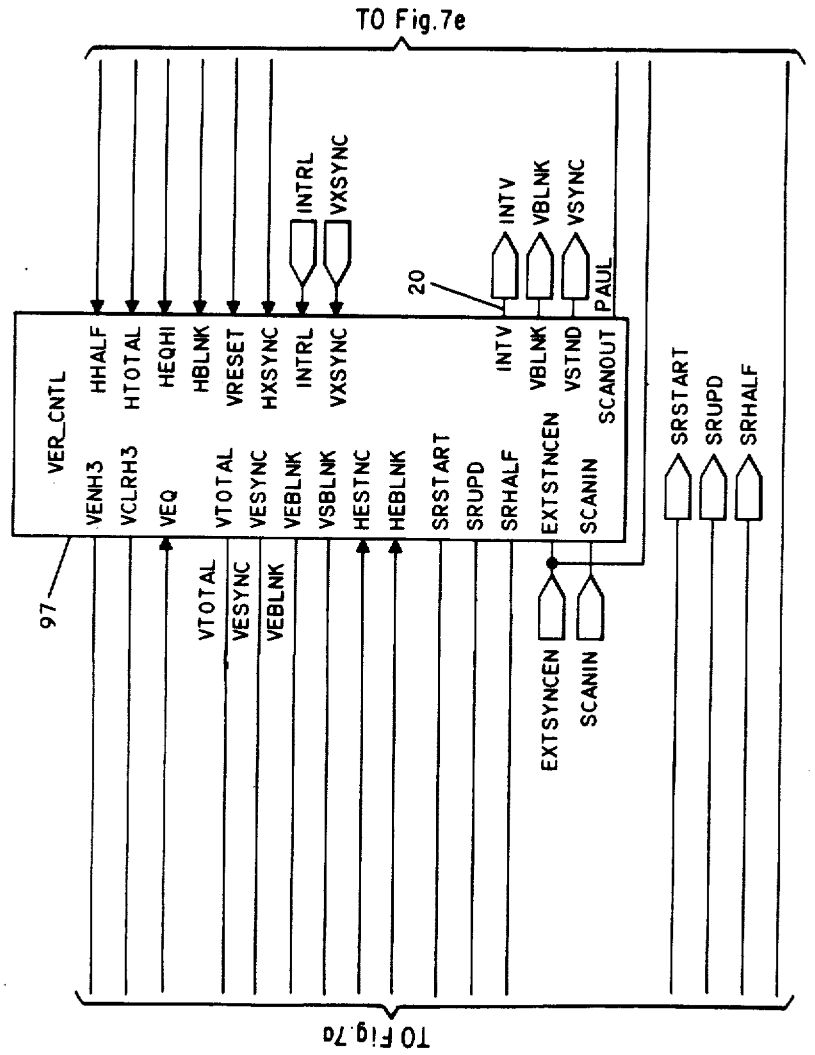
Figure 7D:
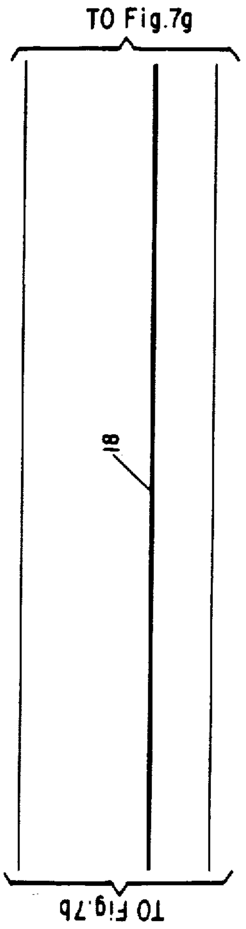
Figure 7E:
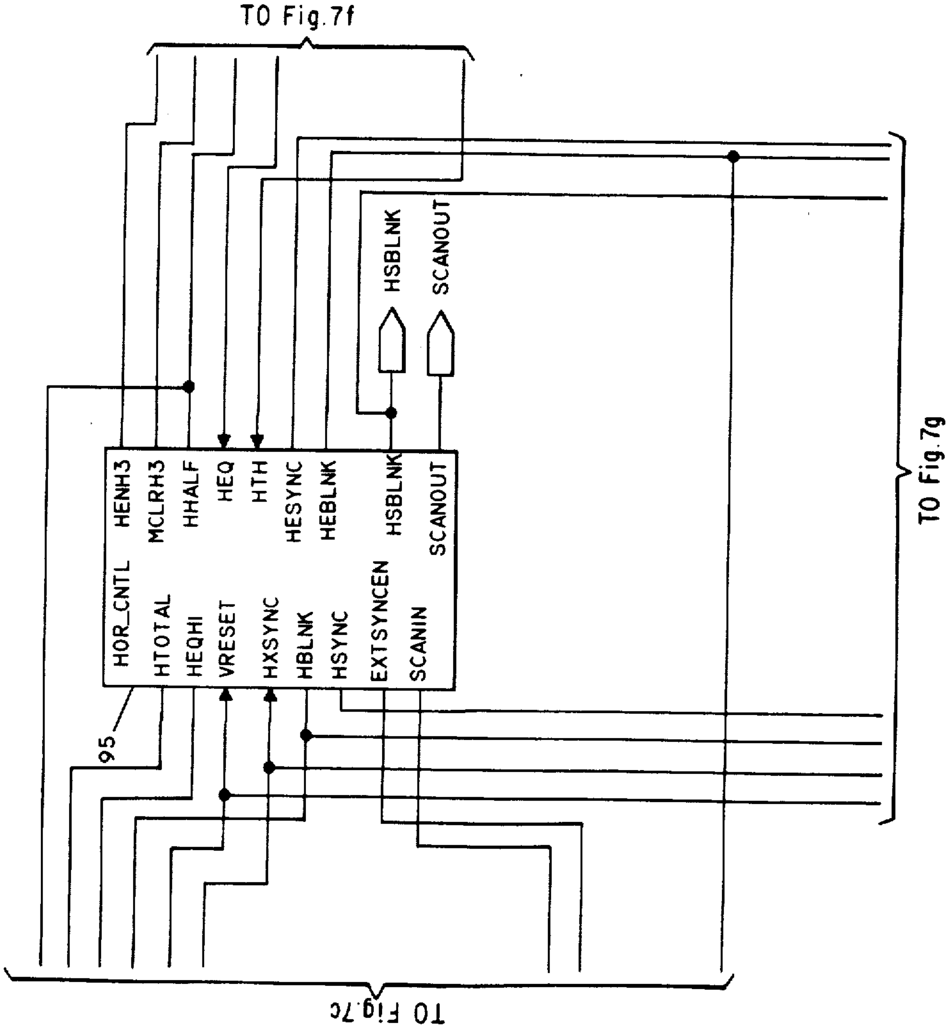
Figure 7F:
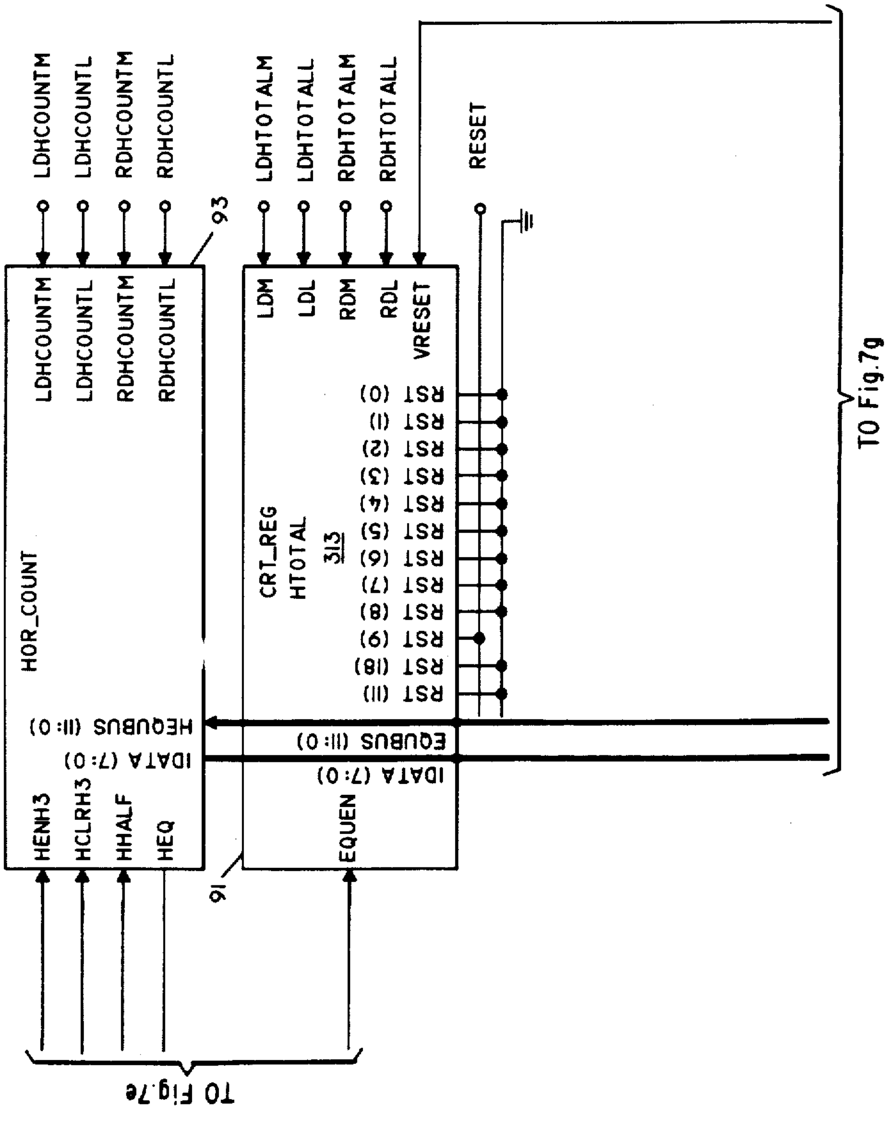
Figure 7G:
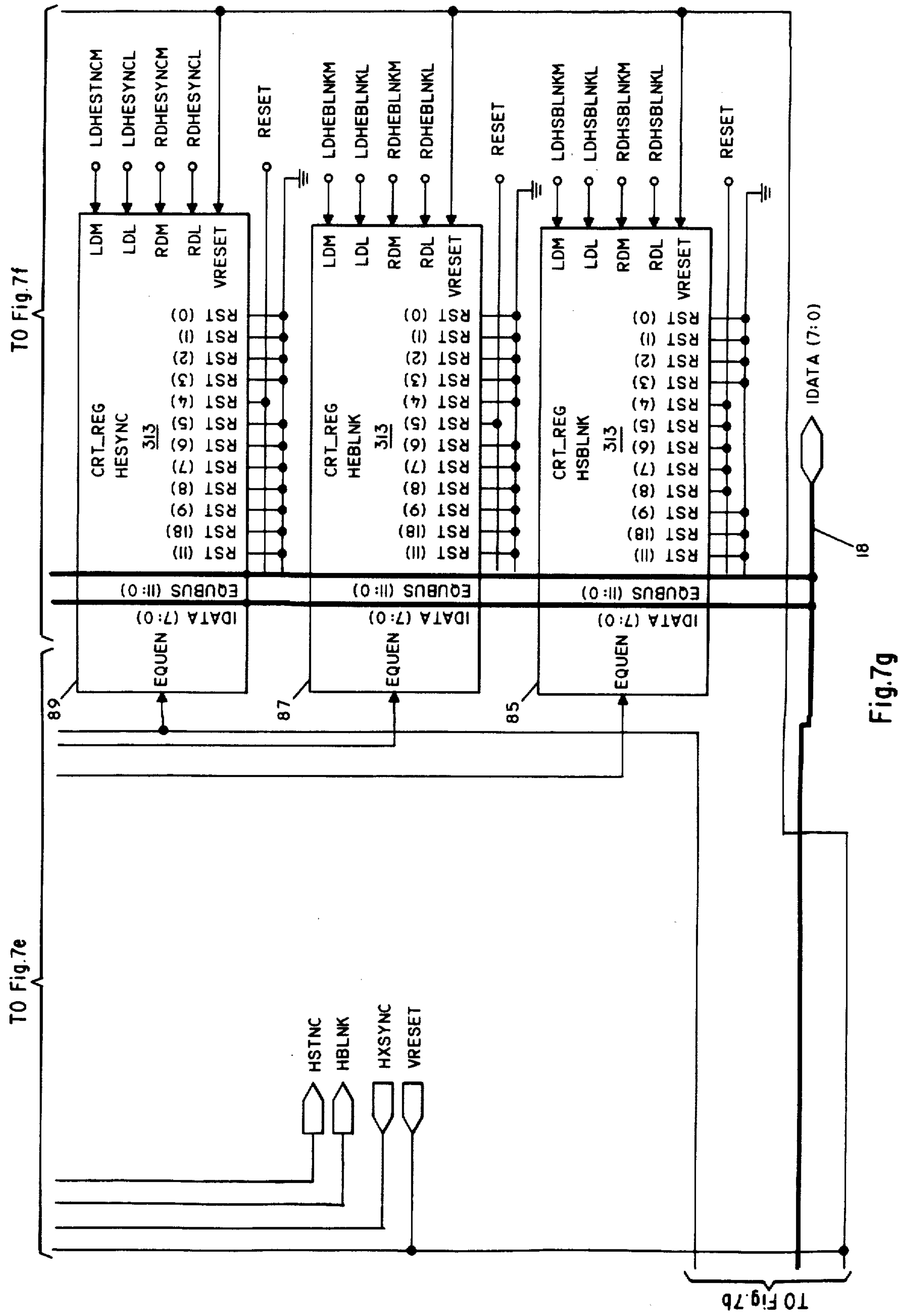

The exception is during the vertical front porch and sync intervals of an old field in an interlaced frame, the increment of the vertical counter occurs at midpoint where the count and the horizontal counter 95 (FIG. 7*e*) is equal to one-half the value in the horizontal total register 91 (FIG. 7*f*). The vertical counter 97 is reset to zero upon reaching the value in the vertical total register 101 on the next following edge of the Vid 1*k* after a high to low transition on an active reset-signal forces the vertical counter to zero. This interval may be read by the microprocessor 1 during the intervals between increments, but may not be written to. Multiple read cycles are normally used for accessing the vertical counter 97 (FIG. 7*c*). Two consecutives reads returning the same data information indicates that the microprocessor 1 access is in an interval between increments.

Figure 16A:
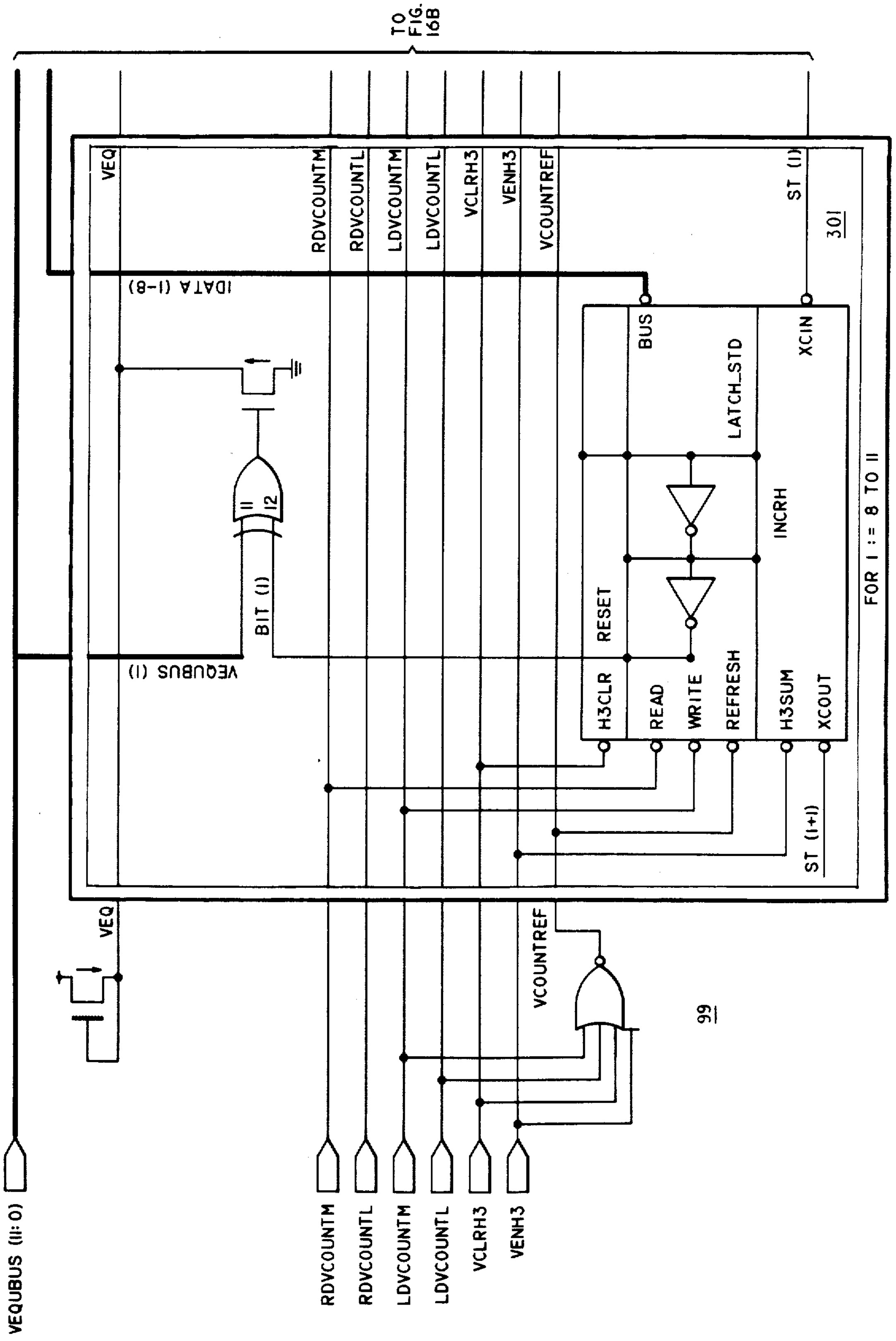
FIGS. 16*a* and 16*b* are schematic diagrams of the vertical counter of FIG. 7.
Figure 16B:
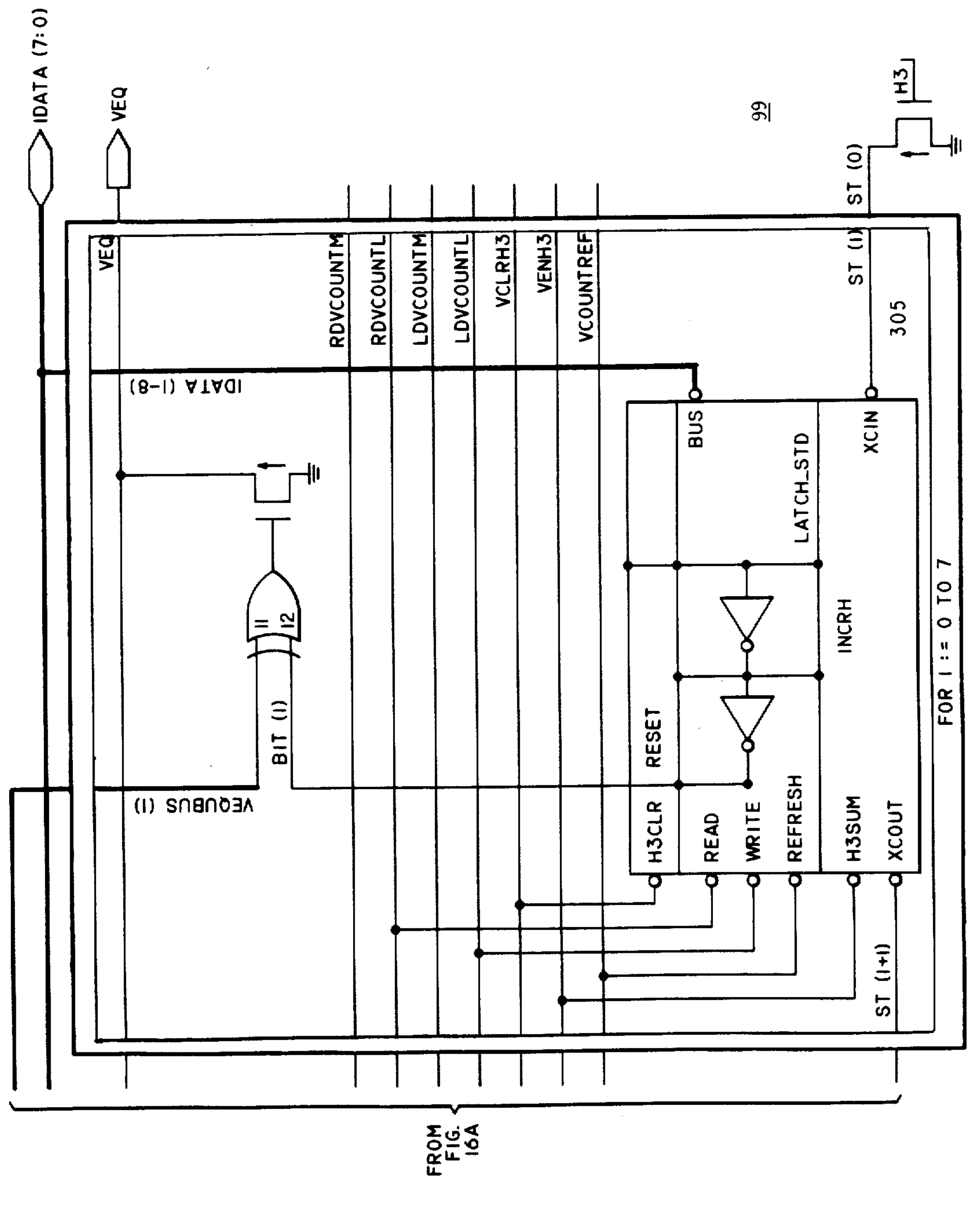

FIGS. 16*a* and 16*e* are schematic diagrams of the vertical counter 99 and provides two counter stages 303 and 305. The first counter stage 305 provides for 8 bits of data and is repeated 8 times and the second stage 305 provides for 4 bits of data so that there is a maximum number of 12 bits stored in the vertical counter.

Figure 17A:
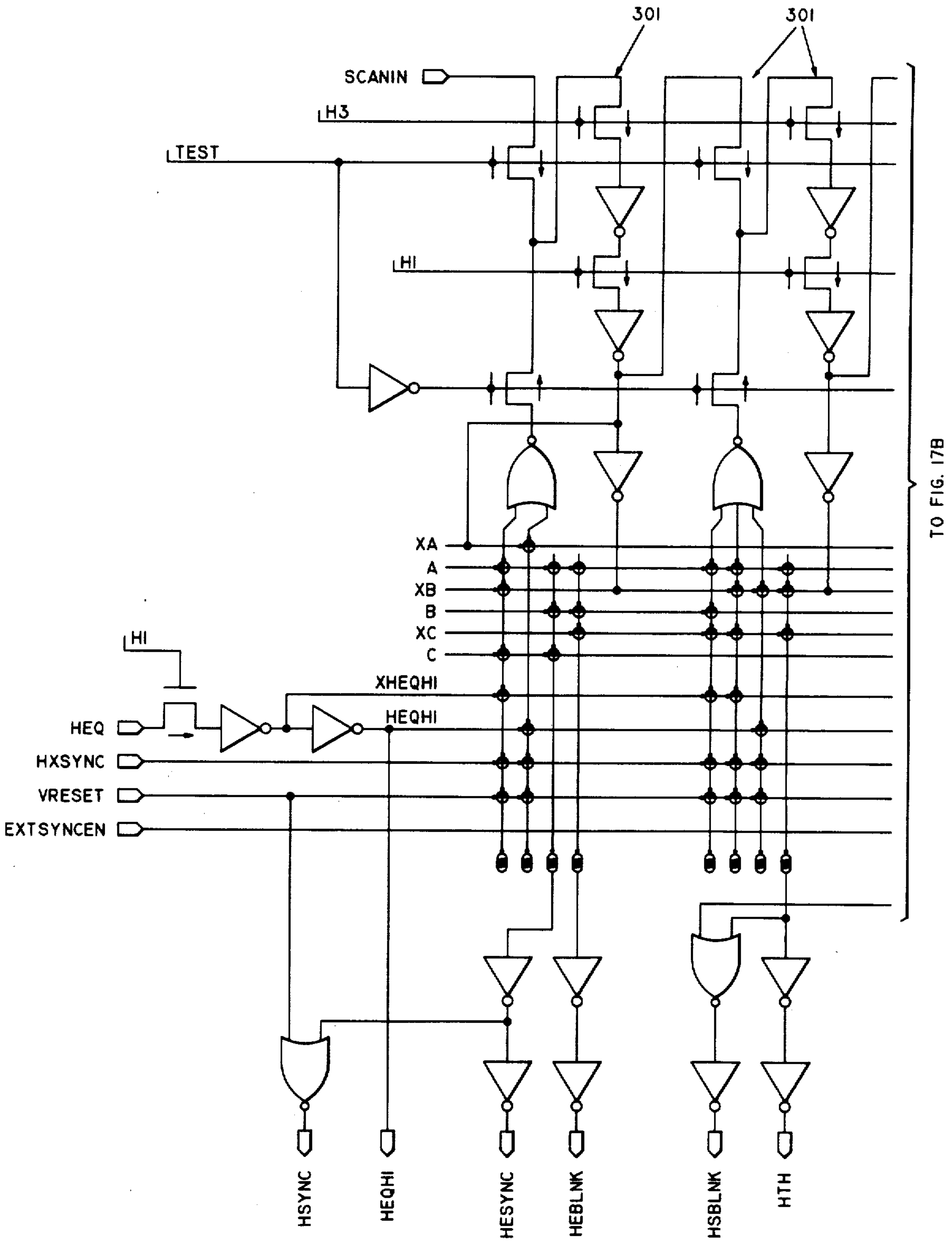
FIGS. 17*a* and 17*b* are schematic diagrams of the horizontal counter of FIG. 7.
Figure 17B:
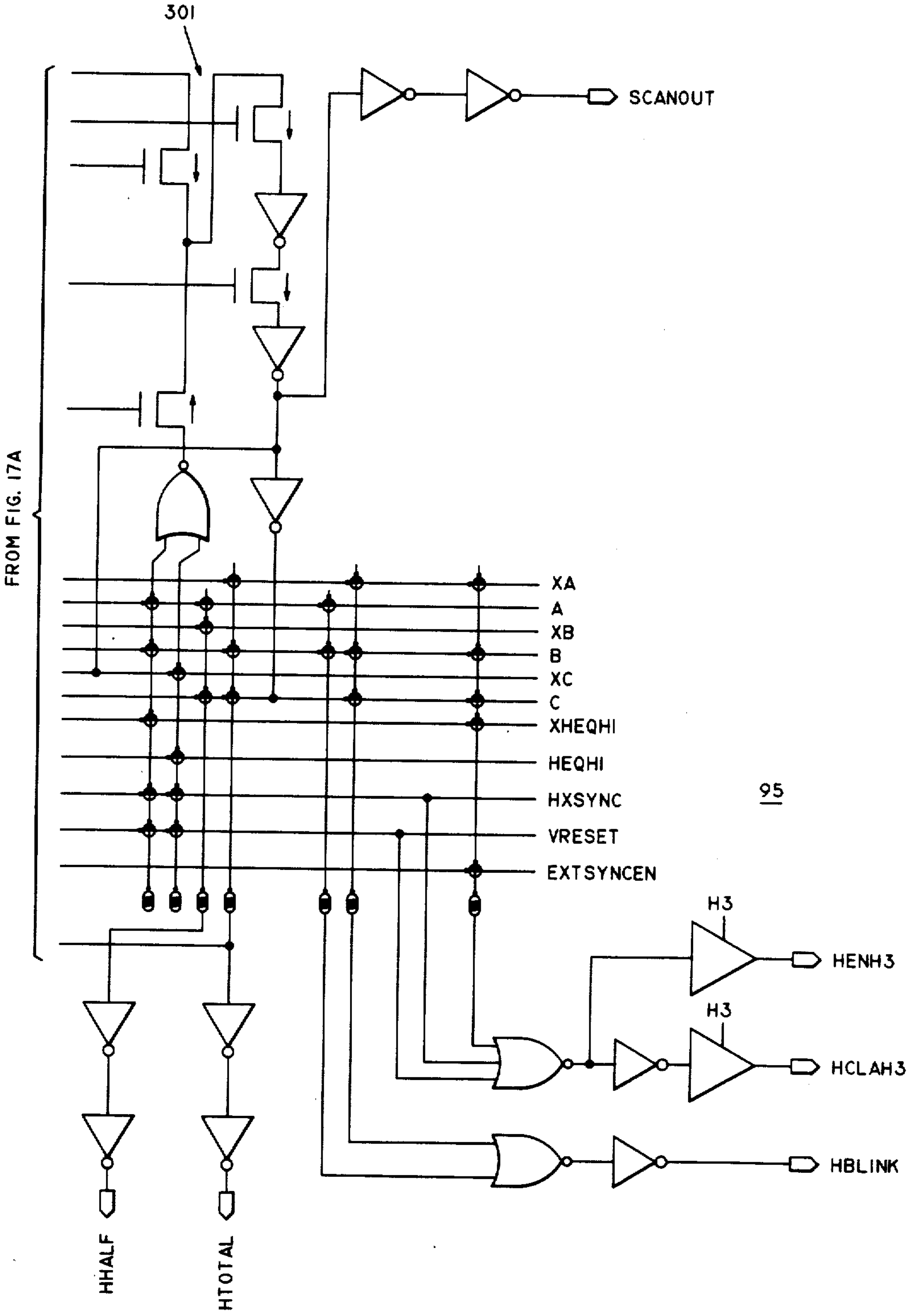

FIGS. 17*a* and 17*b* are schematic diagrams of the horizontal control circuit 95 in which the control signals are generated for controlling the horizontal registers 85, 87, 89, 91 and 93.

Figure 18A:
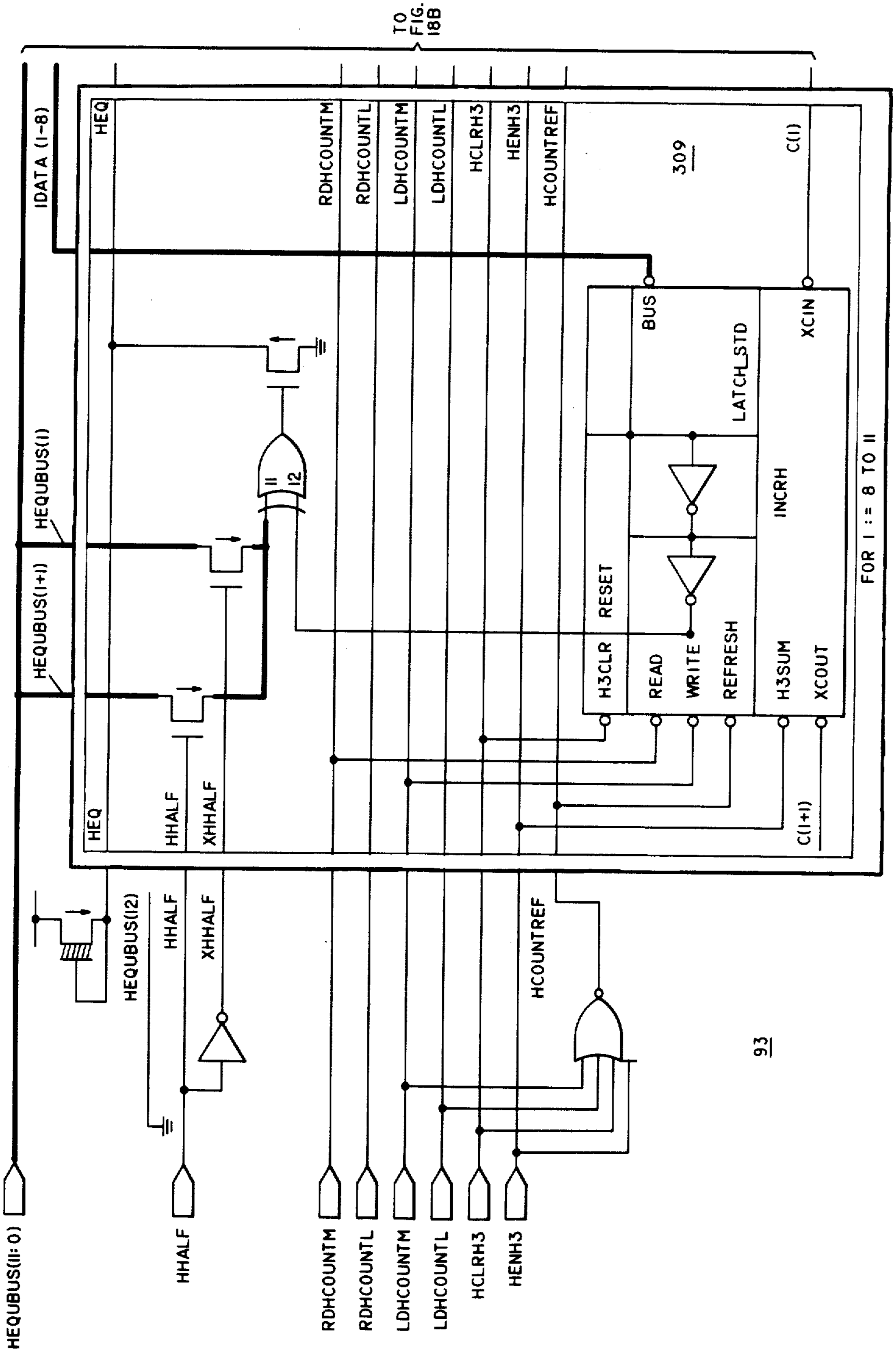
FIGS. 18*a* and 18*b* are schematic diagrams of the horizontal counter of FIG. 7.
Figure 18B:
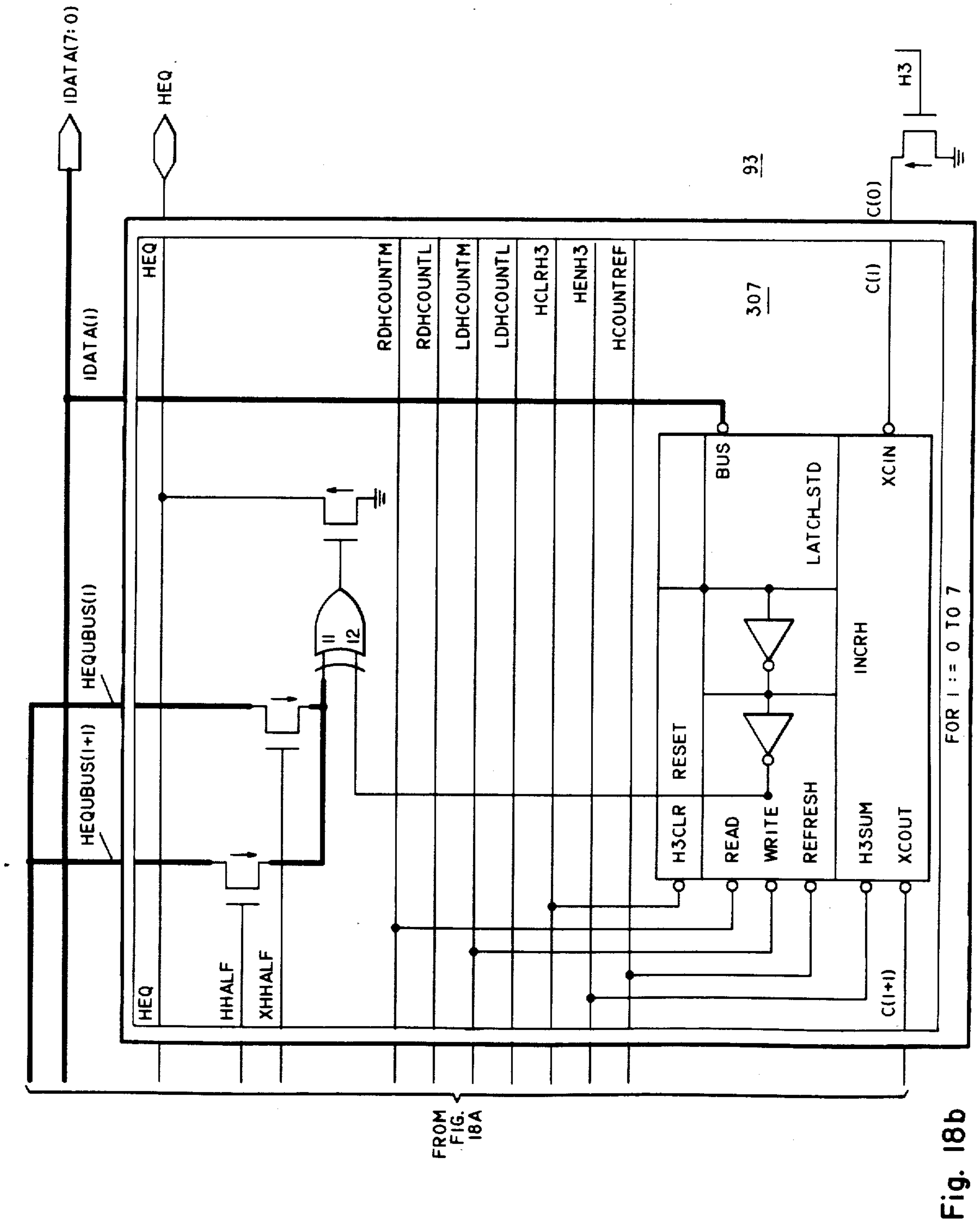

FIGS. 18*a* and 18*b* are schematic diagrams of the horizontal counter 93. The horizontal counter is a 12 bit counter that is divided into two stages 307 and 309, with 307 providing the first 8 bits 0–7 and 309 providing the remaining 4 bits 8–11. The horizontal counter 93 is incremented on VIDCLK falling edge, and serves as a timing base for determining the limits of the horizontal sync and blanking intervals. The value of the horizontal counter is compared to the value of the four other horizontal timing registers in order to generate the signal output HYSYNC- and BLANK-. When the horizontal counter 93 reaches the value in the horizontal total registers 91, it is reset to zero by the circuit 311. When the video system controller is configured in the external sync mode, HYSNC- is an input and the horizontal counter is forced to zero as a delay from the fallen edge of HYNC-. The vertical counter is reset in a similar way to activating the YSYNC-input. External sync mode allows the video system controller 3 to "sync-up" to an external video source. This permits displaying multiple video sources on the same monitor simultaneously. External sync mode is enabled by writing to the EXT-SYNCEN bit in control register 39C. FIG. 38 shows the latch and synchronizing circuits which process the incoming sync pulses. An active reset-signal forces the horizontal counter 93 to zero. And this counter is not accessible to the microprocessor 1.

Figure 19A:
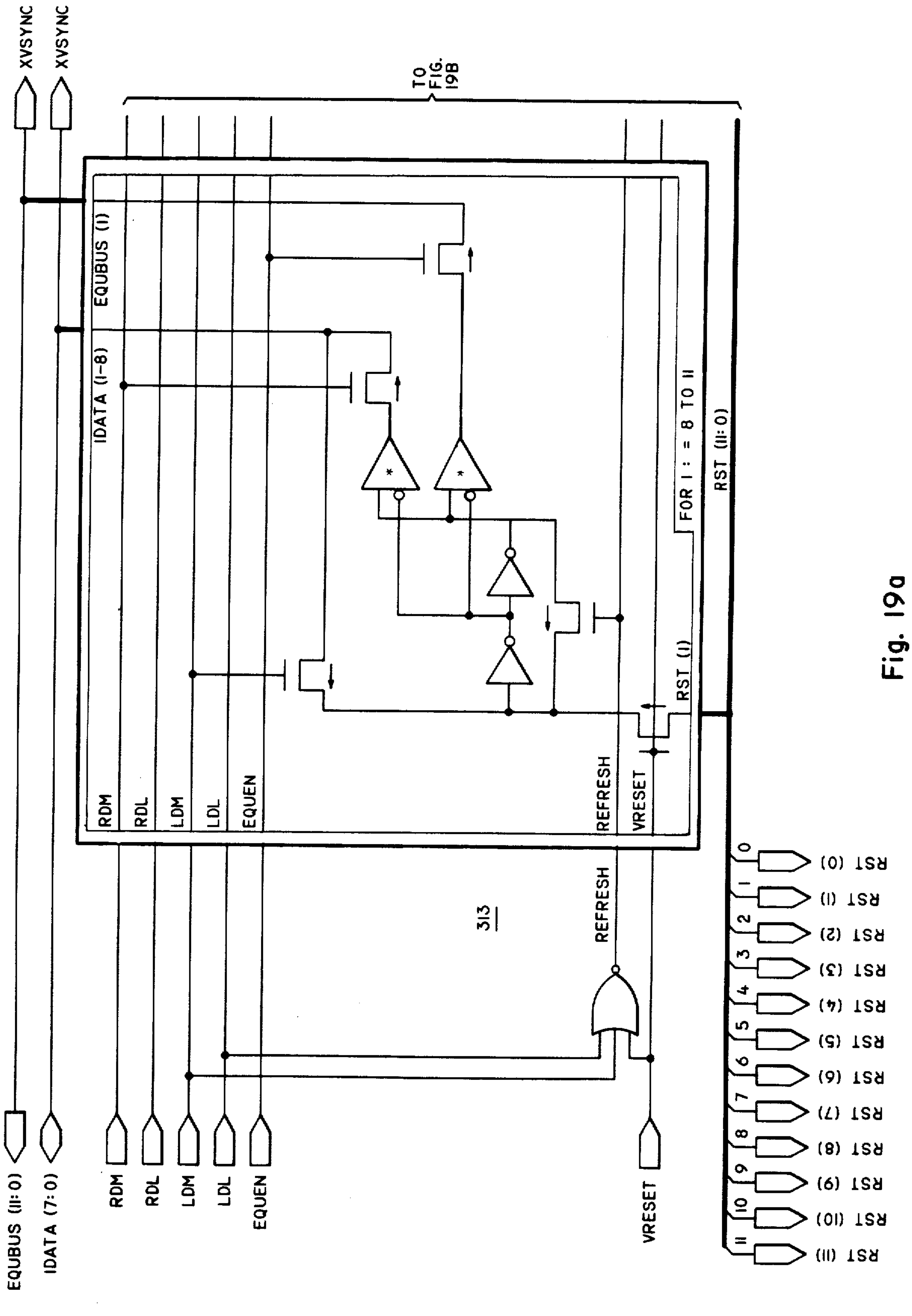
FIGS. 19*a* and 19*b* are schematic diagrams of the basic register used in FIGS. 16, 17 and 18.
Figure 19B:
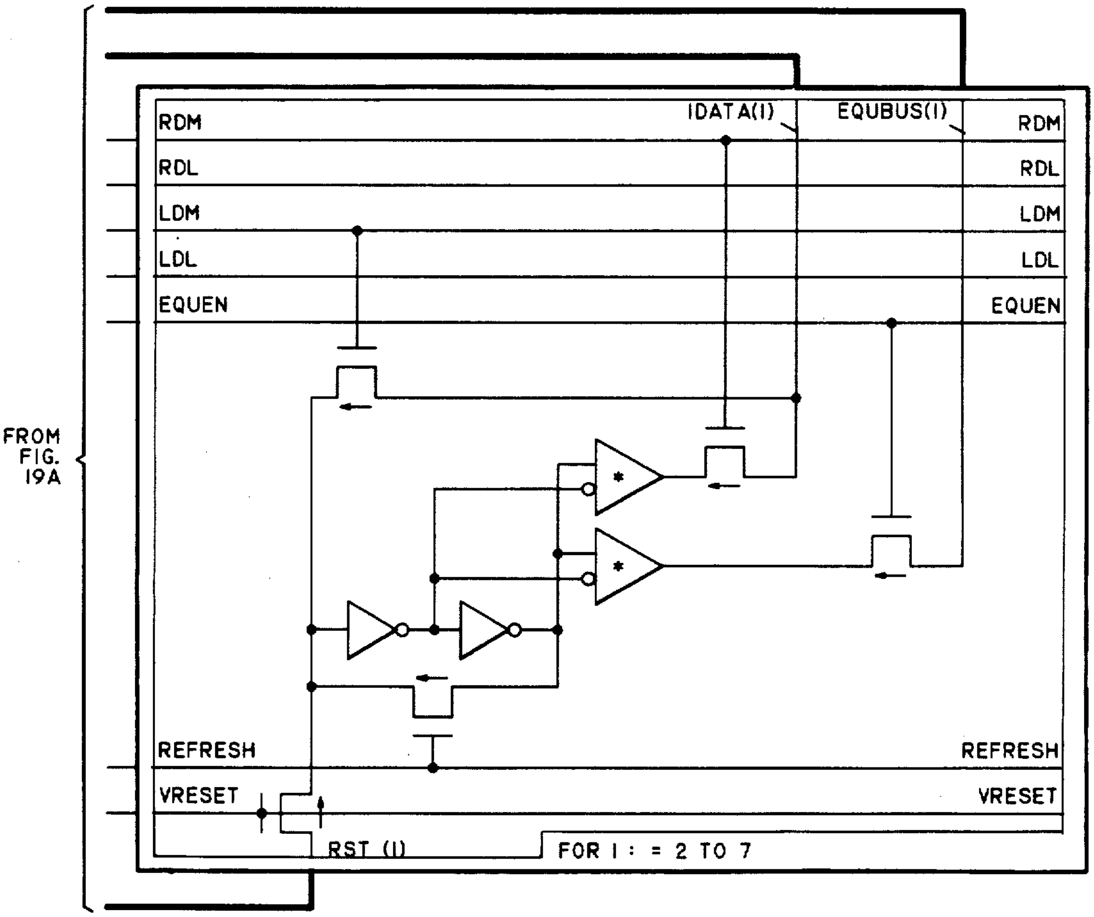

The remaining registers of FIG. 7 are illustrated in FIGS. 19*a* and 19*b* which are schematic diagrams of the basic register block 313.

Another function of the video block 57 includes the SR data block. SR stands for shift registers which are contained within the display memory 5. A shift register read or write cycle is an access initiated by the microprocessor 1. Shift register cycles are specifically geared toward transferring data between the display memory 5 cell arrays and shift registers withing the display memory 5. Display update cycles are initiated automatically within the video system controller 3. Shift register cycles may also be initiated under explicit microprocessor 1 control. FIG. 20 is a schematic diagram of the SR data control circuit that is contained within the video block 57. The direction of the transfer of data is determined by the state of control bit SRW in control register 1. A shift register transfer cycle can be initiated either by the video system controller 3 (display update) or by the microprocessor, whereby the type of cycle desired is determined by the function select code input on lines FS0–FS2. The function select code of a binary value of zero indicates a register access cycle, binary No. 1 an XY indirect cycle, binary 2 a register access cycle, binary 3 a microprocessor direct cycle, binary 4 a shift register cycle shift register to memory, binary 5 shift register cycle memory to shift register 6 and 7 are unused or for special functions such as test mode. A shift register write cycle transfers the contents of the shift register within the display memory 5 to the specific specified row within the on-chip memory cell array and a shift register read cycle transfers the contents of a specified row within the memory cell array to the shift register.

Figure 20A:
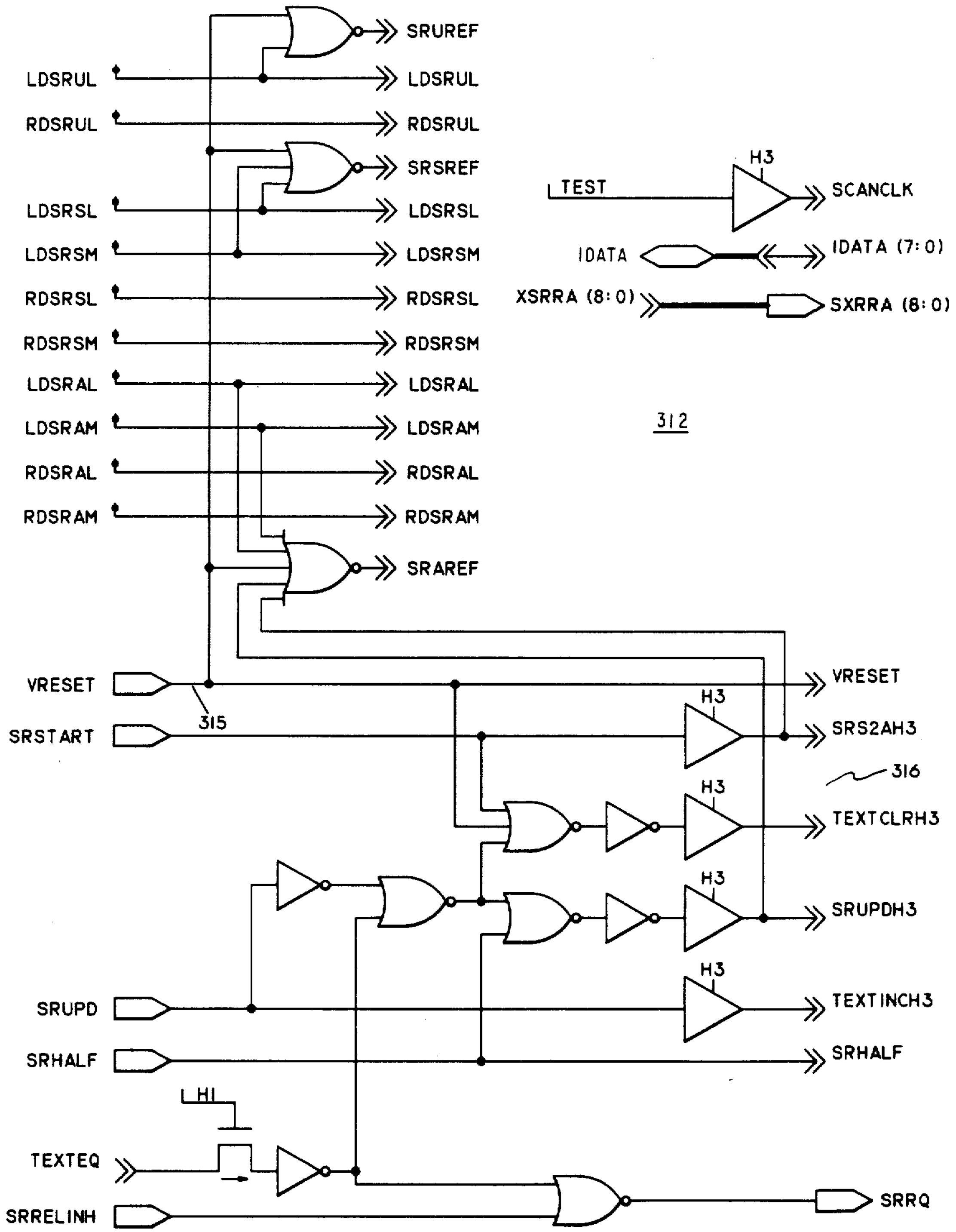
FIGS. 20*a* through 20*i* are schematic diagrams of the SRDAT block of FIG. 5.
Figure 20B:
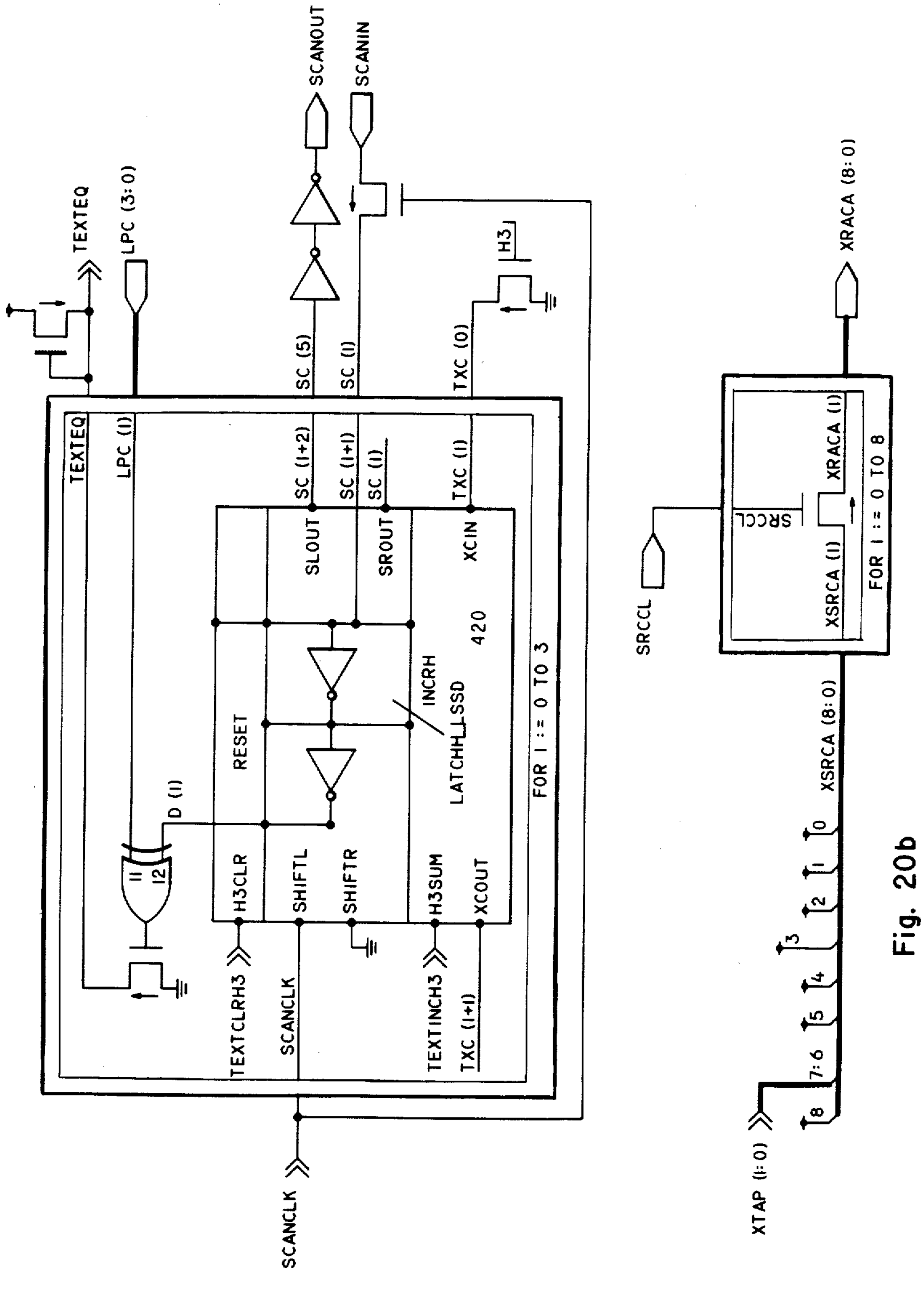
Figure 20C:
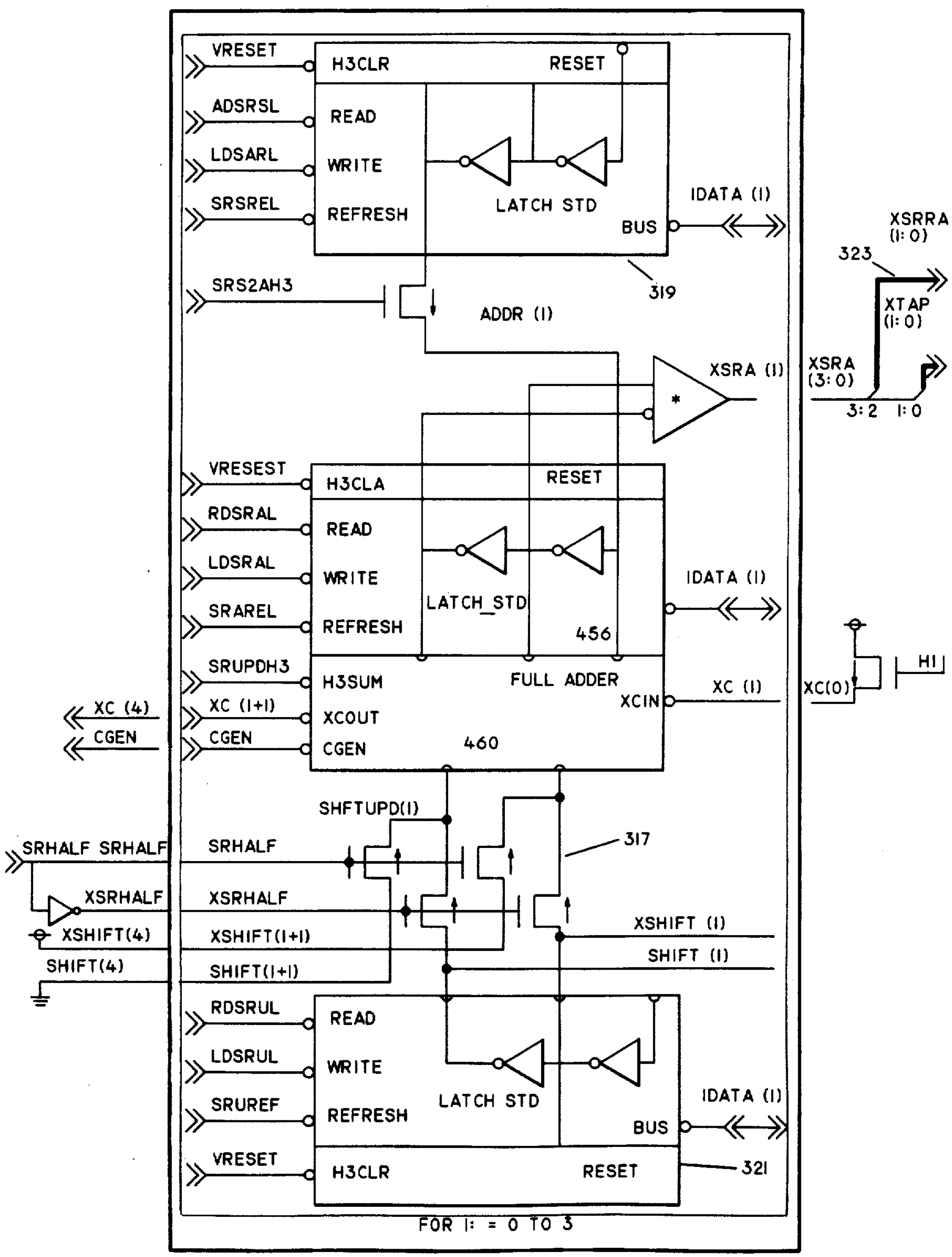
Figure 20D:
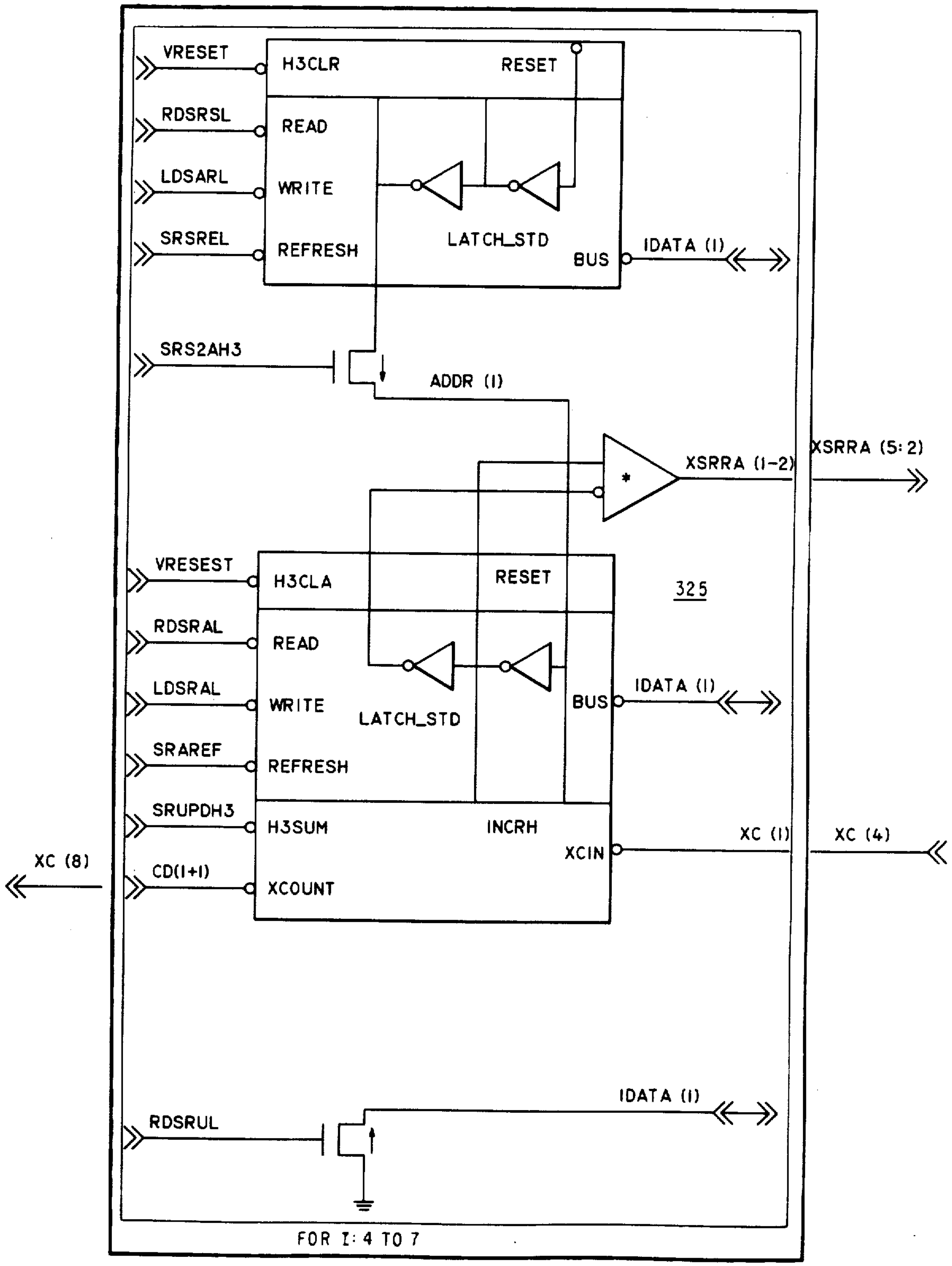
Figure 20E:
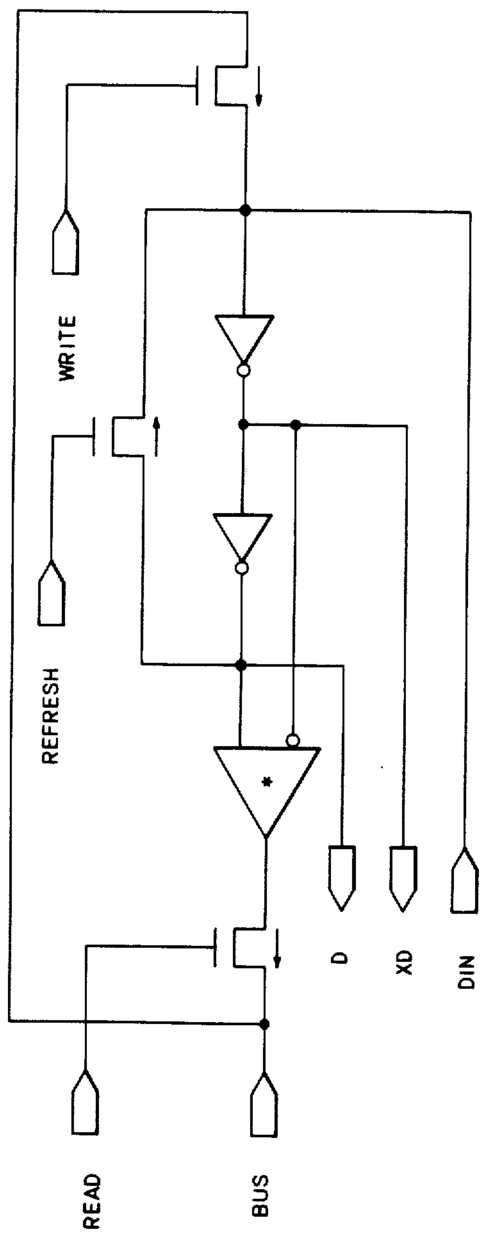
Figure 20F:
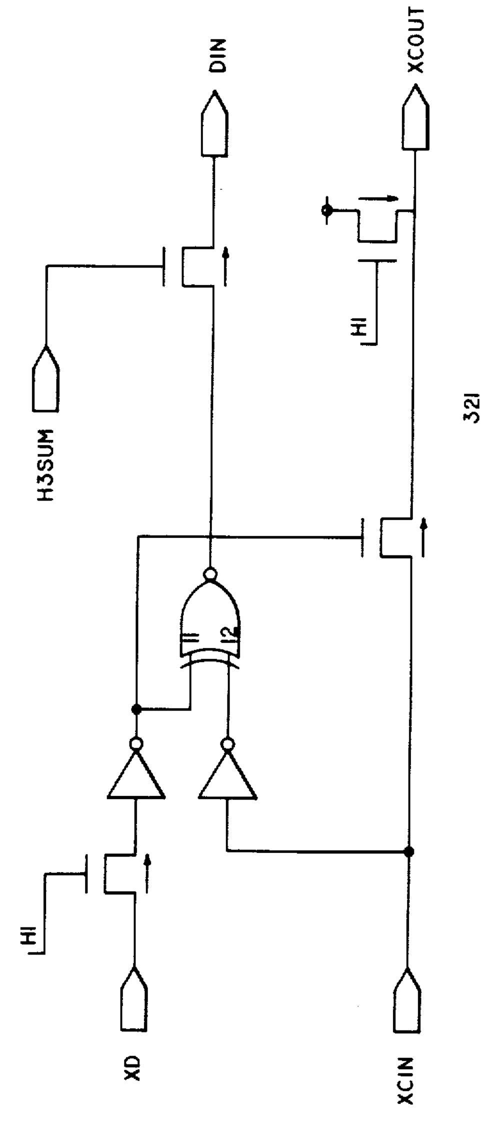
Figure 20G:
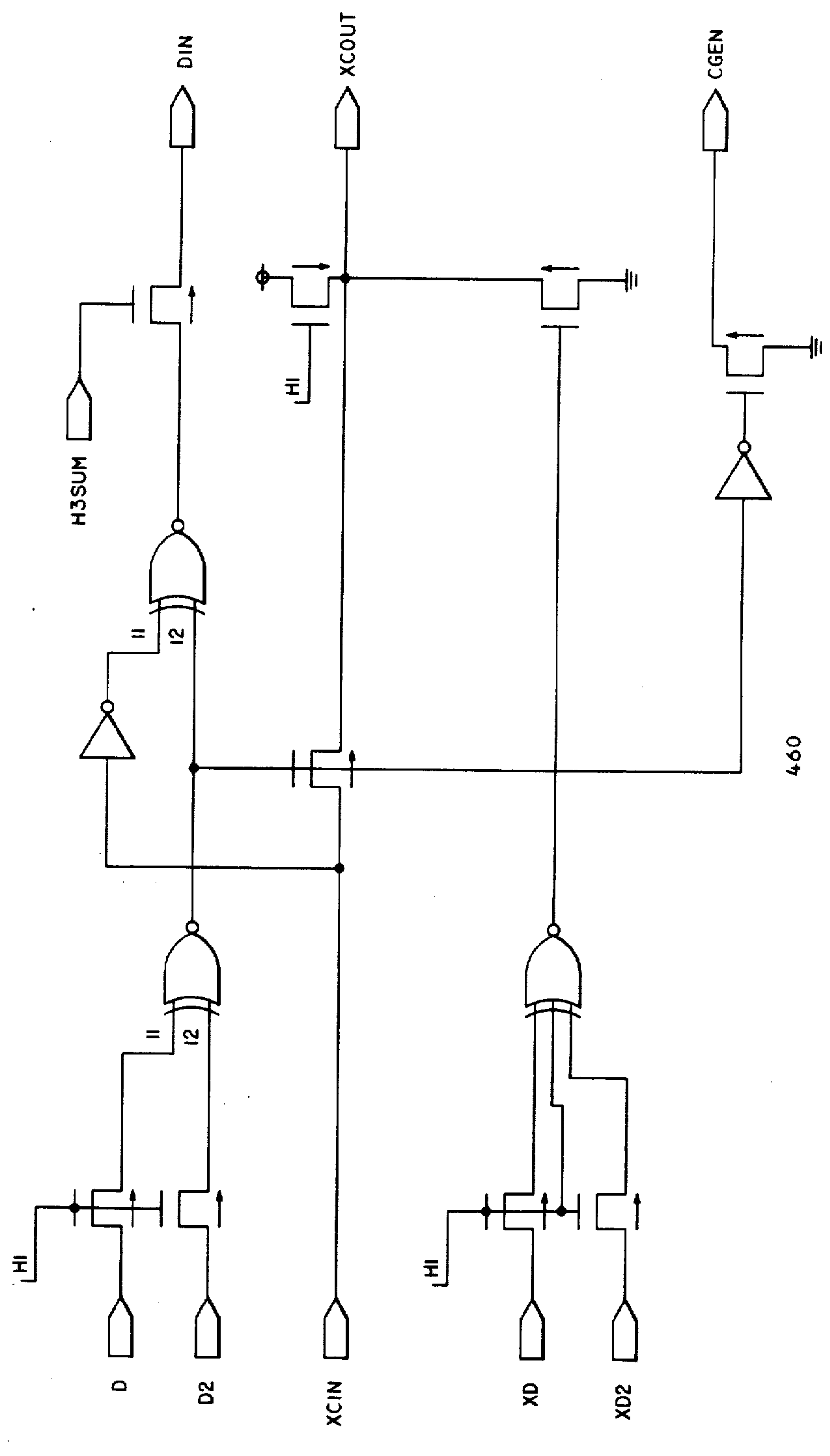
Figure 20H:
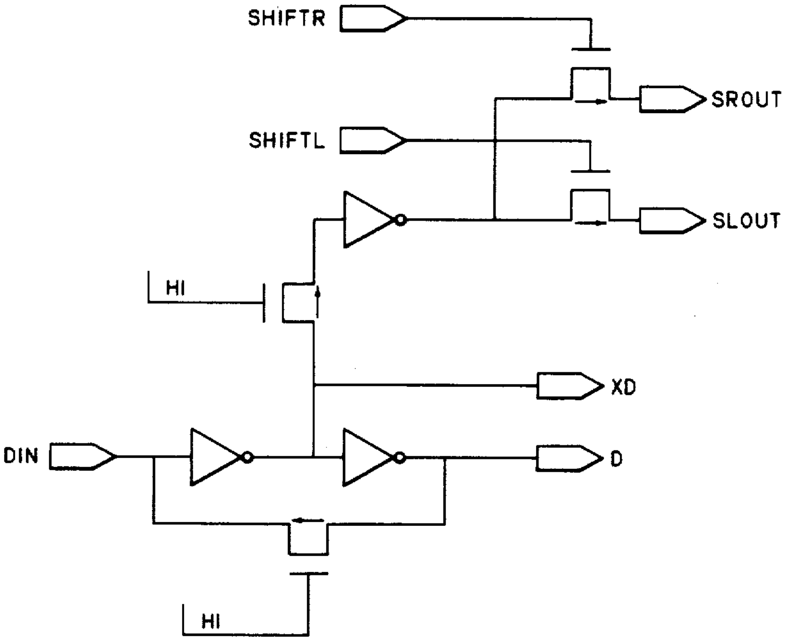
Figure 20I:
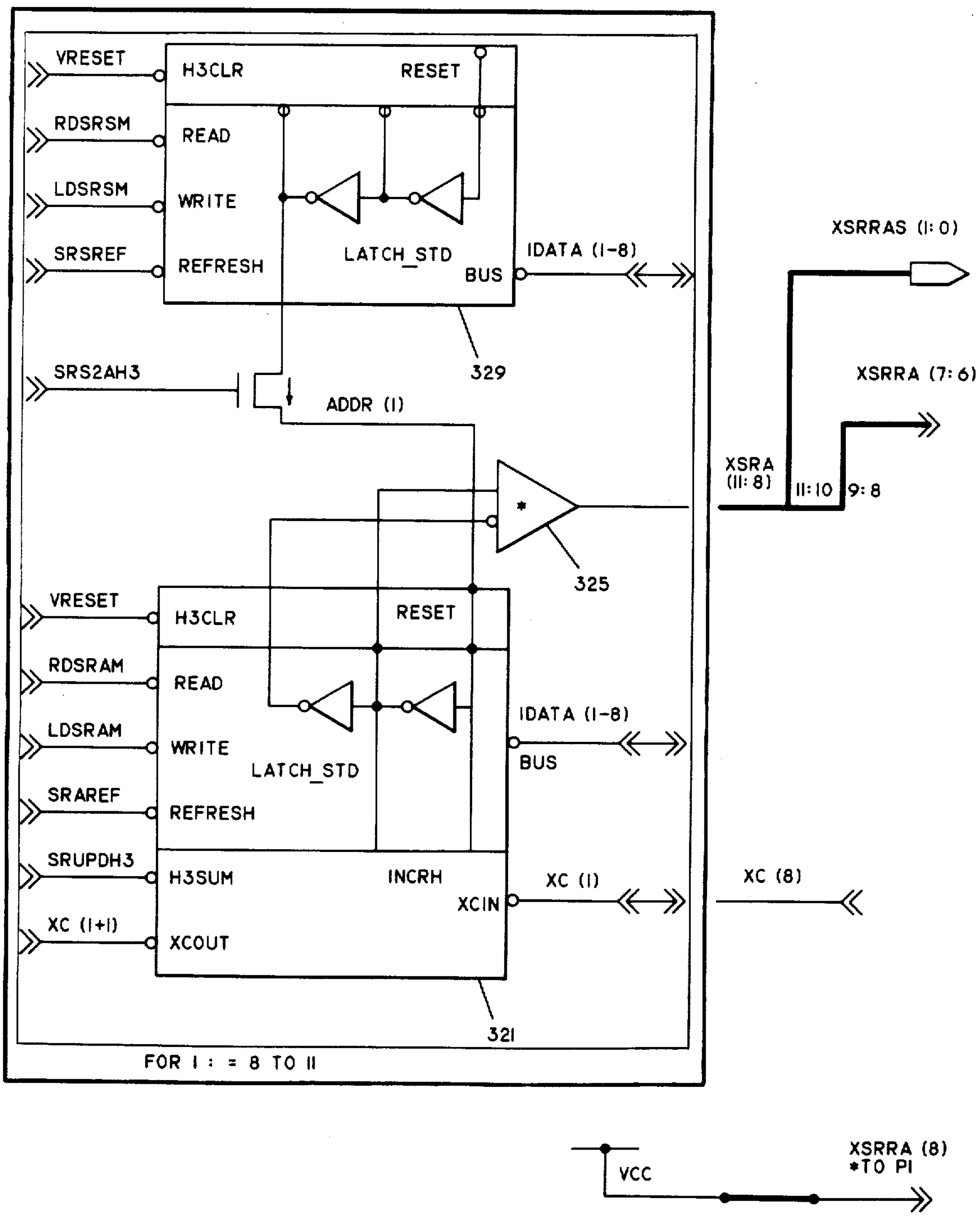

FIG. 20*a* shows the generation of the control logic for the shift register address which provides the memory address to display memory 5 during video system controller 3 requested display update cycles. FIG. 20*b* is a 4 bit control that counts up to the value specified by control bits PLC(3-0) of control register 381. The state of this count determines the period of shift register reload (display update) cycles and can vary from once every horizontal scan line to once every 16 scan lines. FIGS. 20*c*, 20*d*, and 20*i* show the logic of the 12 bit shift register address counter. The least significant 4 bits which are shown in FIG. 20C include a full adder which allows the shift register address to be incremented. In normal operation, by 1, 2, 4, or 8. The least significant 2 bits of this address specify the tap point that is selected on the external display memory 5. The next 8 significant bits are routed to the memory address output pins and represent the row address bits. The final 2 most significant bits of this counter represent the row address select control bits. These bits are decoded to one of 4 active row address selects (RAS(3-0)) during a shift register update cycle when the video system controller 3 is in the extended host address enable mode programmed by setting the EHAE bit within control register 381. If this bit is inactive, then all RAS outputs are active during a shift register update cycle.

Figure 21A:
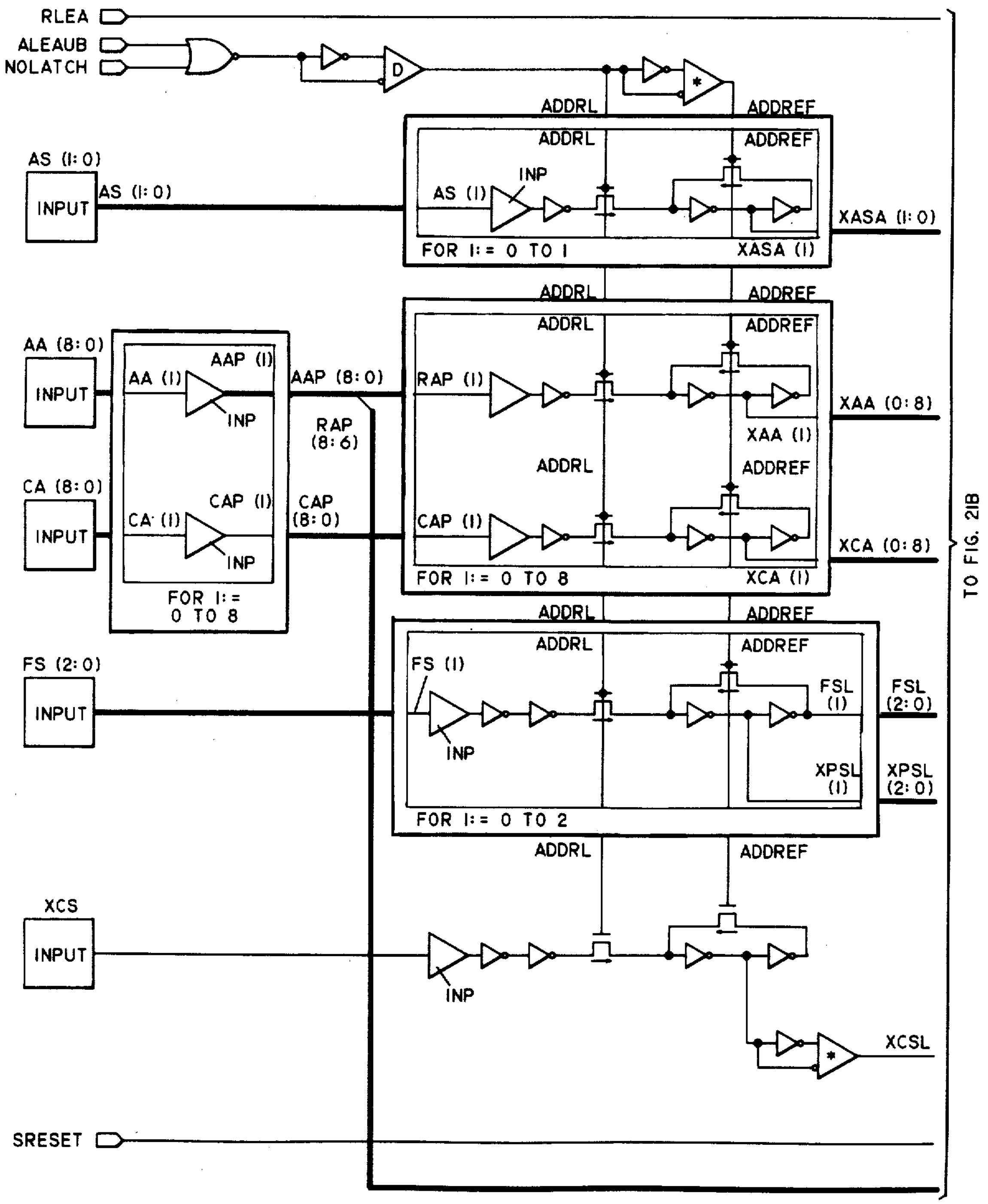
FIGS. 21*a* through 21*b* are schematic diagrams of the FS decode block of FIG. 3.
Figure 21B:
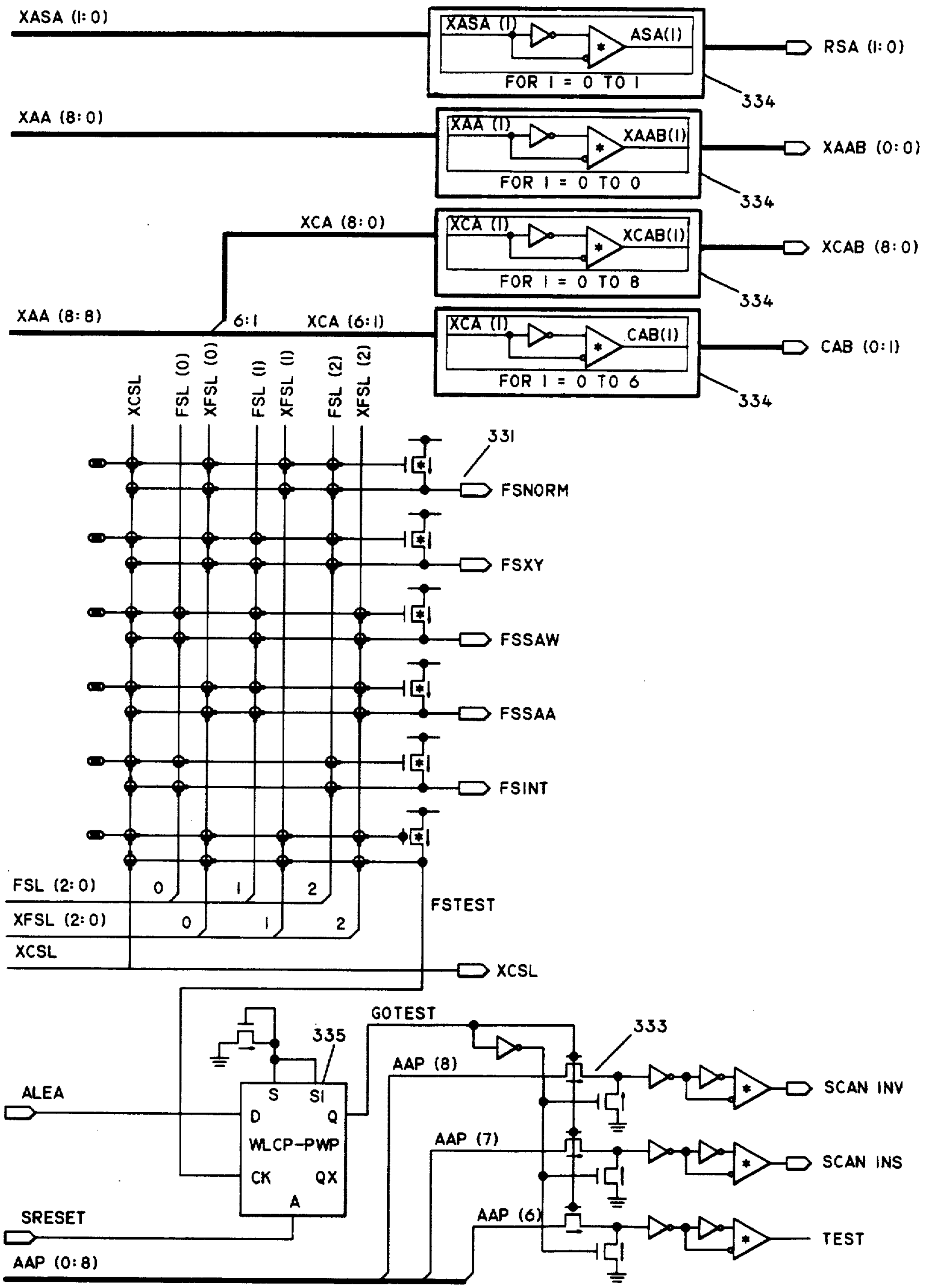

As was discussed earlier, the FS decode circuit decodes the functions that are to be implemented by the video system controller based upon the binary value of the three function select decode signals that are applied thereto. The schematic diagram of the FS decode block 63 is provided in FIGS. 21*a* and 21*b*. The FS decode logic 63 is illustrated in FIGS. 21*a* and 21*b* and receives from the microprocessor 1 control signals FS0-2, row select signal RS0-1, plus column address on data bus 21C and row address on data bus 21R, as well as the CS signal which is brought into the FS decode circuit 63. Additionally a reset signal is provided from the input pins block 59 as is the ALE signal and the no latch signal, which comes from the control registers. It provides the row address, the column address, and the complements thereto, as well as decoding the function select inputs. The different functions are decoded by the PLA 331 and correspond to the previously denoted functions. In order for any function select decode to be active, the chip select input (XCS) must be active. Additionally, circuit 333 and 335 provides for the scan and test mode generation. Line drivers 334 are used to drive the row address signals and the column address signals.

Figure 22A:
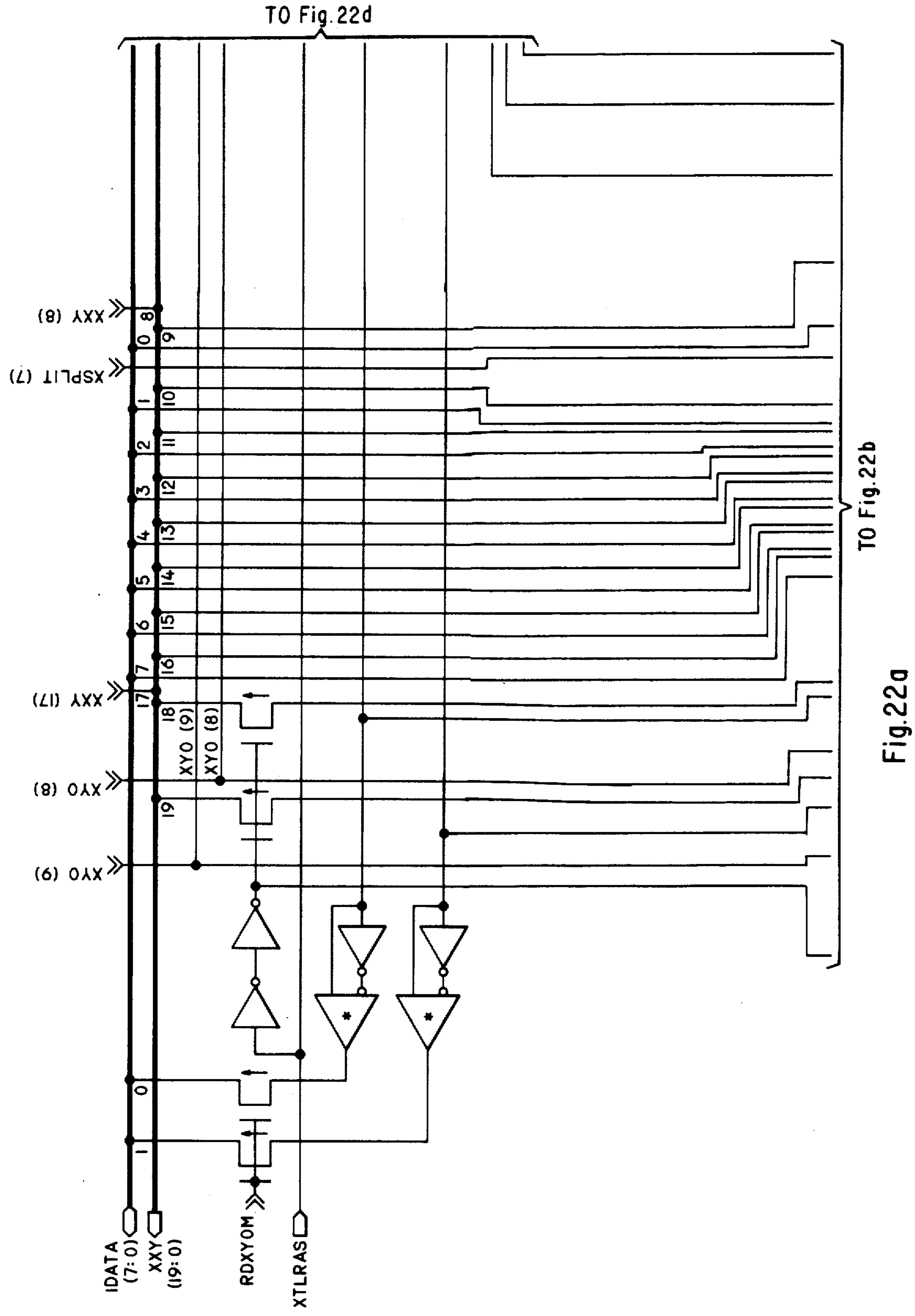
FIGS. 22*a* through 26*b* are schematic diagrams of the XY register block of FIG. 3.
Figure 22B:
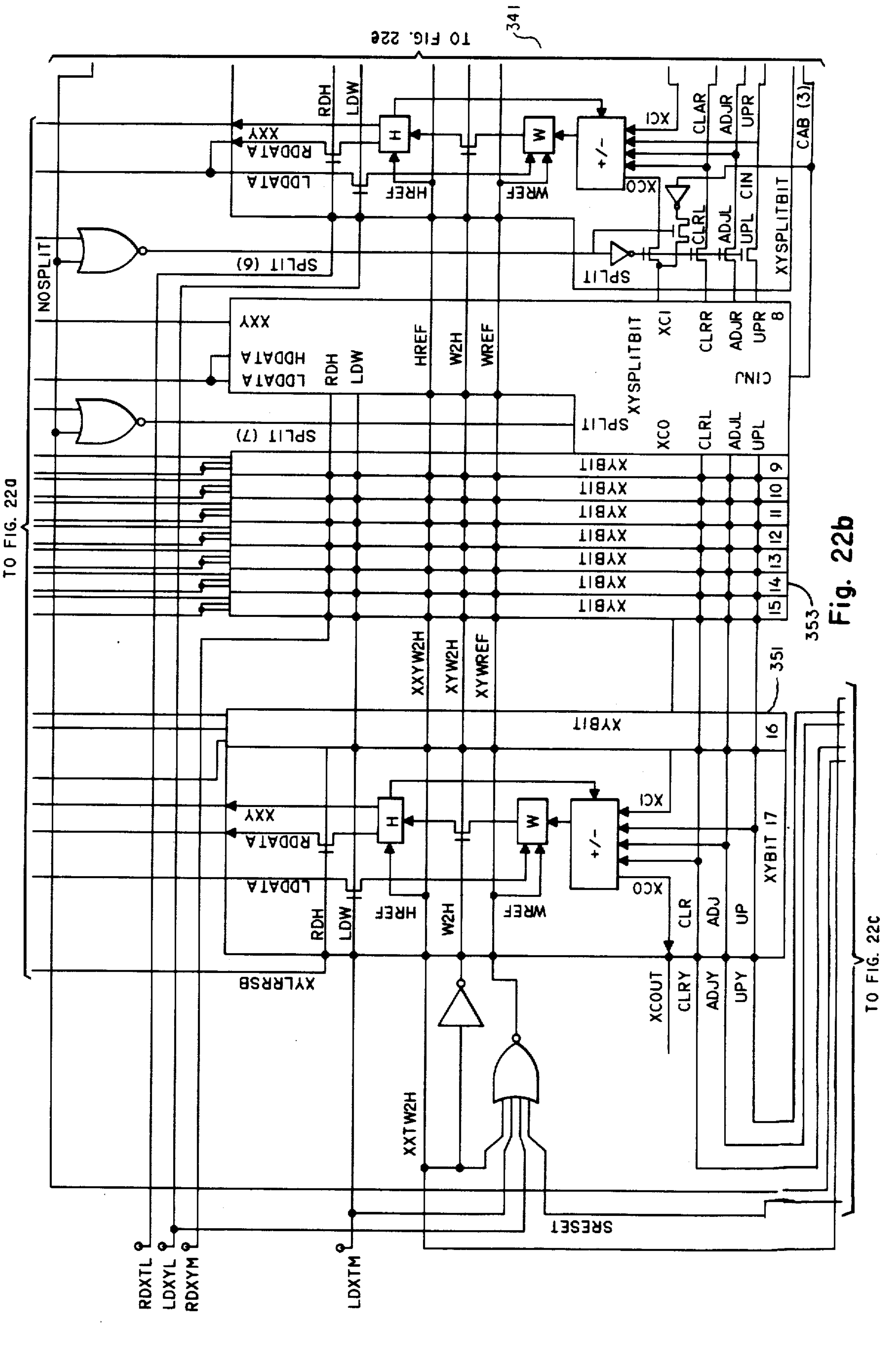
Figure 22C:
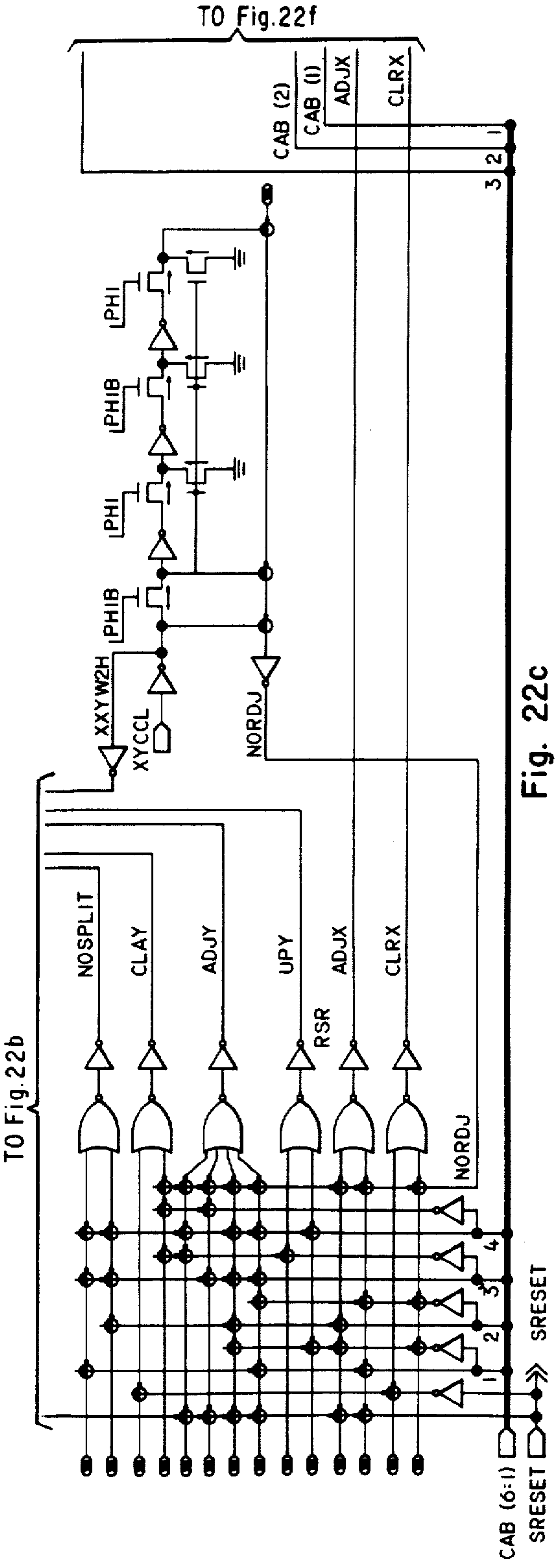
Figure 22D:
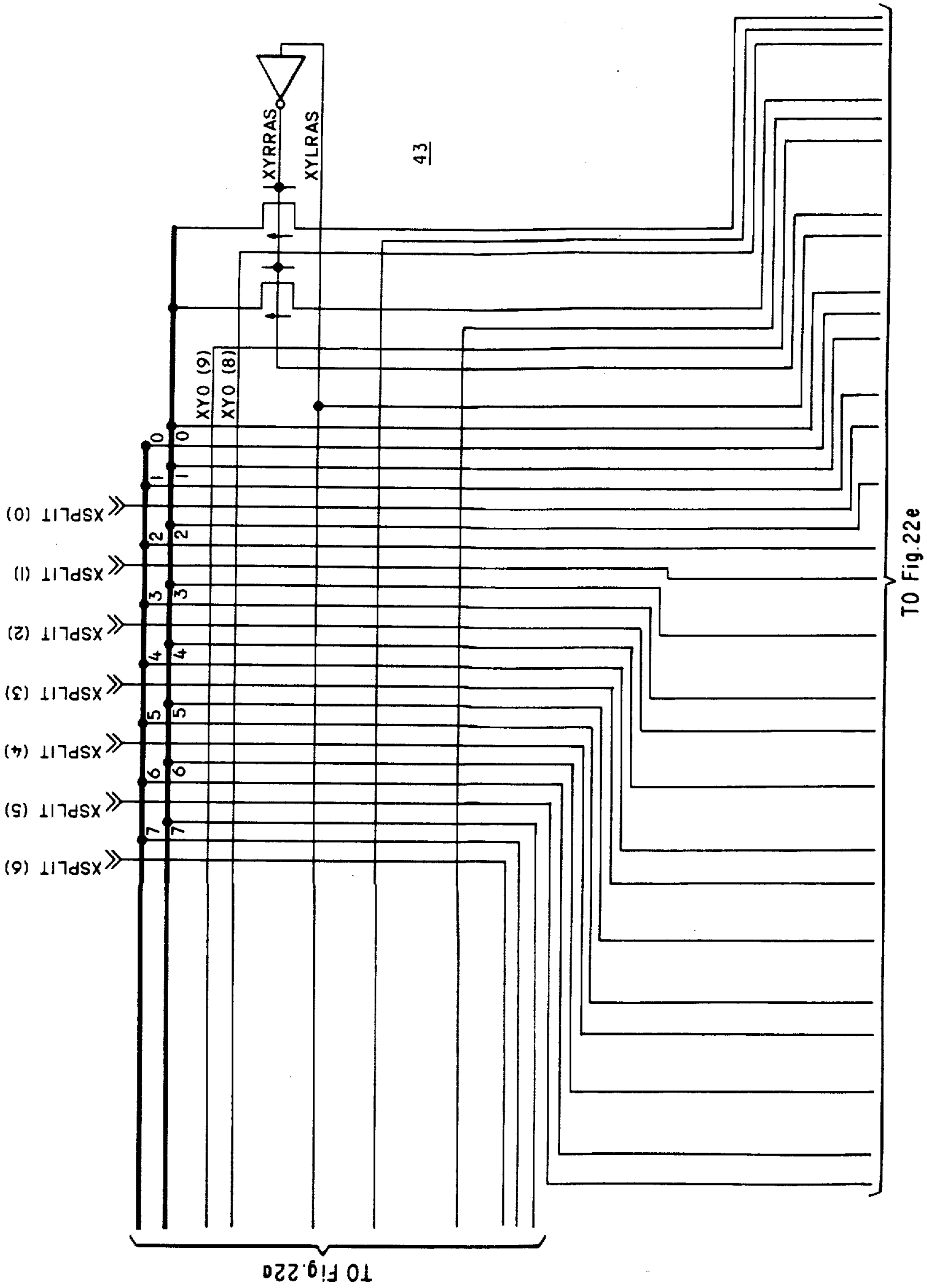
Figure 22E:
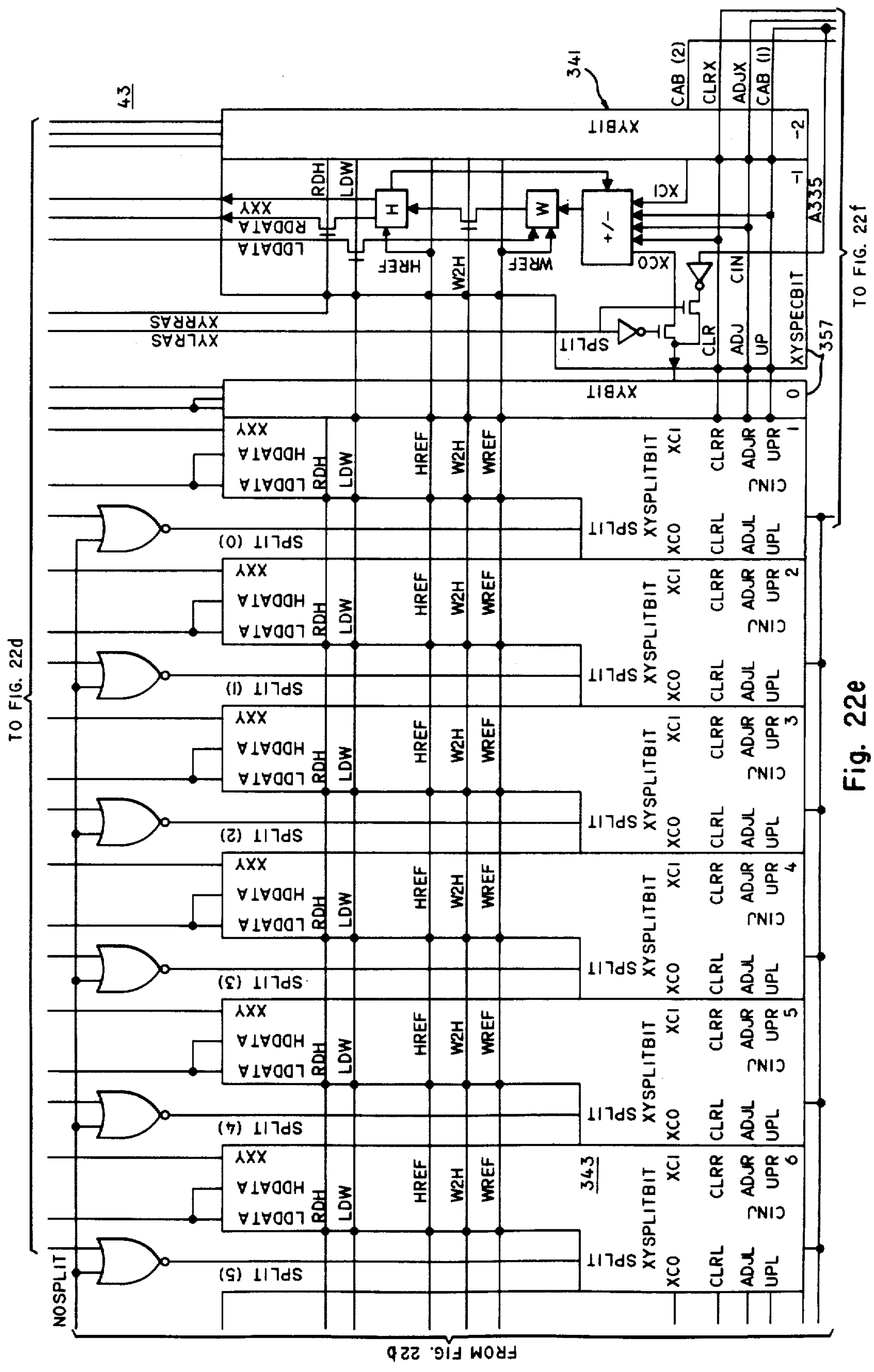
Figure 22F:
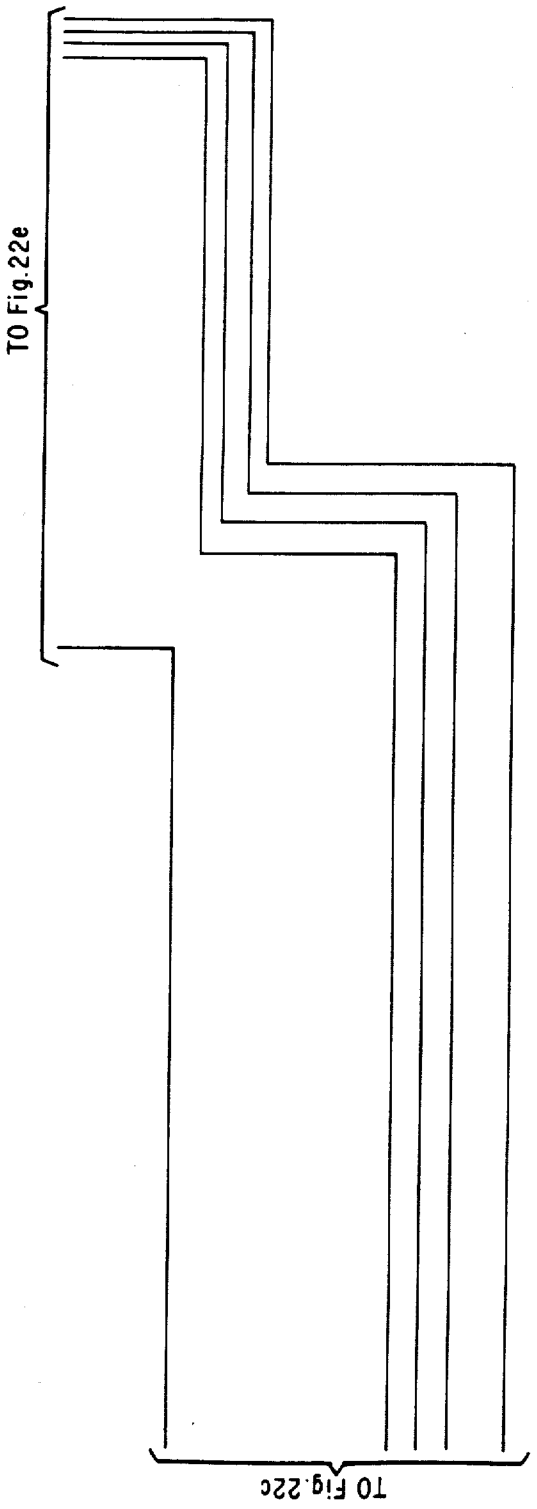
Figure 22G:
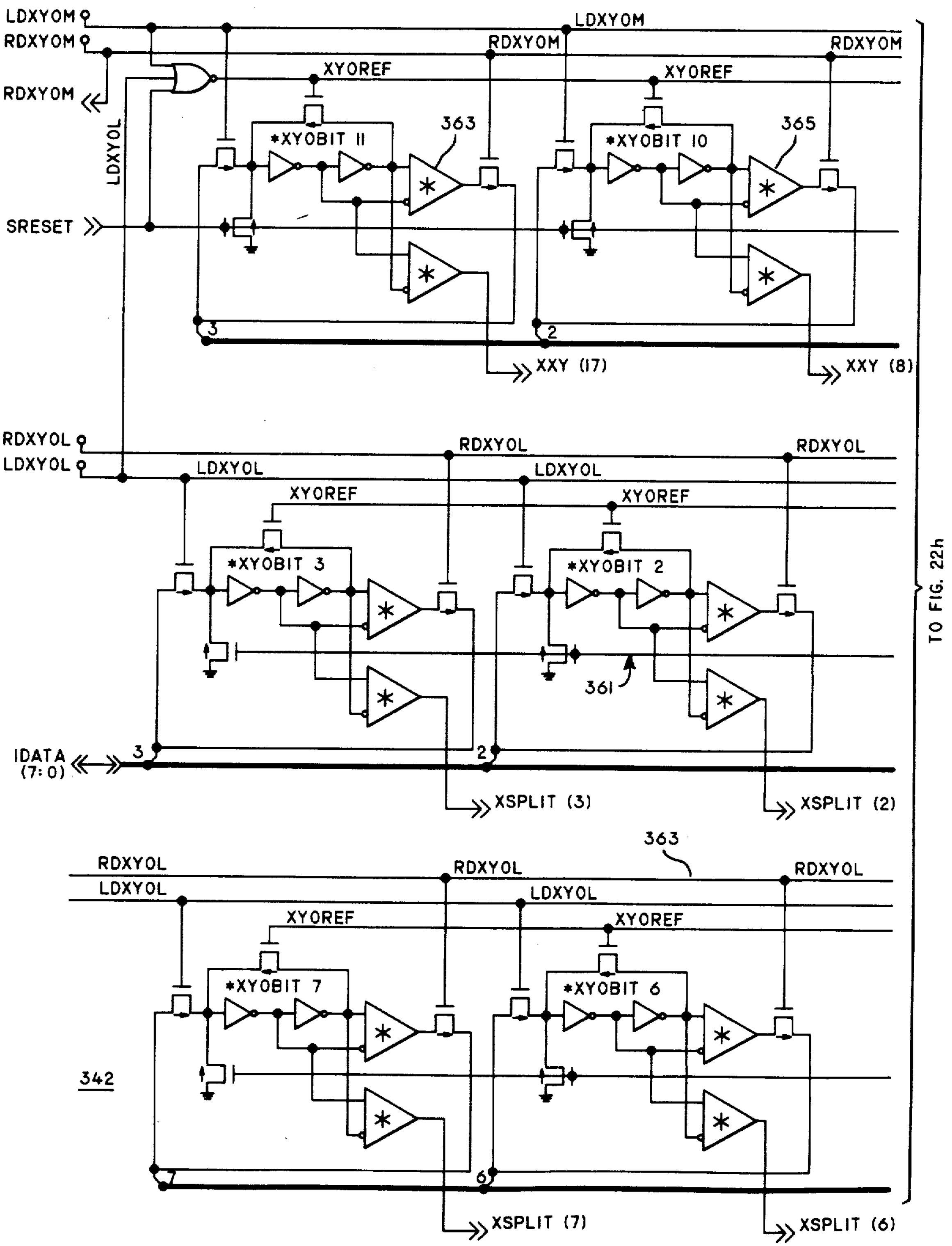
Figure 22H:
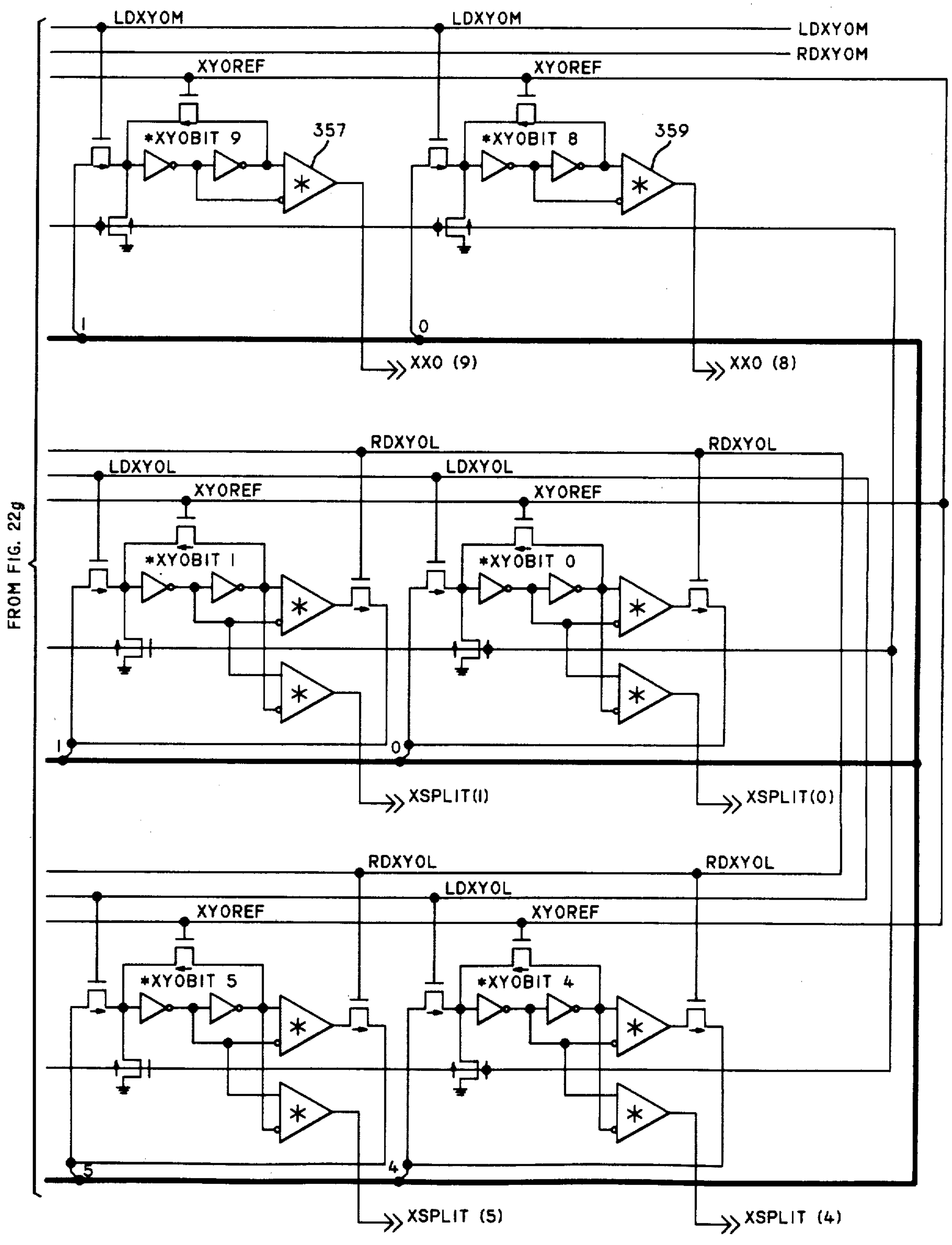
Figure 23:
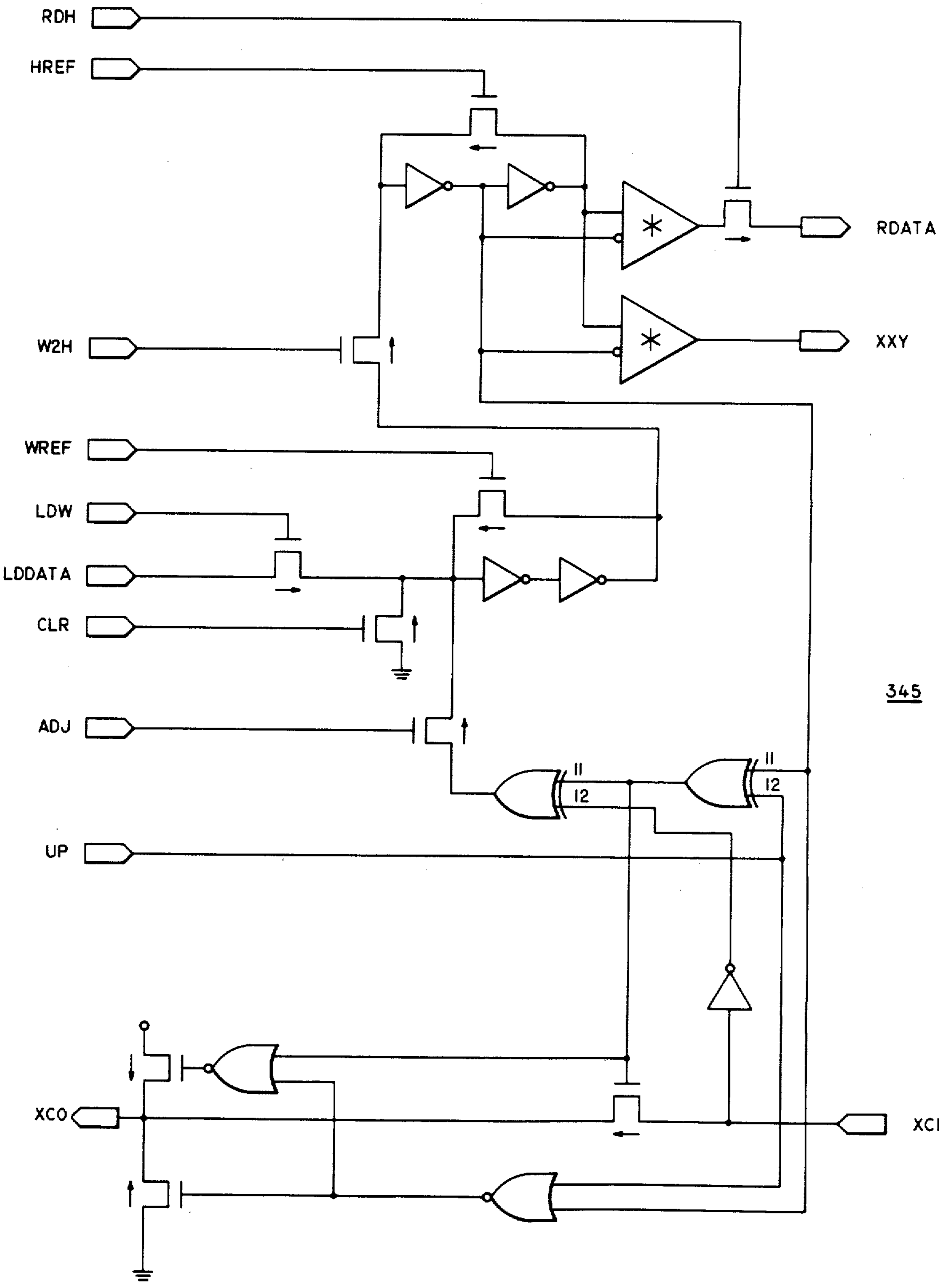
Figure 24:
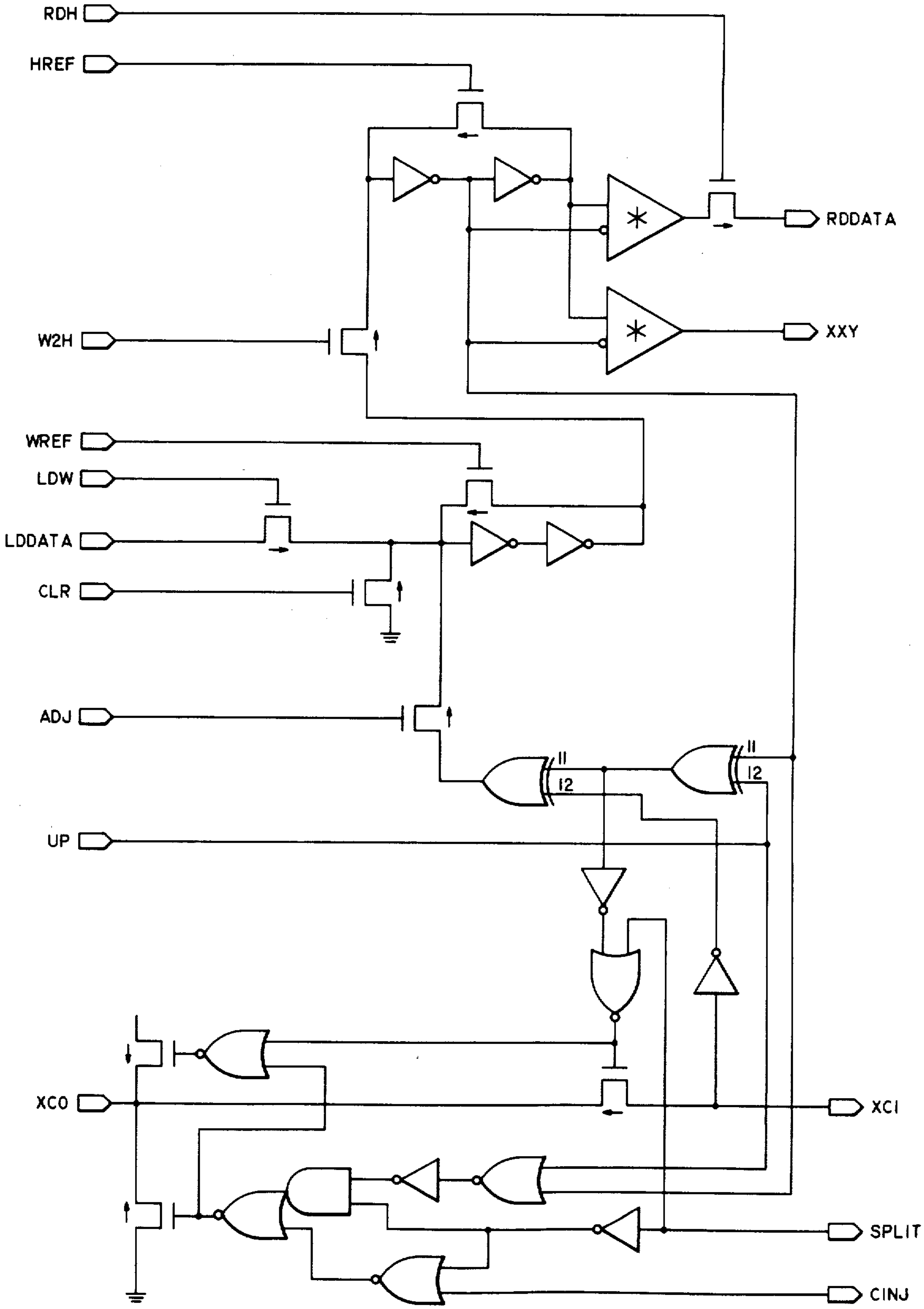
Figure 25:
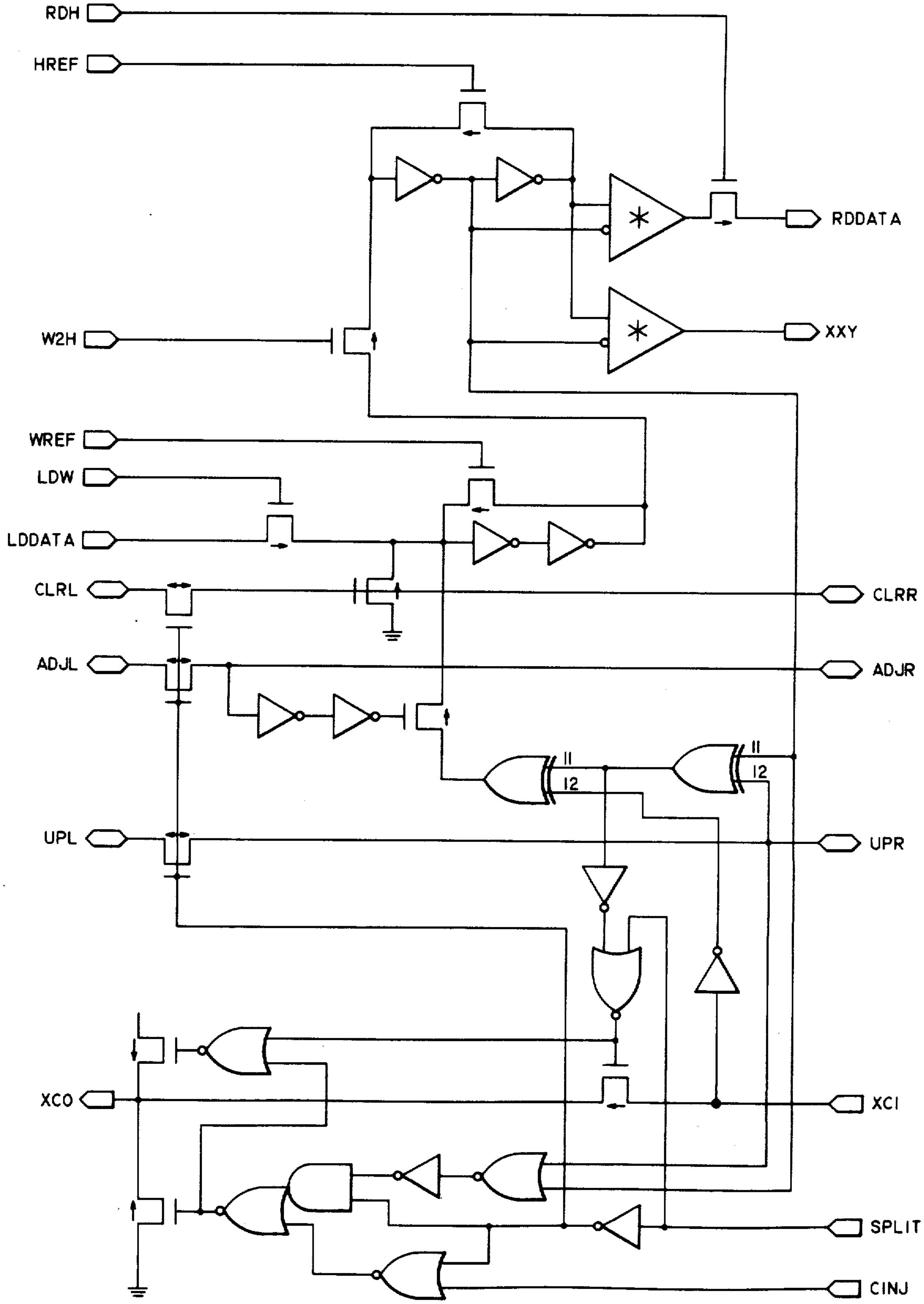

The column address decoder 55 receives the read/write command in the form of RWB, the column address enable low byte in the form of XCEL, the column addresses in the form of CAB and the internal register access function select signal in the form of FSINT. The output of the column address decode circuit is a clear command which is decoded by the decode circuit 341 which is used as an input to the status block 61 and is used to clear the 4 most significant bits of the data bus when a 12 bit internal register is read. FIGS. 22*g* through 22*h* show the logic that completes the decode of the column address during internal register accesses. These outputs select which of the internal registers are accessed or loaded.

FIGS. 22*a* through 22*f* are schematic diagrams of the X-Y register 43. The X-Y register 43 is used during an indirect cycle in which the microprocessor 1 accesses or writes a word in the display memory 5 which in the preferred embodiment is DRAM, dynamic random access memory, indirectly through the 20 bit X-Y address register 341. The contents of the X-Y register 341 represents the concatination of the X-Y coordinates of a word containing one or more pixels on the screen. The X coordinate is represented by the least significant bits of the address and the Y coordinate is represented by the most significant bits of the word address. The location of the boundary between the X and Y coordinates of the address is programmable. Both X and Y increase moving from the least significant bit to the most significant bit in the register 341. The X and Y displacement at the origin, generally located in the upper left hand corner of the screen of the CRT monitor 11 are both 0 only in the special case in which the pixel displayed in the upper left hand corner of the screen resides in the word location at memory address 0. In manipulating X and Y addresses through the video system controller 3, the non zero offset of the upper left corner of the screen must be compensated for from the start of memory.

The capabilities of the X-Y register 43 is particularly useful in applications in which the linear addressing range of the microprocessor 1 is too limited to provide easily access to all pixels within the active display area. A read or write cycle that utilizes the contents of the X-Y register 43 is denoted as an X-Y indirect cycle.

During an X-Y indirect cycle, the contents of the X and Y register 43 are used in place of the row and column address applied on the RA8–RA0 data bus 21R and the CA8–CA0 data bus 23. The 4 bit code input on the CA4–CA1 during an X-Y indirect cycle determines the manner in which the contents of the X-Y address register 43 are updated following completion of the X-Y indirect cycle. With the binary value of these 4 bits is equal to 0, there is no adjustment, equal to 1 increment X, equal to 2 decrement X, equal to 3 clear X, equal to 4 increment Y, equal to 5 increment X, increment Y; equal to 6 decrement X, increment Y, equal to 7 clear X, increment Y; equal to 8 decrement Y, equal to 9 increase X, decrement Y; equal to 10 decrement X, decrement Y; equal to 11 clear X, decrement Y; equal to 12 clear Y; equal to 13 decrement X, clear Y; equal to 14 decrement X, clear Y; equal to 15 clear X, clear Y.

The address adjustments discussed above is performed automatically by the X-Y register 43 during the execution of each X-Y indirect cycles. This mechanism permits convenient access to an arbitrary sequence of adjacent pixels, without incurring the overhead of having to load new values into the X-Y address register prior to each access. As a result, the video system controller is capable of performing incremental graphics operations such as line drawing, polygon filling, and custom character generation at hardware assisted speeds.

The X-Y address register 341 is a 20 bit register comprising of 2 parts. The register includes the X-Y address register 341 and an offset register 342 that is illustrated on FIGS. 22*g* through 22*h*. The offset register 342 contains two accessible bits which are accessible by the microprocessor 1 and designated as bit 11 and bit 10. These two bits are not effected by the X-Y adjustment code input on the CA4–CA1 data bit. The second part is the remaining 18 bit which consists of 16 bits which are accessible by the microprocessor 1 contained in the X-Y register 43 and two groups of 2 bits registers concantinated to it as two most significant or least significant bits depending on the states at B7 of the control register 39C. One of these two bit registers will be enabled. The 16 bits contained in the address register 341 are divided into two portions. The Y coordinates are the most significant bits part on the register 341 and the least significant portion forms part of the X coordinate. The boundary between the X and Y portion is programmable. The signal XYLRAS is provided by the control register 39C and when it is at a logic 1 a two bit register concantinate to the XY register at the MSB. This occurs at 351. These two additional most significant bits and the Y portion of the 353 of the X-Y address register 341 form the Y coordinates. Similarly a logic 0 on the XYLRAS which originates from the control register 39C enables the two least significant bits 355. The two least significant bits 355 and the X portion 357 of the XY address register form the X coordinates. These 18 bits in the XY register 341 are linked such that it carries or borrows from the most significant bit of the X coordinate will ripple into the least significant bit of the Y coordinate only when the Y coordinate is not itself being explicitedly adjusted. Upon reset of the contents of the control register 39C the signal XYLRAS returns to or is defaulted to a logic zero. Either the X or Y portion of the X address register 341 will transfer the contents of bits 8 and 9 of the XY offset register 342 to either the least significant bits 355 of the X coordinates or the most significant bits, 351 of the Y coordinate of the XY address register 341, regardless of the state of the XYLRAS signal. A read to the XY offset register 342 will always return the current value of the enable X or Y expansion bits, bits 8 and 9 of the offset register 342, in data bits $D_1$-$D_0$ but not the value stored in bit 8 and 9.

To ensure proper operation, the XY offset register 342 is always loaded prior to loading the XY address register. This is necessary to allow the two expansion bits, bits 8 and 9, to be loaded correctly. These expansion bits will be used to determine which one of the four row address strobes, REAS3–REAS0 is active during the XY indirect cycle. Bits 8 and 9 are encoded to provided the four active strobes which is performed in the RAS decode logic 5.

Figure 26A:
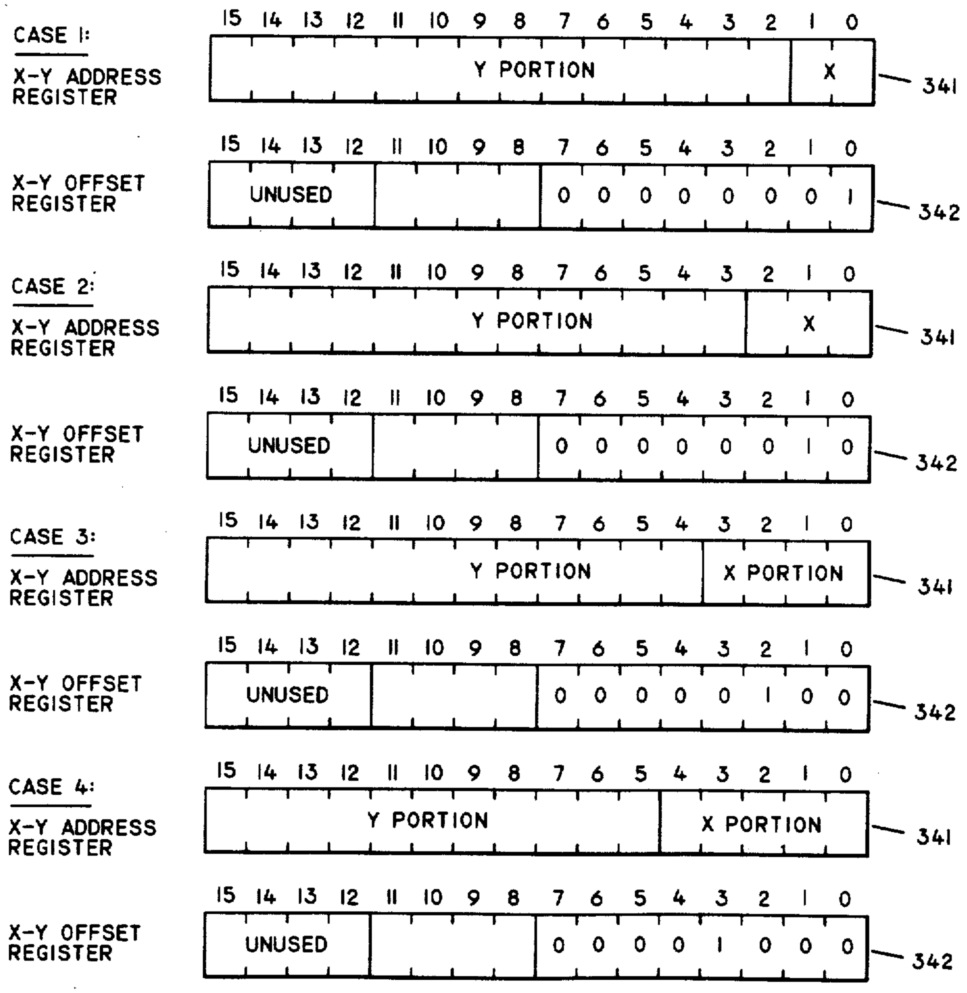
Figure 26B:
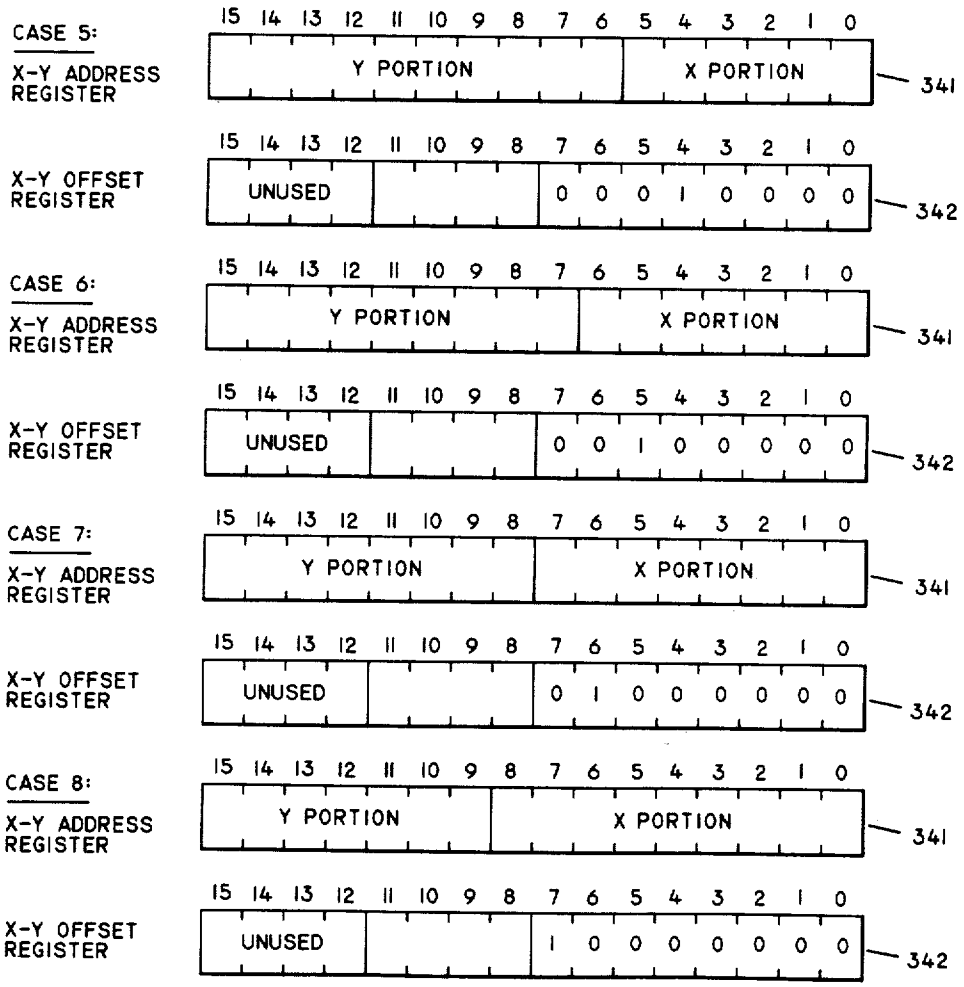

The XY register 341 contains 16 microprocessor 1 accessible bits that become part of the 20 bit XY address register output. The boundary between the XY portion in this register is programmable to accommodate the needs of various graphic memory configurations. The X portion is definable to occupy anywhere from 2 to 9 of the least significant bits of the register. The remaining bits form part of the y portion. The 8 possible boundary conditions between the X and Y positions of this register is illustrated in FIGS. 26A and B.

The XY offset register 342 defines the boundaries between the X and Y portion of the XY address register 341 and contains initial values of the 2 RAS select bits and bits 8 and 9 located at 357 and 359. The 8 least significant bits of the XY offset registers located at 361 and 363 specify the boundaries between the X and Y portions of the address contained within the X and Y register 341 as indicated in FIGS. 26A and B.

Bits 8 and 9 of the two offset registers store the initial values that are loaded into the expansion bit of the X and Y address during an initiated write cycle from the microprocessor 1 to either the X portion 353 or the Y portion 357 of the XY register 351. These 2 bits are not affected by the adjustment code input on CA4-CA1 during an X-Y indirect cycle. Only the transfer and expansion bits of the XY address are changed accordingly. A read of the XY offset register 341 returns the current value of the expansion bits of the XY address instead of the initial value of the two bits 8 and 9 to the XY offset register 341.

Bit 11 at 363 is the MA8 output during row address time and bit 10 located at 365 is the MA8 output during the column address times. These two bits are also unaffected by increments or decrements of the XY address pointer. Any bit in the X-Y address register indicated as unused in FIG. 26A is read as a 0.

The microprocessor 1 initiates an X-Y indirect cycle by setting FS2–FS0 inputs to the function code 001. The displayed memory 5 then is either read or written as specified by the R/W-line. The contents of the XY address register 341 can be adjusted after each XY indirect cycle to point to the adjacent word to be accessed during the next XY indirect cycles. Fifteen different adjustments are available for the XY address register 43. These adjustments are selected by the inputs on CA4—CA1 during an X-Y indirect cycle that was previously discussed. This specified adjustment occurs during the current XY cycle in anticipation of the next X-Y indirect cycle.

The 20 bit XY address is composed of the 16 accessible bits by the microprocessor 1 of the XY address register 341 and the 2 RAS select bits plus the 2 MA8 bits residing in the XY offset register 342. The two RAS-select bits are not directly accessible to the microprocessor 1 which, however, can cause them to be loaded from the bits 8 and 9 of the X-Y offset register. The 20 bit X-Y address points to a word within the displayed memory 5 containing one or more pixels where the number of pixels is determined by the width of the microprocessor 1's data path and the number of bits per pixel. The boundary between the X and Y portion of the address is programmable to accommodate a variety of memory configurations which will be discussed later.

During an X-Y access of the displayed memory 5, the video system controller uses the address contained in the address register 341 in place of the address supplied externally to the RA8–RA0 data bus 21R and the CA8–CA0 data bus 21C. The 8 most significant bits of the 16 bits contained in the XY address register are outputted on data bus 25 as MA0 through the MA7 as the row address and the 8 least significant bits are outputted on data bus 25 as MA0 through MA7 as a column address. Bits 10 and 11 of the XY offset register 342 are also multiplex on the MA8 as row and column addresses. The two RAS select bits, not accessible to the microprocessor 1, are used in place of the RS1-RS0 inputs to determine which of the four row address strobes. RAS3 to RAS0 will become active during the cycle.

XY addressing is flexible to allow the programmer to customize the X and Y screen dimensions to his application. The X portion of the address can occupy the lower 2 to 9 bits of the XY address register, while the Y portion occupies the remainder of the XY address register. The RAS select bits are concontinated to either the X or Y portion according to the state of the XYLRAS signal.

Figure 27A:
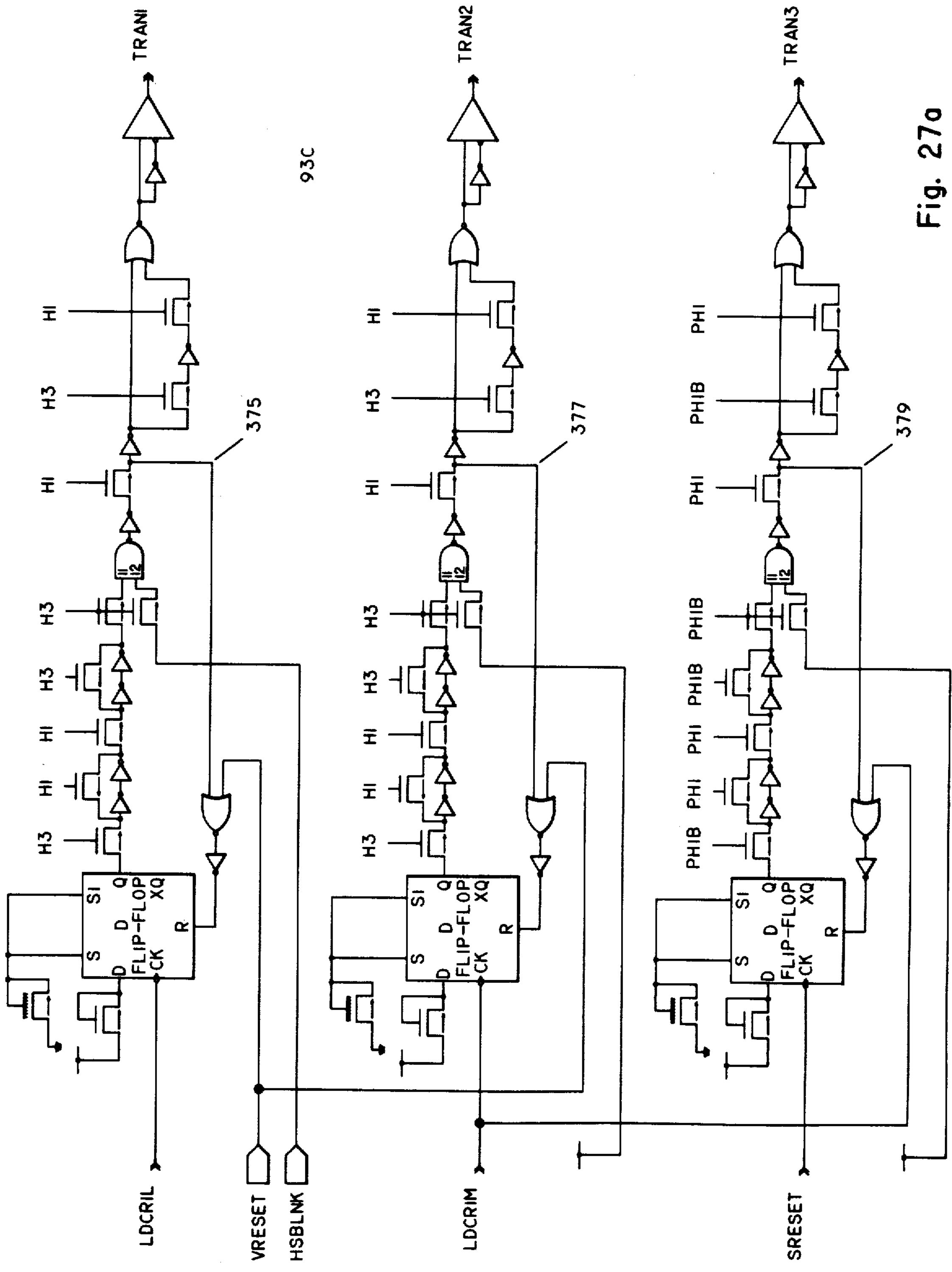
FIGS. 27*a* through 29 are schematic diagrams of the cont reg block of FIG. 3.
Figure 27B:
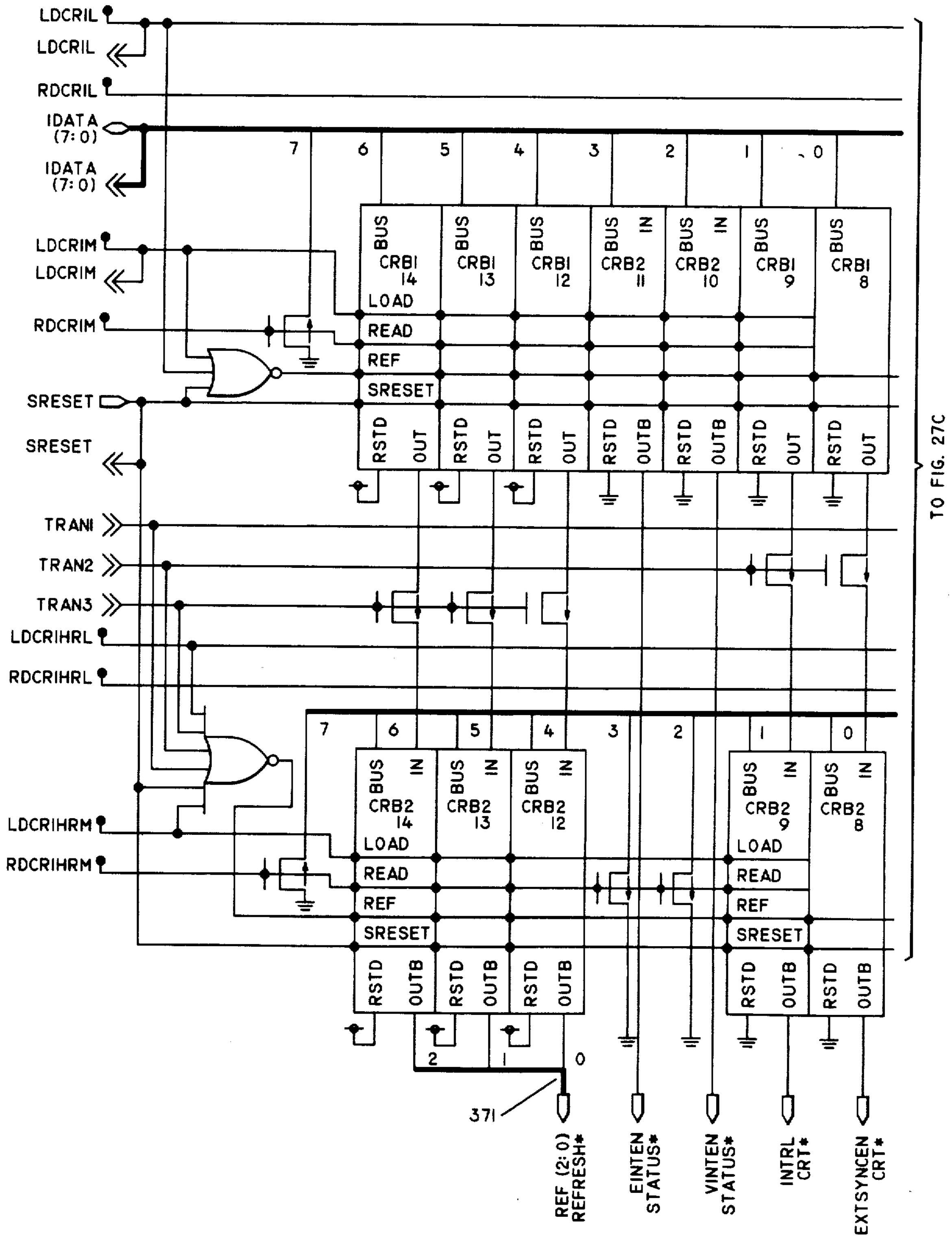
Figure 27C:
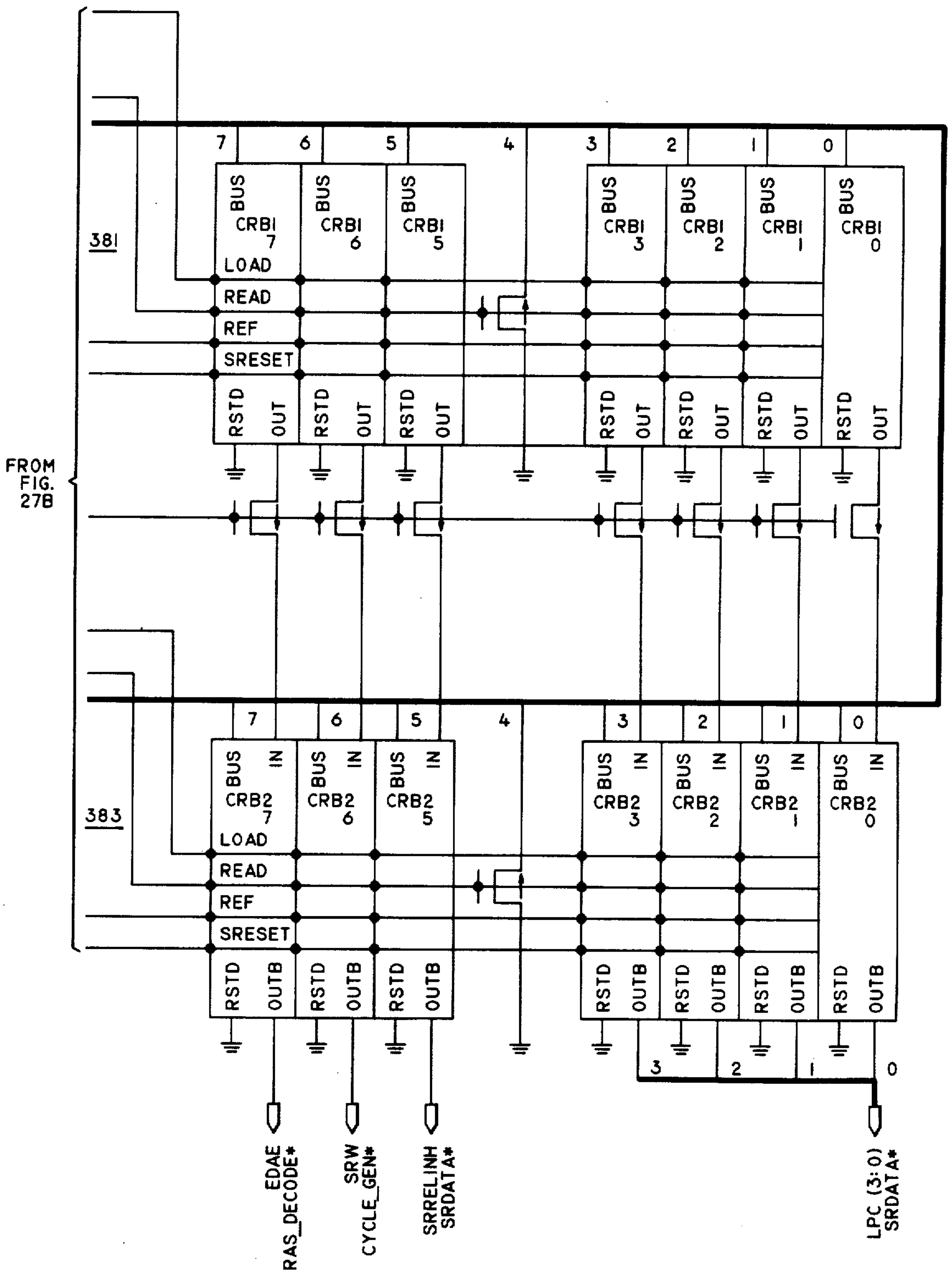
Figure 27D:
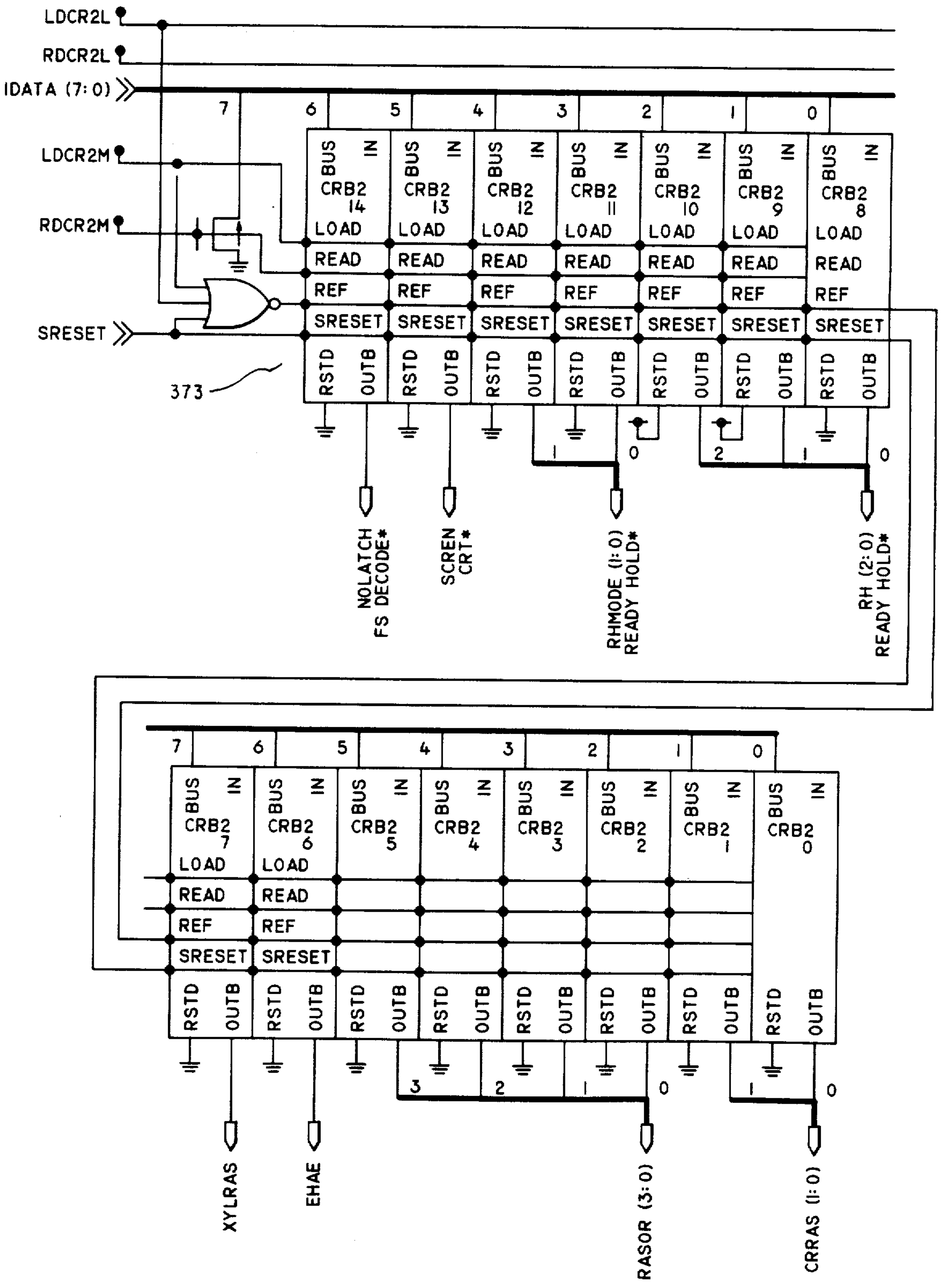
Figure 28:
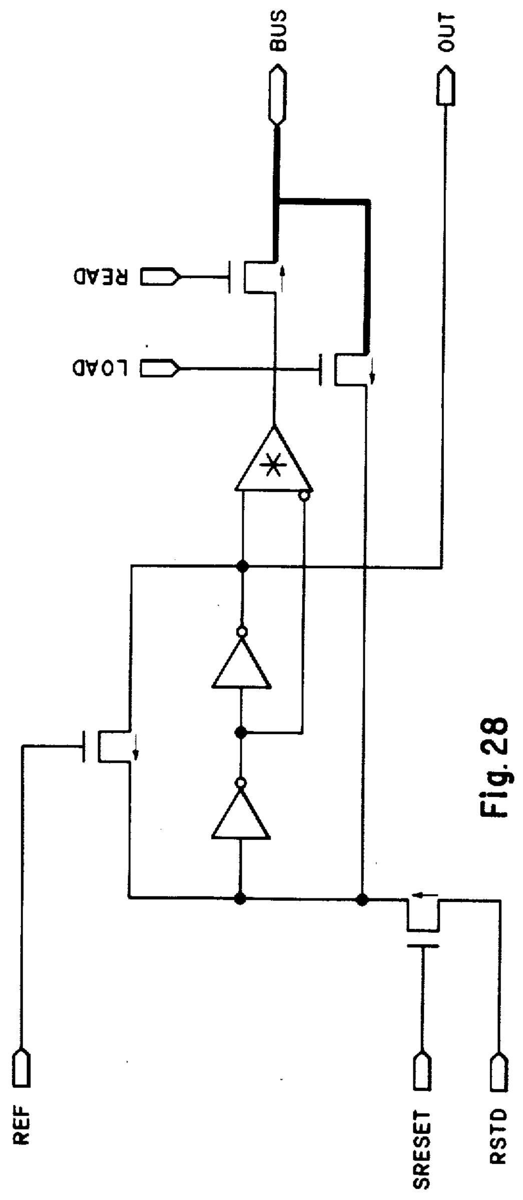
Figure 29:
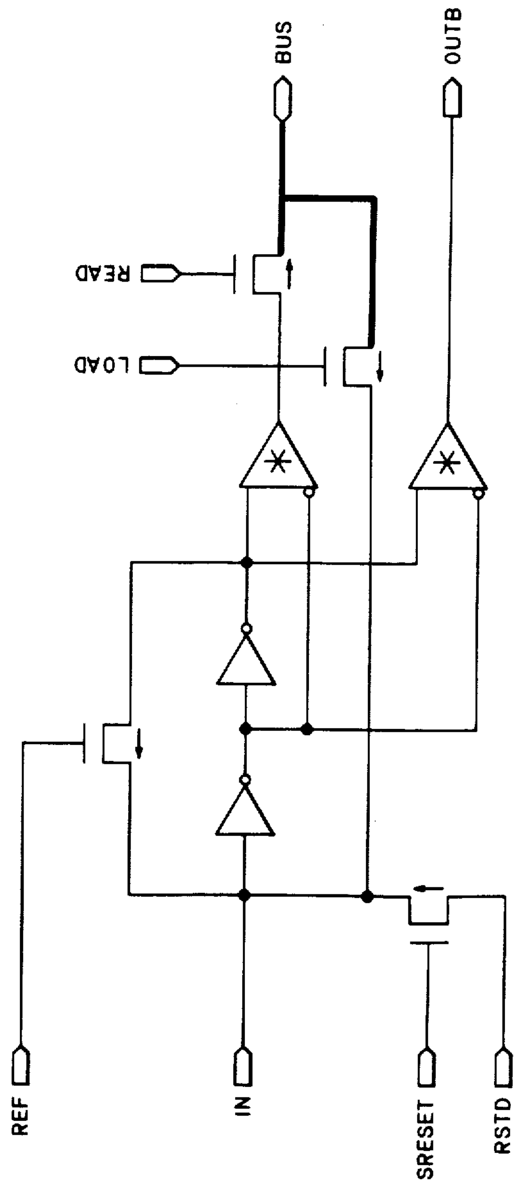

FIGS. 27a through 27c are schematic diagrams of the control registers 39C. The Video System controller 3 contains two directly assessable control registers, 371 & 373. The functions controlled by these registers include the behaviour of the interface signals between the microprocessor one and the Video system Controller 3, the timing of the display update cycles, inabling of interrupt refresh, frequency of Dram-refresh cycles, and creation of video timing functions. Control register 371 & 372 are both 16 BIT registers. Each may be read and written to by the microprocessor 1. The functions assigned to the individual bits within these registers or indicated in table two. FIGS. 27*a* through 27*c* show the logic of three synchronizing circuits, 375, 377, & 379. The three synchronizer circuits are used to transfer the contents of the control register 381 to the output holding register 383 of the control register 371. The reason for this is that the microprocessor one writes to the control registers during the execution of a function by the video system controller one. To avoid glitches and interruptions, the data is loaded into the control registers 381 & then transferred to the output holding registers 383 via transfer signals TRAN 1, TRAN 2, and TRAN 3. Two reset signals are used to initialize the transfer signals which inlcude VRESENT and SRESET. The horizontal start blank signal is applied to the synchronizing circuit 375 to implement the TRAN 1 signal. When microprocessor 1 writes to control register 381, TRAN 1 prevents the VSC 3 from changing operating mode until the horizontal start blank signal becomes valid. This occurs half way through the horizontal scan line. FIG. 27*d* illustrates the control register 373 and the functions associated therewith. FIGS. 28 and 29 are schematic diagrams of the CRB registers that are used to make up the control registers 381 & 373.

Figure 30:
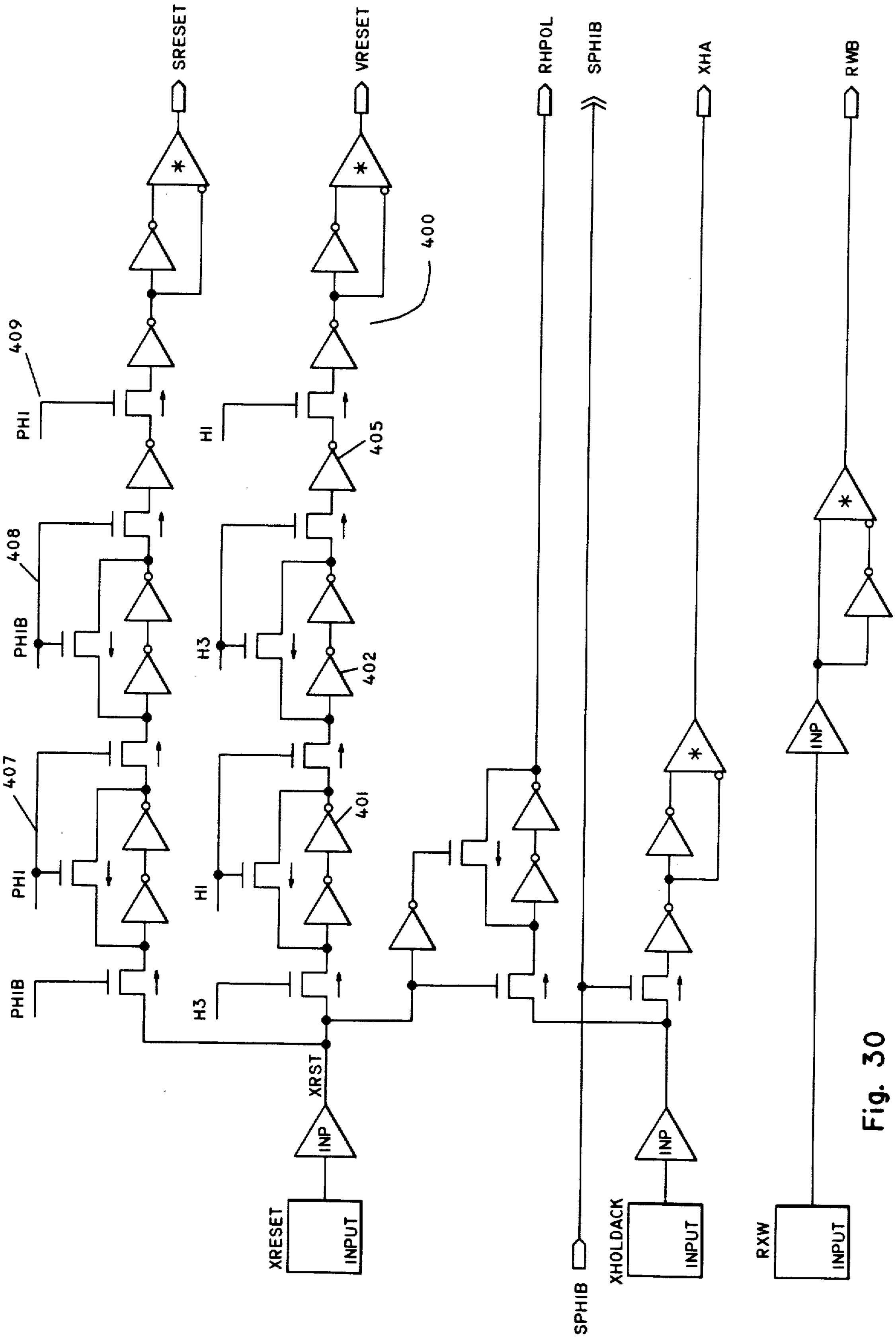
FIG. 30 is a schematic diagram of the input pins block of FIG. 3.

FIG. 30 is a schematic diagram of the input pins blocks 59 and provides the logic for receiving the control signals from the microprocessor one on databus 23 and buffering the signals for application to the video system controller three. Circuit 400 synchronizes the system reset and video reset signals to be in synch with the appropriate clocks. This of course is done by using circuit delays at 401, 403, & 405 to insure that the video reset is in synch with this clock being phase three and phase one signals are submultiple of the video clock, and the system reset is in synch with this clock by the synchronizing stages 407, 408 and 409. The remaining circuits are essentially buffered and amplified for application to the video system controller.

The data status block 61 includes the status registers 81 and the data pins 83.

Figure 31A:
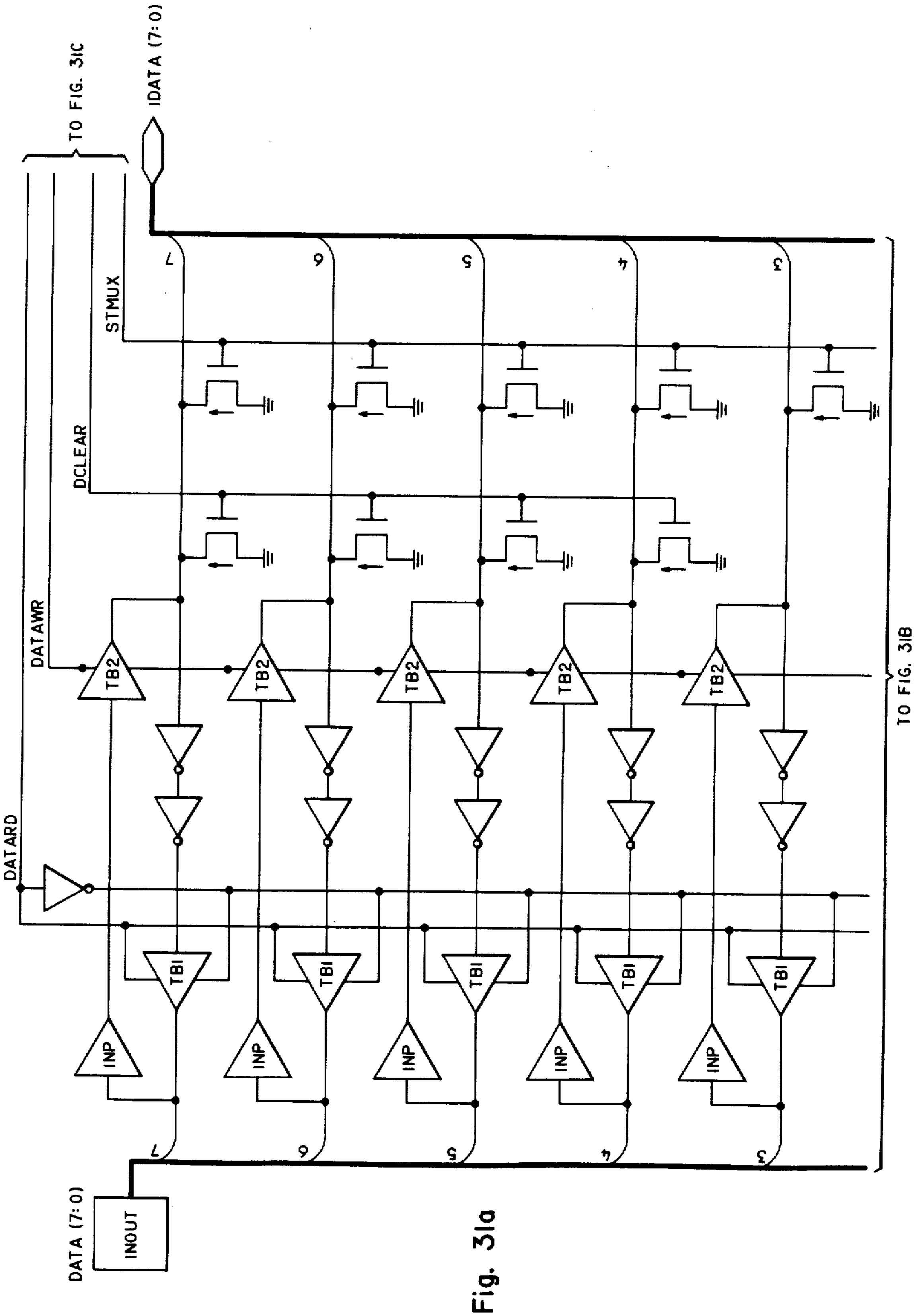
FIGS. 31*a* through 31*c* are schematic diagrams of the data pins block of FIG. 3.
Figure 31B:
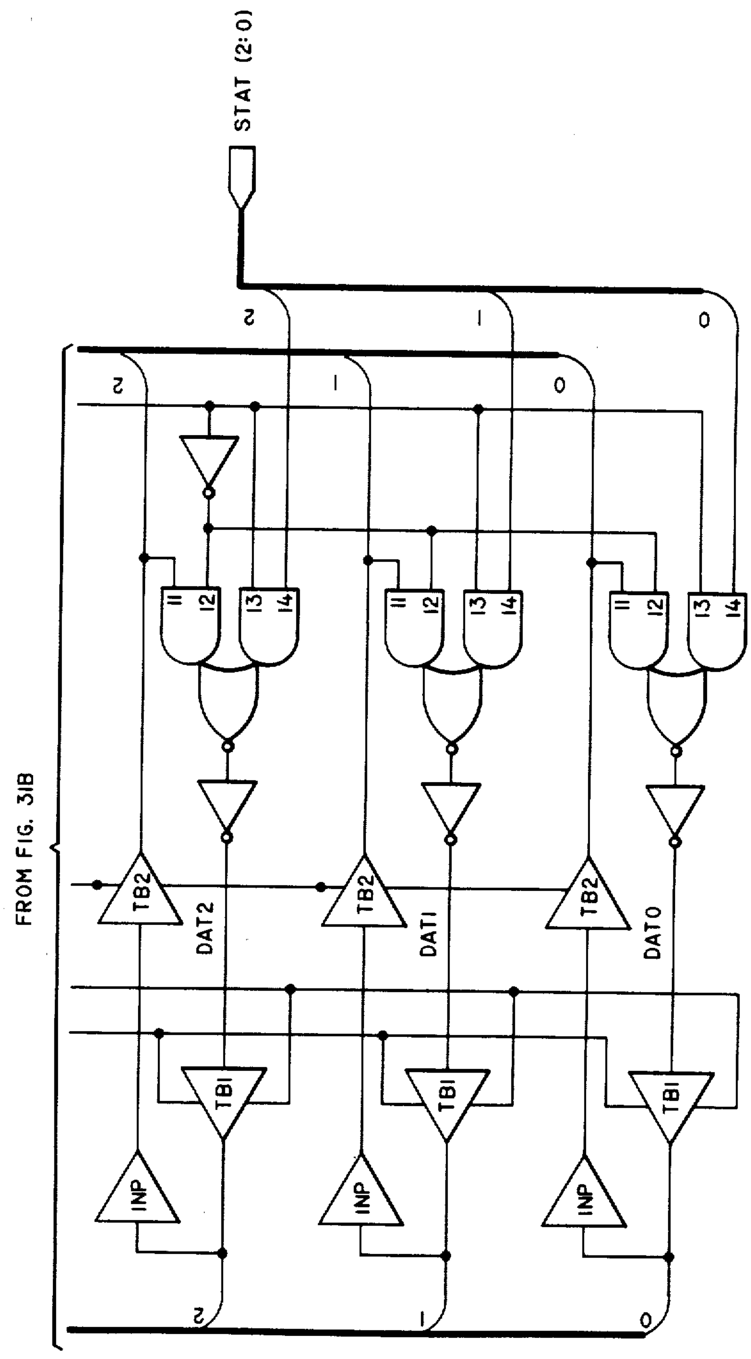
Figure 31C:
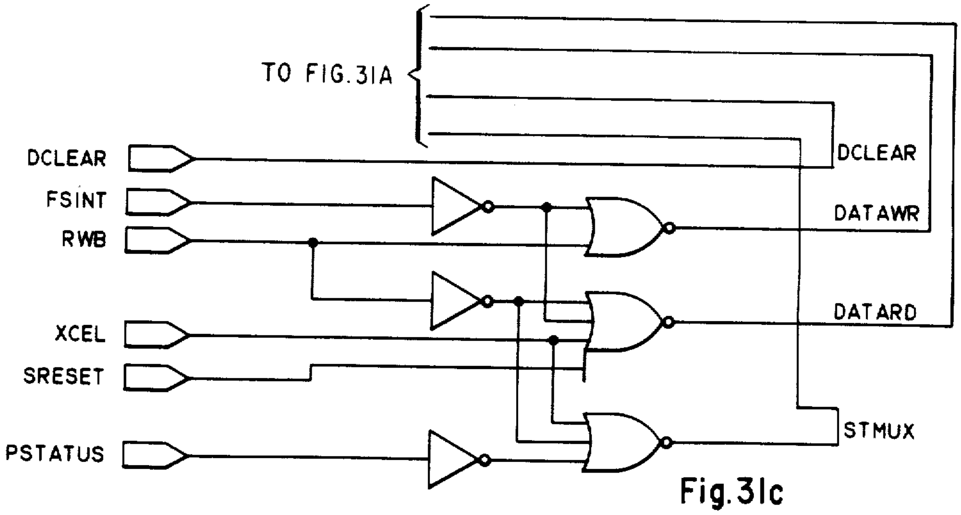

FIGS. 31*a* through 31*c* are schematic diagrams of the data pins 83 in which buffering and amplification is provided for driving the signals that are present on the databus 17 to the xy register 43, the column address 49,41 and the control and internal registers 39.

Figure 32A:
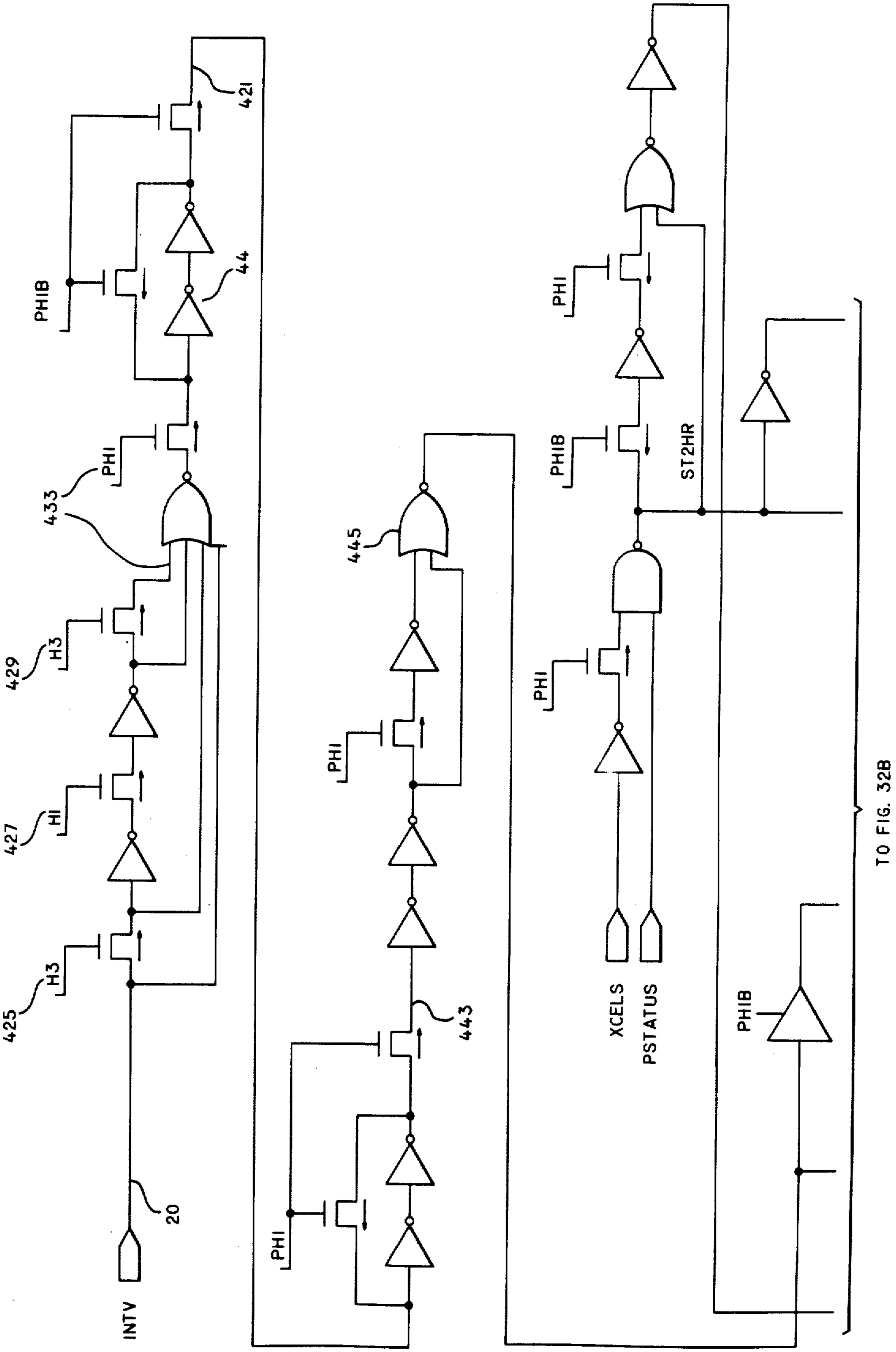
FIGS. 32*a* through 32*c* are schematic diagrams of the data state block of FIG. 3.
Figure 32B:
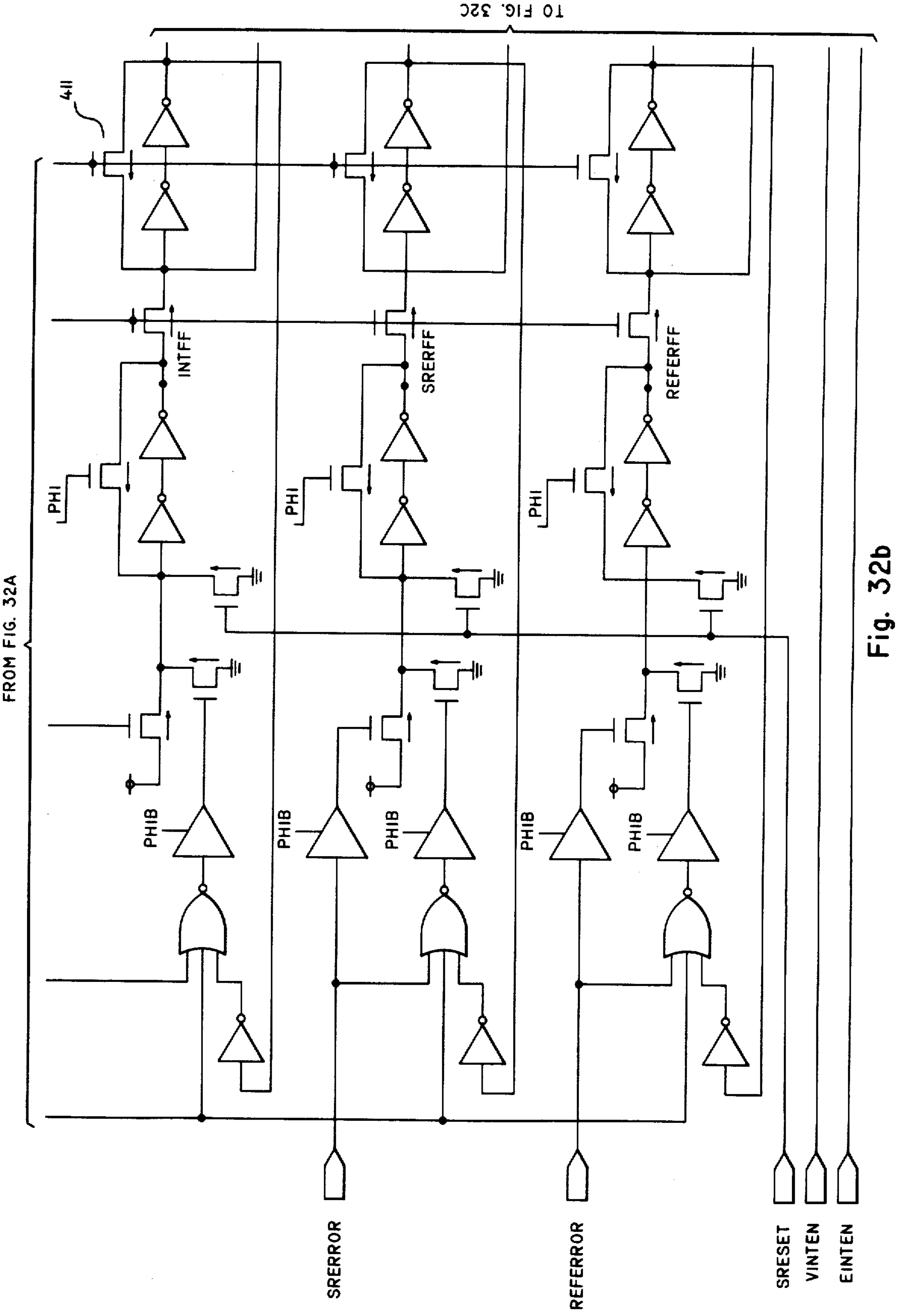
Figure 32C:
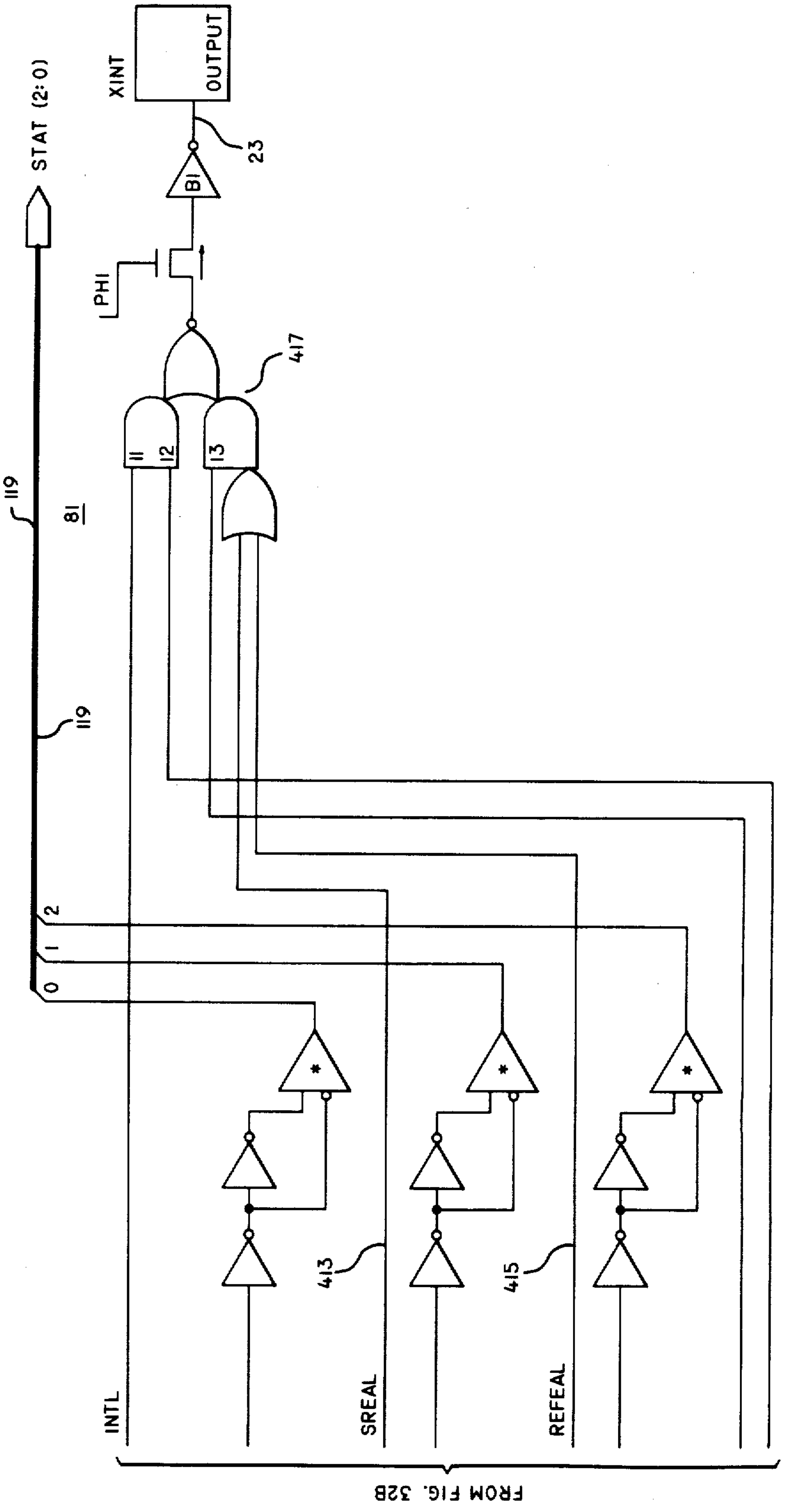
Figure 33A:
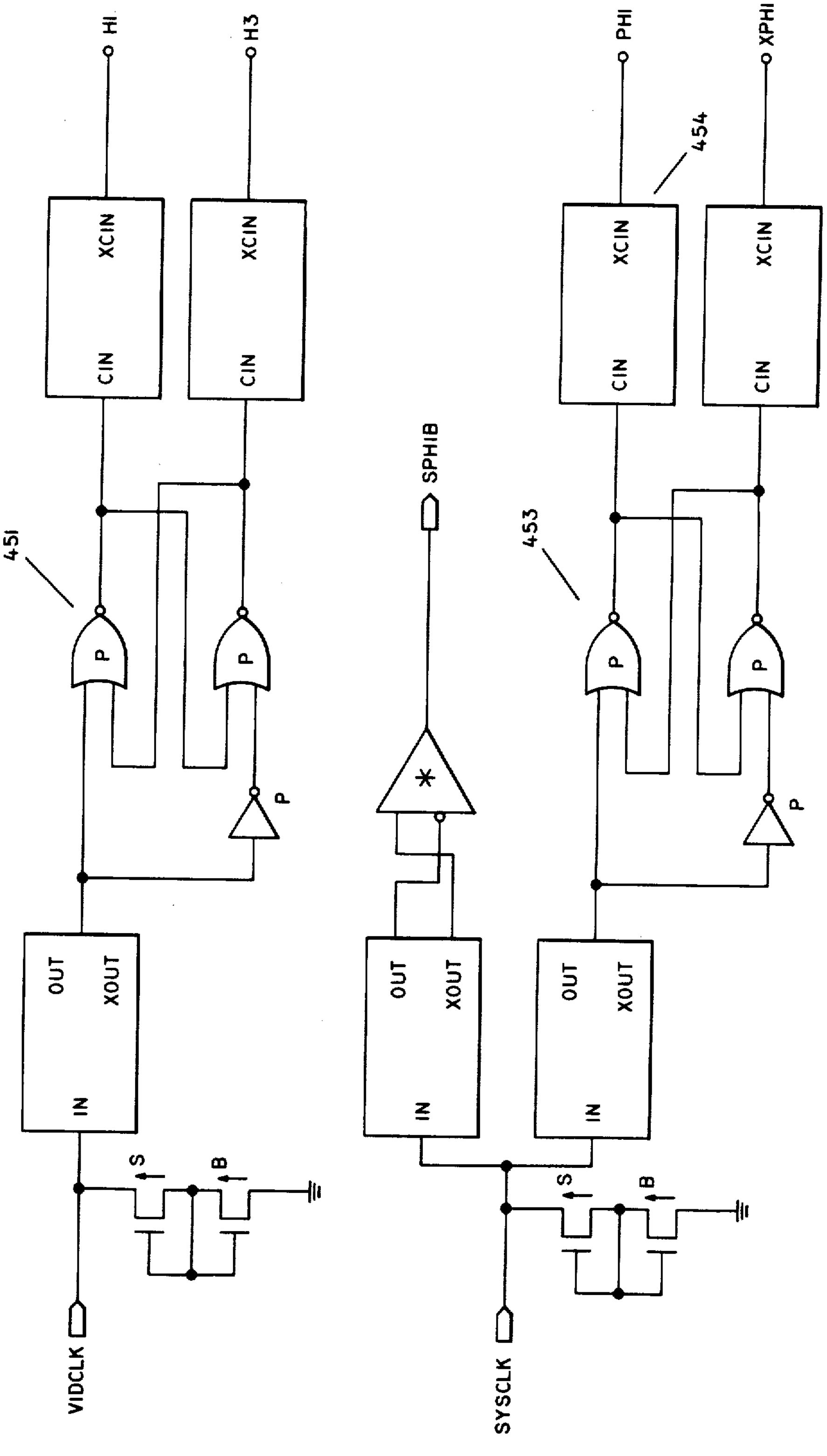
FIGS. 33*a* through 33*c* are schematic diagrams of the dual clocks used in the video system controller.
Figure 33B:
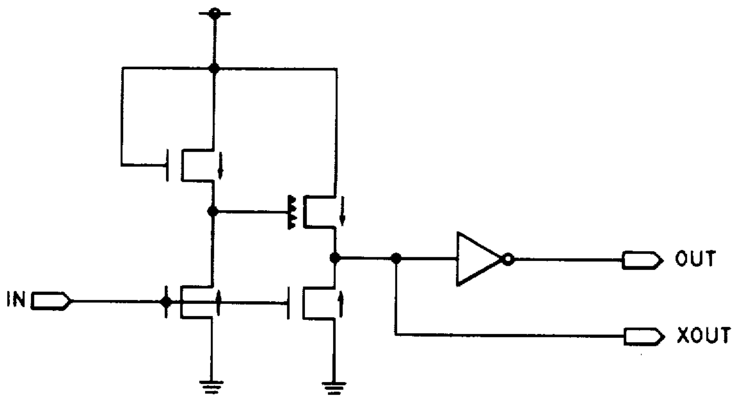
Figure 33C:
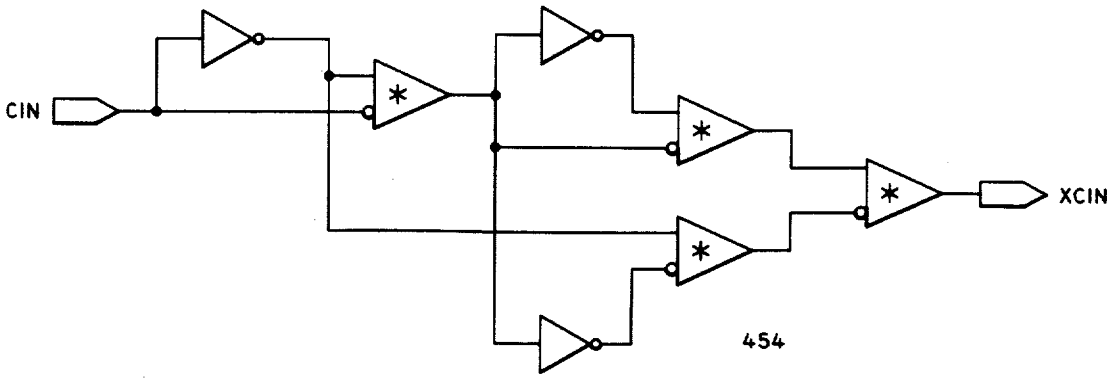

FIGS. 32*a* through 32*c* are schematic diagrams of the status register 81 in which there is present three bits, each representing a particular internal conditon. A bit value one indicates that the corresponding condition has been detected. These conditions include a vertical interrupt at logic circuit 411. A display error which indicates that the video system controller three was unable to perform a display update cycle requested during the horizontal blanking interval. The display error is stored in this circuit 413. The refresh error latch, 415 indicates that the video system controller 3 was unable to execute the designated number of Dram-refresh cycles before the beginning of the next horizontal blanking interval. These three signals are combined together by and/or logic 417 and provide the interrupt conductor 23 and exact cause of interrupt is provided on the status lines 419. Again, there is a synchronizer circuit 421 which synchronizes the interrupt from the video block 27 with the system clock. The interrupt is 1st synchronized with the video clock by circuit 423 which includes three gated transistors 425, 427, & 429 which are gated by phase three, phase one, and phase three. Separating between the phase three gate and phase one, and the phase one and the phase three, is an inverting amplifier 435 & 437 respectfully. The output of the circuit 433 is applied to the system clock synchronizers which includes a gated latch 441, 443 and the pulse shaping circuit 445 which provides the interrupt to the vertical interrupt circuit 411. FIGS. 33*a* through 33*c* provide for the clock circuits that are used to generate the phase one and phase three phases on the video clock at circuit 451, circuit 453 generates a system clocks that are used to provide clocks to the video system controller 3. The dual clocks and the synchronizing circuits illustrated in the FIGS. 32, 9, 30, & 36 are required since the video clock, VIDCLK, which is harmonically related to the monitor dot clock, may be different from the microprocessor 1 clock, SYSCLK. SYSCLK is specified to run faster than VIDCLK, and permits performing memory cycles at an expedient rate. VIDCLK is specified to run slower than SYSCLK, however the architecture permits controlling monitors whose dot clock frequency can exceed 100 MHZ.

Figure 34:
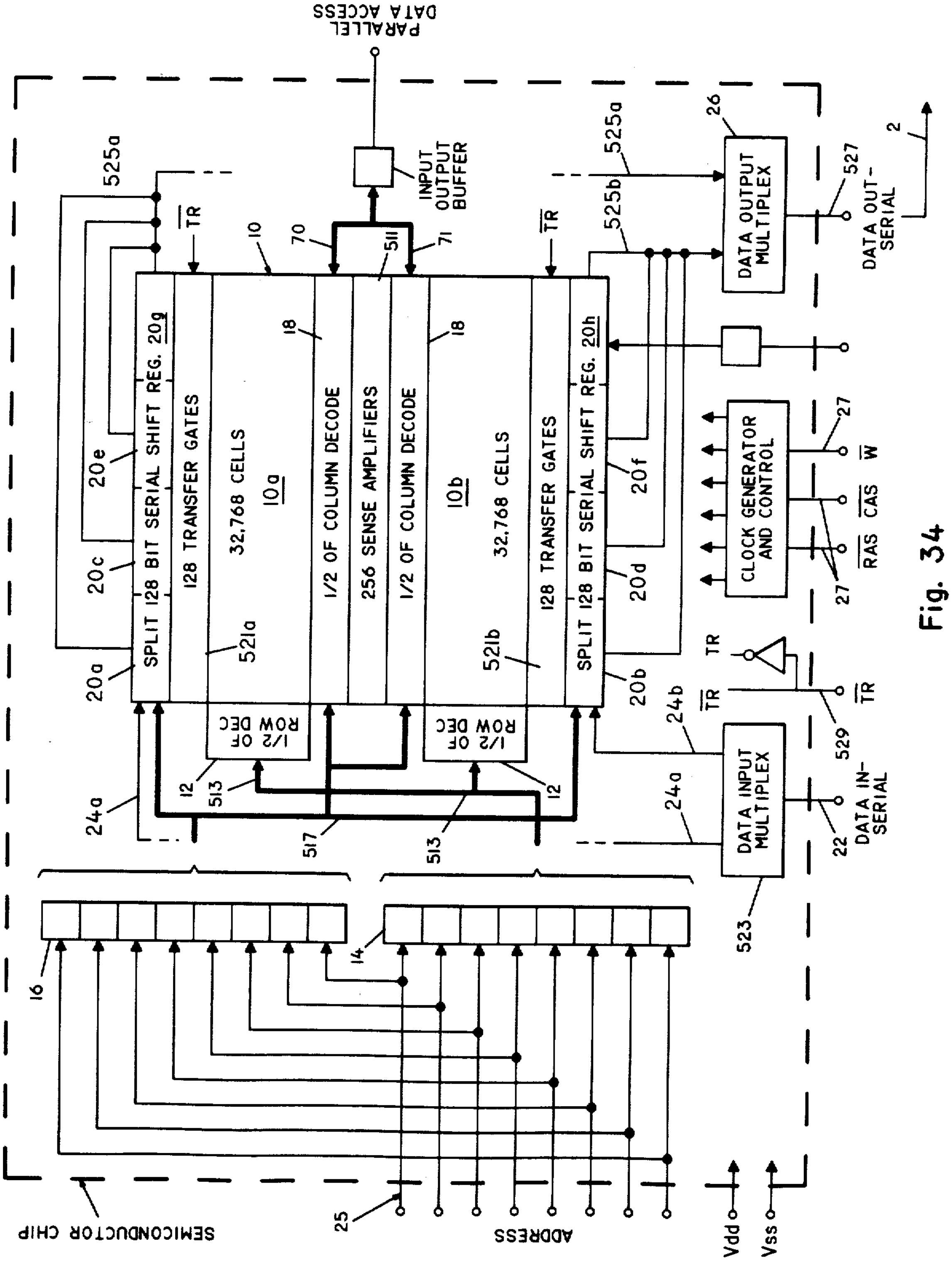
FIG. 34 is a schematic diagram of one embodiment of the display memory.

One example of a memory device 5 which may be suitable for use in the system depicted in FIG. 1 and depicted in FIG. 34, is a 64K-bit MOS dynamic read/-write memory using one transistor cells, as shown in U.S. Pat. No. 4,239,993, and further including a serial shift register having multiple taps added. For this example, the random access may be one bit wide. Other suitable examples (not shown) may be memory devices as hereinbefore described which have 256K-bits of storage or even larger.

As hereinafter set forth, if the memory is partitioned to provide eight chips, for example, then the individual storage devices may be X1, i.e. one bit wide, and eight of these storages may be connected in parallel for access by a typical 8-bit microcomputer 8. Other partitioning, such as X4 or X16, could also be employed as will hereinafter be apparent.

The memory device 5 depicted in FIG. 34 is typically made by an N-channel, self-aligned, silicon-gate, double-level polysilicon, MOS process, with all of the device being included in one silicon chip of about 1/30 of a square inch in size, which usually would be mounted in a standard dual-in-line package having twenty pins or terminals. For a 256K-bit device this package may be provided with as many as twenty-two pins or terminals. Similarly, the number of the pins would increase for larger volume devices. The device includes in this example an array 10-split into two halves 10*a* and 10*b* of 32,768 cells each, in a regular pattern of 256 rows and 256 columns. Of the 256 rows or X lines, there are 128 in the array half 10*a* and 128 in the half 10*b*. The 256 columns or Y lines are each split in half with one-half being in each of the halves 10*a* and 10*b*. There are 256 sense amplifiers 511 in the center of the array; these are differential type bistable circuits made according to the invention disclosed and claimed in said Patent 4,239,993, or in U.S. Pat. No. 4,081,701. Each sense amplifier is connected in the center of a column line, so 128 memory cells are connected to each side of each sense amplifier by a column line half. The chip requires only a single 5 v supply vdd, along with a ground terminal vss.

A row or X address decoder 12, split into two halves, is connected by sixteen lines 513 to eight address buffers or latches 14. The buffers 14 are made according to the invention disclosed in U.S. Pat. No. 4,288,706. An eight-bit X address is applied to inputs of the address buffers 14 by eight address input terminals 525. The X decoder 12 functions to select one of the 256 row lines as defined by an eight bit address on the input terminals 15 received via bus 507 from the microcomputer 8. For more than 256 row lines, i.e. a 256 K-bit memory with 512 row lines, a larger than eight-bit X address and eight-bit latch must be employed.

A column address is also received on the input pins 25 and latched into column address latches 16. For a bit-wide random-access data input/output, all eight column address bits are needed, but for byte-wide access, i.e. eight bits, only five address bits are needed, and the microcomputer may output additional column address bits to select among several cascaded chips; these additional column address bits may be used by chip-select decoders of conventional construction. The outputs of the column address latches 16 are connected by lines 517 to a decoder 18 in the cneter of the array which selects one-of-256 columns to produce a bit wide input/output on random access input/output line 17/31; separate input 17 and output 31 lines may be used as shown in FIG. 1, or the lines 17/31 may be multiplexed as shown in FIG. 34. Rows of dummy cells (not shown) are included on each side of the sense amplifiers as is the usual practice in devices of this type. As for the X-address, for larger volume devices, the number of bits and latches required to identify a column increases.

The memory device is thus similar to a standard dynamic RAM, with bit-wide or other bit-size random access and also having a serial input/output. Continuing to refer to FIG. 34, the serial access is provided by a 256-bit serial shift register 20 split into two identical halves with the halves positioned at opposite sides of the array 10. The same result may be achieved by placing both halves on the same side of the array, but laid out one above the other. However, placing the halves on opposite sides of the array balances the operation of the sense amplifiers.

The shift register 20 may be loaded from the column lines of the array 10 for a read cycle, or loaded into the column lines for a write cycle, by 128 transfer gates 521*a* on one side of the array and a like number of transfer gates 521*a* on one side of the array and a like number of transfer gates 521*b* on the other side of the array.

Data input to the device for serial write is by a data-in terminal 22 which is connected by a multiplex circuit 523 to inputs 24*a* and 24*b* of the shift register halves. Data is read out serially from the register halves via outputs 525*a* and 525*b*, a data-out multiplex and buffer circuit 26, and a data-out terminal 527.

The shift register 20 is operated by a clock 0 which is used to shift the bits through the stages of the register, two stages for each clock cycle. For read operations it takes only 128 cycles of the clock 0 to output 256 bits from the 256 bit positions of the split shift register. A control signal TR 29 applied to the transfer gates 21*a* and 21*b* connects each of the 256 bit positions of the shift register 20 to its corresponding column line in the array halves 10*a* and 10*b*.

In a serial write operation, the sense amplifiers 511 are operated by a write command, W, occuring after TR/QE to set the column lines at a full logic level, after which one row line is selected by the address in the latches 14 and the data forced into the memory cells of this row. A serial read cycle starts with an address on the input 15 which is decoded to activate one of the 256 X or row address lines (and a dummy cell on the opposite side). The sense amplifiers 11 are then actuated by a control signal from clock generator and control circuitry 30 to force the column lines to a full logic level, and then the transfer gates 21*a* and 21*b* are actuated by control signal TRQE to move the 256 bits from the selected row into the corresponding shift register 20 halves. The shift clock signal 0 then applied and may move 256 bits onto the output pin 527 in serial format via the multiplex circuit 26, at two stages or bits per clock cycle, requiring 128 clock cycles for the entire register. The output pin 527 is connected to the shift register 7 of FIG. 1.

As thus far described, the memory device is similar to a standard dynamic RAM with a bit-wide or other bit-size random access with a serial input and out-put; however, according to the invention, the 256-bit serial shift register 20, which provides the serial input and output, is organized as four 64-bit shift registers. One, two, three or four 64-bit shift registers may be accessed depending upon which of the four "taps" along the 256-bit shift register is selected. Since the 256-bit shift register is split into two "halves", each 64-bit shift register is also split into halves. As shown in FIG. 34, one 64-bit shift register is top half 20*a* and bottom half 20*b*, a second 64-bit shift register is top half 20*c* and bottom half 20*d*, a third 64-bit shift register is top half 20*e* and bottom half 20*f*, and a fourth 64-bit shift register is top half 20*g* and bottom half 20*h*.

The tap selected determines whether the first, second, third, or fourth 64-bit shift registers is accessed. The tap selected is determined by a two bit code applied to the two most significant column address inputs. The depiction in FIG. 34 is thus made of lines 517 from the column address latch 16 also inputting to the shaft register 20 to select, via a binary code, the particular tap desired.

Figure 35:
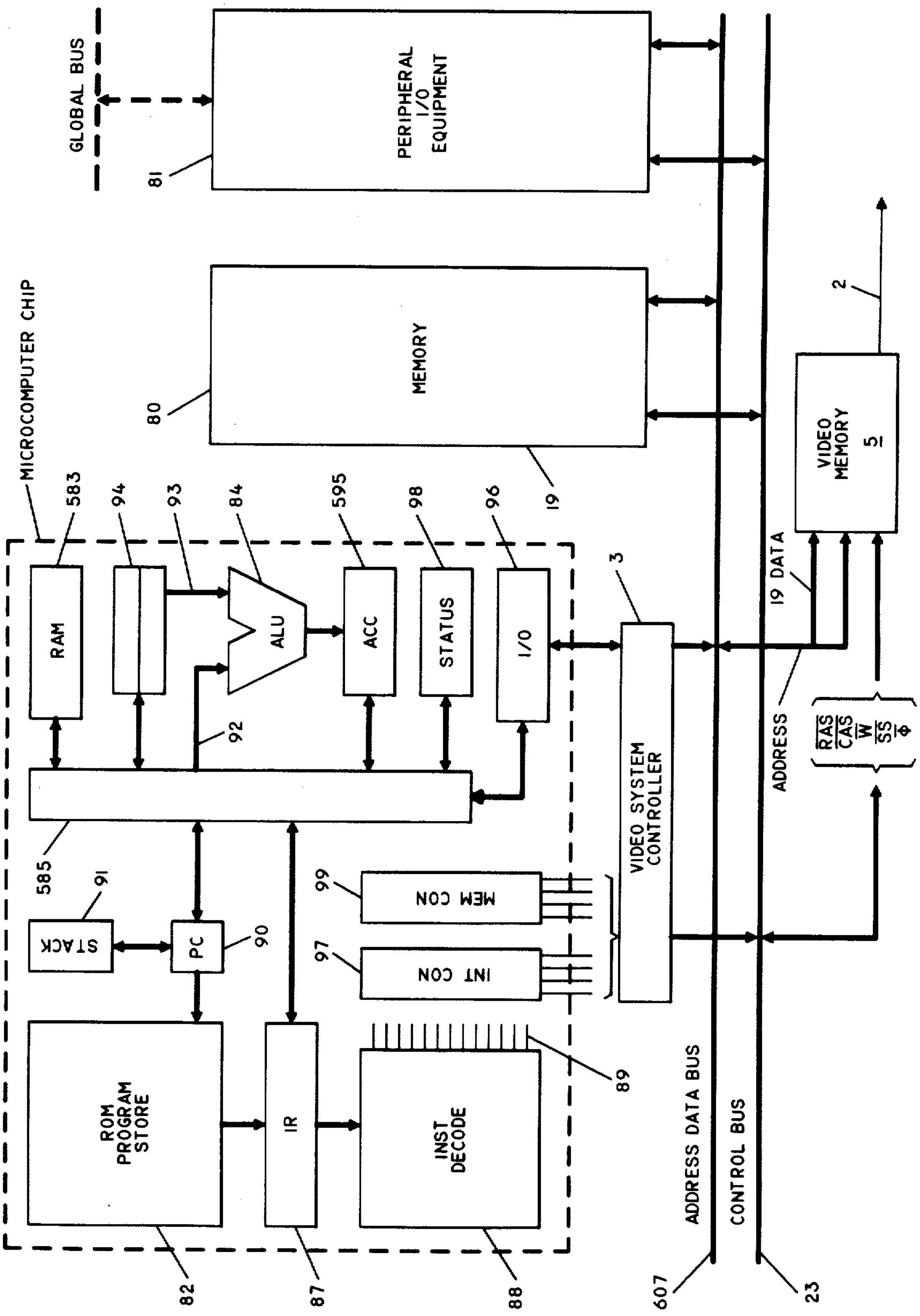
FIG. 35 is a block diagram of a microprocess of FIG. 1.

Referring to FIG. 35, a microcomputer 1 which may be used with the system of the invention may include a single-chip microcomputer device 1 of conventional constructions, along with additional off-chip program or data memory 80 (if needed), and various peripheral input/output devices 81, all interconnected by an address/data bus 607, and a control bus 9.

A single bidirectional multiplexed address/data bus 7 is shown, but instead separate address and data busses may be used as in FIG. 1 and also the program addresses and data or input and output addresses may be separated on the external busses; the microcomputer may be of the Von Neumann architecture, or of the Harvard type or a combination of the two.

The microprocessor 1 could be one of the devices marketed by Texas Instruments under the part number of TMS 7000 or TMS 99000, for example, or one of the devices commercially available under part numbers Motorola 68000 or 6805, Zilog Z8000 or Intel 8086 or 8051, or the like. These devices, while varying in details of internal construction, generally include an onchip ROM or read-only memory 82 for program storage, but also may have program addresses available off-chip, but in any event have off-chip data access for the Display memory 5. The video system controller 3 is designed to interface to all microprocessors and microcomputers which provides flexibility to system designers.

A typical microcomputer 1, as illustrated in FIG. 35, may contain a RAM or random access read/write memory 583 for data and address storage, an ALU 84 for executing arithmetic or logic operations, and an internal data and program bus arrangement 585 for transferring data and program addresses from one location to another (usually consisting of several separate busses). Instructions stored in the ROM 82 are loaded one at a time into an instruction register 587 from which an instruction is decoded in control circuitry 88 to produce controls 589 to define the microcomputer operation.

The ROM 82 is addressed by a program counter 90, which may be self-incrementing or may be incremented by passing its contents through the ALU 84. A stadk 591 is included to store the contents of the program counter upon interrupt or subroutine. The ALU has two inputs 92 and 93, one of which has one or more temporary storage registers 94 loaded from the data bus 585.

An accumulator 595 receives the ALU output, and the accumulator output is connected by the bus 85 to its ultimate destination such as the RAM 583 or a data input/output register and buffer 96. Interrupts are handled by an interrupt control 597 which has one or more off-chip connections via the control bus 23 for interrupt request, interrupt acknowledge, interrupt priority code, and the like, depending upon the complexity of the microcomputer device and the system.

A reset input may also be treated as an interrupt. A status register 98 associated with the ALU 84 and the interrupt control 597 is included for temporarily storing status bits such as zero, carry, overflow, etc., from ALU operations; upon interrupt the status bits are saved in RAM 583 or in a stack for this purpose.

The memory addresses are coupled off-chip through the buffers 96 connected to the external bus 607 depending upon the particular system and its complexity. This path may be employed for addressing off-chip data or program memory 80 and input/output 581 in addition to off-chip video memory 5. These addresses to bus 7 may originate in RAM 83, accumulator 95 or instruction register 87, as well as program counter 90. A memory control circuit 99 generates (in response to control bits 89), or responds to, the commands to or from the control bus 9 for address strobe, memory enable, write enable, hold, chip select, etc., as many be appropriate.

In operation, the microcomputer device 1 executes a program instruction in one or a sequence of machine cycles or state times. A machine cycle may be 200 nsec., for example, by an output from a 5 MHz crystal clock applied to the microcomputer chip. So, in successive machine cycles or states, the program counter 90 is incremented to produce a new address, this address is applied to the ROM 82 to produce an output to the instruction register 587 which is then decoded in the control circuitry 88 to generate a sequence of sets of microcode control bits 589 to implement the various steps needed for loading the bus 85 and the various registers 94, 595, 96, 98, etc.

For example, a typical ALU arithemtic or logic operation would include loading addresses (fields of the instruction word) from instruction register 587 via bus 585 to addressing circuitry for the RAM 583 (this may include only source address or both source and destination addresses). Such an operation may also include transferring the addressed data words from the RAM 583 to a temporary register 94 and/or to the input 92 of the ALU. Microcode bits 589 would define the ALU operation as one of the types available in the instruction set, such as add, subtract, compare, and, or, exclusive or, etc. The status register 98 is set dependent upon the data and ALU operation, and the ALU result is loaded into the accumulator 595.

As another example, a data output instruction may include transferring a RAM address from a field in the instruction to the RAM 583 via bus 585, transferring this addressed data from the RAM 583 via bus 585 to the output buffer 96 and thus out onto the external address/data bus 7. Certain control outputs may be produced by memory control 99 on lines of the control bus 23 such as write enable, etc. The address for this data output could be an address on the bus 607 via buffer 96 in a previous cycle where it is latched in the memory 80 or memory 5 by an address strobe output from the memory control 99 to the control bus 9.

An external memory controller device may be used to generate the RAS and CAS strobes. A two-byte address for the memory 5 would be applied to the bus 607 in two machine cycles if the bus 607 is 8-bit, or in one cycle if the bus is 16-bit.

The instruction set of the microcomputer 8 includes instructions for reading from or writing into video memory 5, the additional memory 19 or the input/output ports of peripheral equipment 581, with the internal source or destination being the RAM 583, program counter 90, temporary registers 94, instruction register 587, etc. In a microcoded processor each such operation involves a sequence of states during which addresses and data are transferred on internal bus 585 and external bus 7.

Alternatively, the invention may use a microcomputer 1 of the non-microcoded type in which an instruction is executed in one machine state time. What is necessary in selecting the microcomputer 1 is that the data and addresses, and various memory controls, be available off-chip, and that the data-handling rate be adequate to generate and update the video data within the time constraints of the particular video application.

The video memory arrangement of the invention is described in terms of one bit data paths for the bus 7, although it is understood that the microcomputer system and the memory technique is useful in either 8-bit or 16-bit systems, or other architectures such as 24-bit or 32-bit. One utility is in a small system of the type having 8-bit data paths and 12-bit to 16-bit addressing, in which no external memory 80 is needed and the peripheral circuitry 81 consists of merely a keyboard or like interface, plus perhaps a disc drive. A bus interface chip such as an IEEE 488 type of device could be included in the peripheral circuitry 81, for example.

Figure 36:
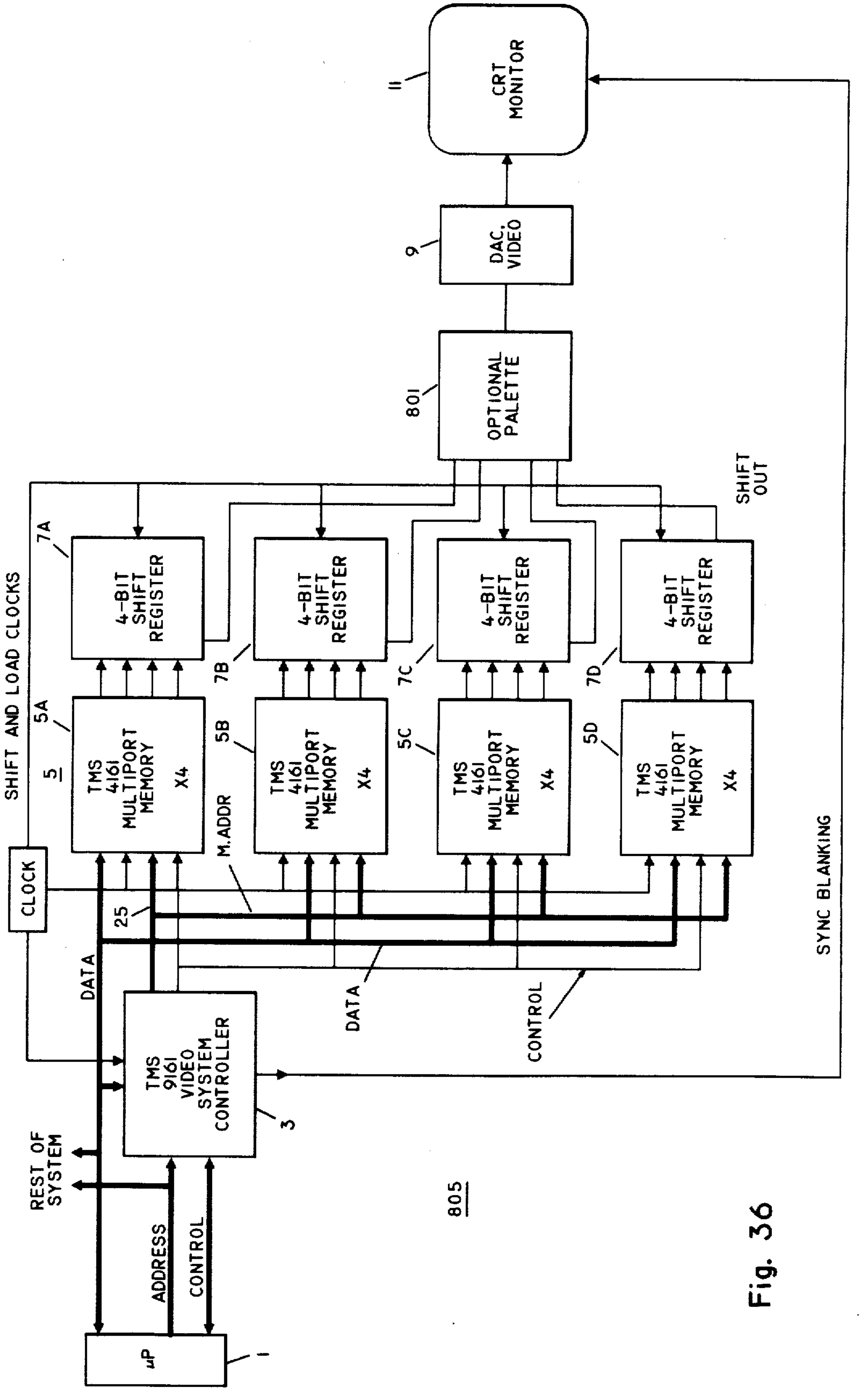
FIGS. 36 and 37 are alternative embodiments of a video system.

FIG. 36 is an Block Diagram of the video system according to the invention in which the video system 805 is a 512×512 pixel graphic system with 16 colors. The displayed memory 5 has been expanded from a single multiport memory device to four groups of memory devices, 5A, 5B, 5C, 5D by 4D. The output of the multiport memory 5A–5D are applied to the 4 bit shift registers 7A–7D and to the CRT monitor 11 via the Digital to analog converter 9 and an optional color pallet register 801. The color pallet registers of course contains the coded information for generating the program colors that are addressed to it by the microprocessor.

Figure 37:
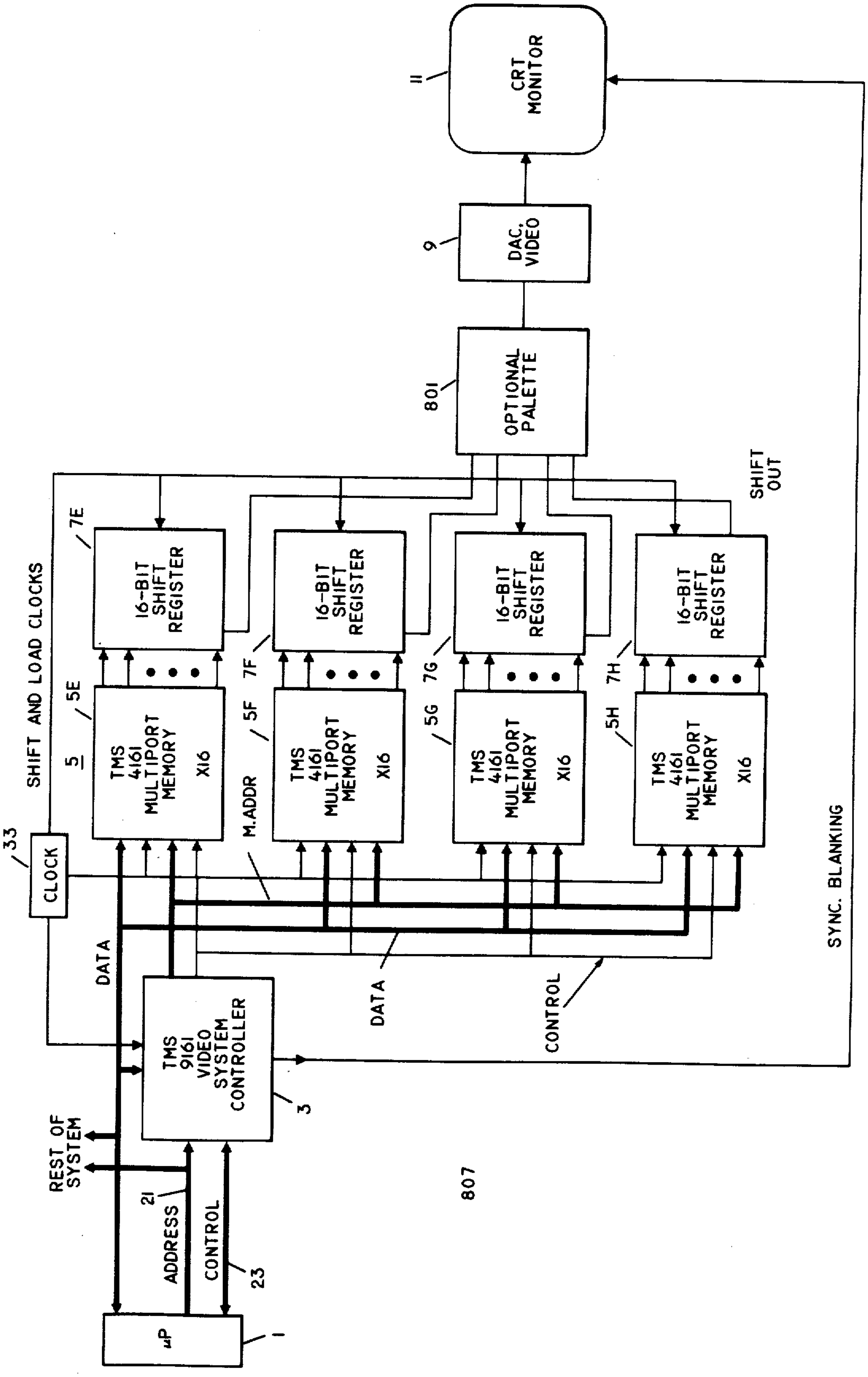

FIG. 37 is a block diagram of a 1024×1024 pixel resolution color graphic system. The display memory five has been replaced with 4 groups of multi-port memories 5E, 5F, 5G, 5H which are 16 bits deep. The shift register 7 has been expanded to include four shift registers 7E–7H which are 16 bits wide. The remainder of the circuits of FIGS. 36 & 37 is identical to that disclosed in FIG. 1.

While this invention has been described with reference to illustrated embodiments, this description is not intended to be construed in a limited sense. Various modifications of the illustrated embodiments, as well as other embodiments of the inventions will be apparent to persons skilled in the art upon reference to this description. It is therefore contemplated that the appended claims will cover any such modification of embodiments as fall within the scope of the invention.

What is claimed is:

1. A video system comprising:

a data processor means for manipulating data including pixel image data forming a video image in accordance with program instructions, said data processor means having a control bus for transmitting control signals including an XY memory access signal, a data bus and a first address bus;

a memory means connected to said data bus and having a second address bus, for storing and recalling data, including pixel image data corresponding to a visual image, in memory locations corresponding to addresses received from said second address bus;

a video system controller means connected to said data bus, said first address bus and said second address bus for controlling the transfer of data between said data processor means and said memory means by control of the address applied to said memory means via said second address bus, said video system controller means including an XY address register means connected to said data bus for storing the row and column addresses corresponding to a particular display location expressed as an X raster position code and a Y raster position code, an XY offset register means connected to said XY address register means having data stored therein defining the number of bits of said XY address register means defining said X raster position code and the number of bits of said XY address register means defining said Y raster position code, and an addressing means connected to said control bus, said first address bus, said second address bus and said XY address register means for performing an XY memory access by providing an address from said XY address register means to said memory means via said second address bus upon receipt of an XY memory access signal; and a display means connected to said memory means for generating an operator perceivable visual display corresponding to said video data stored in said memory means.

2. A video system as claimed in claim 1, wherein:

said data processing means further includes means for transmitting an XY address update control signal on said control bus; and said video system controller means further includes an XY update means connected to said control bus and said XY address register means for separately updating said X raster position code and said Y raster position code stored in said XY address register means in accordance with said XY address update control signal after each XY memory access.

3. A video system as claimed in claim 2, wherein:

said XY address update control signal transmitted by said data processor means includes an increment X update control signal; and said XY update means increments the X raster position code stored in said XY address register means after an XY memory access upon receipt of an increment X signal update control signal.

4. A video system as claimed in claim 2, wherein:

said XY address update control signal transmitted by said data processor means includes a decrement X update control signal; and said XY update means decrements the X raster position code stored in said XY address register means after an XY memory access upon receipt of a decrement X signal update control signal.

5. A video system as claimed in claim 2, wherein:

said XY address update control signal transmitted by said data processor means includes a clear X update control signal; and said XY update means clears the X raster position code stored in said XY address register means after an XY memory access upon receipt of a clear X signal update control signal.

6. A video system as claimed in claim 2, wherein:

said XY address update control signal transmitted by said data processor means includes an increment Y update control signal; and said XY update means increments the Y raster position code stored in said XY address register means after an XY memory access upon receipt of an increment Y signal update control signal.

7. A video system as claimed in claim 2, wherein:

said XY address update control signal transmitted by said data processor means includes a decrement Y update control signal; and said XY update means decrements the Y raster position code stored in said XY address register means after an XY memory access upon receipt of a decrement Y signal update control signal.

8. A video system as claimed in claim 2, wherein:

said XY address update control signal transmitted by said data processor means includes a clear Y update control signal; and said XY update means clears the Y raster position code stored in said XY address register means after an XY memory access upon receipt of a clear Y signal update control signal.

9. A video system as claimed in claim 2, wherein:

said XY address update control signal transmitted by said data processor means includes an increment X increment Y update control signal; and said XY update means increments the X raster position code stored in said XY address register means and increments the Y raster position stored in said XY address register means after an XY memory access upon receipt of an increment X increment Y signal update control signal.

10. A video system as claimed in claim 2, wherein:

said XY address update control signal transmitted by said data processor means includes an increment X decrement Y update control signal; and said XY update means increments the X raster position code stored in said XY address register means and decrements the Y raster position stored in said XY address register means after an XY memory access upon receipt of an increment X decrement Y signal update control signal.

11. A video system as claimed in claim 2, wherein:

said XY address update control signal transmitted by said data processor means includes an increment X clear Y update control signal; and said XY update means increments the X raster position code stored in said XY address register means and clears the Y raster position stored in said XY address register means after an XY memory access upon receipt of an increment X clear Y signal update control signal.

12. A video system as claimed in claim 2, wherein:

said XY address update control signal transmitted by said data processor means includes a decrement X increment Y update control signal; and said XY update means decrements the X raster position code stored in said XY address register means and increments the Y raster position stored in said XY address register means after an XY memory access upon receipt of a decrement X increment Y signal update control signal.

13. A video system as claimed in claim 2, wherein:

said XY address update control signal transmitted by said data processor means includes a decrement X decrement Y update control signal; and said XY update means decrements the X raster position code stored in said XY address register means and decrements the Y raster position stored in said XY address register means after an XY memory access upon receipt of an decrement X decrement Y signal update control signal.

14. A video system as claimed in claim 2, wherein:

said XY address update control signal transmitted by said data processor means includes an decrement X clear Y update control signal; and said XY update means decrements the X raster position code stored in said XY address register means and clears the Y raster position stored in said XY address register means after an XY memory access upon receipt of a decrement X clear Y signal update control signal.

15. A video system as claimed in claim 2, wherein:

said XY address update control signal transmitted by said data processor means includes a clear X increment Y update control signal; and said XY update means clears the X raster position code stored in said XY address register means and increments the Y raster position stored in said XY address register means after an XY memory access upon receipt of a clear X increment Y signal update control signal.

16. A video system as claimed in claim 2, wherein:

said XY address update control signal transmitted by said data processor means includes a clear X decrement Y update control signal; and said XY update means clears the X raster position code stored in said XY address register means and decrements the Y raster position stored in said XY address register means after an XY memory access upon receipt of a clear X decrement Y signal update control signal.

17. A video system as claimed in claim 2, wherein:

said XY address update contol signal transmitted by said data processor means includes a clear X clear Y update control signal; and said XY update means clears the X raster position code stored in said XY address register means and clears the Y raster position stored in said XY address register means after an XY memory access upon receipt of a clear X clear Y signal update control signal.

18. A video system as claimed in claim 2, wherein:

said XY offset register means is further connected to said data bus whereby said data processor means can alter the data stored therein thereby redefining the number of bits of said XY address register means defining said X raster position code and the number of bits of said XY address register means defining said Y raster position code.

19. A video system as claimed in claim 2, wherein:

said XY offset register means is further connected to said data bus and further includes a plurality of offset bits, whereby said data processor means can alter said offset bits stored in said XY offset register means; and said addressing means provides an address from said XY address register means to said memory means via said second address bus upon receipt of an XY memory access signal by concatenation of said X raster position code, said Y raster position code and said plurality of offset bits stored in said XY offset register means.

20. A video system as claimed in claim 2, wherein:

said memory means has a plurality of memory planes, each memory plane having a separate memory write enable input, whereby pixel image data having said predetermined plural number of bits is stored at each memory location;

said XY offset register means is further connected to said data bus and further includes a plurality of plane select bits, whereby said data processor means can alter said plane select bits stored in said XY offset register means; and said addressing means provides an address from said XY address register means to said memory means and further provides a selection of memory planes of said memory means in accordance with said plane select bits stored in said XY offset register means.

21. A video system comprising:

a data processor means for manipulating data including pixel image data forming a video image in accordance with program instructions, said data processor means having a control bus for transmitting control signals, said control signals including a direct memory access control signal, an XY indirect memory access control signal and an XY address update control signal, a data bus and a first address bus;

a memory means connected to said data bus and having a second address bus, for storing and recalling data, including pixel image data corresponding to a visual image, in memory locations corresponding to addresses received from said second address bus, said memory means constructed to receive separately a row address and a column address time multiplexed on said second address bus;

a video system controller means connected to said data bus, said first address bus and said second address bus for controlling the transfer of data between said data processor means and said memory means by control of the address applied to said memory means via said second address bus, said video system controller further including a row address latch connected to said first address bus for storing a row address received from said data processor means, a column address latch connected to said first address bus for storing a column address received from said data processor means, an XY address register means connected to said data bus for storing the row and column addresses corresponding to a particular display location expressed as an X raster position code and a Y raster position code received from said data processor means, the most significant bits being said Y raster position code and the least significant bits being said X raster position code, an XY offset register means connected to said control bus and said XY address register means having data stored therein defining the number of bits of said XY address register means defining said X raster position code and the number of bits of said XY address register means defining said Y raster position code, said XY offset register means being alterable by said data processor means, a multiplexer means connected to said control bus, said second address bus and said row address latch, said column address latch and said XY address register means for sequentially applying said row address stored in said row address latch and then applying said column address stored in said column address latch to said second address bus in response to a direct memory access control signal, and for sequentially supplying said row address stored in said XY address latch and then said column address stored in said XY address latch to said second address bus in response to an XY indirect memory access control signal, and an XY update means connected to said control bus and said XY address register means for separately updating said X raster position code and said Y raster position code stored in said XY address register means in accordance with said XY address update control signal after each XY memory access; and a display means connected to said memory means for generating an operator perceivable visual display corresponding to said video data stored in said memory means.

22. A video system as claimed in claim 21, wherein:

said control bus includes an XY address update control signal of 4 bits for specifying the type of update of the X raster position code and the Y raster position code upon an XY indirect memory access control signal; and said XY update means does not alter said X raster position code or said Y raster position code in response to an XY address update control signal in a first state;

increments said X raster position code in response to an XY address update control signal in a second state;

decrements said X raster position code in response to an XY address update control signal in a third state;

clears said X raster position code in response to an XY address update control signal in a fourth state;

increments said Y raster position code in response to an XY address update control signal in a fifth state;

increments said X raster position code and increments said Y raster position code in response to an XY address update control signal in a sixth state;

decrements said X raster position code and increments said Y raster position code in response to an XY address update control signal in a seventh state;

clears said X raster position code and increments said Y raster position code in response to an XY address update control signal in an eighth state;

decrements said Y raster position code in response to an XY address update control signal in an ninth state;

increments said X raster position code and decrements said Y raster code in response to an XY address update control signal in a tenth state;

decrements said X raster position code and decrements said Y raster position code in response to an XY address update control signal in an eleventh state;

clears said X raster position code and decrements said Y raster position code in response to an XY address update control signal in an twelfth state;

clears said Y raster position code in response to an XY address update control signal in a thirteenth state;

increments said X raster position code and clears said Y raster position code in response to an XY address update control signal in a fourteenth state;

decrements said X raster position code and clears said Y raster position code in response to an XY address update control signal in a fifteenth state; and clears said X raster position code and clears said Y raster position code in response to an XY address update control signal in a sixteenth state.

23. A video system as claimed in claim 21, wherein:

said XY offset register means is further connected to said data bus and further includes a first and second offset bits, whereby said data processor means can alter said offset bits stored in said XY offset register means; and said multiplexer means provides said row address to said memory means via said second address bus upon receipt of an XY memory access signal by providing said first offset bit as the most significant bit of said row address and recalling the least significant bits from said XY address register means and provides said column address to said memory means via said second address bus upon receipt of an XY memory access signal by providing said second offset bit as the most significant bit of said column address and recalling the least significant bits from said XY address register means.

24. A video system as claimed in claim 21, wherein:

said memory means has a plurality of memory planes, each memory plane having a separate memory write enable input, whereby pixel image data having said predetermined plural number of bits is stored at each memory location;

said XY offset register means is further connected to said data bus and further includes a plurality of plane select bits, whereby said data processor means can alter said plane select bits stored in said XY offset register means; and said multiplexer means provides an address from said XY address register means to said memory means and further provides a selection of memory planes of said memory means in accordance with said plane select bits stored in said XY offset register means.

25. A method of controlling data transfer between a data processor and a memory in a video system by control of the address supplied to the memory, the method comprising the steps of:

storing a row address received from said data processor means;

storing a column address received from said data processor means;

storing an XY address received from said data processor means corresponding to a particular display location expressed as an X raster position code and a Y raster position code;

storing data defining the number of bits of said stored XY address defining said X raster position code and the number of bits of said stored XY address defining said Y raster position code;

sequentially applying said stored row address and then applying said stored column address to the memory response to a direct memory access control signal;

sequentially supplying a row address and then a column address from said stored XY address to the memory in response to an XY indirect memory access control signal;

separately updating said X raster position code and said Y raster position code of said stored XY address in accordance with an XY address update control signal after each XY indirect memory access; and generating an operator perceivable visual display corresponding to video data stored in the memory.

26. A method as claimed in claim 25, further including:

incrementing, decrementing, clearing or not altering said X raster position code and said Y raster position code in response to said XY address update control signal.

27. A method as claimed in claim 25, further including:

altering via the data processor the stored data defining the number of bits of said stored XY address register means defining said X raster position code and the number of bits of said stored XY address register means defining said Y raster position code.

28. A method as claimed in claim 25, further including:

storing first and second offset bits alterable by the data processor; and said step of sequentially supplying a row address and then a column address from said stored XY address to the memory in response to an XY indirect memory access control signal includes providing said first offset bit as the most significant bit of said row address and recalling the least significant bits of said row address from said stored XY address register means and providing said second offset bit as the most significant bit of said column address and recalling the least significant bits from said stored XY address.

29. A method as claimed in claim 25, wherein:

storing a plurality of plane select bits alterable by the data processor; and selecting memory planes of the memory in accordance with said stored plane select bits.

* * * * *